(12) United States Patent
Adams et al.

(10) Patent No.: US 10,611,051 B2
(45) Date of Patent: *Apr. 7, 2020

(54) SYSTEMS AND METHODS FOR SKINNING ARTICLES

(71) Applicant: CORNING INCORPORATED, Corning, NY (US)

(72) Inventors: Brian Michael Adams, Corning, NY (US); Timothy Eugene Antesberger, Vestal, NY (US); Richard Dominic Bomba, Rochester, NY (US); Marc Jason Cassada, Horseheads, NY (US); Joseph Henry Citriniti, Corning, NY (US); John Joseph Costello, III, Virginia Beach, VA (US); Scott Winfield Deming, Elmira, NY (US); Parasuram Padmanabhan Harihara, Painted Post, NY (US); Michael Joseph Joyce, Elmira, NY (US); Christopher Lane Kerr, Tioga, PA (US); Harry Robinson, Jr., Corning, NY (US); Brian Christopher Sheehan, Elmira Heights, NY (US); Dell Joseph St. Julien, Watkins Glen, NY (US); Kevin Lee Wasson, Elmira, NY (US); James Arthur Youngman, Dundee, NY (US)

(73) Assignee: Corning Incorporated, Corning, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/518,901

(22) PCT Filed: Oct. 14, 2014

(86) PCT No.: PCT/US2014/060515
§ 371 (c)(1),
(2) Date: Apr. 13, 2017

(87) PCT Pub. No.: WO2015/057729
PCT Pub. Date: Apr. 23, 2015

(65) Prior Publication Data
US 2017/0239840 A1 Aug. 24, 2017

Related U.S. Application Data

(63) Continuation-in-part of application No. 14/083,722, filed on Nov. 19, 2013, now Pat. No. 9,670,809, and
(Continued)

(51) Int. Cl.
*B28C 7/04* (2006.01)
*B05C 11/10* (2006.01)
(Continued)

(52) U.S. Cl.
CPC .......... *B28C 7/0418* (2013.01); *B05C 5/0241* (2013.01); *B28B 11/04* (2013.01);
(Continued)

(58) Field of Classification Search
USPC ........ 118/300, 313–315, 407–412, 404, 665, 118/683, 684; 264/629–631; 425/126.1
See application file for complete search history.

(56) References Cited

U.S. PATENT DOCUMENTS 2,820,249 A 1/1958 Colombo
3,134,508 A 5/1964 Bayer et al.
(Continued)

FOREIGN PATENT DOCUMENTS

CN 1987102620 A 10/1987
CN 1265621 A 9/2000
(Continued)

OTHER PUBLICATIONS

Accuratus Ceramic Corporation; Fused Silica Material Properties; www.accuratus.com; 1 Page; Retrieved Nov. 10, 2015 (No Publication Date).
(Continued)

*Primary Examiner* — Yewebdar T Tadesse

(57) ABSTRACT

A system for delivering and applying a flowable mixture to an article (311-313) is disclosed. The system includes a
(Continued)

mixture delivery system (200) and a skinning system (300). The mixture delivery system (200) includes a mixer (220) configured to mix a dry material and a fluid to produce the flowable mixture, and a pump (235) configured to pump the flowable mixture to a delivery line. The skinning system (300) receives the flowable mixture from the mixture delivery system (200) through the delivery line. The skinning system (300) includes a skinning pipe (310) configured to apply the flowable mixture to the article (311-313) and a manifold (305) that supports the skinning pipe (310). The skinning system (300) also includes an article feeding mechanism (315) configured to push the article (311-313) into the skinning pipe (310). The skinning system (300) includes a transfer system (320) configured to hold the article (311-313) and move the article (311-313) out of the skinning pipe (310).

18 Claims, 94 Drawing Sheets

Related U.S. Application Data a continuation-in-part of application No. 14/217,848, filed on Mar. 18, 2014, now Pat. No. 9,239,296.

(60) Provisional application No. 62/063,364, filed on Oct. 13, 2014, provisional application No. 61/891,147, filed on Oct. 15, 2013.

(51) Int. Cl.
| | |
|---|---|
| *B28B 19/00* | (2006.01) |
| *B28C 5/12* | (2006.01) |
| *B28C 5/14* | (2006.01) |
| *B28C 7/02* | (2006.01) |
| *G05D 11/13* | (2006.01) |
| *B28B 11/04* | (2006.01) |
| *F01N 3/022* | (2006.01) |
| *B29C 48/11* | (2019.01) |
| *B05C 5/02* | (2006.01) |
| *G05B 11/01* | (2006.01) |
| *B29C 48/92* | (2019.01) |
| *B29C 48/157* | (2019.01) |
| *B29C 48/156* | (2019.01) |
| *B05C 13/02* | (2006.01) |

(52) U.S. Cl.
CPC ........ *B28B 19/0038* (2013.01); *B28C 5/1292* (2013.01); *B28C 5/143* (2013.01); *B28C 7/026* (2013.01); *B29C 48/11* (2019.02); *B29C 48/156* (2019.02); *B29C 48/157* (2019.02); *B29C 48/92* (2019.02); *F01N 3/0222* (2013.01); *G05B 11/01* (2013.01); *G05D 11/135* (2013.01); *G05D 11/136* (2013.01); *G05D 11/137* (2013.01); *B05C 5/027* (2013.01); *B05C 11/1021* (2013.01); *B05C 13/02* (2013.01)

(56) References Cited

U.S. PATENT DOCUMENTS

| | | |
|---|---|---|
| 3,957,940 A | 5/1976 | Schubert et al. |
| 3,972,970 A | 8/1976 | Taylor |
| 4,150,929 A | 4/1979 | Brandt |
| 4,191,126 A | 3/1980 | Reed et al. |
| 4,203,673 A | 5/1980 | Buckson |
| 4,319,840 A | 3/1982 | Kondo et al. |
| 4,338,028 A | 7/1982 | Tailleur et al. |
| 4,416,043 A | 11/1983 | Aoki et al. |
| 4,814,029 A | 3/1989 | Butcher |
| 5,122,038 A | 6/1992 | Malkoski |
| 5,252,836 A | 10/1993 | Matthews et al. |
| 5,401,454 A | 3/1995 | Mendel |
| 5,574,957 A | 11/1996 | Barnard et al. |
| 5,691,811 A | 11/1997 | Kihira |
| 5,703,960 A | 12/1997 | Soest |
| 5,783,129 A | 7/1998 | Shirai et al. |
| 5,966,213 A | 10/1999 | Shimosaka et al. |
| 6,045,898 A | 4/2000 | Kishi et al. |
| 6,048,256 A | 4/2000 | Obeng et al. |
| 6,061,126 A | 5/2000 | Yoshimura et al. |
| 6,122,045 A | 9/2000 | Pike et al. |
| 6,139,903 A | 10/2000 | Baron et al. |
| 6,190,152 B1 | 2/2001 | Cree |
| 6,200,380 B1 | 3/2001 | Finkelstein et al. |
| 6,429,157 B1 | 8/2002 | Kishi et al. |
| 6,551,535 B2 | 4/2003 | Sander |
| 6,660,086 B1 | 12/2003 | Prince et al. |
| 6,760,100 B2 | 7/2004 | Ivakhnenko et al. |
| 6,786,629 B2 | 9/2004 | Rondeau et al. |
| 6,926,858 B2 | 8/2005 | Cree |
| 7,239,588 B2 | 7/2007 | Gotoh et al. |
| 7,602,487 B2 | 10/2009 | Fukami et al. |
| 7,627,163 B2 | 12/2009 | Chang et al. |
| 8,090,143 B2 | 1/2012 | Komaki et al. |
| 8,142,859 B2 | 3/2012 | Domey et al. |
| 8,268,401 B2 | 9/2012 | Tokumaru |
| 8,439,299 B2 | 5/2013 | Luo et al. |
| 8,999,483 B2 | 4/2015 | Chapman et al. |
| 9,132,578 B2 | 9/2015 | Anthony et al. |
| 9,138,674 B2 | 9/2015 | Takahashi et al. |
| 9,139,479 B2 | 9/2015 | Chapman et al. |
| 9,239,296 B2 | 1/2016 | Citriniti et al. |
| 9,670,809 B2 | 6/2017 | Chapman et al. |
| 2001/0022212 A1 | 9/2001 | Kapteyn et al. |
| 2002/0006471 A1* | 1/2002 | Ohira .............. B05C 5/007 427/356 |
| 2002/0100994 A1 | 8/2002 | Sander |
| 2004/0223638 A1 | 11/2004 | Lespinet et al. |
| 2004/0238158 A1 | 12/2004 | Vandermeer et al. |
| 2005/0199335 A1 | 9/2005 | Oehl et al. |
| 2006/0137525 A1 | 6/2006 | Rae et al. |
| 2007/0091309 A1 | 4/2007 | Kondo |
| 2007/0095859 A1 | 5/2007 | Maser et al. |
| 2007/0132988 A1 | 6/2007 | Gargano et al. |
| 2009/0010523 A1 | 1/2009 | Komaki et al. |
| 2009/0011178 A1 | 1/2009 | Masukawa et al. |
| 2009/0020909 A1 | 1/2009 | Shirai et al. |
| 2009/0220735 A1 | 9/2009 | Mizuno et al. |
| 2009/0291252 A1 | 11/2009 | Ohno et al. |
| 2009/0297765 A1 | 12/2009 | Domey et al. |
| 2010/0045975 A1 | 2/2010 | Zoeller, III |
| 2010/0055332 A1 | 3/2010 | Domey et al. |
| 2010/0143215 A1 | 6/2010 | Caze et al. |
| 2010/0304041 A1 | 12/2010 | Fletcher et al. |
| 2011/0052039 A1 | 3/2011 | Urabe et al. |
| 2011/0116704 A1 | 5/2011 | Zoeller, III |
| 2011/0128370 A1 | 6/2011 | Booth et al. |
| 2011/0141461 A1 | 6/2011 | Matsui et al. |
| 2011/0237431 A1 | 9/2011 | Ambrosini et al. |
| 2011/0278753 A1 | 11/2011 | Breuer et al. |
| 2011/0298916 A1 | 12/2011 | Arden |
| 2012/0064254 A1 | 3/2012 | Franchet et al. |
| 2012/0301664 A1 | 11/2012 | Chapman et al. |
| 2013/0098450 A1 | 4/2013 | Frantz |
| 2013/0108521 A1 | 5/2013 | Ikushima |
| 2013/0136866 A1 | 5/2013 | Anthony et al. |
| 2013/0212051 A1 | 8/2013 | Stephens, II et al. |
| 2014/0199482 A1 | 7/2014 | Cai et al. |
| 2015/0105896 A1 | 4/2015 | Hagg et al. |

(56) References Cited

U.S. PATENT DOCUMENTS

| | | | |
|---|---|---|---|
| 2015/0322938 A1 | 11/2015 | Laessle et al. | |
| 2016/0082618 A1 | 3/2016 | Bruins et al. | |

FOREIGN PATENT DOCUMENTS

| | | | |
|---|---|---|---|
| CN | 1883908 | A | 12/2006 |
| CN | 101213036 | A | 7/2008 |
| CN | 101301645 | A | 11/2008 |
| CN | 201586525 | U | 9/2010 |
| CN | 101871895 | A | 10/2010 |
| CN | 102331424 | A | 1/2012 |
| CN | 202137837 | U | 2/2012 |
| CN | 202315736 | U | 7/2012 |
| CN | 202548069 | U | 11/2012 |
| CN | 202964884 | U | 6/2013 |
| CN | 102513823 | B | 12/2013 |
| EP | 554104 | A2 | 8/1993 |
| EP | 1738815 | A1 | 1/2007 |
| FR | 2625941 | A1 | 7/1989 |
| GB | 1224104 | A | 3/1971 |
| GB | 1325424 | A | 8/1973 |
| GB | 2111038 | A | 12/1981 |
| JP | 59071844 | A | 4/1984 |
| JP | 60192823 | A | 10/1985 |
| JP | 61008164 | A | 1/1986 |
| JP | 1987099377 | U | 6/1987 |
| JP | 4223126 | A | 8/1992 |
| JP | 8285780 | A | 11/1996 |
| JP | 09314011 | A | 12/1997 |
| JP | 11258169 | A | 9/1999 |
| JP | 2005161724 | A | 6/2005 |
| JP | 0376884 | B2 | 2/2006 |
| JP | 2007045020 | A | 2/2007 |
| JP | 2007054740 | A | 3/2007 |
| JP | 2008119604 | A | 5/2008 |
| JP | 2010005869 | A | 1/2010 |
| WO | 1999064845 | A1 | 12/1999 |
| WO | 2004057317 | A1 | 7/2004 |
| WO | 2006041101 | A1 | 4/2006 |
| WO | 2006135452 | A1 | 12/2006 |
| WO | 2007001012 | A1 | 1/2007 |
| WO | 2009108156 | A1 | 9/2009 |
| WO | 2011008461 | A2 | 1/2011 |
| WO | 2013082061 | A1 | 6/2013 |

OTHER PUBLICATIONS

Chien et al., "Study on rheological behavior of polymer melt flowing through micro-channels considering the wall-slip effect", J. Micromech. Microeng. 15 (2005) pp. 1389-1396.

Gifford, "The Effect of Wall Slip on the Performance of Flat Extrusion Dies", Polymer Engineering and Science, Nov 2001, 41(11) pp. 1886-1892.

Lanteri et al., "Rheological behaviour of a polymer-ceramic blend used for injection moulding", Journal of Materials Science 31, 1996, pp. 1751-1760.

Malik and Shenoy; "Generalized Annular Couette Flow of a Power-Law Fluid"; Ind. Eng. Chem. Res. 1991, 30, 1950-1954.

NYCO NYAD® G Wollastonite; http://www.matweb.mom/search/datasheet_print.aspx?matguid=65AF8927066740FA9759748AAAA66881; Downloaded Jan. 21, 2015; 2 Pages.

Opticontrols Inc. "A Tutorial on Feedforward Control, Reflections of a Process Control Practitioner," 2011, http://www.opticontrols.com/.

Pastorius et al; "Laser Line Sensors Enhance Rubber Manufacturing"; http://www.ien.com/article/laser-line-sensors/113209; Downloaded Mar. 18, 2014; 4 Pages.

Rothstein et al., "The axisymmetric contraction-expansion: the role of extensional rheology on vortex growth dynamics and the enhanced pressure drop", Journal of Non-Newtonian Fluid Mechanics 98(1) 2001, pp. 33-63.

* cited by examiner

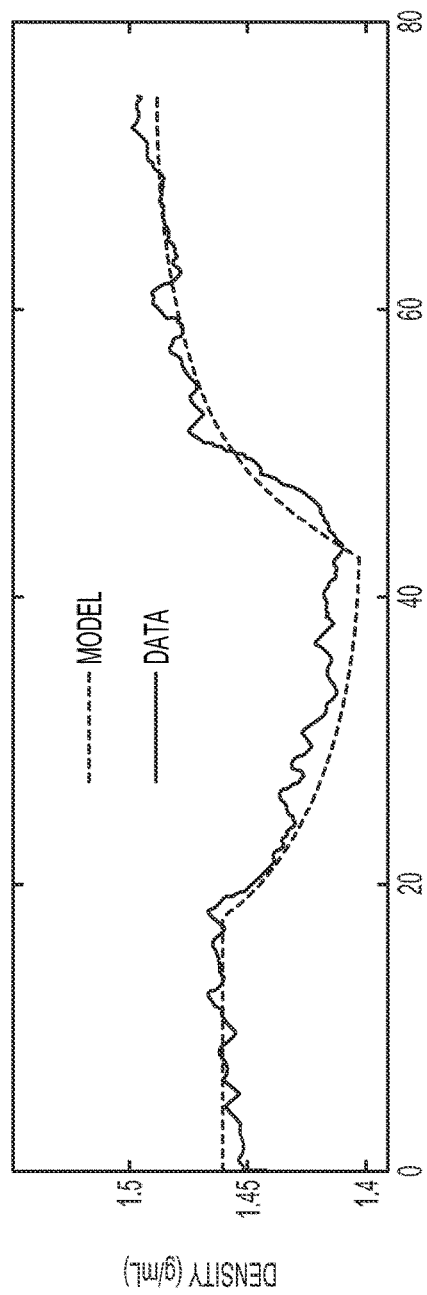
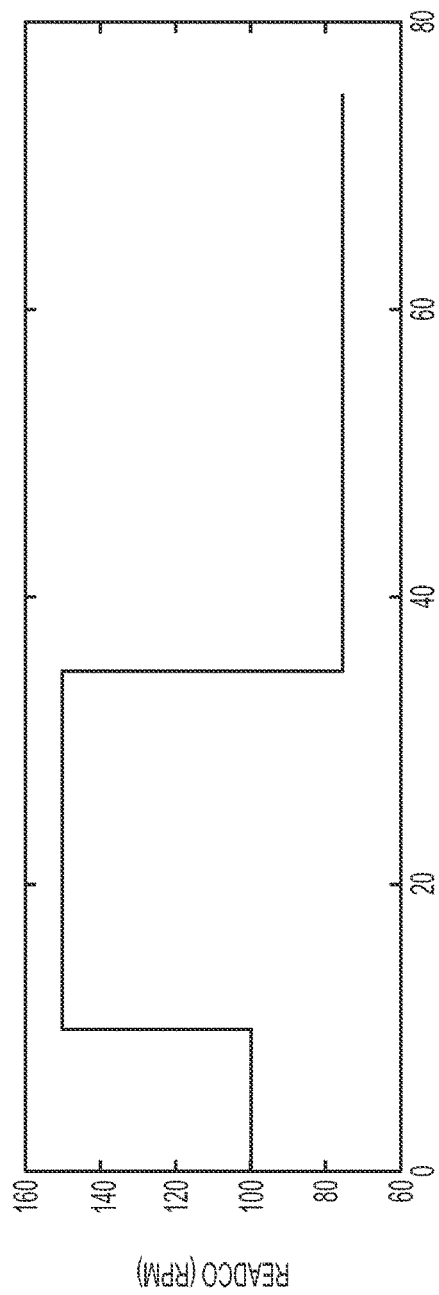
FIG. 23A
FIG. 23B

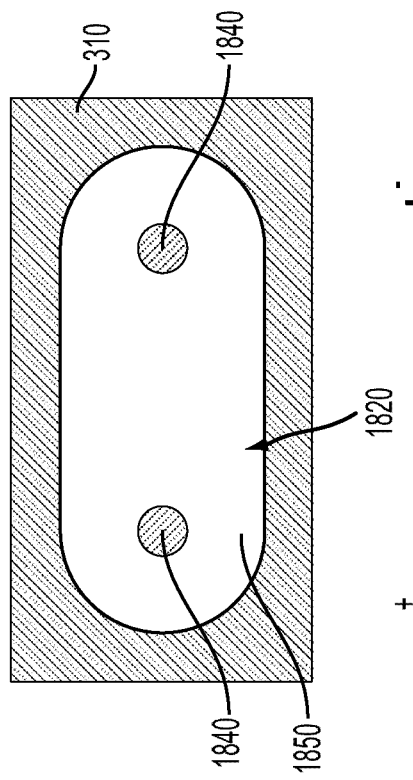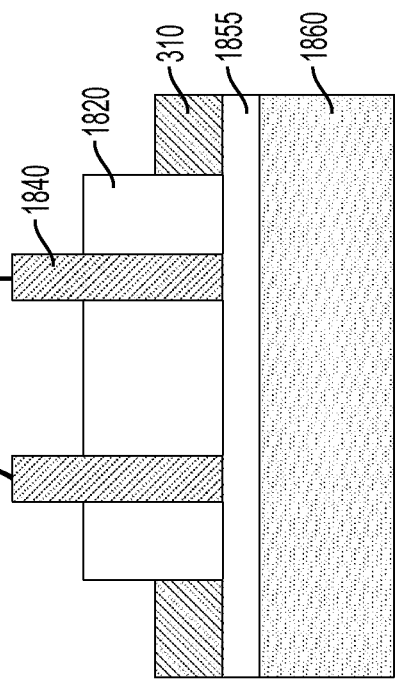

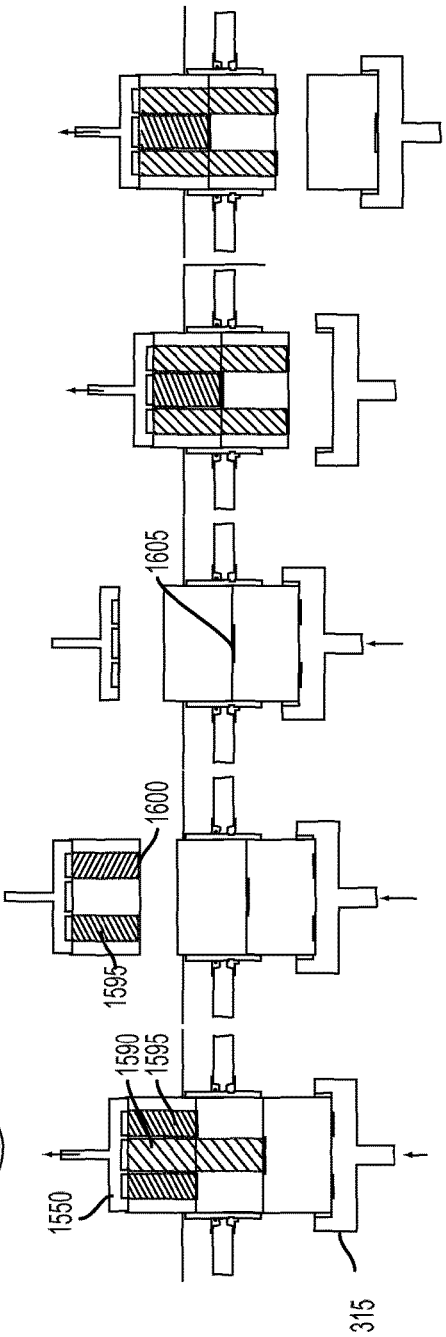

| STEP | DESCRIPTION | CENTERING EXTEND | VAC OUTER | VAC INNER | BOTTOM STAGE | UPPER STAGE | AIR KNIFE ON/OFF |
|---|---|---|---|---|---|---|---|
| 5A | PRIOR TO LOADING PART | OFF | ON | ON | RAPIDING DOWNWARD TO LOAD POSITION | UPWARD AT PROCESS SPEED | OFF |
| 1 | LOADING PART ONTO LOWER | OFF | ON | ON | STOPPED AT LOAD POSITION | UPWARD AT PROCESS SPEED | OFF |
| 1A | ENGAGE LOWER PART | ON | ON | ON | RAPID PART UPWARD | UPWARD AT PROCESS SPEED | OFF |
| 2 | COMBINED MOVEMENT | ON/OFF | ON | OFF | UPWARD AT PROCESS SPEED | UPWARD AT PROCESS SPEED | OFF |
| 2A | TURNING OFF A VAC ZONE | OFF | ON | OFF | UPWARD AT PROCESS SPEED | DISENGAGING TO RAPID UPWARD | OFF |
| 3 | RAPID UPPER PART FOR UNLOAD | OFF | OFF | OFF | UPWARD AT PROCESS SPEED | RAPID UPWARD | OFF |
| 3A | UNLOAD THE TOP PART | OFF | OFF | OFF | UPWARD AT PROCESS SPEED | STATIONARY | OFF |
| 4 | RE-ENGAGE UPPER STAGE | OFF | ON | ON | UPWARD AT PROCESS SPEED | RAPID DOWNWARD | OFF |
| 4A | TURNING ON VACUUM | OFF | ON | ON | UPWARD AT PROCESS SPEED | UPWARD AT PROCESS SPEED | OFF |
| 5 | DISENGAGING LOWER STAGE | OFF | ON | ON | RAPIDING DOWNWARD TO LOAD POSITION | UPWARD AT PROCESS SPEED | ON |

SYSTEMS AND METHODS FOR SKINNING ARTICLES

CROSS-REFERENCE TO RELATED APPLICATIONS

This application claims the benefit of priority under 35 U.S.C. § 371 of International Patent Application Serial No. PCT/US14/060515, filed on Oct. 14, 2014, which in turn, claims the benefit of priority to U.S. Provisional Patent Application No. 61/891,147, filed Oct. 15, 2013, entitled "Process for Axial Skinning Apparatus," and U.S. Provisional Application No. 62/063,364, filed Oct. 13, 2014, entitled "Systems and Methods for Skinning Articles." The International Patent Application Serial No. PCT/US14/060515, filed on Oct. 14, 2014 also claims the benefit of priority to and is a continuation-in-part of U.S. Nonprovisional Application No. 14/083,722, filed Nov. 19, 2013, now issued as U.S. Pat. No. 9,670,809 on Jun. 6, 2017, and U.S. Nonprovisional Application No. 14/217,848, filed Mar. 18, 2014, now issued as U.S. Pat. No. 9,239,296 on Jan. 19, 2016. The contents of all of the above-mentioned applications are incorporated herein by reference in their entireties.

BACKGROUND

The present disclosure generally relates to skinning articles and, more particularly, to systems and methods for skinning articles.

SUMMARY

Exemplary embodiments of the present disclosure relate to a system including an axial skinning system and a flowable mixture delivery system.

Further exemplary embodiments of the present disclosure relate to an axial skinning system for skinning an article.

Further exemplary embodiments of the present disclosure relate to a flowable mixture delivery system for mixing and delivering a flowable mixture to a skinning system for applying to an article.

Further exemplary embodiments of the present disclosure relate to methods for controlling a skinning process.

Further exemplary embodiments of the present disclosure relate to methods for controlling a flowable mixture delivery process.

Further exemplary embodiments of the present disclosure relate to methods for controlling a flowable mixture delivery process and a skinning process to control the quality of skinned articles.

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

FIGS. 23A-23B are graphs of density model validation results.

FIGS. 47A-47B are top and cross-sectional views of the exemplary skin thickness sensor.

FIGS. 67A-67E are schematic diagrams of an exemplary skinning process.

FIG. 67F is a table displaying status of various components of the skinning system during the exemplary skinning process.

DETAILED DESCRIPTION

Figure 1:
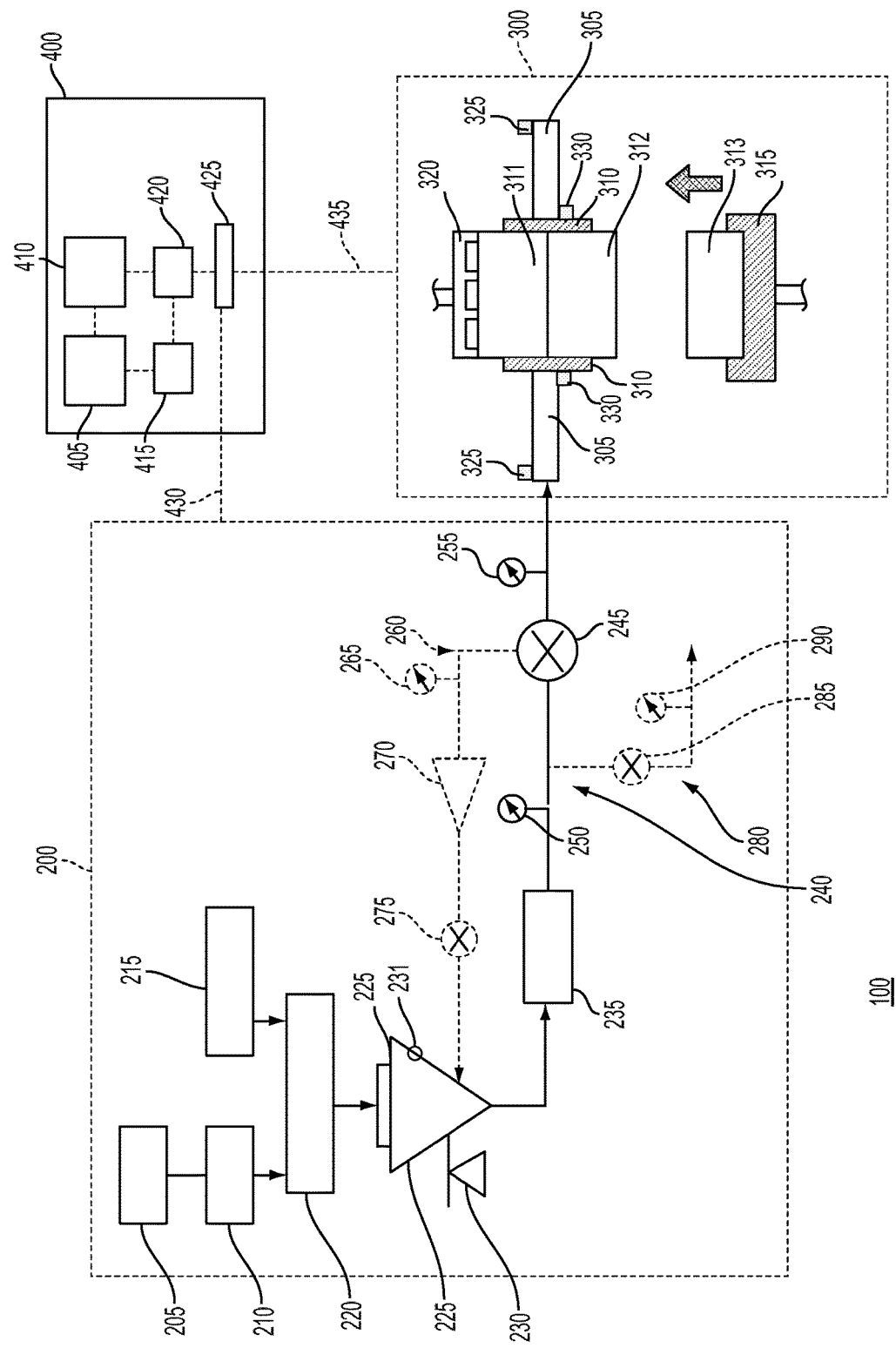
FIG. 1 is a schematic diagram of an exemplary of a system for skinning articles.

The various examples will be described in detail with reference to the accompanying drawings. Wherever possible, the same reference numbers will be used throughout the drawings and the descriptions to refer to the same or like parts. References made to particular examples and implementations are for illustrative purposes, and are not intended to limit the scope of the invention or the claims. The examples shown in the figures are not mutually exclusive.

Features shown in one example (e.g., in one figure) may be included in other examples (e.g., in other figures).

The disclosed article, and the disclosed system and method of making (e.g., skinning) the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

After-treatment of exhaust gas from internal combustion engines may use catalysts supported on high-surface area substrates and, in the case of diesel engines and some gasoline direct injection engines, a catalyzed filter for the removal of carbon soot particles. Filters and catalyst supports in these applications may be refractory, thermal shock resistant, stable under a range of pO2 conditions, non-reactive with the catalyst system, and offer low resistance to exhaust gas flow. Porous ceramic flowthrough honeycomb substrates and wall-flow honeycomb filters (generically referred to herein as honeycomb bodies) may be used in these applications.

Particulate filters and substrates may be difficult to manufacture to external dimensional requirements set by original equipment manufacturers (OEMs) and the supply chain due to drying and firing shrinkage during manufacturing. Consequently, ceramic cement may be used to form an exterior skin of a honeycomb body, which has been machined or "contoured" to a desired dimension. As used herein, the term "honeycomb body" includes single honeycomb monoliths and honeycomb bodies formed by multiple honeycomb segments that are secured together, such as by using a ceramic cement to form a monolith. Ceramic cement may be mixed and applied to a fired, contoured or segmented honeycomb body and the wet skin allowed to dry. The act or process of applying ceramic cement to the exterior of the honeycomb body is referred to herein as "skinning" the honeycomb body. A honeycomb body having skin disposed thereon is referred to herein as a "skinned" honeycomb body. Examples of systems and methods for skinning articles are disclosed in International Application Nos. PCT/US2012/066713, filed Nov. 28, 2012, and PCT/US14/38901, filed May 21, 2014, the contents of the above applications are incorporated herein by reference in their entireties.

Once the wet skin on the honeycomb body has dried an inspection of the skin can be conducted requiring labor, cost, and time. When a defect is found, it may be too late to correct a skinning process that caused the defect in sequential parts skinned in the same production run. The defects may be corrected requiring additional labor, time, and cost, or the production run may have to be scrapped if the defects are not repairable causing lost production and manufacturing inefficiencies.

The skinning process described above may be applied to any article, by which a coating, such as a glass, cement, ceramic, or polymer, is applied to an outer surface of the article, as a step in the manufacturing process. Current methods and systems for skinning articles are process-intensive operations that increase the manufacturing costs of finished products.

The various embodiments include a manufacturing system for efficiently skinning articles of manufacturing conducive to continuous manufacturing by implementing feed-forward and feed-back control processes to ensure substantially consistent product quality. Embodiments also include the various subsystems and components that are configured to enable the overall manufacturing system to operate with efficiency and quality controls.

The hardware used to implement the various illustrative logics, logical blocks, modules, and circuits described in connection with the aspects disclosed herein may be implemented or performed with a general purpose processor, a programmable logic controller (PLC), digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

When an element or layer is referred to as being "on," "connected to," or "adjacent" another element or layer, it can be directly on, directly connected to, or directly adjacent to the other element or layer, or intervening elements or layers may be present. In contrast, when an element or layer is referred to as being "directly on," "directly connected to," or "directly adjacent" another element or layer, there are no intervening elements or layers present. The phrase "at least one of X, Y, or Z" can be construed as X only, Y only, Z only, or any combination of two or more items X, Y, and Z (e.g., XYZ, XYY, YZ, ZZ).

While terms such as, top, bottom, side, upper, lower, vertical, and horizontal are used, the disclosure is not so limited to these exemplary embodiments. Instead, spatially relative terms, such as "top," "bottom," "horizontal," "vertical," "side," "beneath," "below," "lower," "above," "upper" and the like, may be used herein for ease of description to describe a relationship between one element or feature and another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terms "include," "includes," or the like means encompassing but not limited to, that is, inclusive and not exclusive.

The term "about" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "RT" for room temperature, "nm" for nanometers, "rpm" for round per minute, "lb" for pound, and like abbreviations).

Specific values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, and more specific values described herein.

The term "skinning an article" or "skin an article" means applying or coating (or apply or coat), under a pressure, a flowable mixture, such as cement, to an article, such as an outer (e.g., exterior, lateral) surface of a ceramic article, e.g., a ceramic honeycomb substrate. The term "skin," "skin material," or "skinning material" refers to the flowable mixture that is applied under a pressure to the article. Thus, an unskinned (or bare) article is an article prior to being skinned (e.g., coated with the flowable mixture), and a skinned article is an article that has been skinned (e.g., coated with the flowable mixture).

The term "mixture" may also be referred to herein as a "batch." A mixture is obtained by mixing one material, such as a dry material, with another material, such as a fluid. The term "mixture delivery system" may also be referred to as a "batch delivery system." The term "fluid" may include liquid, gas, steam, or any combination thereof.

The term "axial skinning" as used herein refers to applying or coating a flowable mixture to an outer surface of an article in an axial or longitudinal direction. In some embodiments, axial skinning may be achieved by using a pipe. In such embodiments, a flowable mixture is applied to the outer surface of the article by the pipe as the article moves or travels within an inner space of the pipe along the axial direction of the pipe.

The term "article" as used herein refers to a part or a body having a three-dimensional shape. The shape may be any suitable shape, such as, for example, a cylinder shape, a cubic shape, a prism shape, an asymmetric three-dimensional shape, etc. The article may be any part or body to which a skin may be coated. In some embodiments, the article may be a porous part such as, for example, a porous honeycomb substrate for a filter. In some embodiments, the filter may be a particulate filter that may be used in various industries, such as, for example, in gasoline and/or diesel, high duty and/or heavy duty vehicles for after treatment emission control. The substrate may include any suitable structure, form, and/or shape. For example, the substrate may include a porous ceramic honeycomb structure having a plurality of intersecting walls forming mutually adjoining cell channels for air flows. The cross section of the substrate may have any suitable shape, such as a circle, a square, a rectangle, a triangle, an asymmetric shape (e.g., a shape with two axes having different axial length). An asymmetric shape for the cross section may include any shape that is non-symmetric. For example, an asymmetric shape may include two axes having different lengths or diameters.

The term "flowable mixture" refers to any mixture of a fluid and a dry material that has suitable properties for application to an article. One example of the flowable mixture is cement, such as a cement composition, which can flow (e.g., under pump pressure) before it settles. The cement may include any cement with a suitable composition, such as, for example, a glass powder filler, a binder, and a solvent. The glass powder filler may include at least one of a fused silica ($SiO_2$), ground cordierite, grog, silica soot, mullite, or other refractory compounds. Once the flowable mixture is applied to the outer surface of the article, the flowable mixture becomes attached or affixed to, disposed on, or otherwise a part of the article (e.g., referred to as the skin of the article).

The skinned articles may include defects. The term "defect" may include any of a fast flow defect, a starvation defect, a pock defect, a pit defect, and a ring defect. The term fast flow defect refers to a bulging out of the skin from the skinned outer surface of the article, which may occur when excessive localized pressure or reduced viscosity has produced extra flowable mixture. A starvation defect refers to a lack of skin (e.g., flowable mixture) on a portion of the outer surface of the article. A pock defect refers to a small depression (e.g., a crater defect) in the skin surface. A pit defect refers to a pock that penetrates the thickness of the skin from the skin surface to the outer surface of the article beneath the skin, including a defect that leaves a portion of the article uncovered. A ring defect refers to a ring of extra flowable mixture on the skin.

The term "skinning speed" used herein refers to the speed of applying the flowable mixture to the article (or skinning the article). The skinning speed indicates how fast the articles are skinned. The skinning speed also relates to how fast the articles travel or move through the pipe. The unit for the skinning speed may be millimeter per second (mm/sec).

The term "skinning pipe" refers to a pipe included in the skinning system that receives an article and applies (e.g., coats or skins) the flowable mixture to the article as the article moves through an inner space of the pipe. The skinning pipe may also be referred to interchangeably herein as a pipe, a unipipe, a chamber, or a skinning chamber. The skinning pipe may include a circumferential wall defining a bore (e.g., an inner space). The skinning pipe may include any suitable shape for the cross section, such as circle, rectangle, square, triangle, polygon, asymmetric shape, etc. The shape of the cross section of the skinning pipe may substantially match that of the article to be skinned. The dimension (e.g., diameter, radius, circumference, axial length, and/or outer peripheral length) of the inner space defined by the circumferential wall of the skinning pipe may be slightly greater than that of the article.

The term "pressure of the skinning pipe" refers to a pressure measured at the skinning pipe. The pressure of the pipe may also be referred to as a skinning pipe pressure, a unipipe pressure, or a pressure of the unipipe. The skinning pipe pressure may be measured at an inlet of the skinning pipe that receives the flowable mixture and/or at another place adjacent the portion of the skinning pipe where flowable mixture is applied to the article (e.g., at an outlet of a manifold that delivers the flowable mixture to the skinning pipe).

The term "parameter" includes any system operating parameter. A parameter may be a parameter associated with a set point or a target value. A parameter may be a parameter associated with a changing value (e.g., a parameter that is continuously, periodically, or intermittently adjusted b a controller, which may also be referred to as "control actuator"). A parameter may be a parameter that is measured by a measuring device (e.g., a measured parameter).

The term "pressure relief system" may also be referred to as "pressure boost system" or "pressure adjustment system." These terms refer interchangeably to a system that changes the pressure of a device or a portion of the overall manufacturing system, such as, for example, the skinning pipe.

The term "screwfill ratio" used herein refers to a ratio of the feed rate over the mixer speed. Its unit may be, for example, lb/hour/rpm, wherein rpm refers to round per minute.

A "position" of a flow control valve, such as a valve for controlling fluid flow or flow of the flowable mixture, refers to the amount of opening of the valve, which determines the amount of the flow.

A "position" of a pressure relief system (which may also be referred to as a pressure release system, or a pressure boost system), which may include an actuator to move another element, refers to the amount of actuation the actuator provides, which in turn determines the amount of movement the actuator may cause to the other element. Alternatively, the term "position" may refer to the amount of movement the actuator causes to the other element. For example, the pressure relief system may use the actuator to move a ring up and down along a skinning pipe. The term "pressure relief system position" or "pressure boost system position" refers to the amount of actuation the actuator provides, or the resulting amount of movement of the ring.

Overview of Systems and Controls

The system for skinning articles may include a mixture delivery system, a skinning system, and a control system. The mixture delivery system may be configured to produce a flowable mixture and deliver the flowable mixture to the skinning system. The skinning system may be configured to apply (e.g., coat) the flowable mixture to the articles. The control system may be configured to control at least one parameter (e.g., various operational or control parameters) associated with the mixture delivery system and/or the skinning system. For example, the control system may be configured to receive measurement data from various sensors in the mixture delivery system and skinning system, and issue commands generated via feed-forward and feed-back algorithms to control a number of process parameters, non-limiting examples of which include the density, viscosity, and flow rate of the flowable mixture, the skinning speed, the skinning pipe pressure, etc., in order to control the quality of the skin.

In some embodiments, the skinning process may be a continuous process. For example, the skinning process may be a highly automated process that uses robots to feed unskinned articles into the skinning system, and to remove skinned articles from the skinning system. In some embodiments, the mixture delivery system may also be a continuous mixing and delivering system. The continuous style mixer may continuously mix and produce the flowable mixture. A pump may continuously pump the flowable mixture to a delivery line leading to the skinning system. The continuous mixing and delivering process provides a continuous flow of the flowable mixture that has substantially consistent density and/or viscosity. The continuous mixing and delivering process prevents the flowable mixture from settling or drying up. In some embodiments, the flowable mixture may be highly viscous and abrasive (e.g., the flowable mixture may be highly viscous cement). The highly viscous flowable mixture may be continuously produced and pumped to the delivery line leading to the skinning system at a low flow rate. Although the disclosed system enables continuous skinning of the articles, system 100 may also be used for index push skinning process, which is non-continuous.

In various embodiments some subsystems and components of the mixture delivery system and the skinning system may operate in a batch-like manner while supporting a continuous skinning operation. For example, the mixer may operate as needed to produce batches sufficient to support a continuous feed to the skinning system via the mixture delivery pump. As another example, the skinning system may pause the application of the skinning mixture between articles if there is a gap or pause between articles passing through the system, such as in an index push skinning process. Therefore, references to system and subsystems operating "continuously" include batch operations that support continuous or near-continuous processing of articles passing through the skinning system.

The system for skinning articles may include various sensing or measuring devices, sensors, meters and the like (collectively "measuring devices") configured to monitor, measure, or detect system parameters, such as force, pressure, density, viscosity, flow meters, defects in skinned articles, skin thickness in the skinned articles, dimensions (e.g., diameter, radius, circumference, axial length, and/or outer peripheral length) of unskinned articles and/or skinned articles, etc. The control system may implement feedback controls, feed forward controls, or a combination of both feedback and feed forward controls to control various parameters to enable the system to achieve a substantially consistent level of quality control. For example, the control system may employ a feed forward augmented feedback control process to control the mixture delivery system and/or the skinning system based on the measured system parameters. In some embodiments, real-time measurements of the system parameters may be provided to the control system as disturbance, inputs, or feedback. The control system is configured to control system parameters so that the final skinned product achieves a desired level of quality, such as defect free or substantially defect free (e.g., nearly defect free).

Mixture Delivery System

In some embodiments, the mixture delivery system may be an automated or semi-automated system. Dry materials may be weighed and blended in an automated blender, and fed into a continuous loss-in-weight feeder, so that the blended materials flow into the continuous style mixer. The mixer may be fed continuously by multiple loss-in-weight feeders of individual dry materials, or by fewer feeders using pre-blended components of all dry materials. The mixer may be fed continuously by one or more liquid dispensing systems that control flow rates of fluids continuously. The one or more liquid dispensing systems may include one or more peristaltic pumps, one or more gear pumps, one or more liquid loss-in-weight feeders, or one or more flow meters. Fluids, such as liquids, may be injected into the mixer at target proportions and mixed with the dry materials within the mixer. By controlling at least one of a dry material feed rate, mixer speed, and a backup length of the mixer, the mixer may produce the flowable mixture (e.g., cement) with the necessary properties (e.g., density, viscosity) to produce the desired product and with the consistency necessary to achieve quality control requirements.

The flowable mixture may be temporarily stored in a storage device or vessel, such as, for example, a hopper, which may be configured and sized to support delivery of a continuous stream of the mixture to the skinning system. The storage device may include an auger that drives the flowable mixture to a downstream pump. The auger may be configured such that it is disposed in close proximity to the inner wall of the storage device, thereby effectively preventing introducing air bubbles into the flowable mixture when the auger drives the flowable mixture into the pump.

In some embodiments, the mixture delivery system may include a pump, a delivery line including a delivery valve (which may be an assembly of valves), and a recirculation line with one end connecting the delivery line downstream of the delivery valve, and the other end connecting the storage device. The pump may be configured to advance the flowable mixture through the delivery line leading to the skinning system.

The recirculation line may be configured to return all or a portion of the flowable mixture from the delivery line back to the storage device depending upon an operating state of the system. For example, prior to the start of the skinning process, the delivery valve(s) may be positioned in a manner that prevents the flowable mixture from flowing to the skinning system and directs all of the flowable mixture pumped into the delivery line to return back to the storage device via the recirculation line. In this configuration, which may be useful to ensure the mixture meets desired properties of concentration, viscosity, density and pressure before it is introduced to the skinning system, the flowable mixture may be recirculated in a loop from the storage device, through the pump, delivery valve, and the recirculation line and back into the storage device.

The recirculation of the flowable mixture within the recirculation line may continue until a return pressure within the recirculation line reaches a predetermined threshold return pressure and/or other mixture properties or consistency are achieved. When the return pressure reaches the threshold return pressure and/or when the mixture properties reach the threshold properties, the skinning system may be started and the delivery valve(s) may be positioned to allow the flowable mixture to flow to the skinning system. During the skinning process, the recirculation line may continue to recirculate a portion of the flowable mixture between the delivery line, the storage device, and the pump, such as to control the pressure within the mixture. For example, flow through the recirculation line may be maintained as long as the return pressure is greater than the threshold return pressure. Recirculating a portion of the flowable mixture from the delivery line back to the storage device may help to ensure the consistency of the properties of the flowable mixture.

In some embodiments, the skinning system may need to be paused or stopped for a short period of time (e.g., 1-3 hours) for services or repairs (e.g., cleaning or changing a component). When the skinning system is paused or stopped for a short period of time (e.g., 1-3 hours), the mixture delivery system may continue to run, such that the flowable mixture produced is continuously recirculated to prevent settling and to ensure consistency in the mixture properties. After the skinning system is restarted, the mixture delivery system may continue to deliver the flowable mixture to the skinning system.

In some embodiments, the mixture delivery system may include an optional purge line in addition to or instead of the recirculation line. The purge line may be connected to the delivery line at one end and to a dumpster, tote, or material recovery system at another end. When the purge line is opened (e.g., when a valve in the purge line is opened), the flowable mixture may be directed into the purge line, thereby purging or dumping the flowable mixture from the delivery line. For example, when the properties of the flowable mixture do not meet the requirements for the skinning system, the purge line may be used to dump the flowable mixture, thereby preventing the undesired flowable mixture from flowing to the skinning system. In some embodiments, prior to starting the skinning process, the purge line may be opened to dump an initial amount of flowable mixture so that no flowable mixture is directed to the skinning system, until a certain pressure has built up in the delivery line and/or the properties (e.g., density and/or viscosity) of the flowable mixture have met the requirements.

In some embodiments, the mixture delivery system may include a fluid dispensing system configured to dispense a fluid, such as a liquid, to the mixer. The fluid dispensing system may include a storage tank configured to store a fluid, a pump configured to pump the fluid, a recirculation loop with one end connected to an outlet of the pump, and the other end connected to an inlet of the storage tank, and at least one distribution branch connected to the recirculation loop. The recirculation loop may be configured to continuously recirculate the fluid between the storage tank and the pump, which may prevent settling of the fluid, e.g., when the fluid is not being injected into the mixer. The recirculation loop may provide a steady flow and a substantially constant back pressure for the at least one distribution branch.

The fluid dispensing system may include a number of distribution branches, with each distribution branch including flow meters and flow control valves, allowing each distribution branch to be controlled independently to dispense the fluid into the mixer without the need of coordinating sequences. The recirculation loop may include a proportional flow control valve, whose valve position may be adjusted by the control system based on at least one of a speed of the pump, a pump pressure, or a pressure in the recirculation loop downstream the pump. The control system may control the proportional flow control valve such that a substantially constant back pressure is maintained in the recirculation loop to which the distribution branches are connected. The fluid dispensing system may be scalable. For example, when multiple mixers are included in the system, more distribution branches may be added to the recirculation loop with limited or no impact on the existing distribution branches thanks to the steady flow and substantially constant back pressure in the recirculation loop.

The mixture delivery system may include a mixture control system that performs a mixture control process for controlling the rheology of the flowable mixture, such as the density and viscosity. In some embodiments, the mixture control system may be a control system that is separate from but responsive to the overall control system (i.e., control system 400 described below with reference to FIG. 1). In other embodiments, control of the mixture delivery system may be included within the control processes of the overall control system, such as within a mixture delivery control system module. The mixture control system may predict the shift in the rheology based on variations in measured properties of the raw materials, such as variations in measured particle size distribution ("PSD") of the dry material.

The mixture control system may include a feed forward controller that predicts (estimates, calculates, or determines) the effect of a variation in the particle size distribution of the dry material on rheology of the flowable mixture. For example, the feed forward controller may determine an adjustment to the amount of fluid to be added to the mixer (e.g., an amount of the water or a "water call") to maintain the rheology of the flowable mixture within desired tolerances. For example, the feed forward controller may determine the adjustment in the water call based on the variation in the properties of the raw materials (e.g., measured particle size distribution), and the mixture control system may send a signal to the mixer and/or the fluid dispensing system to adjust the water or another fluid added to the mixer based on the adjustment to the water call.

The mixture control system may also include at least one feedback controller that uses real-time or near real-time measurements of the density and/or viscosity of the flowable mixture for skinning to determine adjustments to the water call of the mixer and/or the speed of the mixer (or the screwfill ratio of the mixer) necessary to ensure that the density and/or viscosity remain within the desired density and/or viscosity process limits or requirements.

With the combined feed forward water call adjustment using the PSD measurements and the feedback control of the density and viscosity, the mixture delivery system may provide a continuous flow of the flowable mixture with substantially consistent mixture (or batch) rheology, which aids in ensuring a high quality (i.e., defect free or substantially defect free) skinned product.

The mixture delivery system of the various embodiments may, according to various embodiments described herein, reduce costs and labor, improve the material utilization rate, reduce waste of the raw materials, reduce the line pressure, and/or reduce the complexity of the system. The mixture delivery system also enables in-line measure and control of the rheology of the flowable mixture.

Skinning System

The skinning system may include an upper axis including a manifold mounted with a skinning pipe through which articles are inserted to receive the flowable mixture on the outer surfaces of the articles. The skinning system may also include an upper carriage mounted with a transfer system. In some embodiments, the transfer system may include a vacuum system. For discussion purposes, a vacuum system is used as an example of the transfer system. The transfer system may include any other suitable mechanisms for transferring skinned articles or at least partially skinned articles without introducing defects to the skins. For example, the transfer system may include a plurality of pins or mechanical fingers that may be inserted into the body of the skinned articles from the top surface. The pins or mechanical fingers may grip the internal structure of the skinned articles (e.g., the internal walls of a honeycomb article) such that the transfer system may pull the article out of the skinning pipe.

In some embodiments, the upper carriage and the vacuum system may be located above the skinning pipe in a vertical direction, and may move up and down along a vertical rail mounted on a skinning system support frame. The skinning system may also include a lower carriage supporting an article feeding mechanism. The lower carriage and the article feeding mechanism may be located below the skinning pipe in the vertical direction. Thus, the skinning system may utilize a vertical axial skinning process, in which the unskinned article is pushed into the skinning pipe by the article feeding mechanism from below the skinning pipe, such that the article travels or moves upwardly in the vertical direction along the inner space of the skinning pipe.

As the article moves along the inner space of the skinning pipe, the skinning pipe may apply (e.g., coat), under a pressure, the flowable mixture to an outer surface of the article through a plurality of application holes located on a circumferential wall of the skinning pipe. The flowable mixture may flow from grooves or channels located inside the manifold to the application holes on the circumferential wall. The flowable mixture within the grooves or channels of the manifold may be pressurized such that it flows from the grooves or channels to the circumferential wall of the skinning pipe under a pressure.

The article feeding mechanism located below the skinning pipe may feed the unskinned articles to the skinning pipe by pushing one or more articles through the skinning pipe. The vacuum system located above the skinning pipe may be configured to generate one or more vacuum zones (e.g., multiple vacuum zones). The vacuum system may be referred to as a multi-zone vacuum system. The vacuum system may be configured to hold an at least partially skinned article and pull (e.g., move or lift) it upwardly out of the skinning pipe as the articles move along the inner space of the skinning pipe. When multiple vacuum zones are used together with different spacers inserted between multiple articles, the vacuum system may hold and pull up multiple articles simultaneously.

The skinning system may include at least one force sensor configured to measure at least one force experienced by the upper carriage and/or the lower carriage. The measured force may be used by a skinning control system to determine the timing of the "hand-off" between the article feeding mechanism and the vacuum system (e.g., when the article feeding mechanism should push the articles. For example, the skinning system may use measured forces to determine when to stop pushing the articles through the pipe, the position of the article feeding mechanism (or a lower carriage to which the article feeding mechanism is mounted), and/or the speed of the pushing. The skinning system may also use the measured forces to determine when to activate or deactivate one or more vacuum zones generated by the vacuum system within the article, when the vacuum system should pull the articles, position of the vacuum system (or an upper carriage to which the vacuum system is mounted), and/or the speed of the pulling.

The skinning control system may be configured to perform a skinning control process for controlling the operations of the skinning system. In some embodiments the skinning control system may be a control system that is separate from but responsive to the overall control system (i.e., control system 400 described below with reference to FIG. 1). In other embodiments, control of the skinning system may be included within the control processes of the overall control system, such as within a skinning control system module. In some embodiments, the skinning control system and the mixture control system may form portions of the overall control system 400. Any processes described in this disclosure as being performed by the skinning control system or the mixture control system may also be performed by the overall control system 400. In addition, any processes described in this disclosure as being performed by one control system (e.g., the skinning control system) may also be performed by other control systems (e.g., the mixture control system).

The article feeding mechanism may include a flexure shaft configured to compensate for misalignment between an unskinned article and the inner space of the skinning pipe. The flexure shaft may be configured to bend or deflect within a predetermined degree of flexure in order to correct or compensate for misalignment of articles in the skinning pipe, which may be caused by, e.g., parallelism errors in the surfaces of the articles. The flexure shaft may function to enable misaligned unskinned article to be pushed into the skinning pipe without jamming. The article feeding mechanism may include a centering mechanism configured to center or align each article with the inner space of the skinning pipe, before and/or when the unskinned article is pushed into the skinning pipe.

The skinning system may include at least one laser device (e.g., at least one first laser device) located adjacent an inlet of the skinning pipe that are configured to measure a dimension (e.g., diameter, radius, circumference, axial length, and/or outer peripheral length) of each unskinned article. For example, the laser device located adjacent the inlet of the skinning pipe may be configured to measure the diameters of unskinned articles. In some embodiments, two or more laser devices may be disposed at the inlet to measure the diameters of the unskinned articles. Instead of measuring the diameters of the articles, the circumference, axial length, or the outer peripheral length may be measured. Controls based on the diameter measurement may be modified as controls based on measurements of the radius, the circumference, axial length, or the outer peripheral length. The circumference refers to the outer peripheral length of a cylindrical article, which may have a circular cross section. The outer peripheral length refers to the lateral length of the outer surface of the article having any suitable shape for its cross section, such as a circular shape, a rectangular shape, a square shape, an oval shape, a triangular shape, a polygon shape, or an asymmetric shape. Measured dimension from the dimension measuring laser devices may be used by the control system to adjust various system parameters, such as the skinning speed (e.g., the speed of the article through the skinning pipe) and/or the position of a pressure adjustment system, in order to produce a skin thickness within product tolerances (i.e., to compensate for variability in article dimension).

The skinning system may also include a plurality of laser devices located adjacent an outlet of the skinning pipe that are configured to monitor and/or detect the presence of defects in the skin of each skinned article (hereinafter the laser devices configured to monitor and/or detect defects may be referred to as defect monitoring laser devices). The defect monitoring laser devices may monitor the presence of a defect on the skin of a skinned or at least partially skinned article. Once a defect is detected, the defect monitoring laser devices may detect or determine a type of the defect (e.g., a fast flow type, a starvation type, a pit type, a pock type, a ring type, etc.) Data from the defect monitoring laser devices may be used by the control system to adjust various system parameters that affect skin defects (e.g., pits/pocks, fast flow, and starvation), such as the speed of the pump, which may affect the pressure within the flowable mixture (which in turn may affect the fast flow and/or starvation types of defects), and/or the speed of the mixer, which may affect the density of the flowable mixture (which in turn may affect the pit/pock types of the defect).

The manifold for delivering the flowable mixture to the skinning pipe may include various locating pads and/or locating blocks that enable fast assembly and/or disassembly. With these locating devices, after the manifold is disassembled for services, repairs, or change of a different manifold, the manifold may be re-assembled to the skinning system with precision, such that the skinning pipe remain aligned with other components of the skinning system. The manifold may include a pressure relief system configured to adjust a space adjacent the skinning pipe available for the flowable mixture to flow, thereby adjusting the pressure of the flowable mixture within the skinning pipe. The manifold may also include a skin thickness sensor configured to measure a thickness of the skin applied to the skinned article.

The skinning system may include a skinning control system. The skinning control system may control the skinning process using feed forward controls, feedback controls, or a combination thereof. In some embodiments, the skinning control system may implement a feed forward augmented feedback control that uses real-time or near real-time feedback from the skinning process (e.g., real-time or near real-time monitoring and/or detection of the defects, the pressure of the skinning pipe, and other parameters associated with the mixture delivery system) to control the quality of the final skinned article (e.g. to manage pits/pocks, fast flow, and/or starvation). In some embodiments, the skinning control system may be a control system that is separate from but responsive to the overall control system (i.e., control system 400 described below with reference to FIG. 1). In other embodiments, control of the skinning system may be included within the control processes of the overall control system, such as within a skinning control system module.

Control System

The control system may be configured to monitor the various measuring devices within the system (including the measuring devices described above) and issue control signals to various valves, pumps, and actuators (including the controls described above) in order adjust system parameters to ensure the skinning process meets quality and consistency requirements. As mentioned above, the control system may be a single integrated control system (e.g., control system 400 in FIG. 1), or a combination of a mixture delivery control system, a skinning control system, and/or a supervisor control system (i.e., a distributed control system). The difference between an integrated control system and a distributed control system is a matter of design preference, and the operations of either configuration of control system are substantially the same. Therefore, descriptions of the control system(s) of the various embodiments refer simply to the "control system" without intending to limit the embodiments or the claims to a particular control system architecture.

The control system may not start the skinning process until a return pressure within a recirculation line of the mixture delivery system, or a delivery pressure within the delivery line has reached a predetermined threshold value. In some embodiments, the skinning control system may implement a start-up control scheme to reduce the transient time during the start up of a continuous axial skinning process. The start-up control scheme may include adjusting a pressure relief system to change the space adjacent the skinning pipe available for the flowable mixture prior to the start of the skinning process. The pressure relief system may be adjusted based on the target skinning speed. In some embodiments, the start-up control scheme may include incrementally increasing, e.g., in multiple operations or stages, the skinning speed after the start of the skinning process until it reaches the desired skinning speed, rather than increasing the skinning speed in one operation or stage from zero to the target skinning speed.

The control system may include a multiple-layered feedback control loops to enable delivery of defect-free skinned articles. In some embodiments, the control system may include a first feedback control loop to control the return pressure within the recirculation line, and a second feedback control loop to control the skinning pipe pressure based on the control of the return pressure. In some embodiments, the control system may include a feedback control loop to control the skinning pipe pressure by directly controlling the pump speed or delivery valve position. In some embodiments, the control system may include a first feedback control loop to control a flow rate of the flowable mixture, and a second feedback control loop to control the skinning pipe pressure based on the control of the flow rate.

The control system may proactively compensate for changes in the skinning pipe pressure due to variations in the properties of the flowable mixture. In some embodiments, the control system may include a feed forward controller configured to predict (estimate, calculate, or determine) the impact of the variation in the properties of the flowable mixture, such as the viscosity and/or flow rate). An output of the feed forward controller may be fed into the feedback control loop for controlling the skinning pipe pressure.

The control system may also proactively compensate for changes in the skinning pipe pressure due to variations in the dimensions (e.g., diameter, radius, circumference, axial length, and/or outer peripheral length) of the incoming unskinned articles. The dimension measurements from the laser devices located adjacent the inlet of the skinning pipe may be input into a feed forward controller, which may predict (estimate, calculate, or determine) the impact of the variation of the dimensions of the incoming unskinned articles on the skinning speed and/or the pressure relief system. An output of the feed forward controller may be fed into a feedback loop for controlling the skinning pipe pressure.

In some embodiments, the skinning system may monitor the presence of a defect in a skinned article and/or detect a type of a defect in a skinned article, e.g., using the defect monitoring laser devices located adjacent the outlet of the skinning pipe described above. The control system may implement a feedback control loop to automatically adjust set points (e.g., target values) for system parameters (e.g., skinning pipe pressure set point) based on the type of defect detected.

Overall System and Controls

FIG. 1 is an exemplary system 100 for skinning articles. The system 100 may include a mixture delivery system 200, a skinning system 300, and a control system 400. Although various components, modules, units, devices are shown in the mixture delivery system 200, the skinning system 300, and the control system 400, FIG. 1 shows the systems only schematically for illustrative purposes. Each system may include more or fewer elements and features than illustrated in the figures and described herein.

As shown in FIG. 1, the mixture delivery system 200 may include a particle analyzer 205 configured to measure a particle size distribution of a dry material, such as, for example, an inorganic powder, that is to be used to produce a flowable mixture (e.g., a cement). The inorganic powder may include at least one of an aluminum titanate, cordierite, fused silica, mullite, and alumina, and may have a particle size ranging from 1 to 1000 microns. The measured particle size distribution may be used by the control system 400 to control the properties (e.g., density and/or viscosity) of the flowable mixture.

The particle analyzer 205 may be an in-line analyzer disposed upstream of the blender 210. The particle analyzer 205 may be configured to measure data on particle sizes of the dry material. The control system 400 may communicate with the particle analyzer 205 to receive data or signals from the particle analyzer 205 with information indicating the measured particle size distribution. The control system 400 may control the particle analyzer 205 by transmitting control signals to the particle analyzer 205 to control, e.g., when to start/stop measuring the particle size distribution. In some embodiments, the particle analyzer 205 may continuously measure the particle size distribution of the dry material as the blender 210 receives the dry material over time, and may transmit the measured particle size distributions to the control system 400, which may determine variations in the measured particle size distributions over time.

As shown in FIG. 1, the mixture delivery system 200 may include a blender 210 configured to receive and blend the dry material. The mixture delivery system 200 may include a fluid dispensing system 215 coupled with the control system 400 and configured to dispense or deliver a fluid, such as, for example, water or a binder. In some embodiments, the fluid may include a combination of the water and the binder. The binder may include any suitable binding material, such as, for example, colloidal silica in an aqueous form. The fluid dispensing system 215 may be configured to deliver the fluid at a rate controlled or adjusted in response to signals from the control system 400. The control system 400 may communicate with the fluid dispensing system 215 to receive data or signals from various components or devices included in the fluid dispensing system 215, and to transmit control signals to the fluid dispensing system 215. The various components or devices included in the fluid dispensing system 215 may include flow control valves, pumps, pressure sensors, fluid level sensors, flow meters, etc.

As shown in FIG. 1, the mixture delivery system 200 may include a mixer 220, which may be any suitable type of mixer for mixing a fluid and a dry material to produce a flowable mixture. In some embodiments, the mixer 220 may be a continuous style mixer. The control system 400 may communicate with the mixer 220 to receive data or signals from the mixer 220, which may include information indicating the operational status of the mixer 220, such as, for example, the speed of the mixer 220, the screwfill ratio, the water call amount, etc. The control system 400 may transmit control signals to controllable components within the mixer 220 (or to a mixture control system) for adjusting mixer parameters, such as the speed of the mixer, the screwfill ratio, the water call amount, etc. The mixer 220 may include a manual or automatic slide gate type feature at a discharging end that may be controlled manually or automatically to adjust desired flowable mixture properties, such as density and/or viscosity. Mixer element configurations (e.g., sequence of individual elements), design (e.g., shape and/or size), clearances, and material of construction may be adjustable and may be configured to modify and/or optimize flowable mixture properties (e.g., density and/or viscosity), residence time, attrition of dry materials, and/or wear rates of consumable components.

The feed rate (e.g., the rate of the blended material fed into the mixer 220) and the rotation speed (revolutions per minute or rpm) of the mixer 220 may be controlled by the control system 400 to regulate the rheology of the flowable mixture, such as the density and/or the viscosity. The density and/or viscosity may be affected by the amount of fluid (e.g., water and/or binder) added to the mixer 220. The density and/or viscosity of the flowable mixture may also be affected by the composition of the dry material.

As shown in FIG. 1, the mixer 220 may be supplied with mixture ingredients (e.g., through connecting pipes, hoses, or conduits) by the blender 210 and the fluid dispensing system 215. The blender 210 may continuously or discontinuously blend the dry material and deliver the blended dry material to the mixer 220. The fluid dispensing system 215 may dispense or deliver (e.g., through injection) an amount (or injection rate) of the fluid into the mixer 220 based on signals indicating a desired amount (sometimes referred to herein as a "water call") that may be received from the control system 400 (or a mixture control system) based on sensor data from the mixer 220. The mixer 220 may continuously mix the dry material and the fluid to produce the flowable mixture, such as, for example, cement for skinning to a ceramic article (e.g., a diesel particulate matter filter substrate).

As shown in FIG. 1, the mixture delivery system 200 may include a storage device 225 configured to temporarily store the flowable mixture produced by the mixer 220. The storage device 225 may also be referred to as a hopper or a surge hopper. The storage device 225 may be disposed downstream of the mixer 220 and coupled (e.g., through connecting pipes, hoses, or conduits) with the mixer 220 to receive the flowable mixture from the mixer 220.

The storage device 225 may include a load cell 230 configured to measure the weight of the flowable mixture stored in the storage device 225 and/or the weight of the flowable mixture that has been discharged from the storage device 225. The load cell 230 may be a loss-in-weight load cell, which may provide an amount of the flowable mixture that has been discharged from the storage device 225. The load cell 230 may transmit data or signals to the control system 400 to provide the control system 400 with the amount of flowable mixture that has been discharged.

The storage device 225 may include a vibration device 231 attached to a rib of the storage device 225 on an outer surface. The vibration device 231 may be configured to cause the storage device 225 to vibrate or move back and forth or side-to-side or circularly, thereby aiding in the downward flow of the flowable mixture.

The control system 400 may communicate with various controllable devices and components (e.g., the load cell 230 and/or the vibration device 231) included in the storage device 225 to receive data or signals including measurement data and information regarding the operational status of the components within the storage device 225 (e.g., the amount of flowable mixture that has been discharged from the storage device 225). The control system 400 may transmit control signals to various components or devices within the storage device 225, such as the load cell 230 and/or the vibration device 231.

As shown in FIG. 1, the mixture delivery system 200 may include a pump 235 configured to advance the flowable mixture from the storage device 225 to a delivery line 240. The pump 235 may be any pump suitable for advancing the flowable mixture through the mixture delivery system with desirable flow rates and pressure to operate the skinning system 300. In some embodiments, the pump 235 may be a progressive cavity pump. The progressive cavity pump 235 may be configured for high torque and low rpm to reduce wear and still allow accurate pressure control of flowable mixture delivery to the manifold without major pulses in pressure. Other types of pumps may also be capable of achieving these to a lesser degree and for a variety of reasons. Examples of other types of pumps may include peristaltic/hose pumps, gear pumps, piston pumps, or alternating dual piston pumps. The control system 400 may communicate with the pump 235 to receive signals or data from the pump 235 including information indicating the operational status of the pump 235, such as the speed of the pump 235, the pressure within the pump 235, etc.

As shown in FIG. 1, the delivery line 240 may include one or more pressure sensors disposed at various locations and configured to measure pressures within the delivery line 240. For example, the delivery line 240 may include a pressure sensor 250 configured to measure a pressure of the pump 235 (pump pressure). The pressure sensor 250 may be disposed within the pump 235 or downstream of the pump 235 in the delivery line 240 (e.g., adjacent an outlet of the pump 235). The pressure sensor 250 may be disposed at any other suitable locations within the mixture delivery system 200. The control system 400 may communicate with the pressure sensor 250 to receive data or signals including information indicating the measured pump pressure. The control system 400 may transmit control signals to the pressure sensor 250 to control when to measure the pressure, and/or when to transmit the measured pressure to the control system 400.

As shown in FIG. 1, the delivery line 240 may also include a pressure sensor 255 configured to measure a pressure within the delivery line 240. The pressure measured by the pressure sensor 255 may be referred to as the delivery pressure or delivery line pressure. The pressure sensor 255 may be disposed within, adjacent, or downstream of the delivery valve 245. The delivery pressure may reflect the pressure of the flowable mixture prior to being delivered to the skinning system 300. The control system 400 may communicate with the pressure sensor 255 to receive data or signals including information indicating the measured delivery pressure. The control system 400 may transmit control signals to the pressure sensor 255 to control, for example, when to measure the delivery pressure and/or when to transmit the measured delivery pressure to the control system 400.

The control system 400 may transmit control signals to the pump 235 to control various parameters, such as at least one of the speed of the pump 235, the pressure within the pump 235 and/or the delivery line 240, and may do so in response to pressure data received from the pressure sensors 250, 255. The rotation speed (rpm or revolutions per minute) of the pump 235 may be controlled by the control system 400 to ensure a substantially consistent flowable mixture pressure provided to or within the skinning system 300. In some embodiments, control system 400, the pump 235, the skinning system 300 and the piping in between may be configured so that the pump 235 regulates the pressure within the skinning system 300 (such as the manifold pressure and/or pressure within the skinning pipe), and may be operated so that the flowable mixture is applied to unskinned articles at a substantially consistent pressure. In other embodiments, the skinning system 300 may include its own pressure regulator subsystem, in which case the pump 235 may provide the flowable mixture at a pressure suitable for supplying that pressure regulatory subsystem. The flow rate and/or the pressure of the flowable mixture within the delivery line 240 may be regulated by the control system 400 controlling the speed and/or displacement of the pump 235. The pump 235 may include a stator that is suitable for long time operations, such as non-stop continuous operations. In some embodiments, the pump 235 may include a polyurethane stator (not shown).

As shown in FIG. 1, in some embodiments, the mixture delivery system 200 may include a recirculation line 260 configured to continuously recirculate at least a portion of the flowable mixture. The recirculation line 260 may redirect or return at last a portion of the flowable mixture from the delivery line 240 back to the storage device 225. The storage device 225 may include a port configured to receive the recirculated portion of the flowable mixture. The recirculation line 260 enables the mixer 220 to run continuously at a reduced, low feed rate when the skinning system 300 is not started or has been paused or stopped so that the flowable mixture does not settle. For example, when the skinning system 300 is stopped or paused temporarily (e.g., for changing sub-components or for cleaning or repair), the mixer 220 may continue to run at a reduced speed and/or feed rate with the flowable mixture being recirculated using the recirculation line 260 to prevent settling of the flowable mixture (e.g., cement). In some embodiments, the recirculation line 260 may enable the flowable mixture to be recirculated without settling for one to three hours. The storage device 225 may or may not be included in the mixture delivery system 200. If the storage device 225 is included, it may take on a variety of shapes and sizes, depending on the use. Examples of the storage device 225 may include a simple cone, a stirred cone, a rectangular chute, a vibrated tube, or any combination of shape, size, and feature.

As shown in FIG. 1, the delivery line 240 may include a delivery valve 245. In some embodiments, the delivery valve 245 may be a two-way delivery valve, while in other embodiments the delivery valve 245 may be a configuration of multiple one-way valves and interconnecting pipes. The control system 400 may communicate with the delivery valve 245 to receive data or signals including information indicating the position (e.g., opening) of the delivery valve 245. The control system 400 may transmit control signals to actuators on the delivery valve 245 to adjust its position.

By controlling the position of the delivery valve 245, the control system can regulate the fraction of the flowable mixture that passes to the skinning system 300 and the fraction that is recirculated to the mixing delivery system 200, thereby regulating the amount of flowable mixture delivered to the downstream skinning system 300. Referring to FIG. 1, the two-way delivery valve 245 may be positioned (e.g., the opening of the valve 245 may be adjusted) to regulate an amount of flowable mixture flowing to the skinning system 300 and the amount flowing through the recirculation line 260. For example, the position of the two-way delivery valve 245 may be adjusted such that all flowable mixture flows to the skinning system 300, all flowable mixture flows to the recirculation line 260, or a first portion of the flowable mixture flows to the skinning system 300 and a second portion of the flowable mixture flows to the recirculation line 260.

Although not shown in FIG. 1, in some embodiments, the recirculation line 260 may return at least a portion of the flowable mixture to the mixer 220 instead of or in addition to the storage device 225. The recirculation line 260 may include a pressure sensor 265 configured to measure a pressure within the recirculation line 260, which may be referred to as a return pressure. The pressure sensor 265 may be disposed within the recirculation line 260 at a suitable location. For example, the pressure sensor 265 may be disposed downstream of the delivery valve 245 in the recirculation line 260. The control system 400 may communicate with the pressure sensor 265 to receive data or signals including information indicating the measured return pressure. The control system 400 may transmit control signals to the pressure sensor 265 to control, for example, when to measure the return pressure and/or when to transmit the measured return pressure to the control system 400.

The recirculation line 260 may include a reducer 270 configured to regulate the flow of the flowable mixture. The reducer 270 may be optional and not included in all embodiments. The recirculation line 260 may further include a valve 275, which may be referred to as a return valve 275. The return valve 275 may be any suitable flow control valve, and may be configured to control the amount of flowable mixture flowing within the recirculation line 260. The return valve 275 may be controlled by the control system 400 in order to control back or return pressure within the recirculation line 260. The position of the delivery valve 245 may be controlled by the control system 400 to regulate the manifold pressure or the skinning pipe pressure. For example, the control system 400 may communicate with the return valve 275 to receive data or signals including information indicating the position of the return valve 275. The control system 400 may transmit control signals to actuators of the return valve 275 to adjust its position, thereby regulating the return pressure within the recirculation line 260 and/or the amount of flowable mixture flowing within the recirculation line 260, which may affect the manifold pressure or the skinning pipe pressure.

In some embodiments, the control system 400 may control the speed of the pump 235 and the position of the delivery valve 245 and the return valve 275 together in order to regulate the amount of flowable mixture and the pressure of the flowable mixture delivered to downstream skinning system 300.

As shown in FIG. 1, the mixture delivery system 200 may include a purge line 280 in addition to or instead of the recirculation line 260. The purge line 280 may include a valve 285 configured to regulate an amount of the flowable mixture flowing within the purge line 280. The valve 285 may be any suitable flow control valve, and may be controlled by the control system 400. For example, the control system 400 may communicate with the valve 285 to receive data or signals including information indicating the position of the valve 285. The control system 400 may transmit control signals to the valve 285 to adjust the position, thereby controlling the amount of flowable mixture flowing in the purge line 280.

The purge line 280 may include a pressure sensor 290 configured to measure a pressure in the purge line 280. The pressure sensor 290 may be disposed at any suitable location within the purge line 280, such as downstream of the valve 285 or upstream of the valve 285. The control system 400 may communicate with the pressure sensor 290 to receive data or signals including information indicating the measured pressure. The control system 400 may transmit control signals to the pressure sensor 290 to control, for example, when to measure the pressure and/or when to transmit the measured pressure to the control system 400.

Although not shown in FIG. 1, the purge line 280 may be connected to a tote or other container (not shown) for receiving the purged (e.g., dumped) flowable mixture. In some embodiments, when at least one property (e.g., density and/or viscosity) of the flowable mixture do not meet target requirements, the purge line 280 may be used to dump or discard the flowable mixture. In some embodiments, the purge line 280 may be used to redirect the flowable mixture from the delivery line 240 until the properties of the mixture and the pressure in the delivery line 240 satisfy operational parameters to enable activation of the skinning system 300 to receive the flowable mixture. When the purge line 280 is open (e.g., when the valve 285 is open), the delivery valve 245 may be closed to prevent the flowable mixture from flowing to the skinning system 300.

As shown schematically in FIG. 1, the skinning system 300 may include a skinning pipe 310 that is supported by a manifold 305. The term "manifold assembly" may include the manifold 305 and various devices or components mounted on or to the manifold 305 and/or the skinning pipe 310. The manifold assembly may also include various devices or components provided around the manifold 305. In some embodiments, various devices or components mounted on or to the manifold 305 may be regarded as parts of the manifold 305. Thus, manifold 305 may also be referred to as manifold assembly 305. In some embodiments, the skinning pipe 310 may be mounted in a hole located at a center portion of the manifold 305. The skinning pipe 310 may define an inner space to receive an article (e.g., article 311 or 312). The skinning system 300 may apply the flowable mixture to the article through the skinning pipe 310, as the article moves axially within the inner space of the skinning pipe 310. For example, as an article moves along the inner space of the skinning pipe 310 in an upward direction (from bottom to top), the article may receive the flowable mixture at its outer surface.

FIG. 1 shows three articles 311, 312, and 313, among which the article 313 is an unskinned article, and the articles 311 and 312 are at least partially skinned articles (e.g., at least partially being applied with the flowable mixture on their respective outer surfaces). The articles 311, 312, and 313 may be inserted or pushed into the skinning pipe 310 by an article feeding mechanism 315, which may be disposed below the skinning pipe 310 in a vertical direction. The article feeding mechanism 315 may be configured to center and/or align an unskinned article (e.g., article 313) with the skinning pipe 310 before or while pushing the article into the skinning pipe 310.

As schematically shown in FIG. 1, the skinning system 300 may include a transfer system 320 configured to hold an article exiting the skinning pipe 310 (e.g., article 311) and move the article out of the skinning pipe 310. For illustrative purposes, a vacuum system is shown as an example of the transfer system 320. For discussion purposes, the transfer system 320 is referred to as a vacuum system 320. The vacuum system 320 may hold and move the article out of the skinning pipe 310 using a vacuum pressure or vacuum force. While the vacuum system 320 holds the article using the vacuum pressure, the vacuum system 320 may pull one or more articles (e.g., article 311 or both articles 311 and 312) in an upward direction through the skinning pipe 310, as the one or more articles move axially within the inner space of the skinning pipe 310 to receive the flowable mixture. The vacuum system 320 may work in combination with the article feeding mechanism 315 so that articles are pushed up through the skinning pipe 310 from the bottom by the article feeding mechanism 315 and pulled out of the top of the skinning pipe 310 by the vacuum system 320. Alternatively, the vacuum system 320 may function merely to lift articles from the skinning pipe 310 after they have been pushed through the skinning pipe 310 by the article feeding mechanism 315 applying a pushing force from the bottom.

As shown in FIG. 1, the manifold 305 may include one or more pressure sensors 325 mounted thereon to measure a pressure associated with the manifold (which may be referred to as a "manifold pressure"). For example, the manifold pressure may refer to the pressure at an inlet of the manifold 305, where the flowable mixture from the mixture delivery system 200 is received and directed into distribution channels within the manifold 305. Although FIG. 1 only shows that the mixture delivery system 200 is connected to one side of the manifold 305 for delivering the flowable mixture to the manifold 305, the mixture delivery system 200 may also be connected to other locations of the manifold 305 so that the manifold 305 may receive the flowable mixture from the mixture delivery system 200 through more than one inlet.

As shown in FIG. 1, the skinning system 300 may include one or more pressure sensors 330 configured to measure a pressure of the flowable mixture at a flow inlet of the skinning pipe 310, where flowable mixture is received from the manifold 305 and is about to flow into the inner space of the skinning pipe 310 for applying to the article. The pressure may be referred to as a skinning pipe pressure, a unipipe pressure, a pressure of the pipe, or a pressure of the skinning pipe. The pressure sensors 330 may be mounted to the skinning pipe 310 at a suitable location. For example, the pressure sensors 330 may be mounted to a lower portion of the skinning pipe 310 that is below a lower surface of the manifold 310.

As shown in FIG. 1 and described above, the control system 400 may communicate with the mixture delivery system 200 and the skinning system 300, and may control the operations of the mixture delivery system 200 and the skinning system 300. The control system 400 may communicate with various components or devices included in the mixture delivery system 200 and/or the skinning system 300. The control system 400 may receive signals or data from the mixture delivery system 200 and/or the skinning system 300, and may transmit control signals to the mixture delivery system 200 and/or the skinning system 300 to control their operations.

The control system 400 may include various hardware and/or software components, modules, units, etc. The hardware components may include circuits, processors, and memories. The software components within the control system may include computer-implemented programs or modules made up of computer executable instructions and/or codes.

The control system 400 may include at least one processor 415 and at least one memory 420. The processor 415 may be any suitable computer processor, such as, for example, a central processing unit (CPU), a signal processor, etc. The memory 420 may be any suitable memory configured to store programs, instructions, and/or codes, which may be executed by the processor 415. The memory 420 may be a non-transitory or tangible random access memory (RAM), a read-only memory (ROM), a flash memory, etc. The processor 415 may read the instructions and/or codes from the memory 420 and execute the instructions and/or codes to run programs that perform various control system functions, such as the methods or processes disclosed herein.

In some embodiments, the control system 400 may be implemented as software and stored on a tangible, non-transitory computer-readable medium, such as a hard-disk, a compact disc, a flash memory, etc. As shown in FIG. 1, the control system 400 may include a mixture control system module 405 and a skinning control system module 410, which may be implemented as separate software modules executing on a central processor 415, or as modules executing on separate processors communicating with a central processor. Within embodiments described above in which the mixture delivery system 200 and the skinning system 300 are configured with their own control systems, the mixture control system module 405 and a skinning control system module 410 may be implemented on separate processors positioned within or nearby their respective systems and communicating via cable or network connections with the central processor 415.

In some embodiments, the mixture control system 405 and/or the skinning control system 410 may each include control hardware components, software components, or both. For example, the mixture control system 405 and the skinning control system 410 may each include hardware circuits, processors, memories, and communication units.

As shown in FIG. 1, the control system 400 may include a communication unit 425 configured to enable the control system 400 to communicate with various components or devices included in the mixture delivery system 200 and the skinning system 300. The communication unit 425 may be a local area data network or a plurality of wired or wireless communication links to various components configured to enable the control system 400 to receive data or signals from the mixture delivery system 200 and/or the skinning system 300, and transmit control signals to the mixture delivery system 200 and the skinning system 300 to control their operations.

In some embodiments, the communication unit 425 may communicate with the mixture delivery system 200 through number of data connection cables or a communication network 430. Similarly, the communication unit 425 may communicate with the skinning system 300 through number of data connection cables or a communication network 435. The communication networks 430 and 435 may be different or the same. The communication networks 430 and 435 may be wired or wireless networks (e.g., Wi-Fi, Bluetooth, etc.). The communication unit 425 may be configured to receive signals or data (e.g., measured system parameters) from the mixture delivery system 200 and the skinning system 300, and transmit signals (e.g., control signals) to the mixture delivery system 200 and the skinning system 300 through their respective networks 430, 435. The communication unit 425 may include hardware components, software components, or both. For example, the communication unit 425 may include switches, routers, Ethernet ports, wireless transceivers, communication lines, etc.

The interconnection among the various components included in the control system 400 (e.g., the mixture control system 405, the skinning control system 410, the processor 415, and the memory 420) is only for illustrative purposes. Components included in the control system 400 may be connected with one another and may communicate with one another.

Figure 2:
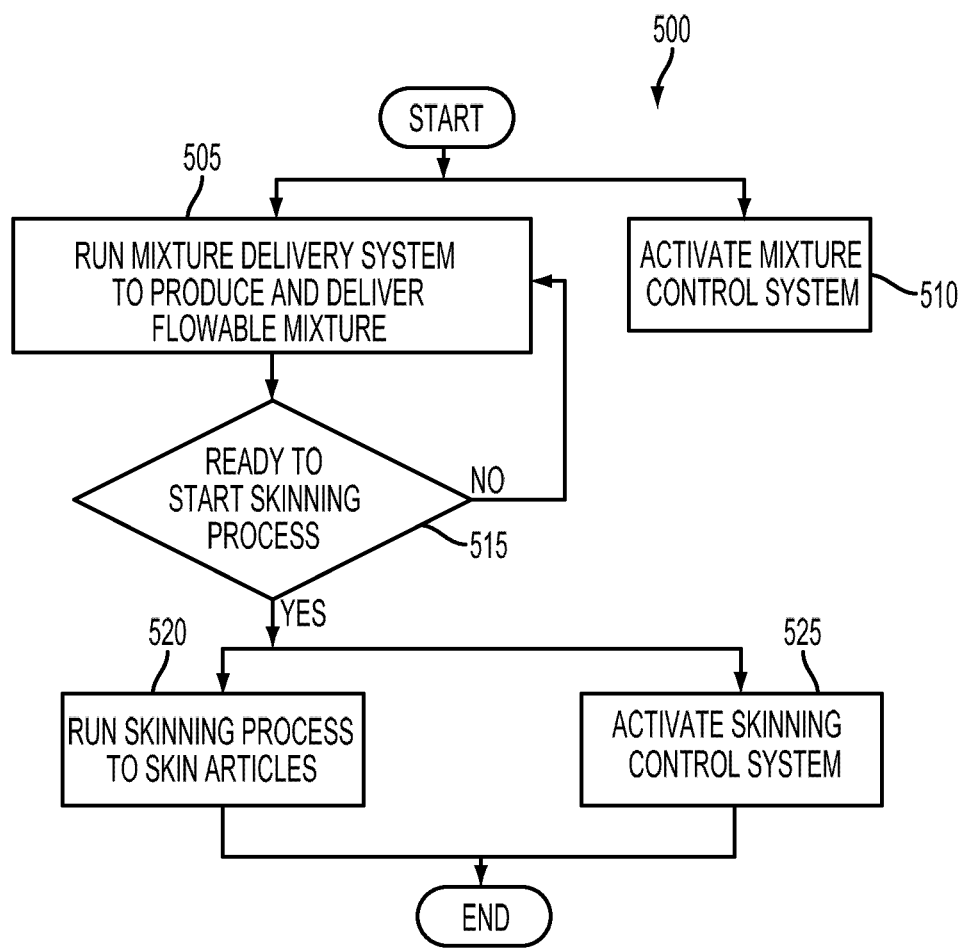
FIG. 2 is a process flow diagram of an exemplary method for the operation of the system for skinning articles.

FIG. 2 is a flowchart illustrating an exemplary method (or process) 500 for operating the system 100 for skinning the articles. The method 500 may be performed by the mixture delivery system 200 and the skinning system 300 working in concert under direction of the control system 400 that receives data from measuring devices and sends control signals to controllable components and subsystem within the system 100. The method 500 may include activating and running the mixture delivery system 200 to produce and deliver a flowable mixture (block 505). The mixture delivery system 200 may be managed and controlled by the mixture control system 405 that may be activated (block 510). The method 500 may include determining whether the skinning process should be started (step 515). Various factors may be considered or evaluated in determining whether the skinning process should be started. Such factors may include the status of the skinning system 300, e.g., whether the skinning system 300 has been assembled and tuned, the skinning pipe pressure, etc. The factors may also include the status of the mixture delivery system 200, e.g., whether the properties of the flowable mixture meet the target requirements, whether the return pressure within the recirculation line 260 has reached a threshold return pressure value, or whether the delivery pressure in the delivery line 240 has reached a threshold delivery pressure value, etc.

Until the control system 400 determines that the skinning process should be started (No, block 515), the mixture delivery system 200 may be operated to prepare the mixture and keep the mixture ready for use without starting the skinning process (e.g., by recirculating the flowable mixture in the recirculation line 260). When the control system 400 determines that the skinning process should be started (Yes, block 515), the skinning process may be started to receive the flowable mixture and start skinning the articles with the flowable mixture (block 520), and the skinning control system 410 may be activated to control the skinning system 300 (block 525). The skinning system 300 may be activated before the skinning process is started, or may be activated at the same time the skinning process is started. The mixture delivery system 200 and the skinning system 300 may continuously and automatically run to produce the flowable mixture and apply the flowable mixture to the articles until some events (e.g., scheduled maintenance, repairs, unexpected sudden stoppage) causes the control system 400 to stop the mixture delivery system 200 and/or the skinning system 300.

Figure 3:
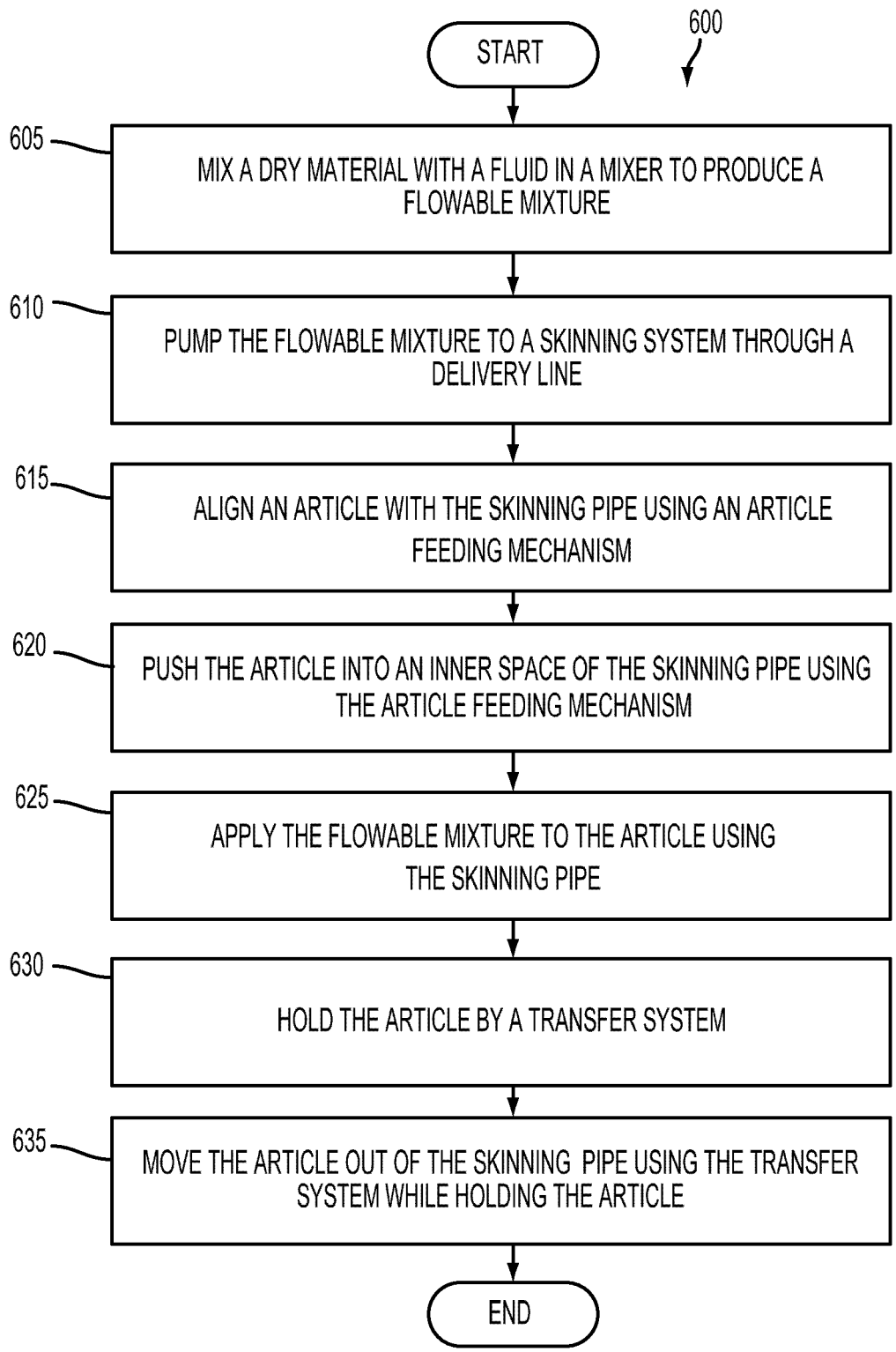
FIG. 3 is a process flow diagram of an exemplary method for the operation of the system for skinning articles.

FIG. 3 is a flowchart showing an exemplary method 600 for operating the system 100. The method 600 may include mixing a dry material with a fluid in a mixer (e.g., the mixer 220) to produce a flowable mixture (block 605). The method 600 may include pumping (e.g., by the pump 235) the flowable mixture to the skinning system 300 through the delivery line 240 (block 610). The method 600 may include aligning an article (e.g., an unskinned article 313) with the skinning pipe 310 using the article feeding mechanism 315. The method 600 may include pushing the article into an inner space of the skinning pipe 310 (block 620).

The method 600 may include applying the flowable mixture to the article using the skinning pipe 310 (block 625). The flowable mixture may be applied to the article by the skinning pipe 310 as the article moves axially along the inner space of the skinning pipe 310. The axial movement of the article may be upward in a vertical direction (e.g., against the gravity of the article). The method 600 may include holding the article by a vacuum pressure generated by the vacuum system 320, as the article moves axially along the inner space of the skinning pipe 310 to receive the flowable mixture (block 630). The method 600 may also include moving the article out of the skinning pipe 310 using the vacuum system 320 while the vacuum system 320 holds the article with the vacuum pressure, as the article moves axially along the inner space of the skinning pipe 310 to receive the flowable mixture (block 635).

Figure 4:
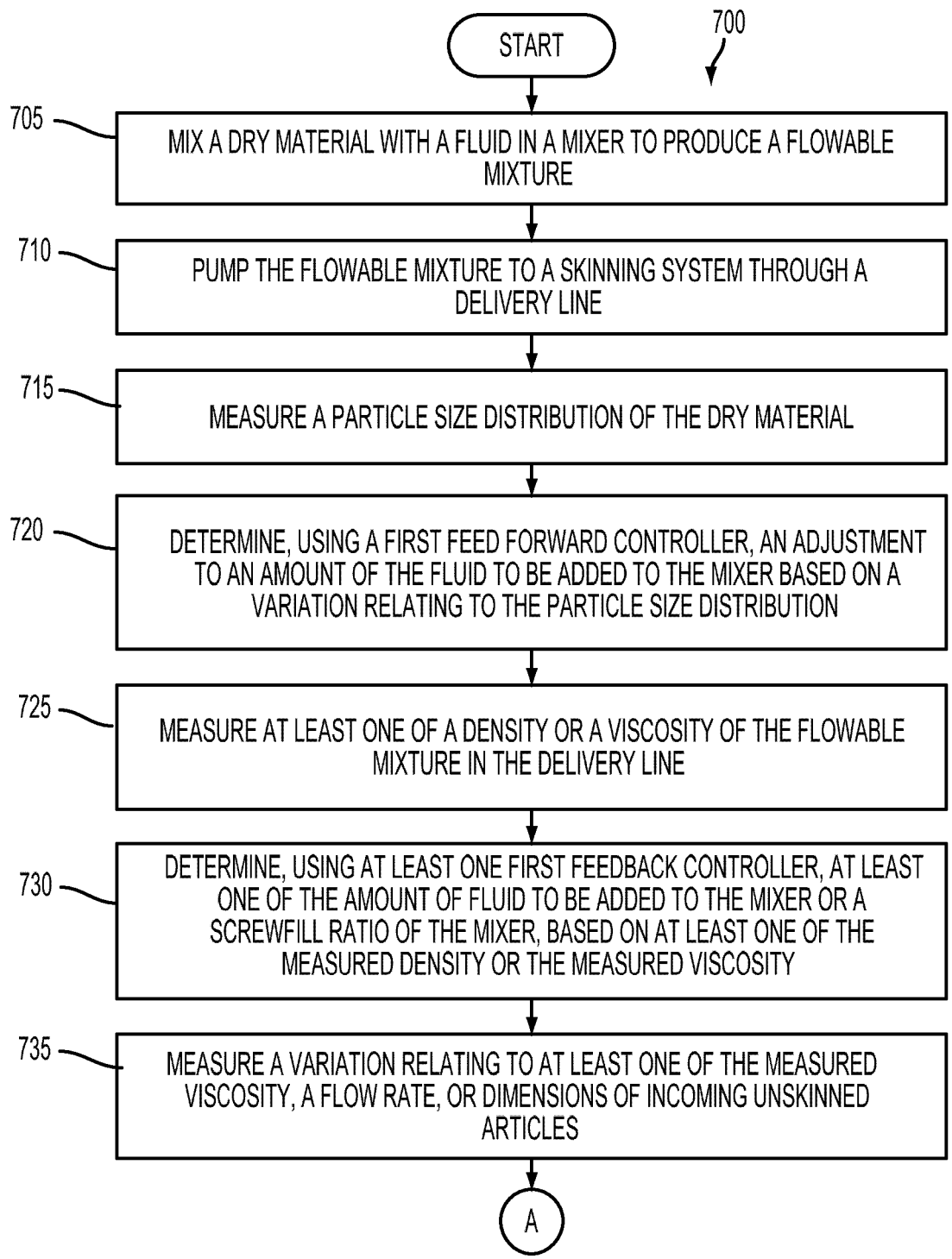
FIG. 4 is a process flow diagram of an exemplary method for the operation of the system for skinning articles.
Figure 5:
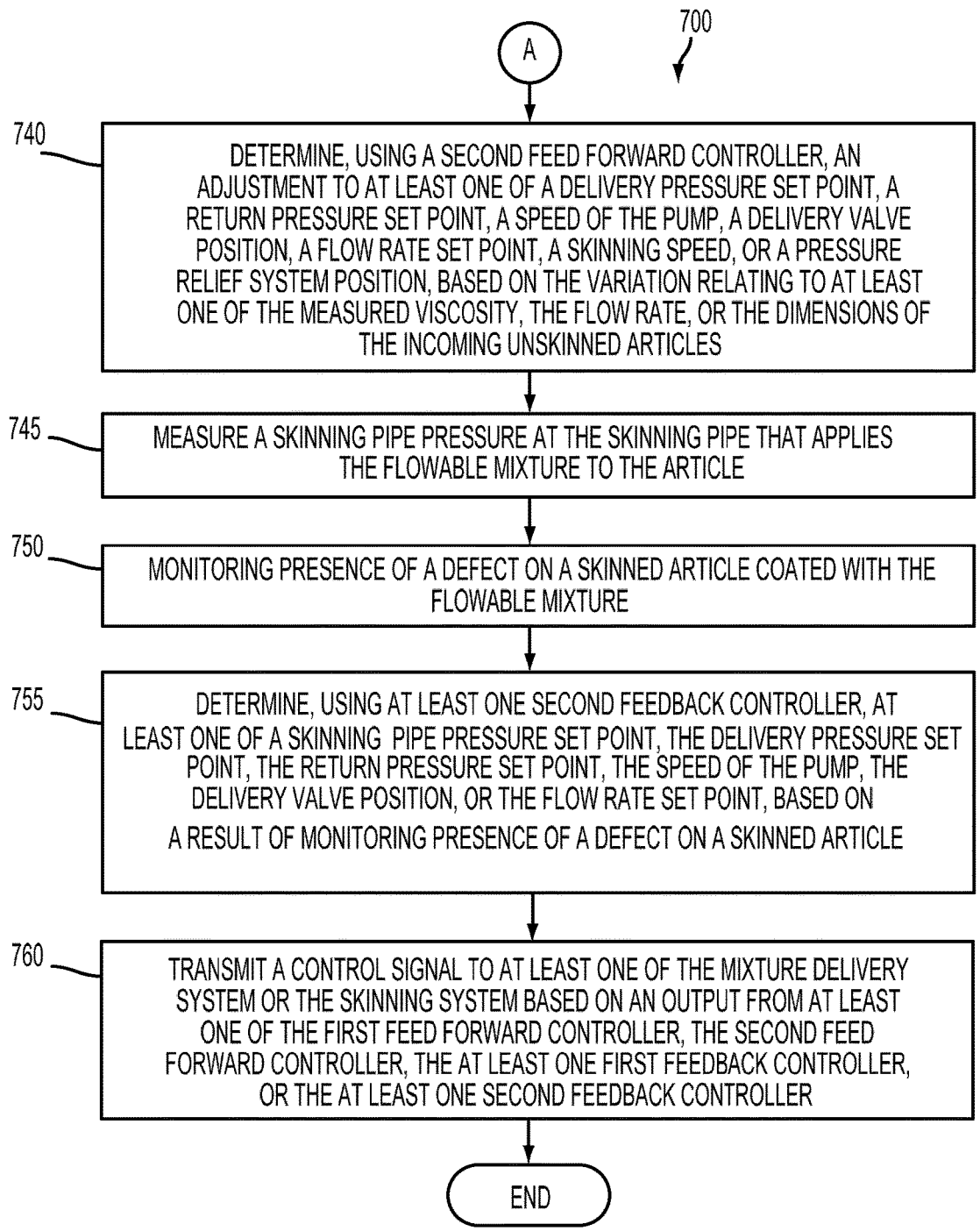
FIG. 5 is a process flow diagram of an exemplary method for the operation of the system for skinning articles.

FIGS. 4 and 5 are a flowchart showing an exemplary method 700 for operating the system 100. The method 700 may include mixing a dry material with a fluid in a mixer (e.g., the mixer 220) to produce a flowable mixture (block 705). The method 700 may include pumping (e.g., by the pump 235) the flowable mixture to the skinning system 300 through the delivery line 240 (block 710). The method 700 may include measuring a particle size distribution of the dry material (block 715). In some embodiments, the particle analyzer 205 may measure the particle size distribution. The method 700 may include determining, using a first feed forward controller, an adjustment to an amount of the fluid to be added to the mixer 220 based on a variation in the particle size distribution (block 720). The fluid may include at least one of water or a suitable binder.

The method 700 may include measuring at least one of a density or a viscosity of the flowable mixture in the delivery line 240 (block 725). The method 700 may include determining, using at least one first feedback controller, at least one of the amount of fluid (e.g., water and/or binder) to be added to the mixer 220 or a screwfill ratio of the mixer 220, based on at least one of the measured density or the measured viscosity (block 730). The method 700 may include measuring a variation in at least one of the viscosity, a flow rate of the flowable mixture (e.g., within the delivery line 240), or dimensions (e.g., diameter, radius, circumference, axial length, and/or outer peripheral length) of incoming unskinned articles (block 735). Measuring the variation in the at least one of the viscosity, flow rate, or dimensions of the incoming unskinned articles may include measuring the viscosity, flow rate, or the dimensions, and determining a variation over time.

Referring to FIG. 5, the method 700 may include determining, using a second feed forward controller, an adjustment to at least one of a delivery pressure set point, a return pressure set point, a speed of the pump (e.g., pump 235), a delivery valve position (e.g., position of the delivery valve 245), a flow rate set point, a skinning speed associated with the skinning system 300, or a pressure relief system position, based on the variation in at least one of the measured viscosity, the flow rate, or the dimensions (e.g., diameter, radius, circumference, axial length, and/or outer peripheral length) of the incoming unskinned articles (block 740). The method 700 may include measuring a skinning pipe pressure at the skinning pipe 310 that applies the flowable mixture to the article (block 745).

The method 700 may include monitoring presence of a defect from a skinned article coated with the flowable mixture (block 750). Monitoring the presence of the defect may include detecting a type of the defect if the defect is present. The type of defect may be a fast flow defect, a starvation defect, a pit defect, a pock defect, or a ring defect. The type of defect may be determined based on different signals associated with different types of defects, such as signals with different peak magnitudes, frequencies, pixel characteristics, etc.

The method 700 may include determining, using at least one second feedback controller, at least one of a skinning pipe pressure set point, the delivery pressure set point, the return pressure set point, the speed of the pump (e.g., pump 235), the delivery valve position (i.e., the position of the delivery valve 245), or the flow rate set point, based on a result of monitoring the presence of the defect. For example, the result of monitoring the presence of the defect may include a type of defect determined from a detected defect. Thus, in some embodiments, the method 700 may include determining, using at least one second feedback controller, at least one of a skinning pipe pressure set point, the delivery pressure set point, the return pressure set point, the speed of the pump (e.g., pump 235), the delivery valve position (i.e., the position of the delivery valve 245), or the flow rate set point, based on the type of defect detected from a skinned article. The method 700 may further include transmitting a control signal to at least one of the mixture delivery system 200 or the skinning system 300 based on an output from at least one of the first feed forward controller, the second feed forward controller, the at least one first feedback controller, or the at least one second feedback controller (block 760).

Mixture Delivery Systems and Controls

Figure 6:
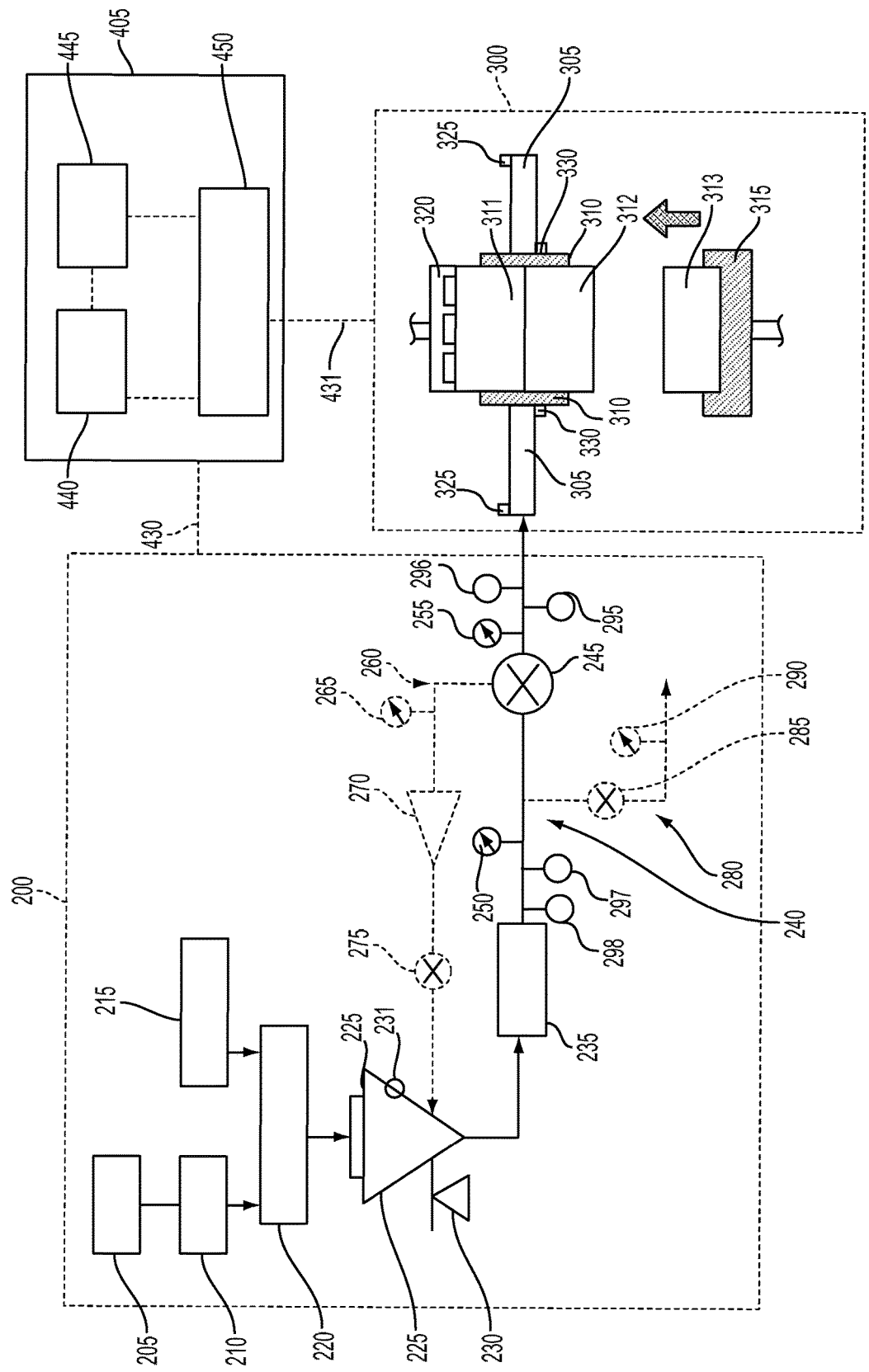
FIG. 6 is a schematic diagram of an exemplary mixture delivery system.

FIG. 6 schematically shows another embodiment of the system 100 include additional components of the mixture delivery system 200 and the mixture control system 405. Some of the components included in the mixture delivery system 200 have been described above in connection with FIG. 1.

In some embodiments, the mixture delivery system 200 may include a densitometer 295 configured to measure the density of the flowable mixture. The densitometer 295 may be an in-line densitometer, and may be disposed at any suitable location within the delivery line 240. For example, the densitometer 295 may be disposed downstream of the delivery valve 245, upstream of the delivery valve 245, or downstream of the pump 235. The densitometer 295 may also be disposed at other locations, such as, for example, upstream of the pump 235, within the recirculation line 260, within the purge line 280, or within the skinning system 300. The inline densitometer 295 may be a radiometric device.

As described above, the mixture control system 405 may be part of the control system 400 or may be a dedicated, separate control system. The mixture control system 405 may communicate with the densitometer 295 via cables or a network 430 to receive signals or data including information indicating the measured density of the flowable mixture, and transmit control signals to the densitometer 295 such as to control when to measure the density and/or when to transmit the measured density to the mixture control system 405. The skinning control system 410 may also obtain the measured density from either the mixture control system 405 or the densitometer 295. The mixture control system 405 and/or the skinning control system 410 may use the measured density to control the properties of the flowable mixture and/or the skinning process.

As shown in FIG. 6, the mixture delivery system 200 may include a viscometer 296 configured to measure the viscosity of the flowable mixture. The viscometer 296 may be an in-line viscometer, and may be disposed at any suitable location within the mixture delivery system 200. For example, the viscometer 296 may be disposed within the delivery line 240. In some embodiments, the viscometer 296 may be disposed downstream of the delivery valve 245, upstream of the delivery valve 245, downstream of the pump 235, etc. The viscometer 296 may also be disposed at other locations, such as, for example, upstream of the pump 235, within the recirculation line 260 or the purge line 280, or within the skinning system 300. The mixture control system 405 may communicate with the viscometer 296 via cables or a network 430 to receive signals or data including information indicating the measured viscosity of the flowable mixture, and transmit control signals to the viscometer 296 such as to control when to measure the viscosity and/or when to transmit the measured viscosity to the mixture control system 405. The skinning control system 410 may also obtain the measured viscosity from either the mixture control system 405 or the viscometer 296. The measured viscosity may be used by the mixture control system 405 and/or the skinning control system 410 to control the properties of the flowable mixture and/or the skinning process, respectively.

As shown in FIG. 6, the mixture delivery system 200 may include a flow meter 297 configured to measure a flow rate of the flowable mixture. The flow meter 297 may be any suitable flow meter, such as a flow meter with a summation function for calculating the total amount of flow. The flow meter 297 may be disposed within the delivery line 240 to measure the flow rate within the delivery line 240. The flow meter 297 may be an in-line flow meter, and may be disposed at any suitable location within the delivery line 240. For example, one or more flow meters 297 may be disposed downstream of the delivery valve 245, upstream of the delivery valve 245, downstream of the pump 235, etc. The mixture control system 405 may communicate with the flow meter(s) 297 via cables or a network 430 to receive signals or data including information indicating the measured flow rate of the flowable mixture, and transmit control signals to the flow meter 297 such as to control when to measure the flow rate and/or when to transmit the measured flow rate to the mixture control system 405. The skinning control system 410 may also obtain the measured flow rate from either the mixture control system 405 or the flow meter 297. The measured flow rate may be used by the mixture control system 405 and/or the skinning control system 410 to control the properties of the flowable mixture and/or the skinning process, respectively.

As shown in FIG. 6, the mixture delivery system 200 may include a rheometer 298 configured to measure the rheology of the flowable mixture. The rheology of the flowable mixture may relate to the behavior of the flowable mixture. The rheology may include various parameters, such as, for example, the mixture consistency, viscosity, density, and characteristics associated with shear stress and/or shear strain, extensional stress and/or extensional strain, etc. In some embodiments, the rheometer 298 may measure the consistency of the flowable mixture. In some embodiments, the rheometer 298 may also measure the density and/or the viscosity. The rheometer 298 may be an in-line rheometer, and may be disposed at any suitable location, such as, for example, downstream of the pump 235 in the delivery line 240, downstream of the delivery valve 245, etc. The rheometer 298 may be used as an alternative to the densitometer 295 and/or the viscometer 296, or may be used in combination with the densitometer 295 and/or the viscometer 296.

The mixture control system 405 may communicate with the rheometer 298 via cables or a network 430 to receive signals or data including information regarding the measured rheology of the flowable mixture, and transmit control signals to the rheometer 298 such as to control when to measure the rheology and/or when to transmit the measured rheology to the mixture control system 405. The skinning control system 410 may also obtain the measured rheology from either the mixture control system 405 or the rheometer 298. The measured rheology may be used by the mixture control system 405 and/or the skinning control system 410 to control the properties of the flowable mixture and/or the skinning process, respectively.

As shown in FIG. 6, in some embodiments, the exemplary mixture control system 405 may include a processor 440, a memory 445, and a communication unit 450. The communication unit 450 may be a dedicated communication unit for the mixture control system 405, which may be the same as or similar to the communication unit 425 shown in FIG. 1. In some embodiments, the communication unit 450 may be part of the communication unit 425 shown in FIG. 1. The processor 440 and the memory 445 may be dedicated processor and memory for the mixture control system 405, or may be the same as or similar to the processor 415 and memory 420 shown in FIG. 1. In some embodiments, the processor 440 and memory 445 may be part of the processor 415 and memory 420 shown in FIG. 1.

The mixture control system 405 may also communicate with the skinning system 300 via a network 431, which may include a wired and/or wireless network. For example, the mixture control system 405 may receive data or signals from various components included in the skinning system 300, and may transmit control signals to the various components in the skinning system 300.

Figure 7:
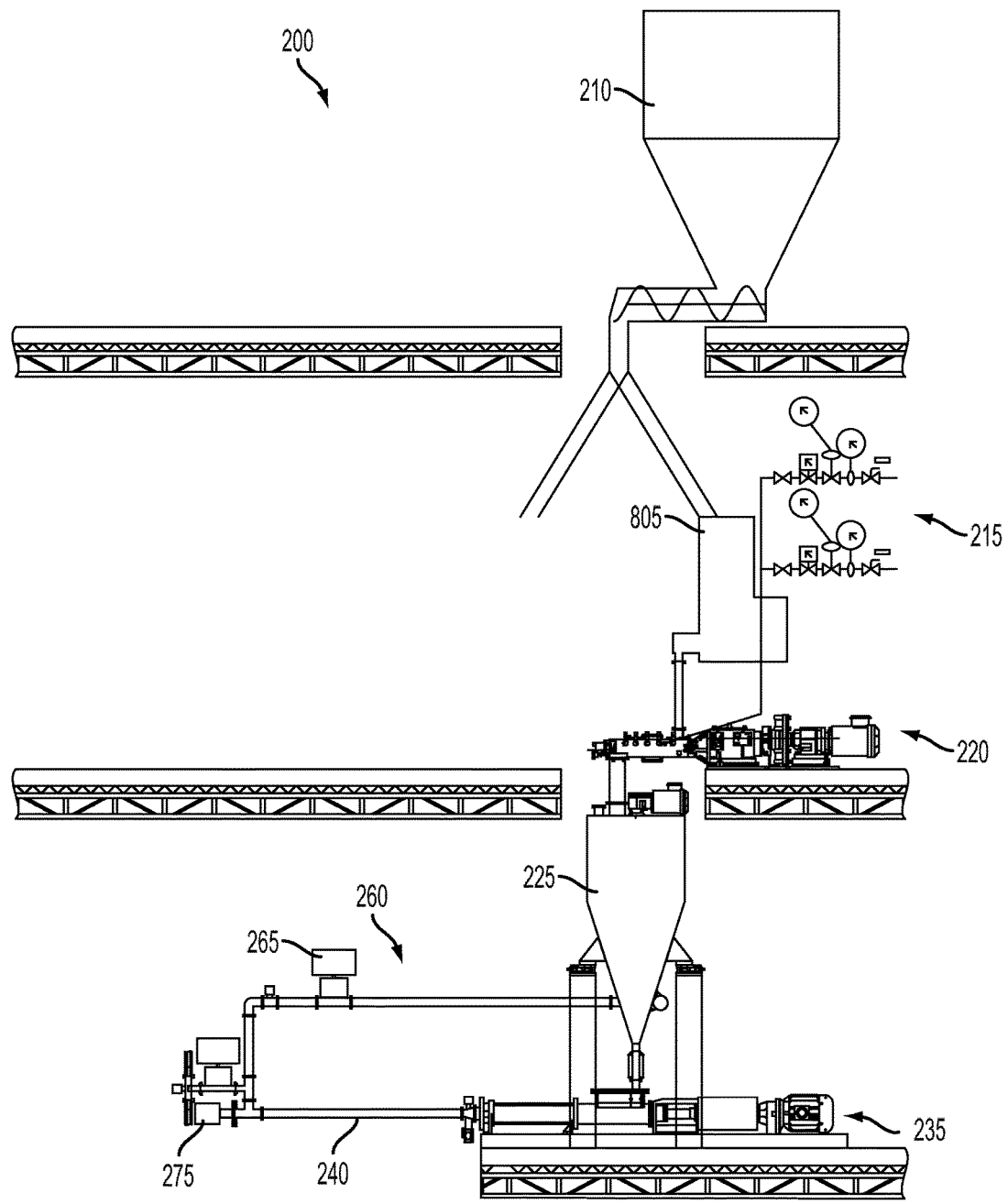
FIG. 7 is a schematic diagram of an exemplary mixture delivery system.

FIG. 7 schematically shows an exemplary configuration of the mixture delivery system 200. In addition to the components shown in FIG. 1 and described above, FIG. 7 shows other components that may be included in the mixture delivery system 200. The mixture delivery system 200 may include a dry blend feeder 805 configured to receive blended dry material from the blender 210 and feed the blended dry material to the mixer 220. The dry blend feeder 805 may be disposed downstream of the blender 210 and upstream of the mixer 220. The dry blend feeder 805 may be a loss-in-weight feeder, and may be controlled by the control system 400 (e.g., the mixture control system 405). For example, the control system 400 may communicate with the dry blend feeder 805 via cables or a network 430 to receive signals or data including information indicating the amount of dry material that has been fed to the mixer 220. The control system 400 may transmit control signals to the dry blend feeder 805 via cables or a network 430 to control the amount to be fed to the mixer. In some embodiments, the dry blend feeder 805 may operate at a feed rate between 0-500 lbs/hour. In some embodiment, the dry blend feeder 805 may be part of or integral with the blender 210.

Referring to FIG. 7, a measuring device, such as a scale or load cell (not shown), within the blender 210 may weigh the desired amounts of raw materials (e.g., two, three, or four raw materials) before or while the blender 210 dry blends raw materials together. In some embodiments, the composition of the raw materials may comprise 70%/30% "coarse"/"fine" fused silica, 10% Wollastonite, and 1% cellulosic binder. Once blended, the blended dry material may be fed to the continuously running loss-in-weight dry blend feeder 805. When the feeder 805 is being refilled, the loss-in-weight control feature may be disabled and the dry blend feeder 805 may use a "volumetric" feed to keep a screw speed of the feeder 805 substantially constant in a continuous operation mode. The feed rate of the dry blend feeder 805 may range from 50 to 300 lbs/hour. In some embodiments, the feed rate of the dry blend feeder 805 may range from 0 to 500 lbs/hour. The feed rate of the dry blend feeder 805 may be controlled such that the downstream flow rate of the flowable mixture within the delivery line 240 may range from 50 to 300 lbs/hour, such as 50 to 200 lbs/hours.

Referring to FIG. 7, in some embodiments, the fluid dispensing system 215 may include one or more (e.g., two) liquid systems for dispensing one or more liquids, such as water and colloidal silica suspension, to the mixer 220 or a fluid tote or container. The fluids may be continuously fed to the mixer 220. The fluid dispensing system 215 may include at least one of a flow meter, a pump, a flow control valve to accurately dispense fluids at target rates. The fluid dispensing rate may range from 50 to 300 pounds/hour. In some embodiments, the fluid dispensing rate may range from 0 to 500 pounds/hour.

As described above, the pump 235 may be operated under direction of the control system 400 to regulate the flow of the flowable mixture through the delivery line 240. The pump 235 may include a motor/gearbox, a chromed rotor, and a polyurethane stator. In various embodiments, the pump 235 may be a progressive cavity pump, a hose (or peristaltic) pump, a diaphragm pump, a gear pump, or a circumferential piston pump. The stator of a progressive cavity pump may be replaceable, allowing convenient replacement of consumable part in addition to more precise control of flowable mixture (e.g., cement) through pump speed control (e.g., rpm manipulation).

FIG. 7 represents an exemplary vertical layout of the components of the mixture delivery system 200. In some embodiments, the blender 210 may be disposed at 21-27 feet above the ground/floor. The fluid dispensing system 215 may be disposed at 15-18 feet above the ground/floor. The dry blend feeder 805 may be disposed at 14-17 feet above the ground/floor. The mixer 220 may be disposed at 12-13 feet above the ground/floor. The storage device 225 may be disposed 6-11 feet above the ground/floor. The recirculation line 260 and the delivery line 240 may be disposed at 5-8 feet above the ground/floor. The pump 235 may be disposed at 4-6 feet above the ground/floor.

Figure 8A:
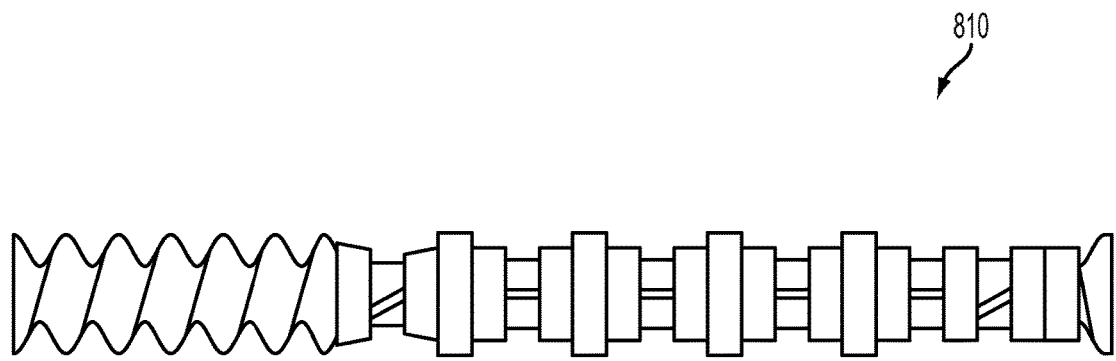
FIGS. 8A-8B are schematic and perspective views of an exemplary mixer head component.
Figure 8B:
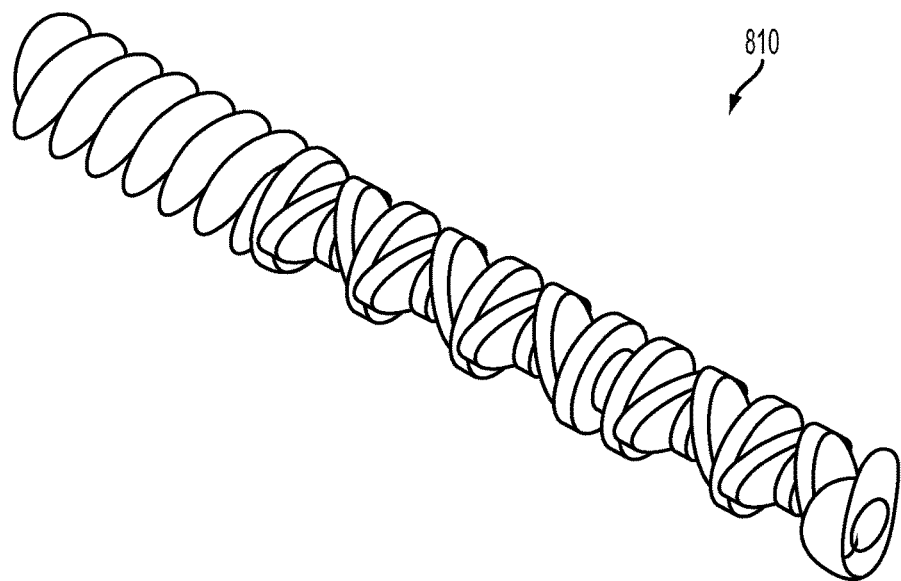

FIGS. 8A and 8B show an exemplary mixer head 810 that may be used in the mixer 220. The continuous mixer 220 may be used to mix both dry and wet ingredients (e.g., the dry blend and the fluids) together into a uniform paste-like flowable mixture (e.g., cement). The size of the mixer 220 may be determined by a target feed rate. The rheology of the produced flowable mixture (e.g., cement) may be affected by the processing parameters and hardware setup used in the mixer 220. Feed rate and speed (e.g., rpm) of the mixer 220 may be adjusted independently, such as to maintain a certain ratio between the feed rate and the speed (e.g., a screwfill ratio) to maintain a substantially consistent density of the flowable mixture. The element configuration and gate opening that regulates the output of the mixer 220 may also affect the rheology of the flowable mixture. In some embodiments, the mixer 220 may be a mixer from Readco Kurimoto LLC. In some embodiments, the mixer may be a mixer made by Gabler GmbH & Co. KG, Bepex International LLC, etc.

Figure 9:
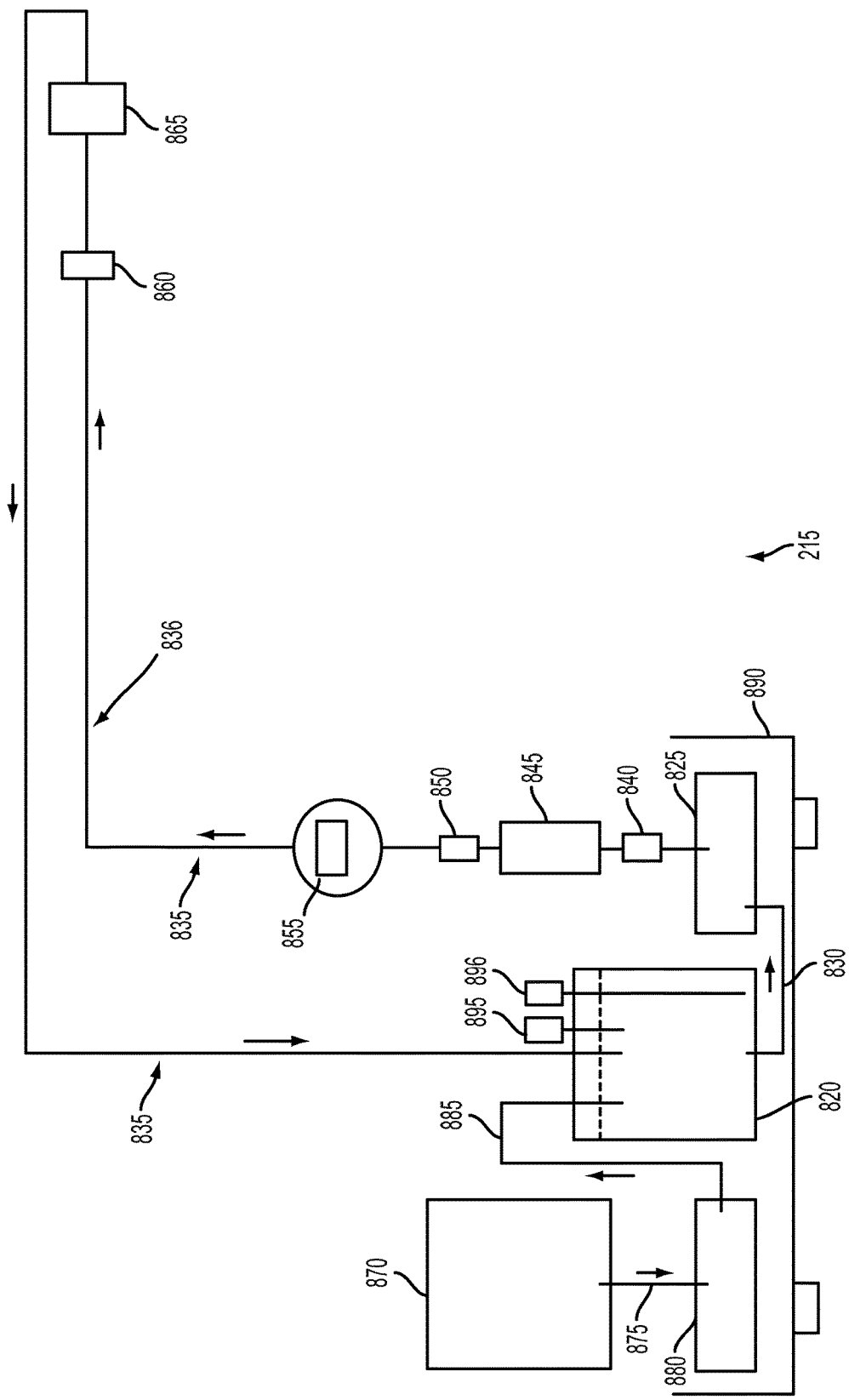
FIG. 9 is a schematic diagram of an exemplary fluid dispensing system.

FIG. 9 schematically shows an exemplary fluid dispensing system 215. The fluid dispensing system 215 may be used for a continuous skinning process or a batch-wise (e.g., index mode) skinning process. The fluid dispensing system 215 may be used for systems and processes other than the mixture delivery system 200 and the mixing process. The fluid dispensing system 215 may include a storage tank 820 configured to store one or more fluids (e.g., water, colloidal silica suspension, etc.). The fluid dispensing system 215 may include a pump 825 configured to pump the fluid from the storage tank 820 to a recirculation loop 835. The pump 825 may be referred to as a fluid system pump 825. The pump 825 may be in fluid communication with the storage tank 820 through a conduit 830. The fluid dispensing system 215 may include one or more pressure sensors (e.g., pressure sensors 840 and 850) configured to measure a pressure of the fluid within the recirculation loop 835.

The fluid dispensing system 215 may include a filter 845 disposed within the recirculation loop 835 and configured to filter contaminants out of the fluid. The filter 845 may be any suitable filter. In some embodiments, the filter 845 may be a screen type filter. The pressure sensor 840 may be disposed upstream of the filter 845 and may be referred to as a pre-filter pressure sensor 840. The pressure sensor 850 may be disposed downstream of the filter 845 and may be referred to as a post-filter pressure sensor 850. The difference between the pressure measured by the pre-filter pressure sensor 840 and the pressure measured by the post-filter pressure sensor 850 may indicate whether the filter 845 needs to be cleaned or replaced. The pre-filter pressure sensor 840 may have a higher pressure reading than the post-filter pressure sensor 850. In some embodiments, during normal operations, there may be a 10 psi pressure difference between the pre-filter pressure sensor 840 and the post-filter pressure sensor 850. In some embodiments, when the pressure difference reaches or exceeds 20 psi, an alarm may be initiated, indicating that the filter 845 should be cleaned, replaced, or otherwise serviced.

Referring to FIG. 9, the fluid dispensing system 215 may include a flow meter 855 disposed in the recirculation loop 835, which may be referred to as a delivery system flow meter. The flow meter 855 may measure the fluid flow rate within the recirculation loop 835. The fluid dispensing system 215 may include a pressure sensor 860, which may be referred to as a supply header pressure sensor. The regions between the delivery system flow meter 855 and the supply header pressure sensor 860 may be referred to as a supply header region 836, and may receive connections of distribution branches for delivering fluids to various users (such as mixers or totes). The pressure sensor 860 may be configured to measure a pressure within the supply header region 836, which may also be referred to as the back pressure.

The fluid dispensing system 215 may include a flow control valve 865, which may be any suitable flow control valve, such as a proportional flow control valve 865. The proportional flow control valve 865 may incrementally control or modulate an amount of flow of the fluid within the recirculation loop 835 by adjusting its opening within the range of 0% to 100%. The proportional flow control valve 865 may be completely closed (0% opening) or be opened at any suitable amount between 0% and 100% (i.e. completely open). The proportional flow control valve 865 may be disposed at any suitable location within the recirculation loop 835, e.g., downstream of or adjacent the supply header pressure sensor 860.

Figure 10:
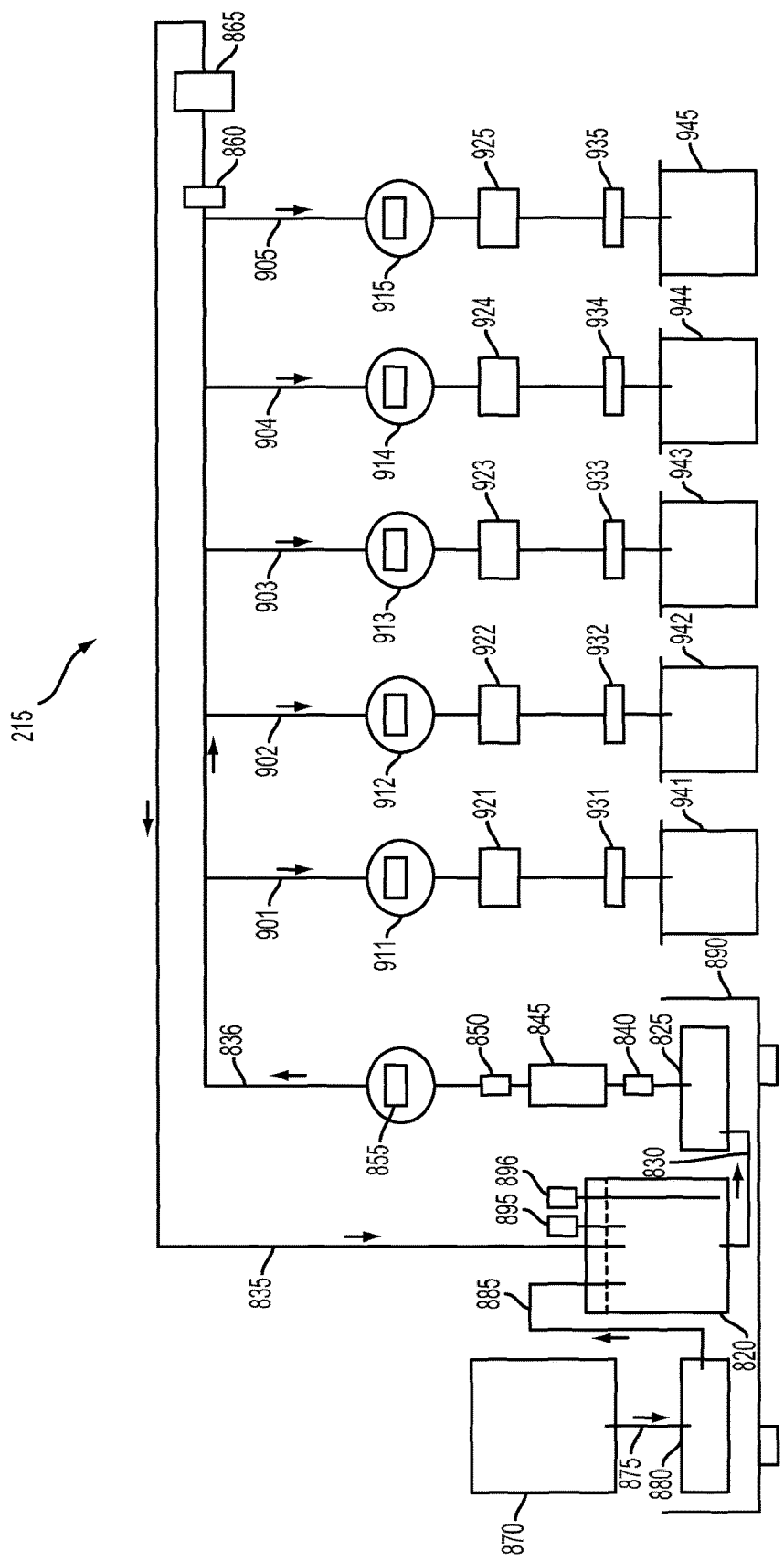
FIG. 10 is a schematic diagram of an exemplary fluid dispensing system.

Referring to FIG. 9, the fluid dispensing system 215 may include a controller 868, which may be a dedicated controller separate from the mixture control system 405 (or the control system 400), or may be a part of the mixture control system 405 or may be controlled by the overall control system 400). The controller 868 may be any suitable controller, such as a programmable linear controller. The controller 868 may communicate with one or more devices included in the fluid dispensing system 215 through data cables or a network 869, which may be a wired or wireless network. For example, the controller 868 may receive signals or data (e.g., measurements) from at least one of the valve 865, pressure sensor 860, and/or the flow meter 855, and may send control signals to these devices. For example, the controller 868 may receive pressure data from the pressure sensor 860 and send a control signal to the valve 865 to adjust the position of the valve 865, based on the speed of the pump 825, so as to maintain a substantially constant pressure (or back pressure) within the supply header region 836 and/or the recirculation loop 835 according to operating pressure set points received from the control system 400. The controller 868 may implement any suitable controls, such as, for example, a feedback control, a feed forward control, or both, and may be responsive to set point or other configuration signals received from the control system 400 to maintain the substantially constant pressure (or back pressure). The controller 868 may communicate with other devices included in the fluid dispensing system 215 as shown in FIG. 9 and FIG. 10, e.g., pre-filter pressure sensor 840, post-filter pressure sensor 850, etc.

Referring to FIG. 9, the fluid dispensing system 215 may include a secondary storage tank 870 configured to store fluid for refilling the storage tank 820. The fluid dispensing system 215 may include a pump 880 configured to pump fluid from the secondary storage tank 870 into the storage tank 820. The pump 880 may be in fluidic communication with the secondary storage tank 870 through a conduit 875, and with the storage tank 820 through another conduit 886. The secondary storage tank 870 may be referred to as a refill tank, and the pump 880 may be referred to as a refill pump. In some embodiments, the refill pump 880 may be a pneumatically operated pump. When the fluid level in the storage tank 820 is below a predetermined level, the refill pump 880 may be energized or activated to pump fluid from the secondary storage tank 870 to refill the storage tank 820.

Referring to FIG. 9, the fluid dispensing system 215 may include a high level sensor 895, which may include a probe disposed within the storage tank 820 at an upper portion to measure a high level of the fluid within the storage tank 820. The fluid dispensing system 215 may also include a low level sensor 896, which may include a probe disposed within the storage tank 820 at a lower portion to measure a low level of the fluid within the storage tank 820. In some embodiments, the fluid dispensing system 215 may not start initially unless the high level sensor 895 indicates that the fluid level in the storage tank 820 is above a predetermined high level. In some embodiments, when the high level sensor 895 in the storage tank 820 detects that the level of the fluid in the storage tank 820 is below the predetermined high level for a period of time (e.g., one minute, two minutes, etc.), the controller 868 may energize or activate the refill pump 880 to refill the storage tank 820 with fluid from the secondary storage tank 870 in response to receiving the signal from the high level sensor 895.

In some embodiments, when the refill pump 880 is energized for more than a predetermined period of time (e.g., four minutes, five minutes, etc.) without receiving a signal from the high level sensor 895 indicating that the predetermined high level has been reached, the controller 868 may initiate an alarm and may de-energize the refill pump 880. In some embodiments, when a signal received from the low level sensor 896 indicates that the fluid level in the storage tank 820 is below a predetermined low level, the controller 868 may de-energize the system pump 825. The fluid dispensing system 215 may include a skid 890 for containing at least one of the storage tank 820, the system pump 825, the refill pump 880, and the secondary storage tank 870. Although not shown due to the limited space, the controller 868 may communicate with at least one of the high level sensor 895, the low level sensor 896, or the refill pump 880 via cables or a network. The controller 868 may receive data or signals from at least one of the high level sensor 896, the low level sensor 896, or the refill pump 880, and may transmit control signals to them to control their operations.

FIG. 10 shows an exemplary fluid dispensing system 215 for distributing fluid to multiple users (e.g., mixers, containers, etc.). As shown in FIG. 10, a plurality of distribution branches 901-905 may be connected to the recirculation loop 835 at a supply header region 836. Although not shown in FIG. 10 due to the limited space, the controller 868 shown in FIG. 9 may also be included in the fluid dispensing system 215 shown in FIG. 10, and may communicate with various devices or components via cables or wired or wireless networks (e.g., via the network 869). Each distribution branch 901-905 may include a flow meter 911-915. Each distribution branch 901-905 may include a proportional flow control valve 921-925. Each distribution branch 901-905 may include a discrete control valve 931-935. A plurality of users (e.g., mixers) 941-945 may request different or the same amounts of fluid from the fluid dispensing system 215, and may receive precise amounts of fluid (e.g., doses) requested independently. The discrete control valves 931-935 may be on-off type control valves, which may provide a positive, drip-free cut-off.

Each of the flow meters 911-915 in the distribution branches may include a totalization function, which may count or calculate a total amount of fluid that has been dispensed to a user. Each of the flow meters 911-915 may transmit the measured flow rate during the dosing operation to a programmable linear controller, which may be separate from or included in the controller 868. Each of the proportional flow control valves 921-925 may be initially completely open (e.g., with 100% opening) and may gradually close until the desired amount of fluid has been dispensed to the user. Alternatively or additionally, each of the proportional flow control valves 921-925 may be programmed to include a high flow rate and a low flow rate. In a distribution branch (one of the braches 901-905), when the total amount of fluid dispensed to a mixer has reached the requested amount, the proportional flow control valve (e.g., one of the valves 921-925) may close, and then the discrete control valve (e.g., one of the valves 931-935) may close.

Referring to FIGS. 9 and 10, the fluid dispensing system 215 may be used for a continuous skinning process. Additionally, the fluid dispensing system 215 may also be used for adding fluids (e.g., liquids) to produce wet batch for extrusion, such as extrusion of ceramic articles. The fluid dispensing system 215 may enable precise dosing of fluids to multiple users (e.g., mixers) simultaneously without degrading accuracy. Steady flow and back pressure may be maintained within the recirculation loop 835, which includes the supply header region 836. The distribution branches 901-905 may be controlled independently to dispense fluid to each user without the need of coordinating sequences among the users. The fluid dispensing system 215 may be scaled based on the number of users. When additional users (e.g., mixers) need to be added to the fluid dispensing system 215, additional distribution branches may be added to the recirculation loop 835 (e.g., the supply header region 836). The recirculation design of the fluid dispensing system 215 may prevent solids within the fluid from settling and being dispensed to the users. The pump 825 may be programmed to pump fluids for recirculation during periods of dosing (e.g., dispensing to the users) and after extended periods of idleness.

Referring to FIGS. 9 and 10, in some embodiments, the supply header pressure sensor 860 may provide pressure information to a compensator logic, which may be included in the controller 868. The pressure information from the supply header pressure sensor 860 may be used by the controller 868 for controlling the proportional flow control valve 865. The delivery system flow meter 855 may provide flow information to a programmable linear controller, which may be separate from or included in the controller 868, via a suitable communication means, such as wireless or wired networks. The controller 868 may use the flow information to adjust the speed of the pump 825. The pump 825 may be controlled by a variable frequency drive, which may be included in the controller 868. The flow rate within the recirculation loop 835 may be regulated by varying the speed of the pump 825. Pressure within the recirculation loop 835 may be controlled by adjusting the opening and closing of the proportional flow control valve 865, which may regulate flow obtain the desired pressure. The fluid dispensing system 215 may be configured to provide a substantially consistent supply header pressure and sufficient fluid flow available to each user.

Figure 11:
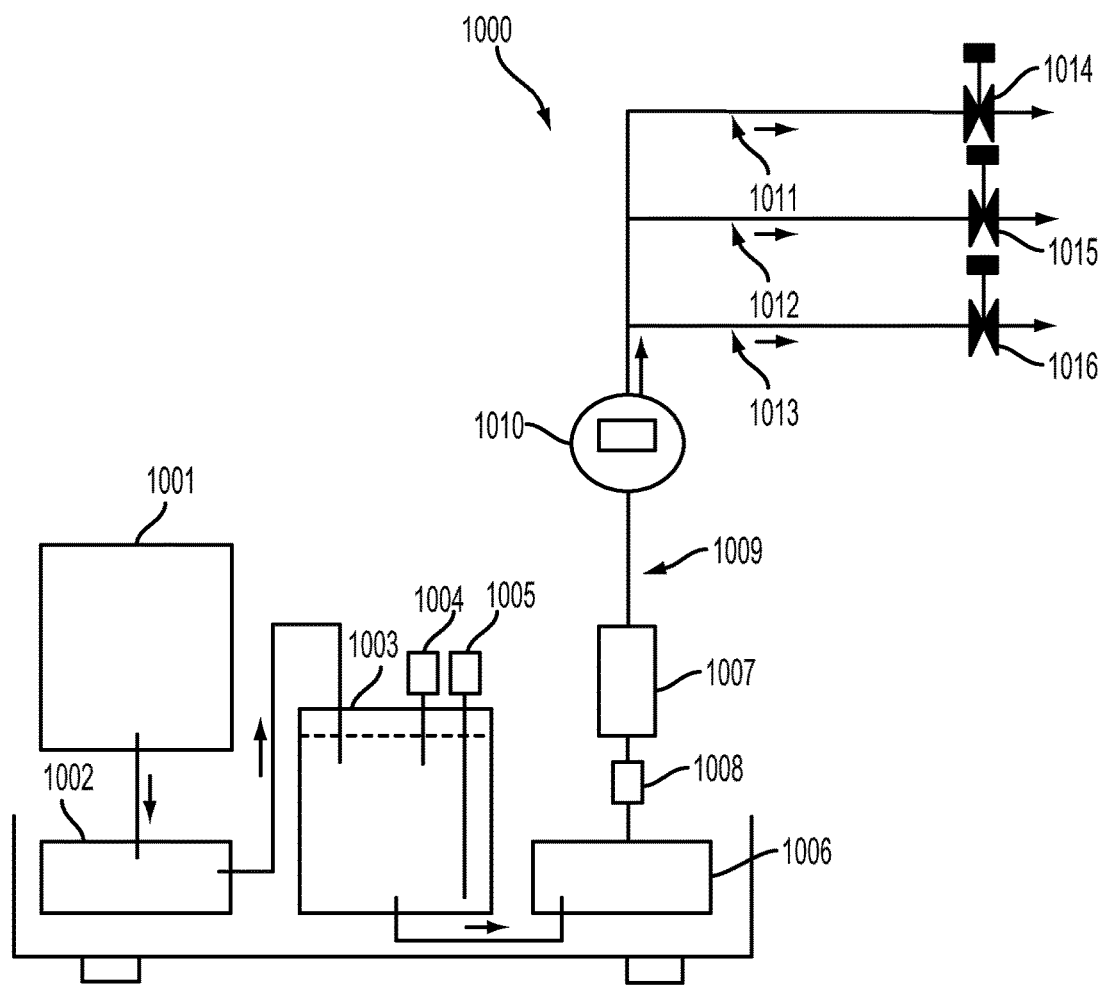
FIG. 11 is a schematic diagram of a conventional fluid dispensing system.

FIG. 11 shows a conventional fluid dispensing system 1000. As shown in FIG. 11, the conventional fluid dispensing system 1000 may include a storage tank 1003, a high level sensor 1004, a low level sensor 1005, a pump 1006, a pre-filter pressure sensor 1008, a filter 1007, and a delivery line 1009. The conventional fluid dispensing system 1000 may also include a secondary storage tank 1001 and a refill pump 1002. Unlike the fluid dispensing system 215 described above with reference to FIG. 10, when multiple users (e.g., three users shown in FIG. 11) request fluids from the conventional dispensing system 1000, the conventional fluid dispensing system 1000 uses three individual distribution branches 1011, 1012, and 1013 to dispense fluids. Each individual distribution branch may include a flow control valve (e.g., one of the flow control valves 1014, 1015, and 1016). The conventional fluid dispensing system 1000 does not include a recirculation loop. In the conventional system, the pump 1006 feeds multiple drops, and loss of dispensing accuracy is common if dosed to more than one drop (e.g., more than one user) at a time. The conventional system limits production flexibility and fluid dispensing rate. In addition, without the recirculation loop, solids within the fluid to be dispensed may settle or be dispensed to the users.

Figure 12:
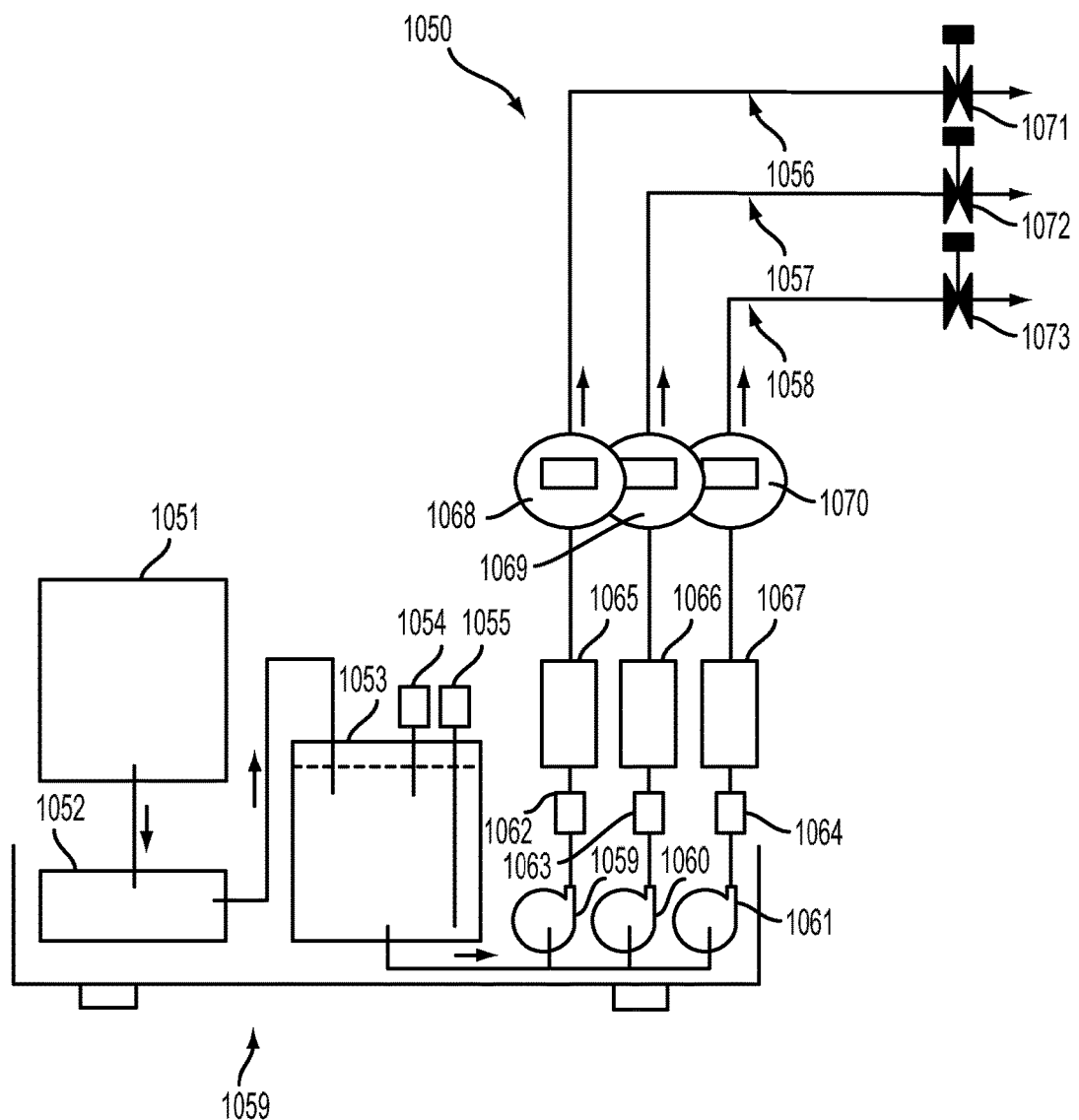
FIG. 12 is a schematic diagram of a conventional fluid dispensing system.

FIG. 12 shows another conventional fluid dispensing system 1050. As shown in FIG. 12, the conventional fluid dispensing system 1050 may include a storage tank 1053, a high level sensor 1054, and a low level sensor 1055. The conventional fluid dispensing system 105 may include a secondary storage tank 1051 and a refill pump 1052. When multiple users (e.g., three users) request fluids from the conventional fluid dispensing system 1050, individual distribution branches 1056, 1057, and 1058 are set up for each of the users. Each distribution branch may include an individual pump 1059, 1060, or 1061, an individual pre-filter pressure sensor 1062, 1063, or 1064, an individual filter 1065, 1066, or 1067, and an individual delivery system flow meter 1068, 1069, or 1070. Each distribution branch may also include an individual flow control valve 1071, 1072, or 1073. Although the dispensing accuracy may be improved as compared to the conventional system shown in FIG. 11, this conventional fluid dispensing system 1050 may be costly due to the redundant components. In addition, without recirculation, solids within the fluid may settle or be dispensed to the users.

Figure 13:
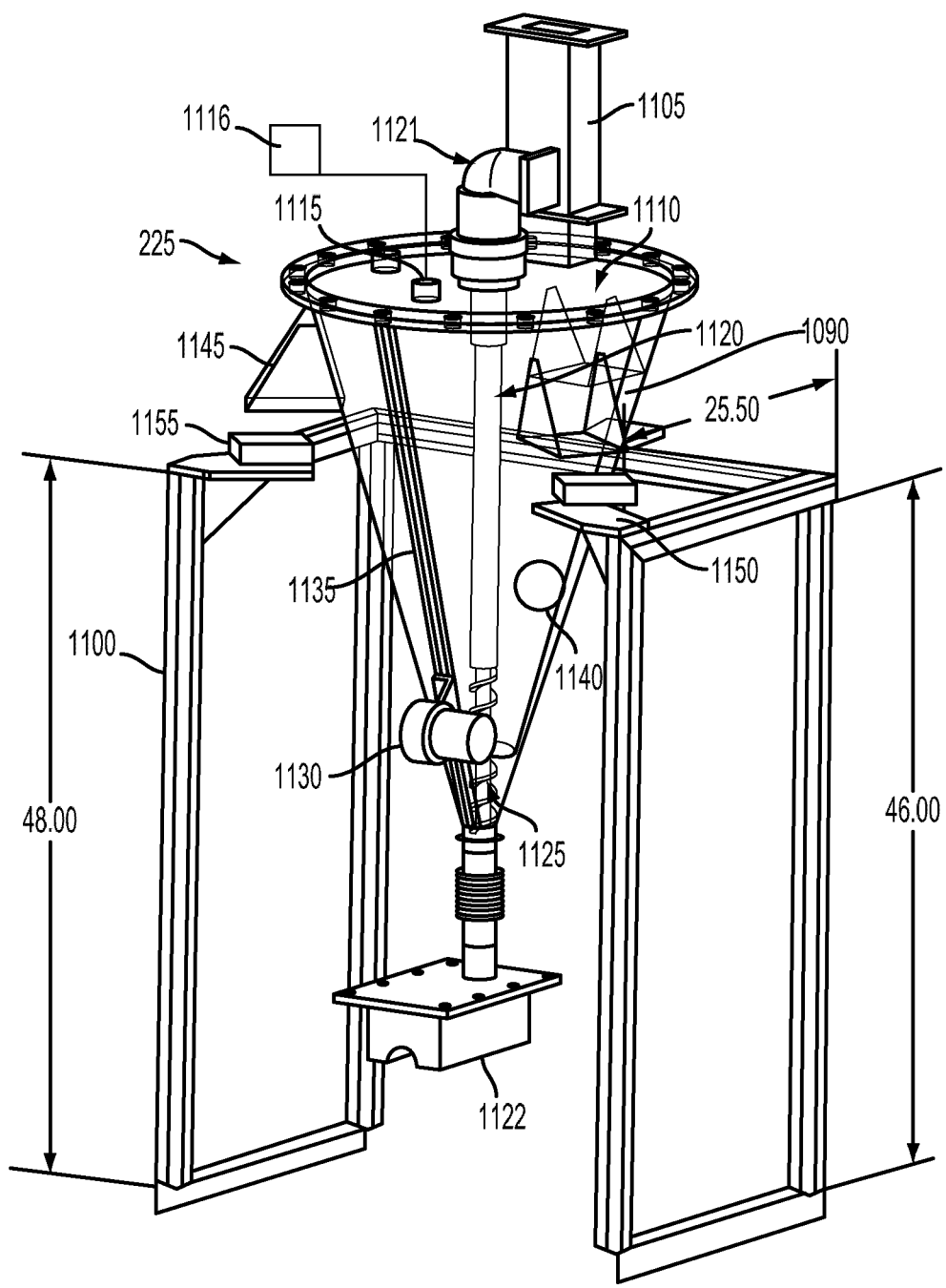
FIG. 13 is a schematic diagram of an exemplary mixture storage device.

FIG. 13 shows components of an exemplary storage device 225 configured to store a flowable mixture from the mixer 220. The storage device 225 may be configured to store the flowable mixture during a continuous mixing and skinning process, or a batch-wise, index mode mixing and skinning process. In the event of downstream equipment stoppage, the storage device 225 may allow the continuous mixing process to continue without stopping for a period of time (e.g., up to three hours). In order to handle periods of downstream equipment stoppage, the feed rate of flowable mixture entering into the storage device 225 may be reduced, and the flowable mixture that is forced into a downstream pump may be reduced.

The storage device 225 may have a shape suitable for ensuring proper flow of the flowable mixture, such as a cone shape, although other shapes may also be used for the storage device 225. The storage device 225 may be made of any suitable material, such as, for example, steel, stainless steel, etc. When a cone-shaped structure 1090 is used, the angle of the cone may be greater than 70 degrees. The storage device 225 may be mounted on and supported by a frame 1100. The storage device 225 may receive the flowable mixture from the mixer 220 through a receiving port or chute 1105, which may include a flanged opening. The capacity of the storage device 225 may be adjusted. For example, if more capacity is needed, a straight section may be added above the cone-shaped structure 1090, as shown in FIG. 7, to increase the storage volume.

The storage device 225 may include a cover 1110 that closes and seals the top opening of the cone-shaped structure 1090 to make the storage device 225 an enclosed vessel. The enclosed vessel may prevent the flowable mixture from drying out. The storage device 225 may include a vacuum port 1115 disposed on the cover 1110 and connected to a vacuum system 1116. The vacuum system 1116 may be configured to apply a vacuum to the top portion of the storage device above the flowable mixture to withdraw or reduce air in an internal volume of the storage device above the flowable mixture, thereby reducing an amount of air being trapped in the flowable mixture (e.g., de-airing the flowable mixture). The vacuum system 1116 may apply a vacuum of up to 15 inches of Hg. The vacuum system 1116 may prevent air from being trapped within the flowable mixture as the flowable mixture falls into the storage device 225 from the mixer 220. De-airing may increase the density of the flowable mixture, which may in turn improve the skin quality (e.g., by reducing the defects such as pits and pocks) of the finished product. In some embodiments, the vacuum system 1116 may also be used to control (e.g., increase or decrease) the density of the flowable mixture by controlling the amount of air within the vessel available to be trapped within the flowable mixture.

The storage device 225 may include an auger 1120 disposed in the center portion of the cone-shaped structure 1090, extending from the bottom of the cone-shaped structure 1090 to the tip portion of the cone-shaped structure 1090. The auger 1120 may be connected to a servo or other type of drive motor 1121 located adjacent the cover 1110. The motor 1121 may be coupled to the auger 1120 so that the motor 1121 can cause the auger to rotate. The lower portion of the auger 1120 may include a helical screw blade 1125 configured to force the flowable mixture down to the pump 235 (not shown in FIG. 13) when the auger 1120 rotates. The pump 235 may be located downstream of an outlet port or chute 1122 of the storage device 225.

Referring to FIG. 13, the storage device 225 may include an external vibration device 1130 configured to cause vibration in the storage device 225. Vibration may aid in the downward flow of the flowable mixture to the lower auger area where the helical screw blade 1125 is located, helping to ensure that the flowable mixture can be forced to the pump 235 by the helical screw blade 1125. The vibration device 1130 may be mounted to an outer surface of the storage device 225. In some embodiments, the vibration device 1130 may be mounted to a rib 1135 that may run the length of the storage device 225 on the outer surface.

When a recirculation line 260 (shown in FIGS. 1 and 6) is included in the mixture delivery system 200, the storage device 225 may include one or more ports 1140 configured to receive recirculated flowable mixture from the recirculation line 260. The port 1140 may include a suitable fitting, such as a tri-clamp fitting that enables quick hose connections with the recirculation line 260.

The storage device 225 may also include one or more mounting structures 1145 attached to the outer surface of the storage device 225 for mounting on the frame 1100. The mounting structure 1145 may be disposed at an upper portion of the outer surface of the storage device 225. The mounting structures 1145 may be placed on one or more supporting portions 1150 of the frame 1100, such that the storage device 225 may be supported by the frame 1100.

The storage device 225 may include one or more load cells 1155 configured to weigh the storage device 225 and/or the flowable mixture stored therein. In some embodiments, three load cells 1155 may be used to weigh the storage device 225. The load cells 1155 may include at least one summation box for providing a total amount of flowable mixture that has been discharged from the storage device 225 based on changes in the measured weight. The total amount of flowable mixture discharged may be used by the control system 400 for weight inventory and process control. In some embodiments, the load cells 1155 may be disposed on the supporting portions 1150 where the mounting structures 1145 rest. Optional equipment may also included in the storage device 225, such as level sensors, probes, nozzles for quick cleaning without disassembly, additional ports for hose connections for incoming and/or outgoing flowable mixture.

Figure 14A:
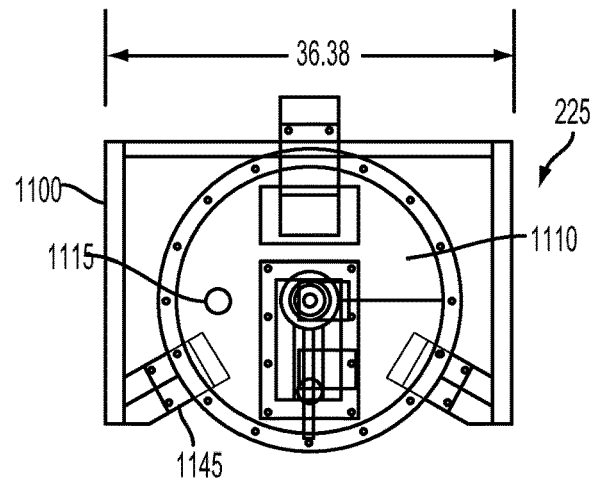
FIGS. 14A-14B are top and side views of schematic diagrams of the exemplary storage device.
Figure 14B:
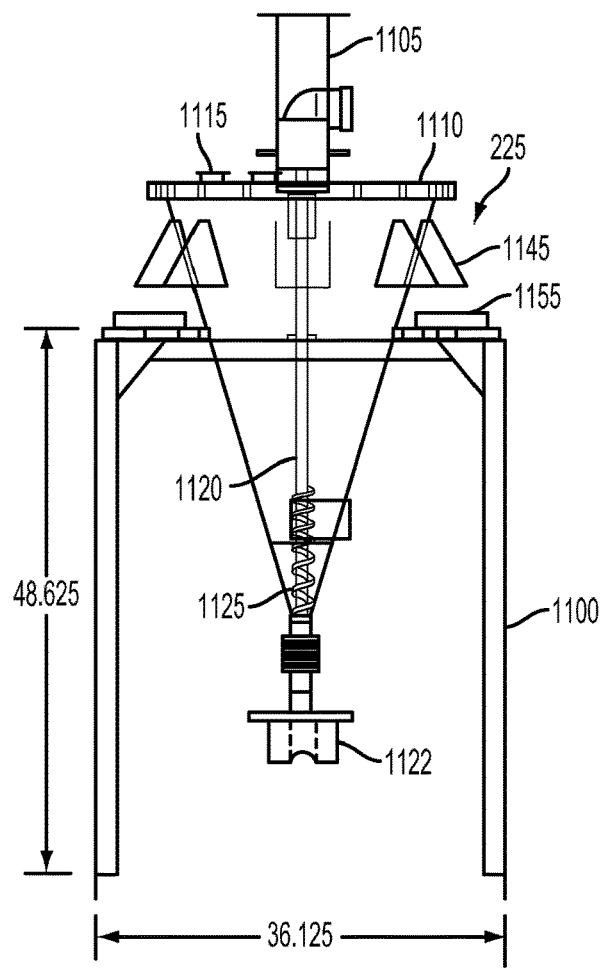
Figure 15:
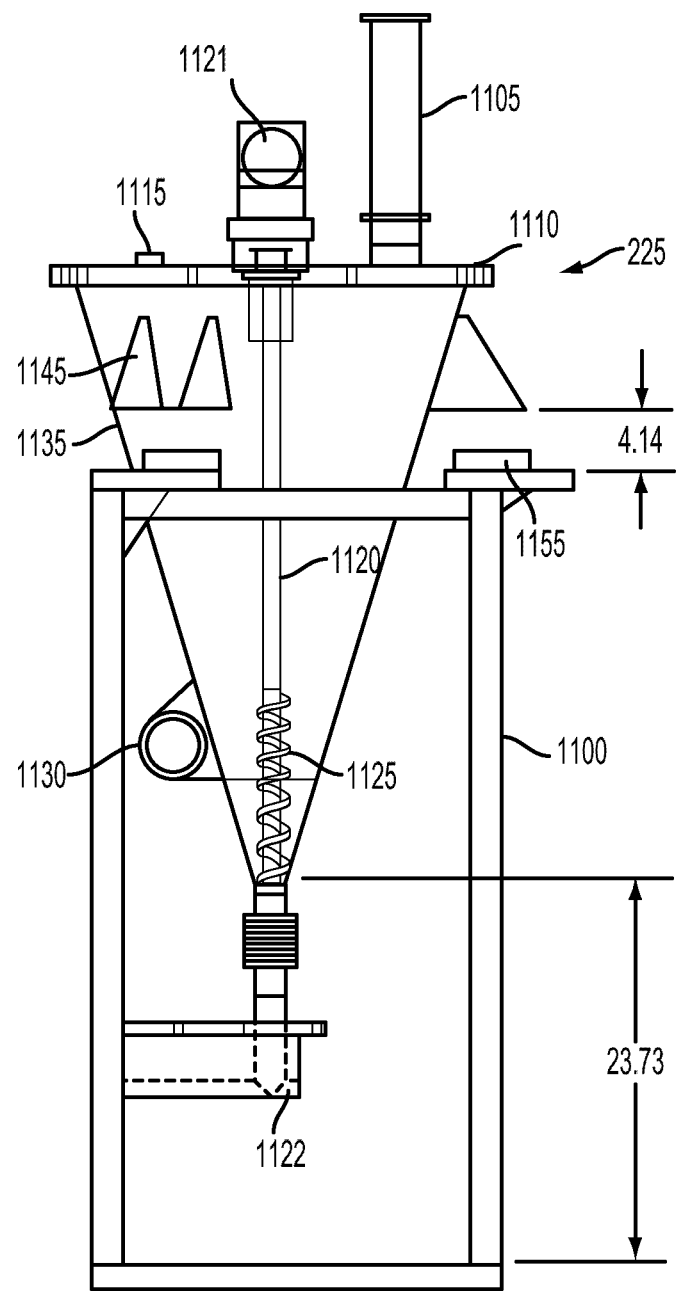
FIG. 15 is a side view of a schematic diagram of the exemplary storage device.

FIG. 14A shows a top view of the storage device 225. FIG. 14B shows a side view of the storage device 225. FIG. 15 shows another side view of the storage device 225. The dimensions shown in FIGS. 13, 14A, 14B, and 15 are for illustrative purposes, and dimensions of the storage device 225 may differ from those shown in these figures in various embodiments. In some embodiments, the cone-shaped structure 1090 may have a height of about three feet, a diameter of about two feet at the opening covered by the cover 1110, and a volume of about three cubic feet. The cone angle may be about 72.5 degrees. The gearbox ratio may be about 70:1.

Figure 16A:
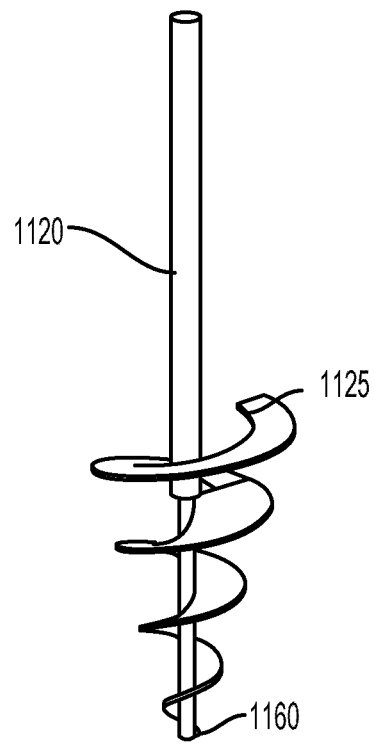
FIGS. 16A-16B are schematic diagrams of an exemplary auger.
Figure 16B:
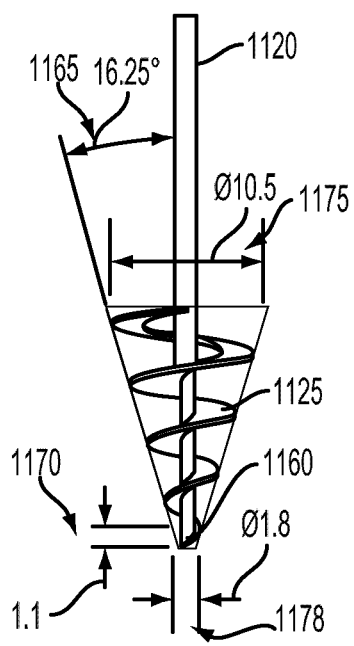
Figure 17:
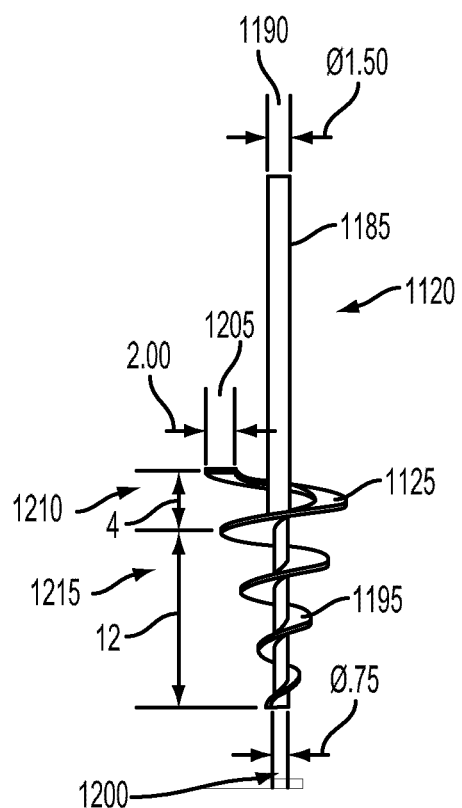
FIG. 17 is a schematic diagram of the exemplary of the auger.

FIGS. 16A, 16B, and 17 show an exemplary auger 1120 suitable for use in a storage device 225. The auger 1120 may include a rod or shaft having two segments with different diameters. The diameter of the upper segment may be greater than the diameter of the lower segment. The lower segment may be mounted with a helical screw blade 1125 extending from a tip end 1160 to a middle portion of the auger 1120. The helical screw blade 1125 may include a cone-shaped profile when rotating. The cone-shaped profile of the helical screw blade 1125 may closely match the cone shape formed by an inner wall of the cone-shaped structure 1090. In some embodiments, an angle 1165 formed by the profile and the shaft of the auger 1120 may be about 16 degrees. In one embodiment, the angle 1165 may be 16.25 degrees. The top line 1175 of the upside down triangle profile may be about 10 inches. In one embodiment, the top line 1175 may be about 10.5 inches. As shown in FIG. 16B, the height 1170 of the half revolution from the tip end 160 may be about 1.1 inches. The diameter 1180 of the first half revolution from the tip end 160 may be about 1.8 inches.

FIG. 17 shows that an upper shaft 1185 of the auger 1120 may include a diameter 1190 of about 1.5 inches. A lower shaft 1195 of the auger 1120 may include a diameter 1200 of about 0.75 inches. The first revolution of the helical screw blade 1125 from the top may surround the upper shaft 1185. In the first revolution, the width 1205 of the blade 1125 (e.g., ribbon) may be about 2 inches wide. The pitch 1210 of the first revolution from the top may be about 4 inches deep (e.g., a 4-inch pitch). The remaining evolutions of the helical screw blade 1125 may include three revolutions surrounding the lower shaft 1195. The lower shaft 1195 may include a diameter of 0.75 inches. The pitch 1215 (e.g., total height) of the three revolutions may be about 12 inches. The dimensions described above and included in the figures are those of a particular embodiment that exhibits improved performance in a conical storage device. However, an auger for use in a storage device 225 may have dimensions different from those shown in FIGS. 16B and 17 may be used for the auger 1120, for example, for handling different types of mixtures.

The cone-shaped profile of the helical screw blade 1125 when it rotates may closely match the cone shape formed by the inner wall of the cone-shaped structure 1090. During a normal operation, when rotating, the outer periphery of the helical screw blade 1125 may be close to the inner wall of the cone-shaped structure 1090 without contacting the inner wall. Because of a tight clearance between the rotating helical screw blade 1125 and the inner wall of the cone-shaped structure 1090, the auger 1120 may force the flowable mixture down into the pump 235 without introducing air bubbles into the flowable mixture, thereby improving the density of the flowable mixture, which in turn may improve the quality of the skin in the skinned articles.

Figure 18:
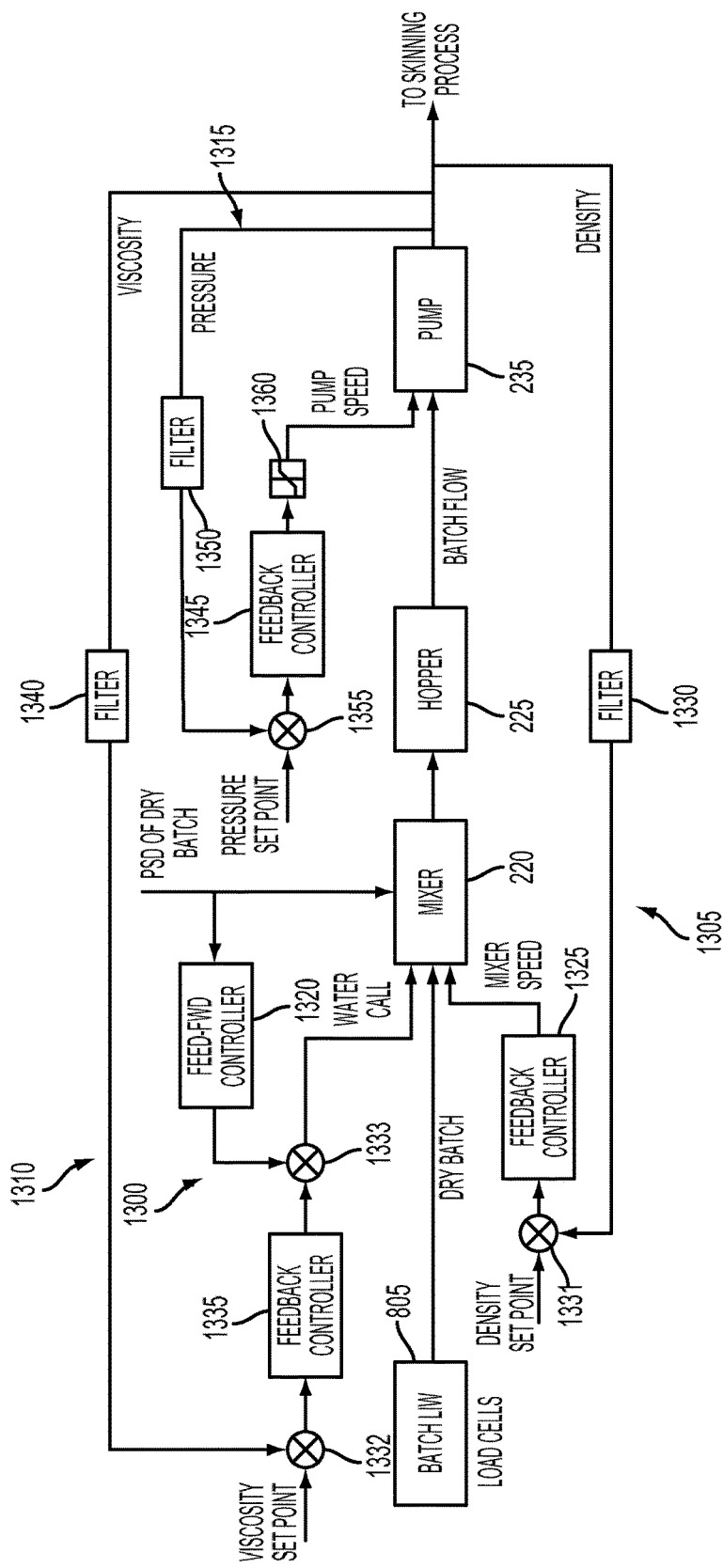
FIG. 18 is a control diagram of an embodiment control system.

FIG. 18 shows a control diagram for controlling the operations of the mixture delivery system 200. The control diagram represents an exemplary control scheme that may be implemented within the control system 400, such as within the mixture control system 405. The mixture control system 405 may control the mixture delivery system 200 to provide a flowable mixture with a substantially consistent rheology to the skinning system 300, which in turn may result in improved skinning quality in the skinned articles. The mixture control system 405 may account for the impact of variations in raw material properties (e.g., particle size distribution or other properties) on the rheology of the flowable mixture.

In some embodiments, the mixture control system 405 may use a feed forward control to proactively account for the variations in the particle size distribution. The mixture control system 405 may use a combination of feed forward and feedback controls to achieve defect free or substantially defect free skinned articles. In some embodiments, the feed forward control may detect variations in the particle size distribution of the dry material, and predict (estimate, calculate, or determine) the impact of the variation in the particle size distribution on the viscosity of the flowable mixture using a control model. The feedback control may include a first feedback control responsive to an inline viscometer (e.g., viscometer 296) that provides substantially consistent and reliable information about the viscosity of the flowable mixture. The feedback control may use a second feedback control responsive to an inline densitometer (e.g., densitometer 295) that provides substantially consistent and reliable information about the density of the flowable mixture. In some embodiments, the feed forward control may use an adaptive model that may be updated (e.g., adapted) by the overall control system 400 during operations using measured viscosity and/or density to increase the model accuracy.

The mixture control system 405 may effectively control the viscosity and/or density of the flowable mixture using real-time or near real-time measurements of process parameters of the system 100. The overall control system 400 may automatically adjust the set points (e.g., target values) of the system parameters used by the mixture control system 405 based on real-time or near real-time viscosity and/or density measurements. The control schemes implemented by the mixture control system 405 may be transferred to other product lines, where measures are available for detecting the raw material property variations, and/or density and/or viscosity of the flowable mixture. The control schemes implemented by the mixture control system 405 may enable the skinning process to be performed by the skinning system 300 continuously without stopping to make changes to the set points (e.g., target values) of the system parameters. As a result, the system down time may be reduced, and more consistent product quality may be provided. With improved quality in the final skinned articles, material utilization rate may also be increased.

Referring to FIG. 18, the control scheme implemented by the mixture control system 405 may include a feed forward control 1300, and one or more feedback controls. In some embodiments, the control scheme may include a first feedback control 1305, a second feedback control 1310, and a third feedback control 1315. The feed forward control 1300 may include a feed forward controller 1320. The particle size distribution measurement, which may be measured by the particle analyzer 205, may be fed into the feed forward controller 1320 as input or disturbance.

Figure 19:
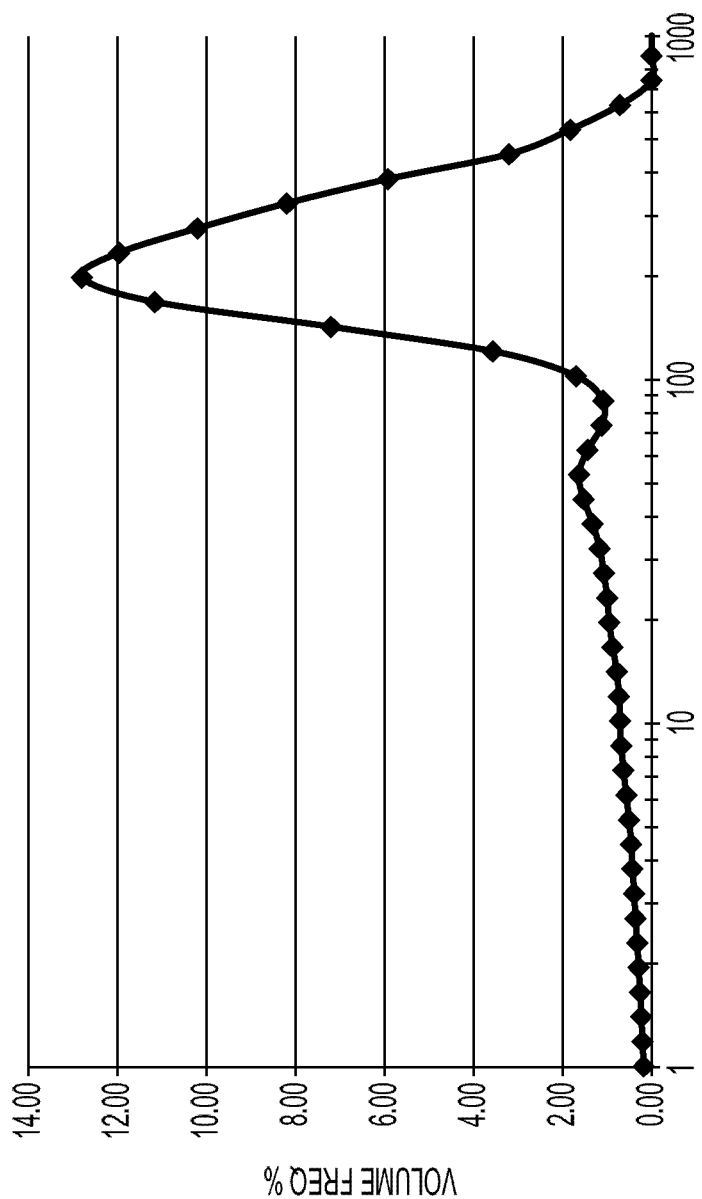
FIG. 19 is a graph of a particle size distribution of a dry material.

FIG. 19 shows a sample particle size distribution of the dry material. The horizontal axis is the size of particle (unit: micron), and the vertical axis is the volume frequency percentage, which is the volume represented by particles of a certain size versus the total volume. For example, when the particle size distribution is continuously measured by the particle analyzer 205, the feed forward controller 1320 may continuously receive the particle size distribution measurements from the particle analyzer 205 over time. The feed forward controller 1320 may determine or calculate, using a control model, a variation in the received particle size distribution measurements over time. Based on the variation in the measured particle size distribution, the feed forward controller 1320 may determine (e.g., calculate, predict, or estimate) an adjustment to an amount of fluid to be added to the mixer 220, such as, for example, an amount of water (or "water call").

Referring to FIG. 18, the first feedback control 1305 may include a first feedback controller 1325. The first feedback controller 1325 may receive measured density (e.g., as measured by the densitometer 295) as a feedback. In some embodiments, the measured density may be filtered by a filter 1330 to remove noise, which may be a digital or analog signal filter. The filter 1330 may be optional. The first feedback controller 1325 may receive a density set point (or target value) as an input. The measured density (after being filtered or without being filtered) may be compared with the density set point to determine a difference in density as indicated by a combination symbol 1331.

The first feedback controller 1325 may determine a mixer speed (or change in mixer speed) that should be implemented based on the measured density and the density set point; for example, based on the difference between the measured density and the density set point. Alternatively or additionally, the first feedback controller 1325 may determine a screwfill ratio based on the measured density and the density set point. The determined mixer speed or screwfill ratio may be used to adjust operations of the mixer 220. For example, the control system 400 may transmit a control signal to the mixer 220 to adjust the mixer speed or the screwfill ratio. Based o the control signal, the mixer 220 may adjust at least one of the mixer speed or the screwfill ratio. Although FIG. 18 only shows the mixer speed as an output of the first feedback controller 1325, the mixer speed may be replaced with the screwfill ratio.

Referring to FIG. 18, the second feedback control 1310 may include a second feedback controller 1335. The second feedback controller 1335 may determine an amount of fluid to be added to the mixer 220 based on measured viscosity and the viscosity set point. In some embodiments, the viscosity may be measured by the viscometer 296. In some embodiments, the measured viscosity may be filtered by a filter 1340, or may not be filtered (i.e., the filter 1340 may be optional). The filter 1340 may be a digital or analog filter. The measured viscosity may be compared with the viscosity set point, as indicated by a combination box 1332. The amount of fluid determined by the second feedback controller 1335 may be combined with the adjustment to the amount of fluid determined by the feed forward controller 1320, as indicated by a combination box 1333, to produce a total amount of fluid to be added to the mixer 220. The amount of fluid to be added to the mixer 220 is represented by a "water call" signal in the control diagram in FIG. 18 and other control diagrams in the subsequent figures. The "water call" signal may indicate not only the amount of water to be added to the mixer, but also an amount of another fluid, or a total amount of the water and another fluid to be added to the mixer 220. The control system 400 may transmit a control signal indicating the total water call amount to the mixer 220. Based on the control signal, the mixer 220 may adjust the water call amount. For example, the mixer 220 may send a request for the adjusted water call amount to the fluid dispensing system 215.

Referring to FIG. 18, the third feedback control 1315 may include a third feedback controller 1345 configure to control the return pressure within the recirculation line 260. The return pressure in the recirculation line 260 may be measured by the pressure sensor 265. The measured return pressure may be filtered by a filter 1350 or may not be filtered (i.e., the filter 1350 may be optional). The filter 1350 may be a digital or analog filter.

The third feedback controller 1345 may determine a pump speed of the pump 235 based on the measured return pressure and the return pressure set point. For example, the measured return pressure and the return pressure set point may be compared, as indicated by the combination symbol 1355, and the third feedback controller 1345 may determine a pump speed of the pump 235 based on the difference between the measured return pressure and the return pressure set point. The control system 400 may transmit a control signal to the pump 235 to adjust the pump speed. The pump 235 may adjust the pump speed based on the control signal. The third feedback control 1315 may include a saturation box 1360 configured to limit the pump speed to prevent the pump speed from exceeding a predetermined range. Although not shown in the figures, in some embodiments, the return pressure may be replaced with the delivery pressure, and the return pressure set point may be replaced with the delivery pressure set point. Thus, any discussions or illustrations throughout the present disclosure that involve return pressure (or return pressure set point) may be applicable to delivery pressure (or delivery pressure set point). In the control scheme shown in FIG. 18, the mixer 220 may receive the dry material from the dry blend feeder 805, which may be associated with one or more loss-in-weight load cells configured provide information regarding the total amount of dry material that has been fed into the mixer 220.

Flowable Mixture Viscosity Controller Design

Feed Forward Model Development

In the example below, the amount of fluid to be added to the mixer 220 is represented by the water call, and water is used as exemplary fluid that is added to the mixer. The term water may also represent other fluids, or a mixture of water and another fluid. The term water call may also represent an amount of a fluid other than water that is added to the mixer 220, or a total amount of fluid (which may include a mixture of water and another fluid) to be added to the mixer 220. In order to design a feed forward controller (e.g., for feed forward controller 1320), a model is developed. The model may be a gain matrix relationship as seen equation (A-1).

$$Y = G*X \qquad (A-1)$$

where G is the gain matrix, X is the particle size distribution ("PSD") information, and Y is the model estimated viscosity. A sample particle size distribution (PSD) for the dry material is shown in FIG. 19. The PSD information is captured in sixty data points. The G matrix may be found using partial least square ("PLS") regression. An experiment was conducted to shift the PSD within the bounds of manufacturing specification of the supply. The gain matrix was obtained using data from this experiment. The PLS regression model shows 78% correlation between PSD shifts/variations and the resulting viscosity variation with 70% predictability.

The measurement of viscosity is affected by density, temperature, and pressure. Hence normalized viscosity as seen in equation (A-2) may be used.

$$V = Y/T/P/\rho \tag{A-2}$$

where Y is model estimated viscosity, T is temperature (F), P is pressure near the viscometer (psi), and $\rho$ is density (g/mL).

An experiment was run in which water call was changed, with manipulated variable in the control system, to observe its effect on normalized viscosity. The difference seen in the viscosity for the water call change may be captured in another gain, $G_1$.

$$G_1 = \Delta V/\Delta WC \tag{A-3}$$

where $G_1$ is the gain that defines the relationship between the changes seen in the normalized viscosity ($\Delta V$) and the change in the water call ($\Delta WC$). The normalized viscosity may be calculated from $(\Delta V) = V_d - V$, where $V_d$ is the desired normalized viscosity.

Controller Development

Feed Forward Control

The feed forward control scheme may use a proportional-only controller. Equation (A-4) represents a generalized expression for the feed forward controller. $Q_D(s)$ is the impact of particle size distribution (PSD) changes or variations on viscosity and may be obtained using the model described in equations (A-1)-(A-3). $K_P$ is the proportional gain of the controller that may be obtained using the process dynamics between water and viscosity.

$$U_{FF}(s) = K_P Q_D(s) \tag{A-4}$$

The feed forward controller calculations may be based on equations (A-1)-(A-3), where the PSD information X is transformed via gain matrix G to a predicted viscosity Y using the partial least squares (PLS) regression coefficients. The viscosity Y may be normalized by temperature T, pressure P, and density p to obtain a normalized viscosity V. The difference $\Delta V$ may be calculated by subtracting the predicted normalized viscosity V from the desired normalized viscosity ($V_d$). The difference $\Delta V$ may be divided by $G_1$ obtained by equation (A-3) to determine the change in water call $\Delta WC$ needed to compensate for the predicted viscosity change. After obtaining the needed change in water call $\Delta WC$, the total water call may be obtained by $WC = WC_{ss} + \Delta WC$, where the $WC_{ss}$ is the steady state water call.

Figure 20:
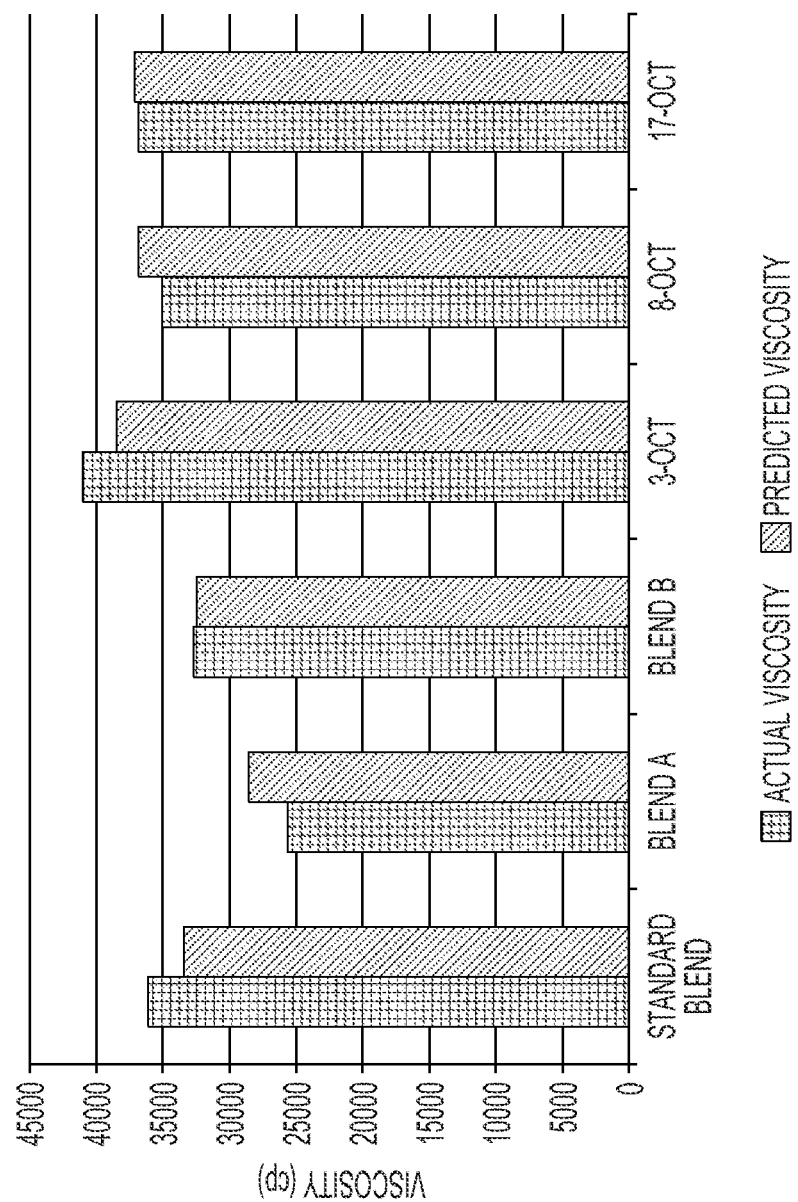
FIG. 20 is a graph of validation results of an exemplary feed forward controller model.

FIG. 20 shows validation results of a feed forward controller model implemented in a control system such as illustrated in FIG. 18. The standard blend, blend A, and blend B were used to develop the model. The next three days were used to predict the viscosity. FIG. 20 compares the prediction with the actual measured viscosity. As shown in FIG. 20, the feed forward controller model closely predicts the viscosity.

Figure 21:
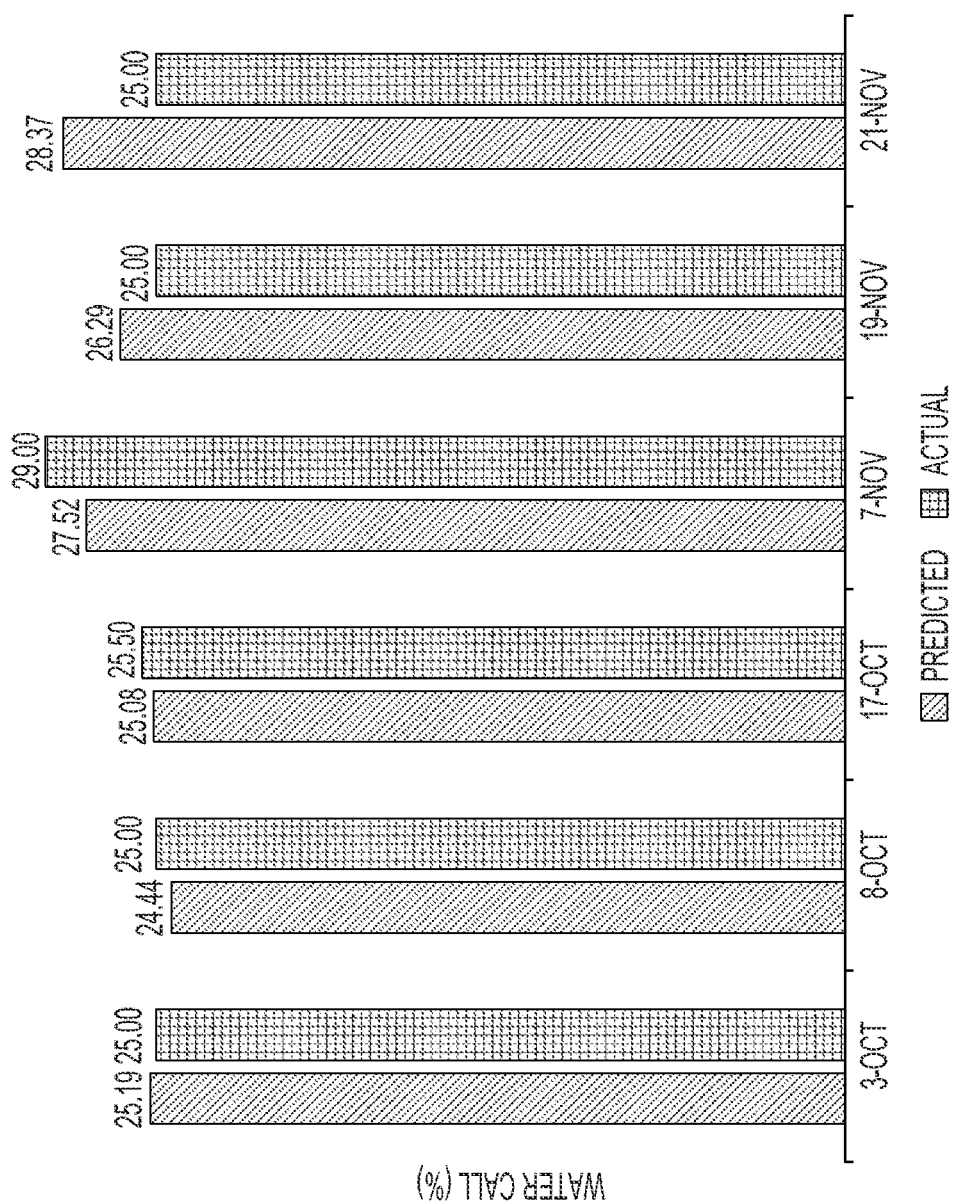
FIG. 21 is a graph of validation results of an exemplary feed forward controller model.

FIG. 21 shows feed forward controller validation results. As shown in FIG. 21, the feed forward controller was able to predict the adjustment to the water call needed based on the PSD information within a 5% error.

One of the advantages of the feed forward control is that variations in viscosity due to PSD shifts and variations in raw materials can be proactively removed from the process without operator intervention, thereby saving time and materials. In addition, there is a benefit in maximizing process consistency without placing high requirements on the supplier specifications, thereby saving manufacturing costs.

Figure 22:
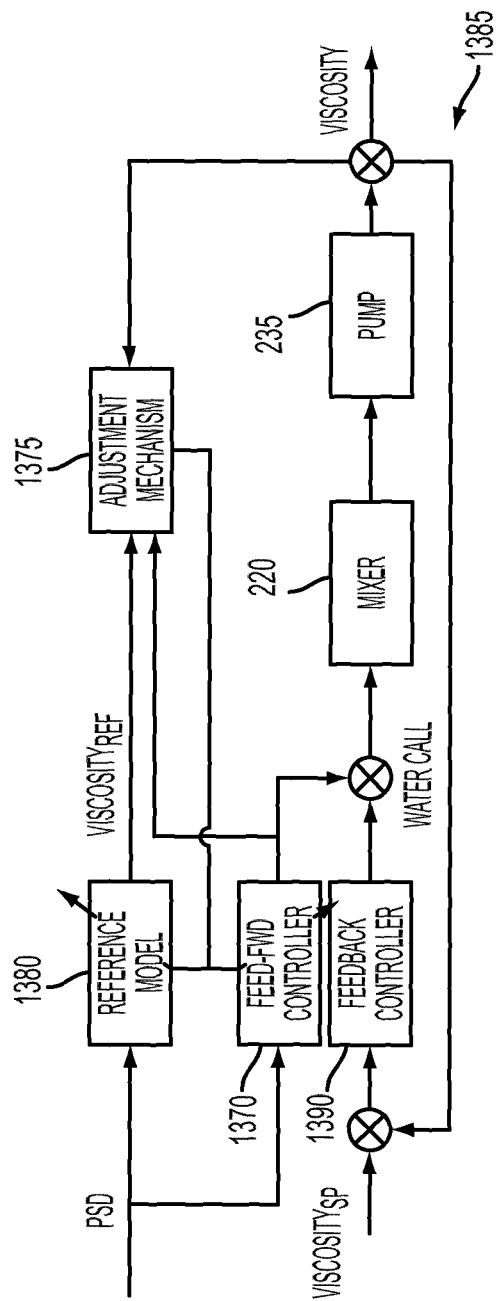
FIG. 22 is a control diagram of an exemplary adaptive feed forward control system.

An embodiment feed forward controller 1370 illustrated in FIG. 22 has the ability to adapt. As shown in FIG. 22, the control scheme for controlling the mixture delivery system 200 may include the adaptive feed forward controller 1370. The adaptive feed forward controller 1370 may include a model similar to that used by the feed forward controller 1320 described above. In some embodiments, the adaptive feed forward controller 1370 may replace the feed forward controller 1320 in the control scheme shown in FIG. 18.

As shown in FIG. 22, the control scheme may include an adjustment mechanism 1375 configured to adjust (or adapt) the feed forward controller 1370 based on measured viscosity. The adjustment mechanism can use any number of adaptive techniques, such as MRAC (model reference adaptive control), gain scheduling, self-tuning, etc. As needed, new control parameters for the feed forward controller may be communicated using the adjustment mechanism 1375. The PSD information (e.g., new PSD information) may be compared to the viscosity response of the system (e.g., measured viscosity), and the feed forward controller 1370 may be adjusted accordingly.

The adjustment mechanism 1375 may adjust a reference model 1380. The feed forward controller 1370 may be adjusted based on the reference model 1380. The reference model 1380 may determine a reference viscosity based on a measured viscosity and the particle size distribution. The reference viscosity determined by the reference model may be input into the adjustment mechanism 1375. In addition, the output of the feed forward controller 1370, i.e., the adjustment to the amount of fluid to be added to the mixer 220 (e.g., changes to the water call) may be input into the adjustment mechanism 1375 as a parameter. The adjustment mechanism 1375 may adjust the feed forward controller 1370 based on the measured viscosity, the reference viscosity, and the output from the feed forward controller 1370. In other words, the feed forward controller 1370 may determine the adjustment to the amount of fluid to be added to the mixer 220 based on both the PSD information and the measured viscosity.

Referring to FIG. 22, the control scheme may also include a feedback control 1385, which may include a feedback controller 1390. The feedback controller 1390 may determine an amount of fluid to be added to the mixer 220 (e.g., "water call") based on the measured viscosity and the viscosity set point. The amount of fluid determined by the feedback controller 1390 may be combined with the adjustment to the amount of fluid determined by the feed forward controller 1370 to obtain the total amount of fluid to be added to the mixer 220. The control system 400 may transmit a control signal to the mixer 220 with the total amount of fluid information. Based on the control signal, the mixer 220 may adjust the total amount of fluid (e.g., water call) to be requested from the fluid dispensing system 215.

Referring to FIGS. 18 and 21, the feedback control designs are discussed below. For discussion purposes, the amount of fluid to be added to the mixer 220 is represented by the water call, although the feedback control designs are applicable to other types of fluids.

Feedback Control

The feed forward control scheme discussed above is able to control proactively the viscosity by predicting the impact of the disturbance (e.g., variations in the PSD) before it affects the process. Feedback control may be able to provide stability and robustness to the overall control scheme. Feedback control may provide a means of self-regulating the viscosity. Depending on the control parameters, a feedback loop may compensate for disturbances. However, there may be loss of flowable mixture by the time the water call adjusts to disturbances iteratively.

The normalized viscosity measurement will be first filtered so that the feedback controller does not respond to noise. An exemplary filter may be represented by equation (A-5):

$$\text{Viscosity}(k) = \alpha \times \text{Viscosity}(k) + (1-\alpha) \times \text{Viscosity}(k-1) \quad \text{(A-5)}$$

where k is the sample time and $\alpha$ is the filter parameter. Since this is a first order filter, the smaller the $\alpha$ value, the more the signal will be filtered. Smaller $\alpha$ value may induce a time delay in the filtered signal. Choosing an appropriate $\alpha$ value would achieve a balance between the amount of filtering and time delay.

The filtered viscosity may be compared with the target viscosity (e.g., viscosity set point) as determined by the operator or skinning process control loops, and the error may be sent to the feedback controller, which may automatically adjust the water call percentage to reduce the error. An example of the structure of the feedback controller (e.g., feedback controller 1335) may be:

$$U_{FB}^I(s) = G_2^{-1}(s) F_1(s) \quad \text{(A-6)}$$

where, $U_{FB}^I(s)$ is the output of the feedback controller in Laplace form, $F_1(s)$ is the Laplace transform representation of a low pass filter and $G_2^{-1}(s)$ is the inverse of the Laplace transform representation of the process model between the water call and viscosity. One form of the process model may be:

$$G_2(s) = K_1 e^{-\theta_1 s}/(1+\tau_1 s) \quad \text{(A-7)}$$

where $K_1$, $\theta_1$, $\tau_1$ are the process gain, time delay, and the time constant respectively describing the relationship between the water call and the viscosity. The process model is a function of the flowable mixture composition and process design such as the length of tubing from the mixer 220 to the location of the viscometer 296, the type of tubing used, etc.

An example form of the feedback controller may be:

$$U_{FB}^I(s) = K_P^I + K_I^I/s \quad \text{(A-8)}$$

where, $K_P^I$ and $K_I^I$ are the proportional and integral gain for the feedback controller. The output of the feedback controller is combined with the output of the feed forward controller to obtain the final controller output, which may be defined as:

$$U(s) = U_{FB}^I(s) - U_{FF}(s) \quad \text{(A-9)}$$

Flowable Mixture Density Controller Design

The measured density (as measured by, e.g., an inline densitometer 295) may be first filtered so that the feedback controller does not respond to noise. An exemplary filter may implement a calculation such as in equation (A-10):

$$\text{Density}(k) = \alpha \times \text{Density}(k) + (1-\alpha) \times \text{Density}(k-1) \quad \text{(A-10)}$$

where k is the sample time and a is the filter parameter. As mentioned earlier in equation (A-5), there is a trade-off in choosing the filter parameter between a time delay and the amount of filtering.

The filtered density may be compared with the target density as determined by the operator or skinning process control loops, and the error may be sent to the density feedback controller (e.g., feedback controller 1325 shown in FIG. 18), which may automatically adjust the speed of the mixer 220 (or the screwfill ratio of the mixer 220) to reduce the error. The structure of the feedback controller (e.g., feedback controller 1325) may be:

$$U_{DM}^I(s) = G_3^{-1}(s) F_2(s) \quad \text{(A-11)}$$

where $U_{DM}^I(s)$ is the output of the feedback controller in Laplace form, $F_2(s)$ is the Laplace transform representation of a low pass filter, and $G_3^{-1}(s)$ is the inverse of the Laplace transform representation of the process model between the water call and viscosity. One form of the process model may be:

$$G_3(s) = K_2 e^{-\theta_2 s}/(1+\tau_2 s) \quad \text{(A-12)}$$

where, $K_2$, $\theta_2$, $\tau_2$ are the process gain, time delay, and the time constant respectively describing the relationship between the mixer rpm (e.g., speed of the mixer) and the density. The process model may be a function of the flowable mixture composition and batch process designs (e.g., mixture delivery system designs), such as the length of tubing from the mixer 220 to the location of the densitometer 295, the type of tubing used, etc. Example data that may be used to determine the parameters for the model used in FIGS. 23A and 23B are $K_2 = -0.00125$ g/mL per rpm, $\theta_2 = 8$ minutes, and $\tau_2 = 7.875$ minutes.

FIGS. 23A and 23B show the density model validation results. FIG. 23A shows the model density and the actual measured density. The dashed line shows the model density, and the solid line shows the measured density of the flowable mixture. As shown in FIG. 23A, the measured density matches the model density closely. FIG. 23B shows the speed (rpm) of the mixer 220, which was adjusted to control the density. Two step tests on the mixer 220 were used to develop the model.

An example form of density feedback controller (e.g., feedback controller 1325) may be:

$$U_{DM}^I(s) = K_P^{II} + K_I^{II}/s \quad \text{(A-13)}$$

where $K_P^{II}$ and $K_I^{II}$ are the proportional and integral gain for the density feedback controller.

Figure 24A:
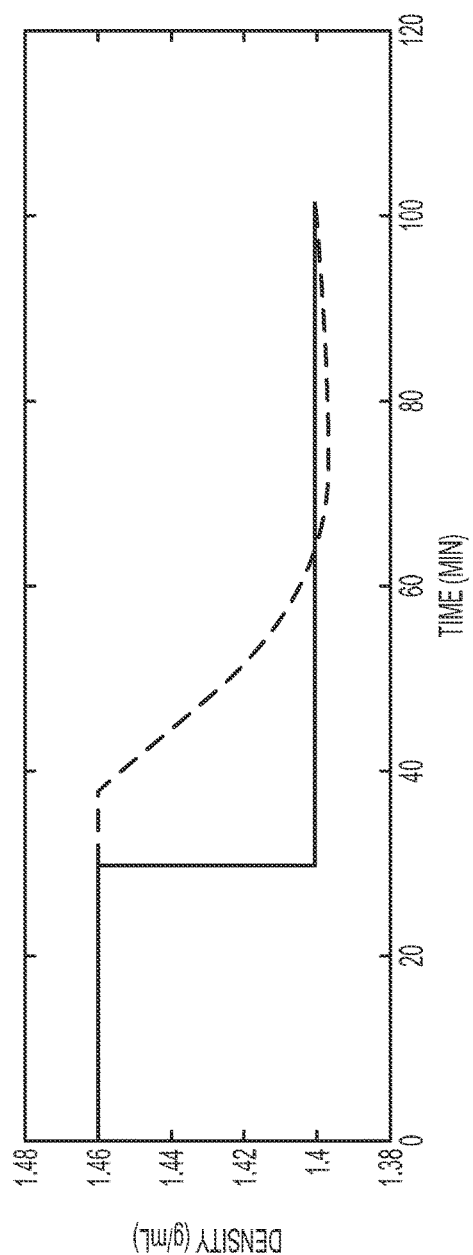
FIGS. 24A-24B are graphs of density model validation results.
Figure 24B:
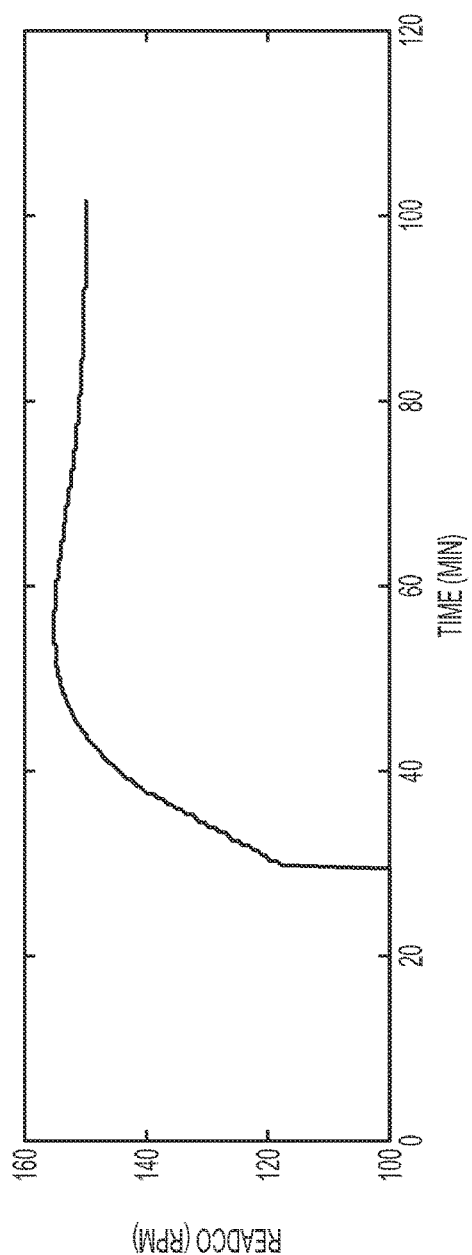

FIGS. 24A and 24B show the density controller validation results. FIG. 24A shows the modeled density and the measured density. The solid line shows the model density and the dashed line shows the measured density. As shown in FIG. 24A, the measured density tracks the modeled density in about twenty minutes. FIG. 24B shows the speed (rpm) of the mixer 220, which is adjusted to control the density. The controller used is a proportional integral feedback controller which controls the mixer 220. FIGS. 24A and 24B show that the controller responds to a request to change the density.

Figure 25:
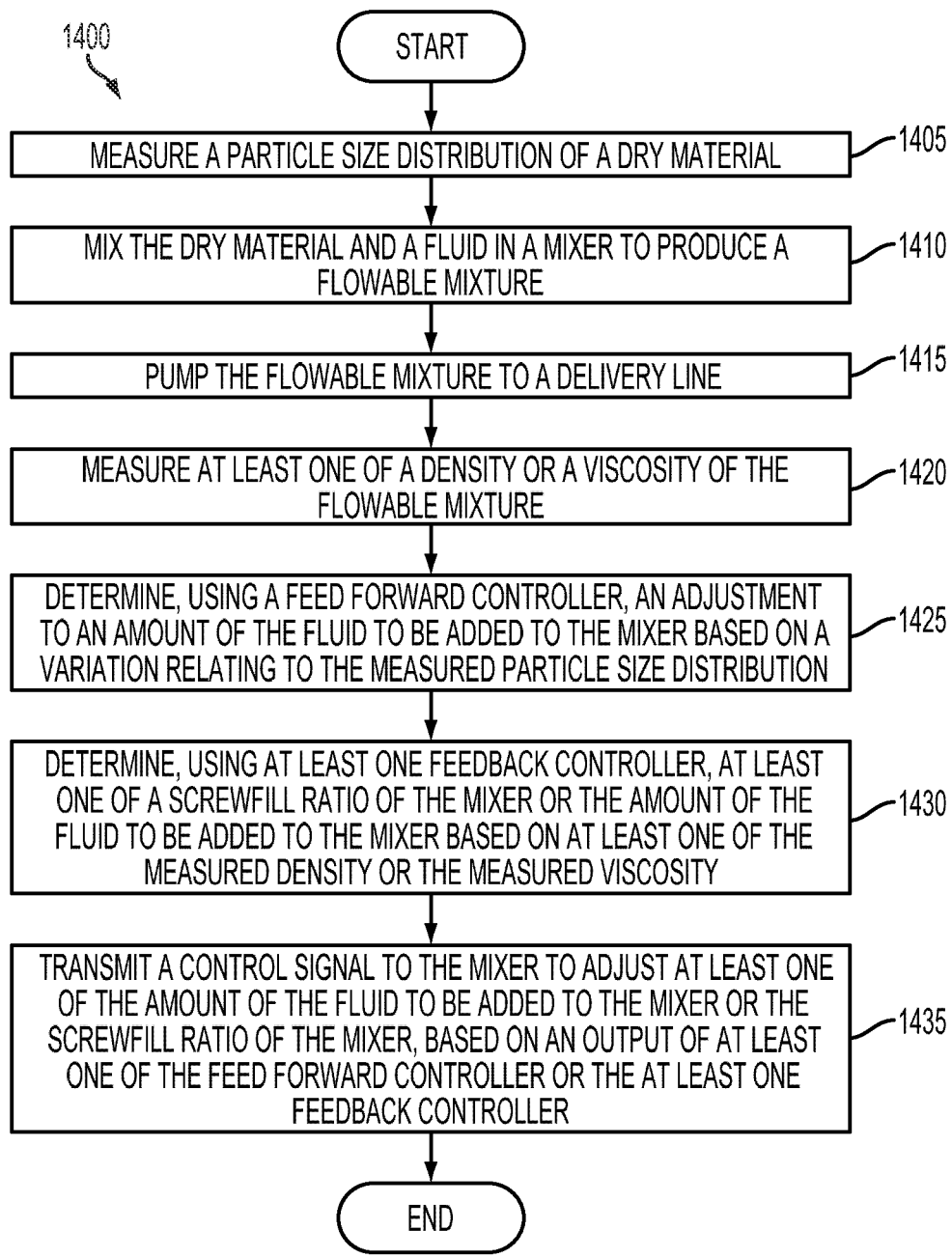
FIG. 25 is a process flow diagram of an exemplary method of operating or controlling a mixture delivery system.

FIG. 25 is a flowchart showing an exemplary method 1400 for controlling the mixture delivery system 200. The method 1400 may include measuring a particle size distribution of a dry material (block 1405). The measurement may be performed by the particle analyzer 205 shown in FIGS. 1 and 6. The method 1400 may include mixing the dry material and a fluid in a mixer (e.g., mixer 220) to produce a flowable mixture (block 1410). The method 1400 may include pumping (e.g., by the pump 235) the flowable mixture to a delivery line (e.g., the delivery line 240) (block 1415). The method 1400 may include measuring at least one of a density or a viscosity of the flowable mixture (block 1420). The measurement of the density may be performed by the in-line densitometer 295 shown in FIG. 6. The measurement of the viscosity may be performed by the in-line viscometer 296 shown in FIG. 6.

The method 1400 may include determining, using a feed forward controller (e.g., the feed forward controller 1320 shown in FIG. 18), an adjustment to an amount of the fluid (e.g., water call) to be added to the mixer 220 based on a variation in the measured particle size distribution (block 1425). The method 1400 may include determining, using at least one feedback controller (e.g., the first feedback controller 1325 and/or the second feedback controller 1335 shown in FIG. 18), at least one of a screwfill ratio (or alternatively, the mixer speed) of the mixer or the amount of the fluid to be added to the mixer based on at least one of the measured density or the measured viscosity (block 1430). The method 1400 may include transmitting a control signal to the mixer 220 to adjust at least one of the amount of the fluid to be added to the mixer 220 or the screwfill ratio (or mixer speed) of the mixer 220, based on an output of at least one of the feed forward controller (e.g., the feed forward controller 1320) or the at least one feedback controller (e.g., the first feedback controller 1325 and/or the second feedback controller 1335) (block 1435).

Skinning System and Controls

Figure 26:
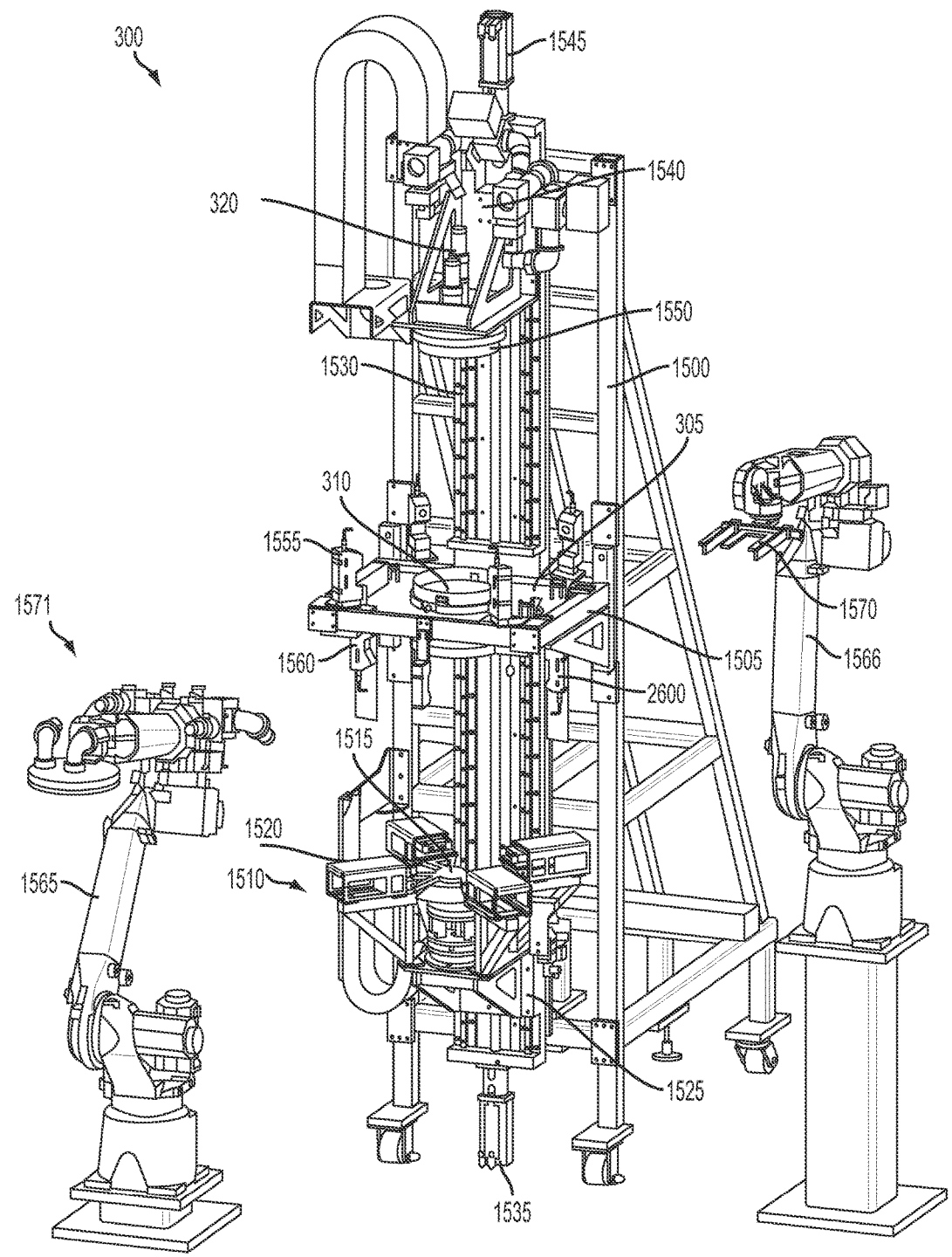
FIG. 26 is a perspective view of an exemplary skinning system.

FIG. 26 is an isometric view of the skinning system 300 in accordance with an embodiment. The skinning system 300 may include the manifold or manifold assembly 305 and the skinning pipe 310. The manifold 305 may be configured to receive a flowable mixture from the mixture delivery system 200, and deliver the flowable mixture to the skinning pipe 310. In some embodiments, the manifold 305 may provide support to the skinning pipe 310. In some embodiments, the manifold 305 may include a hole at a center portion, and the skinning pipe 310 may be mounted to the manifold 305 within the hole. The manifold 305 may supply flowable mixture to the skinning pipe 310 through distribution grooves (shown in FIG. 36). In some embodiments, the skinning pipe 310 may not be mounted to the manifold 305, but instead, be mounted to a dedicated mounting device connected to a frame structure of the skinning system 300. The manifold 305 may be mounted on a frame structure 1500, for example, through one or more mounting brackets 1505. The mounting bracket 1505 may be mounted to the frame structure 1500 using suitable fastening means, such as screws, bolts, nuts, etc.

The skinning pipe 310 may include an inner space. In some embodiments, the inner space may be defined by a curved circumferential wall of the skinning pipe 310. Although the skinning pipe 310 is shown to have a circular cross section, it may have any other suitable cross section shape defined by the shape of the articles to be skinned, including, for example, square, ellipse, rectangle, triangle, polygon, etc. The skinning pipe 310 may receive an article (e.g., an unskinned article), which may move axially along the inner space of the skinning pipe 310. While the article moves axially along the inner space, the skinning pipe 310 may apply (or coat) the flowable mixture to an outer surface of the article. An unskinned article may enter the skinning pipe 310 from an inlet (e.g., the lower open end of the skinning pipe 310), and move out of the skinning pipe 310 from an outlet (e.g., the upper open end of the skinning pipe 310) as a skinned article with flowable mixture applied on its outer surface.

Referring to FIG. 26, the skinning system 300 may include the article feeding mechanism 315. The article feeding mechanism 315 may be mounted to the frame structure 1500. The article feeding mechanism 315 may be located below the manifold 305 and the skinning pipe 310 in a vertical direction. The article feeding mechanism 315 may be configured to support an article, center and/or align the article with the inner space of the skinning pipe 310. The article feeding mechanism 310 may be configured to push the article into the inner space of the skinning pipe 310 from the inlet of the skinning pipe 310.

Referring to FIG. 26, the article feeding mechanism 315 may include a centering mechanism 1510 and a platen 1515. The platen 1515 may be configured to support an article (e.g., an unskinned article). The centering mechanism 1510 may include a plurality of centering devices 1520 surrounding the platen 1515. For illustrative purposes, four centering devices 1520 are shown in FIG. 26, although the centering mechanism 1510 may include any other number of centering devices 1520, such as, for example, two, three, six, etc. With the unskinned article resting on the platen 1515, the centering devices 1520 may be activated to center the unskinned article in order to align the unskinned article with the inner space of the skinning pipe 310, before or when the unskinned article is pushed into the skinning pipe 310.

The article feeding mechanism 315 may include any other suitable mechanisms for pushing the unskinned articles into the skinning pipe 310, and/or aligning the unskinned articles with the skinning pipe 310. For example, in some embodiments, the article feeding mechanism 315 may include a platen disposed at the bottom of one or more articles, and a centering pipe that is not disposed around the platen, but above the platen in the middle way between the skinning pipe and the platen. The platen may be moved up and down relative to the centering pipe, which may be fixed at a position relative to the skinning pipe. The centering pipe may include a pipe configured to center and/or align the articles pushed by the platen, before the articles are pushed into the skinning pipe. The centering pipe may not move together with the platen.

In some embodiments, the article feeding mechanism 315 may include one or more transfer arms each having a tooth type element (e.g., a rod or a nut) configured to engage with a cavity of a plate disposed at a bottom surface of each article to hold and support the articles. The transfer arms pick up the articles at a position below the skinning pipe 310, and pushes the articles into the skinning pipe 310 using the plate and the tooth type element.

In some embodiments, the article feeding mechanism 315 may include a robotic arm configured to support the article at the bottom of the article, and pushes the article upward into the skinning pipe 310. In some embodiments, the article feeding mechanism 315 may include one or more rollers disposed around the outer surfaces of the articles for pushing the articles into the skinning pipe using frictional forces between the rollers and the outer surfaces of the articles. In some embodiments, the rollers may include pins or mechanical fingers that may engage with the outer surfaces of the articles while pushing the articles into the skinning pipe 310. In some embodiments, the article feeding mechanism 315 may include a long pipe disposed between the skinning pipe 310 and a position where unskinned articles are to be loaded into the long pipe. The article feeding mechanism 315 may include a platen configured to push a plurality of articles stacked within the long pipe into the skinning pipe 310. The long pipe may be aligned with the skinning pipe 310.

Referring to FIG. 26, the skinning system 300 may include a lower carriage 1525 located below the article feeding mechanism 315 and configured to support the article feeding mechanism 315. The lower carriage 1525 may be mounted to the frame structure 1500. The frame structure 1500 may include a rail or track 1530 disposed in the vertical direction. The rail 1530 may be a vertical rail. The lower carriage 1525 may be mounted on the rail 1530 and may be movable along (e.g., up and down) the rail 1530 in the vertical direction relative to the skinning pipe 310. As the lower carriage 1525 moves along the rail 1530, the article feeding mechanism 315 may be moved upward toward the manifold 305 (and the skinning pipe 310) and downward away from the manifold 305 (and the skinning pipe 310).

As the article feeding mechanism 315 moves upward toward the manifold 350 (and the skinning pipe 310), the unskinned article disposed on the platen 1515 may be pushed into the inner space of the skinning pipe 310 to receive the flowable mixture during the skinning process. At a certain position or elevation of the article within the skinning pipe 310, or in response to the vacuum system 320 acquiring the article, the article feeding mechanism 315 may stop pushing the article and may move downward to receive another unskinned article. The skinning system 300 may include a lower servo motor 1535 configured to move the lower carriage 1525 (and hence the article feeding mechanism 315) along the rail 1530. The lower servo motor 1535 may be mounted to the frame structure 1500 at a lower end of the rail 1530, as shown in FIG. 26, although it may be located at any other suitable location.

Referring to FIG. 26, the skinning system 300 may include an upper carriage 1540. The upper carriage 1540 may be mounted on the rail 1530 at a top portion above the manifold 305. The upper carriage 1540 may support the vacuum system 320. The vacuum system 320 may be mounted to the upper carriage 1540. The upper carriage 1540 may move along (e.g., up and down) the rail 1530 to move the vacuum system 320 relative to the manifold 305 (and the skinning pipe 310). The skinning system may include an upper servo motor 1545 configured to move the upper carriage 1540 (and hence the vacuum system 320). The upper servo motor 1545 may be mounted to the frame structure 1500 at an upper end of the rail 1530, as shown in FIG. 26, although it may be located at any other suitable location.

Referring to FIG. 26, the vacuum system 320 may include a vacuum chuck 1550. The vacuum chuck 1550 may be mounted to the upper carriage 1540. The vacuum chuck 1550 may be configured to be in contact with a surface of an article (e.g., an at least partially skinned article), while the article moves axially along the inner space of the skinning pipe 310 to receive the flowable mixture. Through the vacuum chuck 1550, the vacuum system 320 may apply a vacuum to the at least partially skinned article to create a vacuum force that enables the vacuum chuck 1550 to hold the article. The vacuum chuck 1550 may pull the article out of the skinning pipe 310 as the article moves axially along the inner space of the skinning pipe 310 to receive the flowable mixture. The vacuum chuck 1550 may be made of one or more suitable materials, such as, for example, rubber, steel, stainless steel, aluminum, copper, ceramic, etc.

Referring to FIG. 26, the skinning system 300 may include at least one laser device 1555 (e.g., at least one second laser device 1555) disposed adjacent an outlet (e.g., the upper opening) of the skinning pipe 310. The at least one laser device 1555 may be configured to monitor and/or detect presence of a defect (e.g., pits, pocks, fast flow, starvation) on the skinned article (e.g., on the skin). Thus, the at least one laser device 1555 may be referred to as at least one defect measuring laser device 1555. In some embodiments, the at least one laser device 1555 may be mounted on the manifold 305 or the mounting bracket 1505. The laser device 1555 may be mounted to other portions of the skinning system 300, such as, for example, a dedicated mounting frame attached to the frame structure 1500. FIG. 26 shows four laser devices 1555. Any other suitable number of laser devices may be used, such as, for example, one, two, three, five, six, etc.

The control system 400 may be configured to determine a type of the defect detected from the skin based on signals or data received from the at least one laser device 1555. For example, different types of defects (e.g., fast flow defects, starvation defects, pit defects, pock defects, ring defects) may be associated with different signals having different characteristics (e.g., magnitudes, frequencies, pixel characteristics). The control system 400 may extract information from the signals or data received from the at least one laser device 1555 and determine the type of defect based on the extract information. Alternatively, the at least one laser device 1555 may detect the type of defect on the skin.

In some embodiments, the at least one laser device 1555 disposed adjacent the outlet of the skinning pipe 310 may also be configured to measure dimensions (e.g., diameter, radius, circumference, axial length, and/or outer peripheral length) of the skinned articles. In some embodiments, the at least one laser device 1555 may include a first plurality of laser devices configured to measure dimensions (e.g., diameter, radius, circumference, axial length, and/or outer peripheral length) of the skinned articles, and a second plurality of laser devices configured to monitor and/or detect the defects on the skinned articles. For example, FIG. 26 shows four laser devices 1555. Two laser devices 1555 may be used for monitoring and/or detecting the defects, and the other two laser devices 1555 may be used for measuring the dimensions (e.g., diameter, radius, circumference, axial length, and/or outer peripheral length) of the skinned articles. Also, more laser devices 1555 may be included. For example, eight laser devices 1555 may be disposed adjacent the outlet of the skinning pipe 310, four for monitoring and/or detecting the defects, and four for measuring the dimensions (e.g., diameter, radius, circumference, axial length, and/or outer peripheral length) of the skinned articles.

Referring to FIG. 26, the skinning system 300 may include at least one laser device 1560 disposed adjacent an inlet (e.g., the lower opening) of the skinning pipe 310. The at least one laser device 1560 may be configured to measure a dimension (e.g., diameter, radius, circumference, axial length, and/or outer peripheral length) of an unskinned article. Thus, the at least one laser device 1560 may be referred to as at least one dimension measuring laser device 1560. In some embodiments, the at least one laser device 1560 may be mounted on the manifold 305 or the mounting bracket 1505. The laser device 1560 may be mounted to other portions of the skinning system 300, such as, for example, a dedicated mounting frame attached to the frame structure 1500. FIG. 26 shows four laser devices 1560. Any other suitable number of laser devices may be used, such as, for example, one, two, three, five, six, etc.

In some embodiments, when the at least one laser device 1555 is configured to measure a dimension (e.g., diameter, radius, circumference, axial length, and/or outer peripheral length) of the skinned article, the dimension of the skinned article measured by the laser device 1555 and the dimension of the unskinned article measured by the laser device 1560 may be used to determine, e.g., by the control system 400, the thickness of the skin. The laser devices 1555 and 1560 may transmit data or signals about the measured dimensions of the unskinned articles and the skinned articles to the control system 400. The control system 400 may compare the dimensions of the unskinned article as measured by the laser device 1560 with the dimensions of the corresponding skinned article as measured by the laser device 1555 to calculate the thickness of the skin. For example, the control system 400 may subtract a diameter of the unskinned article from a diameter of the corresponding skinned article to obtain the thickness of the skin (e.g., flowable mixture). The skin thickness information may be used by the control system 400 to control the mixture delivery to the manifold 305 (e.g., adjusting the amount and/or the pressure of mixture delivered to the manifold 305), and/or the skinning system (e.g., the centering mechanism 1510).

Referring to FIG. 26, the skinning system 300 may include at least one robot or robotic arm configured to load or unload an article. For example, the skinning system 300 may include two robots, a loading robot 1565 configured to load unskinned articles to the article feeding mechanism 315, and an unloading robot 1566 configured to unload skinned articles from the vacuum chuck 1550. The unloading robot 1566 may include one or more arms 1570 for grabbing (or supporting) and unloading a skinned article received from the vacuum chuck 1550. The arms 1570 may be adjustable to fit articles of different sizes (e.g., different diameters, different radii, different circumferences, and/or different outer peripheral lengths).

The loading robot 1565 may include a vacuum chuck 1571 configured to grab or hold an unskinned article using vacuum force or vacuum pressure. While the vacuum chuck 1571 holds the unskinned article, the loading robot 1565 may lift and transport the unskinned article to the article feeding mechanism 315. The unskinned article may include a spacer (not shown in FIG. 26) located at its bottom surface to aid in creating a vacuum within the body of the unskinned article. The vacuum chuck 1571 of the loading robot 1565 may be similar to the vacuum chuck 1550 mounted to the upper carriage 1540, or may be different.

Figure 27:
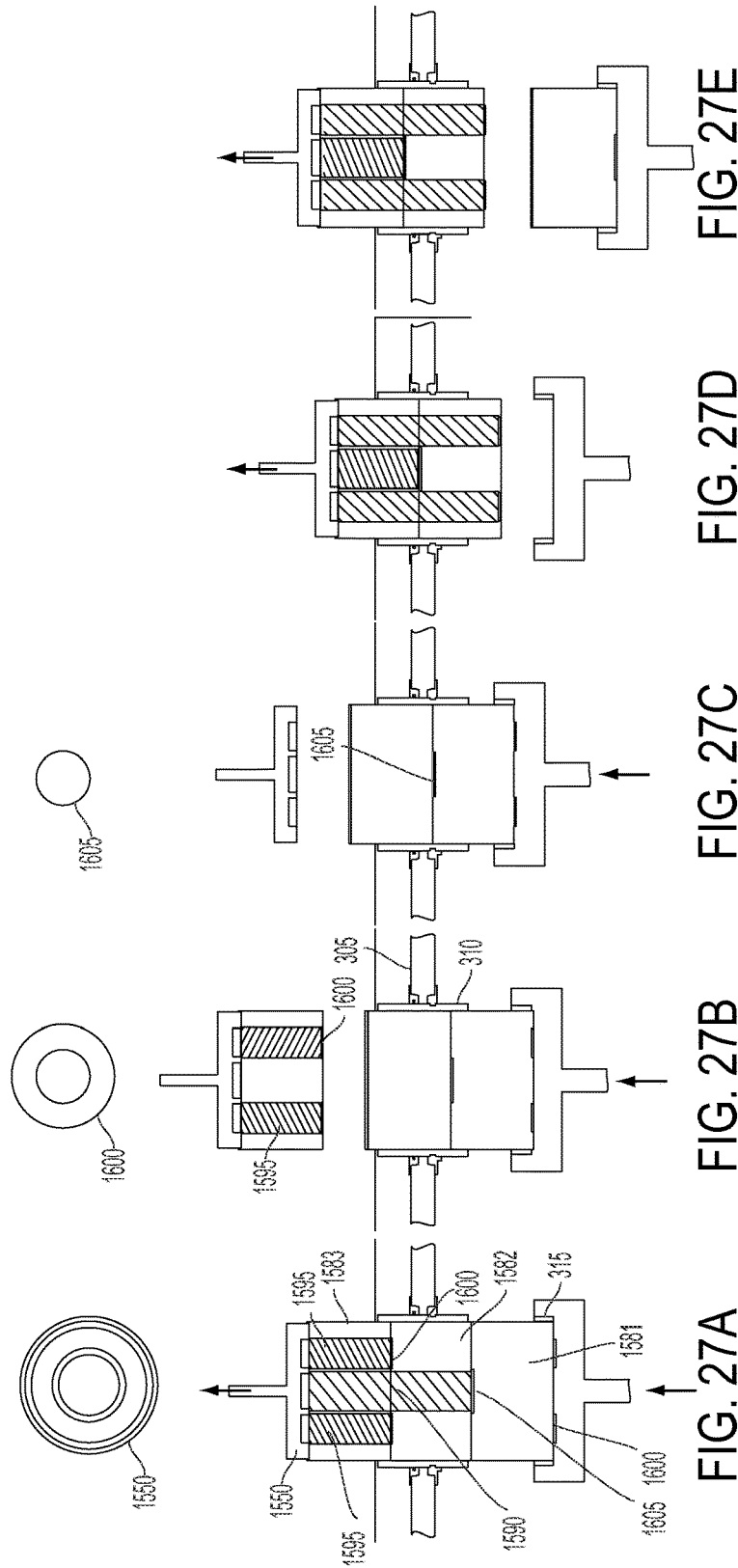
FIGS. 27A-27E are schematic diagrams of an exemplary skinning process.

FIGS. 27A-27E schematically show the operations of the skinning system 300. FIG. 27A shows that at a certain stage, the article feeding mechanism 315 may support an unskinned article 1581 on the platen 1515, while pushing the unskinned article 1581 into the skinning pipe 310. At the same time, there may be an article 1582 on top of the article 1581 moving inside the inner space of the skinning pipe 310 to receive the flowable mixture, and an article 1583 on top of the article 1582, which may have been skinned or at least partially skinned. Although FIGS. 27A-27E shows that the article feeding mechanism 315 and the vacuum system 320 (which includes the vacuum chuck 1550) may simultaneously transfer (e.g., by pushing and pulling), the skinning system 300 may transfer any suitable number of articles, such as, for example, one, two, four, five, six, etc. In addition, the skinning system 300 may be configured to skin articles having the same length or different lengths. For example, the skinning system 300 may be configured to skin a first group of articles with a first length, and a second group of articles with a second length different from the first length. Articles with different lengths may be mixed. For example, the first article to be skinned may have a first length, and a second article to be skinned may have a second length different from the first length, and a third article to be skinned may have a third length different from the first length and/or the second length.

Referring to FIGS. 27A-27E, the vacuum chuck 1550 may include one or more vacuum zones. In the example shown in FIG. 27A, the vacuum chuck 1550 may include two vacuum zones 1590 and 1595, a center (or inner) vacuum zone 1590 in the center, and a side (or outer) vacuum zone 1595 on the sides surrounding the center vacuum zone 1590. The center vacuum zone 1590 and the side vacuum zone 1595 may be controlled (e.g., activated or deactivated) independently. In some embodiments, the center vacuum zone 1590 may extend through more than one articles (e.g., two articles 1583 and 1582), and the side vacuum zone 1595 may extend only within one article (e.g., article 1583). In some embodiments, the center vacuum zone 1590 may extend within one article, and the side vacuum zone 1595 may extend through more than one article (e.g., two or more articles).

Referring to FIGS. 27A-27F, spacers may be disposed at the bottom surface of an article to aid in creating and maintaining the vacuum force or vacuum pressure within the vacuum zones 1590 and 1595 by sealing the air flow at the bottom surface of the article. With the spacers located at the bottom surfaces of the articles, high vacuum pressure may be generated within the bodies of the articles using the vacuum system 320, enabling the vacuum chuck 1550 to hold and pull one or more articles while the articles move along the inner space of the skinning pipe 310.

The vacuum chuck 1550 may hold an article at the top surface of the article. The high vacuum pressure generated within the articles may ensure that the top surface of the article is securely attached to the vacuum chuck 1550 even when the article is experiencing external forces, such as gravity and the frictional forces exerted on the article when the article is being applied with the wet, flowable mixture through the skinning pipe 310. Depending on the number of vacuum zones used in the vacuum system 320, or the number of articles the vacuum chuck 1550 is designed to hold/pull together, the spacers disposed at the bottom surfaces of articles may have the same shape or different shapes. For example, when the vacuum chuck 1550 is designed to hold/pull one article at a time, a circular plate shaped spacer may be disposed at the bottom surfaces of the articles. When the vacuum chuck 1550 is designed to hold/pull two articles at a time, different shapes of spacers may be disposed alternately at the bottom surfaces of the articles.

For example, the spacers may include two shapes complementing each other such that when used together, the two spacers disposed at the two bottom surfaces of two articles may cover the entire or substantially the entire area of the cross section of the bottom surfaces. In other words, the total area covered by the two spacers may equal to or substantially equal to the area of the bottom surface of an article. The shapes of the spacers may depend on the shape of the bottom surface of the articles. For example, when cylindrical articles 1581, 1582, and 1583 are to be skinned, donut shaped spacers 1600 and donut hole shaped spacers 1605 may be alternately disposed at the bottom surfaces of the articles to seal off the multiple vacuum zones 1590 and 1595. For example, a donut shaped spacer 1600 (a first spacer) may be disposed at the bottom surface of the article 1583 to seal off the vacuum zone 1595 (a first vacuum zone), a donut hole shaped spacer 1605 (a second spacer) may be disposed at the bottom surface of the article 1582 to seal off the vacuum zone 1590 (a second vacuum zone), a donut shaped spacer 1600 may be disposed at the bottom surface of the article 1581, which may seal off another vacuum zone 1590 when it is generated, and so forth.

As shown in FIGS. 27A-27F, when articles 1581, 1582, and 1583 are stacked, the donut shaped spacer 1600 is disposed between the articles 1582 and 1583, and the donut hole shaped spacer 1605 is disposed between the articles 1582 and 1581. The sequence of the spacers may be changed. For example, a donut hole shaped spacer 1605 may be disposed at the bottom surface of the articles 1583 and 1581, and a donut shaped spacer 1600 may be disposed at the bottom surface of the article 1582. The donut shaped spacer 1600 and the donut hole shaped spacer 1605 complement each other to cover an area equal to or substantially equal to the area of the a bottom surface of one of the articles 1583 and 1582, such that the vacuum force or vacuum pressure may be generated and maintained within both vacuum zones 1590 and 1595.

As shown in FIG. 27A, both vacuum zones 1590 and 1595 may be generated such that the vacuum chuck 1550 may hold the article 1583 and pull not only the article 1583 but also the article 1582 with the vacuum force. Different number of vacuum zones may be used along with different shapes of spacers such that the vacuum chuck 1550 may hold and pull more than two articles at a time or only one article at a time. The spacers 1600 and 1605 may be made of any suitable material, such as paper, mylar plastic, etc. In the stage shown in FIG. 27A, the vacuum system 320 is pulling the article 1583 while the article feeding mechanism 315 is pushing the articles 1581, 1582, and 1583 together. In other words, at this stage, the upper carriage 1540 is pulling up the articles, and at the same time, the lower carriage 1525 is pushing the articles up. Both the upper carriage 1540 and the lower carriage 1525 may move together upward at the same speed.

Referring to FIG. 27B, the vacuum chuck 1550 holds and pulls the skinned article 1583 out of the skinning pipe 310 by moving upward in the vertical direction away from the skinning pipe 310. Before or after the skinned article 1583 moves out of the skinning pipe 310, the center vacuum zone 1590 may be deactivated so that no or little vacuum force is applied to the article 1582. The timing of deactivation may be determined based on a force experienced by the upper carriage 1540. Without the vacuum applied to the article 1582, the article 1583 may disengage from the article 1582 and be moved away from the article 1582.

In some embodiments, the center vacuum zone 1590 (or the side vacuum zone 1595, depending on the type of spacer attached to the bottom of article 1583) may be deactivated after the article 1583 has been pulled out of the skinning pipe 310, and while the vacuum chuck 1550 and the article feeding mechanism 315 are moving at substantially the same speed. This stage shown in FIG. 27B may be referred to as a hand-off stage. The timing of the hand-off may be determined based on forces between the vacuum chuck 1550 (or the upper carriage 1540) and the article feeding mechanism 315 (or the lower carriage 1525). For example, the timing of activating or deactivating one or more of the vacuum zones 1590 and 1595 may be determined by the control system 400 based on the forces between the vacuum chuck 1550 (or the upper carriage 1540) and the article feeding mechanism 315 (or the lower carriage 1525). After the center vacuum zone 1590 is deactivated, the upper carriage 1540 (to which the vacuum chuck 1550 is mounted) may move upward at a greater speed than the lower carriage 1525, thereby moving the skinned article 1583 away from the article 1582. In the meantime, the article feeding mechanism 315 may continue to push the articles 1581 and 1582 through the skinning pipe 310 from the bottom.

After the vacuum chuck 1550 moves up to a certain position at which point the article is clear of the skinning pipe 310 and accessible for removal, the unloading robot 1566 (see FIG. 26) may remove the skinned article 1583 along with its spacer from the vacuum chuck 1550. The vacuum chuck 1550 may be deactivated to stop generating the vacuum pressure within the article 1583, or be controlled to reduce the vacuum pressure within the article 1583. The article 1583, along with its spacer, may drop from the vacuum chuck 1550 and be caught by the arms 1570 of the unloading robot 1566. In some embodiments, the vacuum chuck 1550 may place the article 1583 with its spacer onto the arms 1570 of the unloading robot 1566, and then reduce or stop the vacuum pressure generated within the article 1583. As shown in FIG. 27C, after the skinned article 1583 has been removed from the vacuum chuck 1550, the vacuum chuck 1550 (through the motion of the upper carrier 1540) may move down toward the skinning pipe 310 while the article feeding mechanism 315 continues to push the articles 1581 and 1582 through the skinning pipe 310.

As shown in FIG. 27D, after the vacuum chuck 1550 moves to a position close to the article 1582, the vacuum chuck 1550 may be stopped (e.g., under control of the skinning control system 410). The vacuum chuck 1550 may wait for the article 1582 to contact (e.g., touch) the vacuum chuck 1550. After the vacuum chuck 1550 contacts the article 1582, the center vacuum zone 1590 and/or the side vacuum zone 1595 may be activated. Vacuum force or vacuum pressure may be applied to both the articles 1581 and 1582, enabling the vacuum chuck 1550 to hold and pull the articles 1581 and 1582 together upward to move through the skinning pipe 310.

Although not shown in FIG. 27D, there may be a stage (i.e., a period of time) when the vacuum system 320 (or the upper carriage 1540) and the article feeding mechanism 315 (or the lower carriage 1525) move together upward at the same speed. While they move together at the same speed, the article feeding mechanism 315 (or the lower carriage 1525) may stop moving upward, and start retrieving downward, leaving the vacuum system 320 (or the upper carriage 1540) pulling both articles alone. This may also be referred to as a hand-off stage. The article feeding mechanism 315 may move downward to a position to receive another unskinned article, as shown in FIG. 27E. The loading robot 1565 may place the unskinned article onto the article feeding mechanism 315. For example, the loading robot 1565 may hold the unskinned article by vacuum pressure, lift it, and place it onto the paten 1515 of the article feeding mechanism 315.

The process or cycle shown in FIGS. 27A-27E may be repeated until the skinning process is terminated or paused. The process shown in FIGS. 27A-27E may be a continuous process, with continuous pulling (by the vacuum system 320) and pushing (by the article feeding mechanism 315) through the skinning pipe 310. Alternatively or additionally, the skinning system 300 may be operated in an index mode, in which the process may be stopped at one point, and re-started at a different point during the process. For example, the skinning system 300 may be operated to skin one article, and then stopped or paused after the article is skinned, and then re-started to skin another article, rather than being operated to skin a plurality of articles in a continuous manner.

Figure 28:
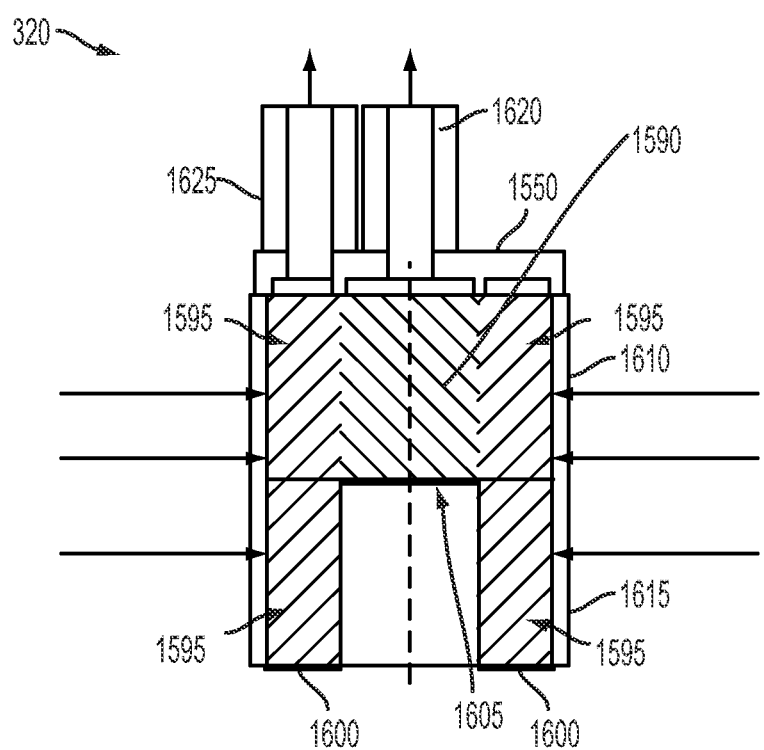
FIG. 28 is a schematic diagram of an exemplary vacuum system.

FIG. 28 shows an exemplary vacuum system 320. The vacuum system 320 may include the vacuum chuck 1550 with one or more vacuum zones (hence, the vacuum chuck 1550 may be referred to as a multi-zone vacuum chuck 1550). For illustrative purposes, FIG. 28 shows a vacuum system 320 with two vacuum zones (e.g., a multi-zone vacuum system 320). The vacuum system 320 may include any number of vacuum zones, such as one, three, four, etc. In the embodiment shown in FIG. 28, the vacuum system 320 includes the center vacuum zone 1590 and the side vacuum zone 1595. The center vacuum zone 1590 may extend only within one article 1610, while the side vacuum zone 1595 may extend within both articles 1610 and 1615. This is because a donut hole shaped spacer 1605 is disposed between the articles 1610 and 1615, and a donut shaped spacer 1600 is disposed at the bottom of the article 1615. When a donut shaped spacer 1600 is disposed between the articles 1610 and 1615, and a donut hole shaped spacer is disposed at the bottom of the article 1615, the center vacuum zone 1590 may extend within both articles and the side vacuum zone 1595 may extend only within one article.

The vacuum system 320 may include two or more vacuum ports. For example, the vacuum system 320 may include a first vacuum port 1620 and a second vacuum port 1625. Both vacuum ports 1620 and 1625 may be connected to a vacuum generating machine (not shown) configured to generate a vacuum pressure or vacuum force within the vacuum zones 1590 and 1595. The first vacuum port 1620 may be used for generating the center vacuum zone 1590, and the second vacuum port 1625 may be used for generating the side vacuum zone 1595. As shown in FIG. 28, air may flow into the articles 1610 and 1615 from the side surfaces of the articles. When more than two vacuum zones are included in the vacuum system 320, the vacuum system 320 may include more than two vacuum ports.

Figure 29A:
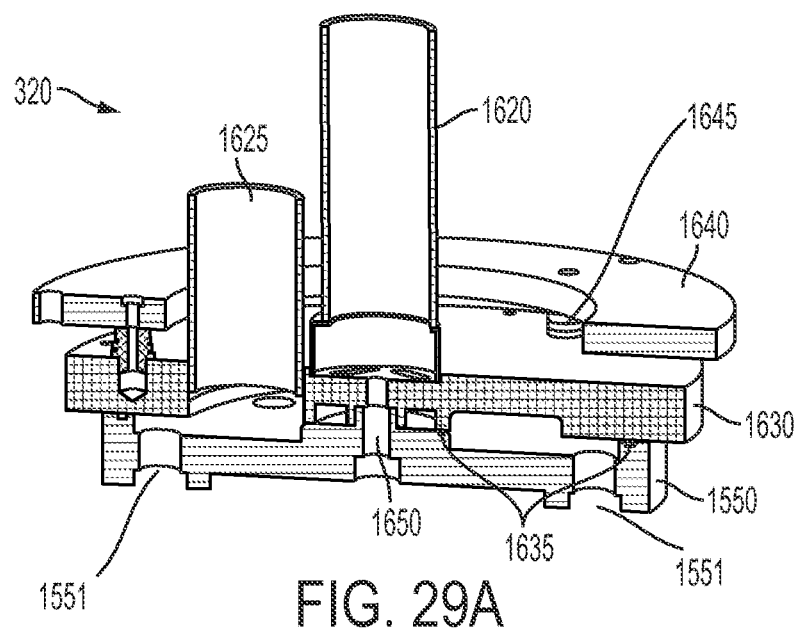
FIGS. 29A-29B are cross-sectional perspective views of the exemplary vacuum system.
Figure 29B:
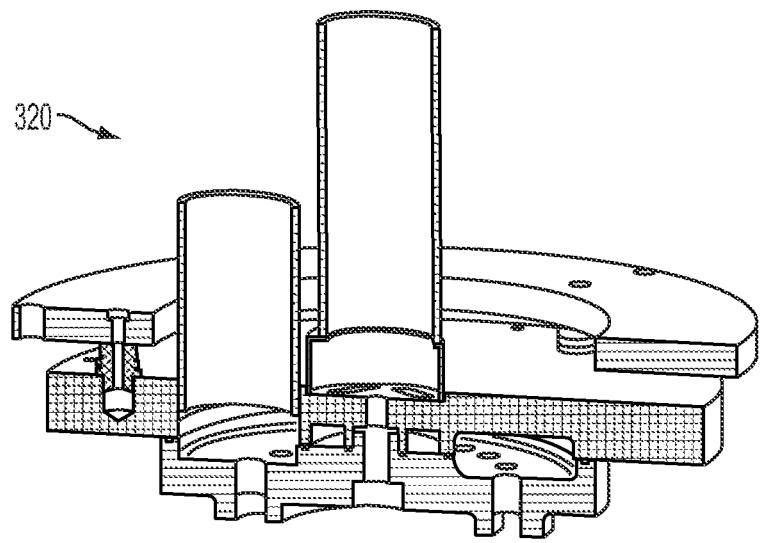

FIGS. 29A and 29B show isometric cut-away views of the exemplary vacuum systems 320 with vacuum chuck 1550 having different sizes. FIG. 29A shows the vacuum chuck 1550 having a twelve-inch diameter, and FIG. 29B shows the vacuum chuck 1550 having a seven-inch diameter. Although the vacuum chuck 1550 is shown to have a circular face or shape, the vacuum chuck 1550 may include any other suitable face or shape, such as, for example, square, rectangle, triangle, polygon, etc. As shown in FIGS. 29A and 29B, the vacuum system 320 may include a chuck mount 1630. The vacuum chuck 1550 may be detached from the chuck mount 1630 and replaced for a different size. The vacuum chuck 1550 may be mounted to the chuck mount 1630 under a lower surface of the chuck mount 1630. An O-ring seal 1635 may be provided between the chuck mount 1630 and the vacuum chuck 1550 to seal off the space between the chuck mount 1630 and the vacuum chuck 1550.

The first vacuum port 1620 and the second vacuum port 1625 may be mounted on the chuck mount 1630 (e.g., on a top surface of the chuck mount 1630). The vacuum system 320 may include a tip or tilt plate 1640. The tilt plate 1640 may be mounted on a top surface of the chuck mount 1630. One or more force sensors 1645 (e.g., at least one first force sensor 1645) may be disposed between the tilt plate 1640 and the chuck mount 1630. In some embodiments, the force sensors 1645 may be mounted on the chuck mount 1630. In some embodiments, the force sensors 1645 may be mounted to a lower surface of the tilt plate 1640, on the upper surface of the tilt plate 1640, or on the upper carriage 1540. The force sensors 1645 may be disposed at any other suitable locations on the upper carriage 1540 or the vacuum system 320. The tilt plate 1640 may be mounted to the upper carriage 1540. The force sensors 1645 may be configured to measure at least one force (e.g., first force) experienced by the upper carriage 1540. The force measured by the force sensors 1645 may be used to determine the timing of hand-off between the upper carriage 1540 and the lower carriage 1525 during the skinning process.

The vacuum system 320 may also include a counterbored hole 1650 for receiving one or more screws or another fastening device, through which the vacuum chunk 1550 may be mounted to the chuck mount 1630 (e.g., to a bottom surface of the chuck mount 1630). Other suitable fastening means may include rods, bolts, nuts, clamps, etc. The fastening means may enable a fast change of the vacuum chuck 1550 for a different size when the size of the articles is changed. As shown in FIGS. 29A and 29B, the vacuum chuck 1550 may include one or more air passages or vacuum channels 1551 (e.g., two or more vacuum channels 1551). The air passages 1551 may communicate with the air flow received from the article with minimal restriction so as to minimize the magnitude of vacuum pressure and/or the vacuum force for holing and pulling the articles. The air passages 1551 may be in fluid communication with the first vacuum port 1620 and the second vacuum port 1625. Each of the first vacuum port 1620 and the second vacuum port 1625 may be independently controlled, e.g., by the control system 400, to provide vacuum pressure to the air passages 1551 or stop providing vacuum pressure to the air passages 1551.

Figure 30B:
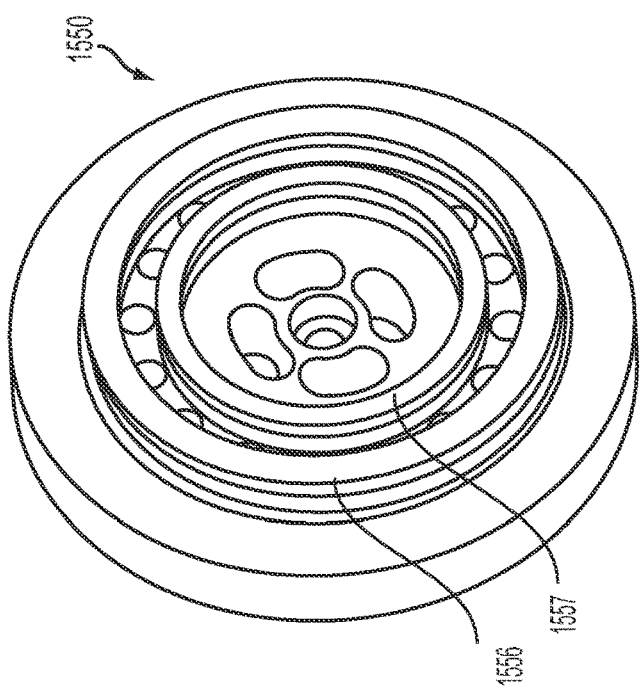
FIGS. 30A-30B are perspective views of exemplary vacuum chucks of different sizes.
Figure 30A:
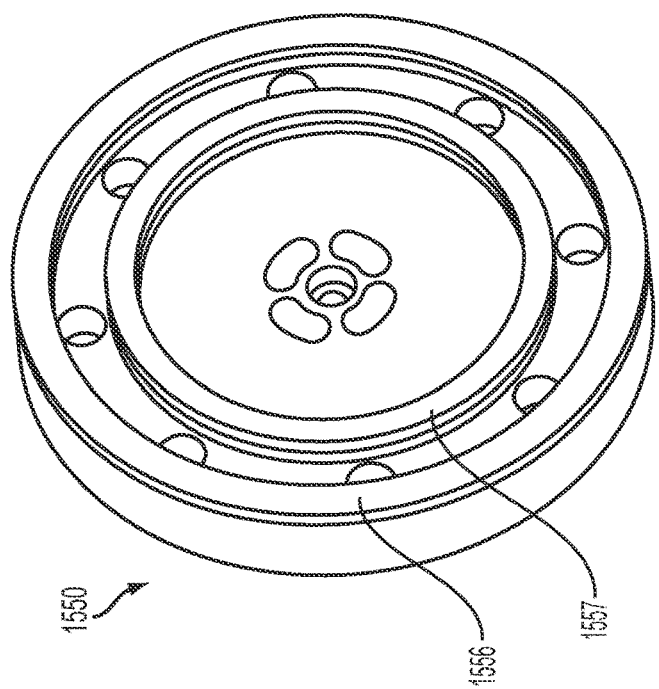

FIGS. 30A and 30B show isometric views of the exemplary vacuum chuck 1550 in different sizes. FIG. 30A shows the vacuum chuck 1550 having a first size (e.g., twelve-inch diameter), and FIG. 30B shows the vacuum chuck 1550 having a different second size (e.g., seven-inch diameter). When the size of the articles to be skinned is changed (e.g., from a seven-inch diameter to a twelve-inch diameter), the vacuum chuck 1550 mounted to the chuck mount 1630 may be quickly changed for a different vacuum chuck with a different size (e.g., diameter).

In some embodiments, the vacuum chuck 1550 may include one or more integral molded rubber surfaces. For example, each vacuum chuck 1550 shown in FIGS. 30A and 30B may include two integral molded rubber surfaces 1556 and 1557. The rubber surfaces 1556 and 1557 may be configured to seal the top surfaces of the articles when the vacuum chuck 1550 is in contact with the articles, even when the article top surfaces are not even. The rubber surfaces 1556 and 1557 may also be configured to provide an amount of compliance during the hand-off of articles that occurs during the skinning process discussed above in connection with FIGS. 27A-27E, and the force triggered motion control process discussed below.

Figure 31B:
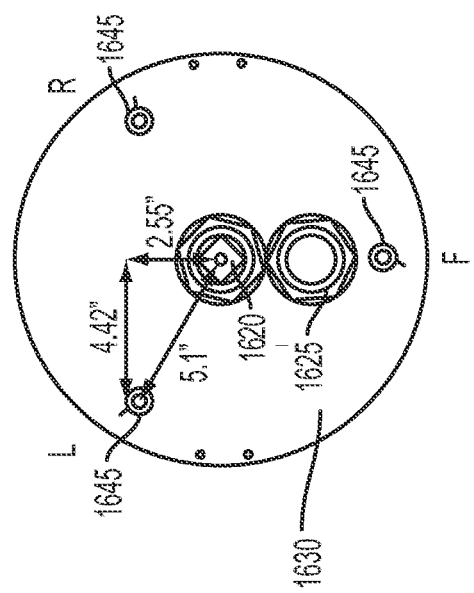
FIGS. 31A-31B are perspective and top views of the exemplary vacuum system.
Figure 31A:
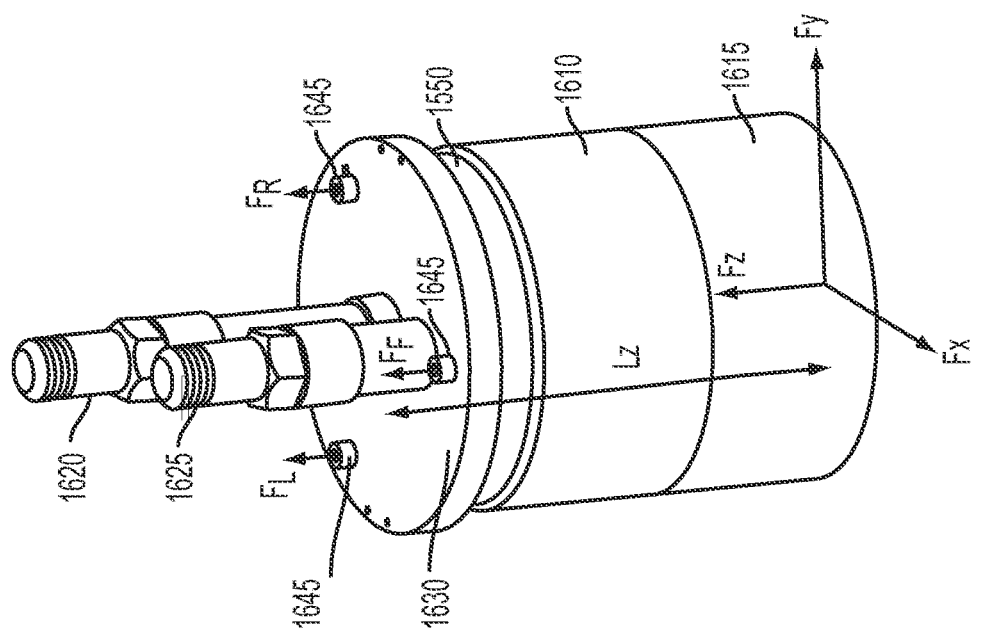

FIGS. 31A and 31B show an isometric view and a top view of the vacuum system 320. As shown in FIG. 31A, the vacuum chuck 1550 may hold both articles 1610 and 1615 by a vacuum pressure. The force sensors 1645 may be mounted on the chuck mount 1630, although the force sensors 1645 may be mounted at any other locations of the vacuum system 320 or the upper carriage 1540. The force sensors 1645 may be configured to measure forces experienced by the vacuum mount 1630 (and hence the upper carriage 1540) as a result of a pushing force exerted, e.g., by the article feeding mechanism 315, on the lower article 1615 that the vacuum chuck 1550 holds. The force sensors 1645 are not used for measuring the vacuum force generated by the vacuum system 320.

FIG. 31B shows the exemplary locations of the three force sensors 1645 relative to the first vacuum port 1620. The first vacuum port 1620 may be located at the center portion of the chuck mount 1630, which may have a circular top surface. The three force sensors 1645 may be located around the first vacuum chuck 1620 (or the center of the circular top surface of the chuck mount 1630) at equal distances, forming an equilateral triangle. The distances between one of the force sensors 1645 and the center of the circular top surface of the chuck mount 1630 are shown in FIG. 31B, as one example configuration. The three force sensors 1645 may be distributed in other configurations on the chuck mount, which may not form an equilateral triangle. For example, they may form any triangle. In some embodiments, less than three or more than three force sensors 1645 may be used.

Below equations show how the force experienced by the vacuum mount 1630 (and hence the upper carriage 1540) may be calculated from the forces measured by the force sensors 1645. For discussion convenience, the three force sensors 1645 are labeled as "L," "R," and "F," and the forces they measure are labeled as "$F_L$," "$F_R$," and "F," as shown in FIGS. 31A and 31B. As shown in the equations below, summing the force moments (M) about the x-axis (the same direction as "$F_x$") shown in FIG. 31A yields $F_y$ as a function of the forces $F_L$ and $F_R$ measured by the force sensors "L" and "R."

$$\Sigma M_{x\text{-}axis}=0 \quad (B\text{-}1)$$

$$F_y L_z+4.42F_R-4.42F_L=0 \quad (B\text{-}2)$$

$$F_y=(4.42F_L-4.42F_R)/L_z \quad (B\text{-}3)$$

Summing the force moments about the y axis (the same direction as "$F_y$") shown in FIG. 31A yields $F_x$ as a function of the forces $F_L$, $F_R$, and $F_F$ measured by the three force sensors "L," "R," and "F."

$$\Sigma M_{y\text{-}axis}=0 \quad (B\text{-}4)$$

$$-F_x L_z+2.55F_R+2.55F_L-5.1F_F=0 \quad (B\text{-}5)$$

$$F_x=(2.55F_R+2.55F_L-5.1F)/L_z \quad (B\text{-}6)$$

The total side force may be:

$$F_{side}=\sqrt{F_y^2+F_x^2} \quad (B\text{-}7)$$

The force in the z-direction (same as the $F_z$ direction shown in FIG. 31A) may be calculated by summing the three forces measured by the three force sensors:

$$F_z=F_L+F_R+F_F \quad (B\text{-}8)$$

The force sensors 1645 may transmit, via a wired or wireless network, electrical signals to the skinning control system 410, which may use the signals to calculate the forces $F_R$, $F_F$, and $F_L$ as a function of time. These force measurements may be input into the above equations (B-1) to (B-8) to calculate process forces $F_x$, $F_y$, and $F_z$. The process forces may be used in process monitoring, debug, and controls, such as, for example, a force triggered motion control of the skinning system 300 discussed below.

Figure 32:
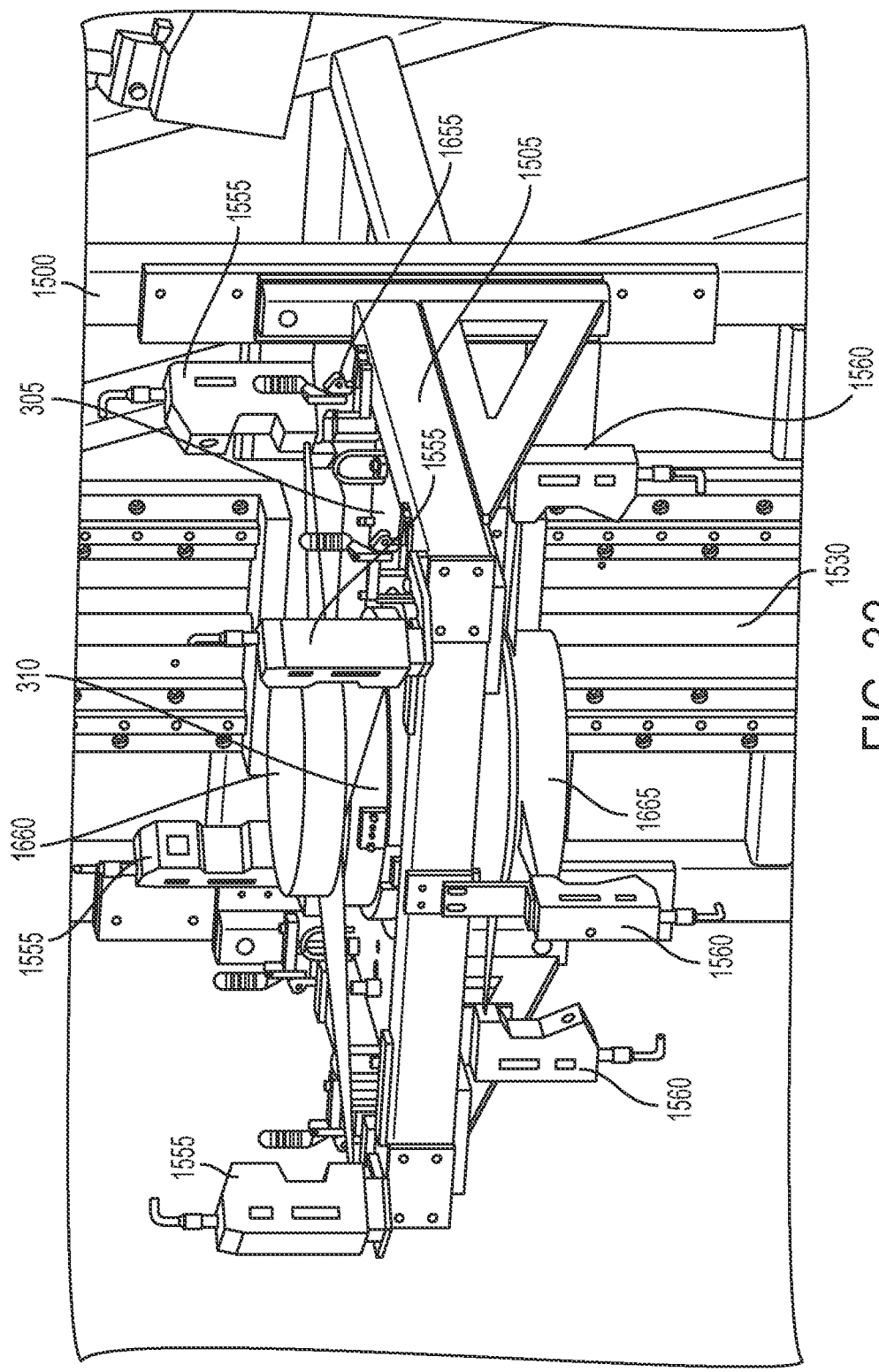
FIG. 32 is a perspective view of a portion of the exemplary skinning system.

FIG. 32 shows an isometric view of the exemplary manifold or manifold assembly 305. As shown in FIG. 32, the manifold 305 may be mounted to the frame structure 1500 through one or more mounting bracket 1505. In the embodiment shown in FIG. 32, two mounting brackets 1505 are included, one on each side of the manifold 305, although any suitable number (e.g., one, three, four, etc.) of mounting brackets 1505 may be used. The manifold 305 may be mounted to the mounting bracket 1505 through one or more fastening devices 1655. FIG. 32 shows four fastening devices 1655. In some embodiments, any number (e.g., one, two, three, six, etc.) of fastening devices 1655 may be used. The fastening devices 1655 may be any suitable fastening devices, such as clamps, screws, bolts and nuts, etc.

The skinning pipe 310 may be mounted at a center portion of the manifold 305, for example, inside a hole of the manifold 305. For illustrative purposes, two articles 1660 and 1665 are shown in the skinning pipe 310. The skinning pipe 310 may be configured to receive the articles 1660 and 1665 and apply the flowable mixture to the articles 1660 and 1665 as the articles 1660 and 1665 move axially along the inner space of the skinning pipe 310.

Referring to FIG. 32, at least one laser device 1555 may be disposed adjacent the outlet (e.g., the upper open end) of the skinning pipe 310 and configured to monitor and/or detect a defect in a skinned article or at least partially skinned article, as the article moves out of the skinning pipe 310. The laser device 1555 may be referred to as a defect monitoring laser device 1555. FIG. 32 shows four laser devices 1555 disposed adjacent the outlet of the skinning pipe 310 for monitoring and/or detecting the defect. In some embodiments, the laser devices 1555 may also be mounted on the mounting brackets 1505 or a dedicated mounting bracket. In some embodiments, the laser devices 1555 may be mounted on a top or side surface of the manifold 305. Other suitable numbers (e.g., one, two, three, five, six, etc.) of laser devices 1555 may be used.

Referring to FIG. 32, at least one laser device 1560 may be disposed adjacent an inlet (e.g., the lower open end) of the skinning pipe 310 and configured to measure a dimension (e.g., diameter, radius, circumference, axial length, and/or outer peripheral length) of an incoming unskinned article. The laser device 1560 may be referred to as dimension measuring laser device 1560. In the embodiment shown in FIG. 32, four laser devices 1560 are disposed adjacent the inlet of the skinning pipe 310 for measuring the dimension of unskinned articles (three are visible in FIG. 32, and one is obscured). In some embodiments, the laser devices 1560 may be mounted on a lower or side surface of the manifold 305. In some embodiments, the laser devices 1560 may be mounted on the lower portion of the mounting bracket 1505 or a dedicated mounting bracket. In some embodiments, the laser devices 1560 may be mounted at a middle point between the manifold 305 and the lowest position of the article feeding mechanism 315. Other suitable numbers of laser devices 1560 (e.g., one, two, three, five, six, seven, eight, etc.) may also be used. In some embodiments, the laser devices 1560 may be used to measure the diameter of the unskinned articles.

Figure 33:
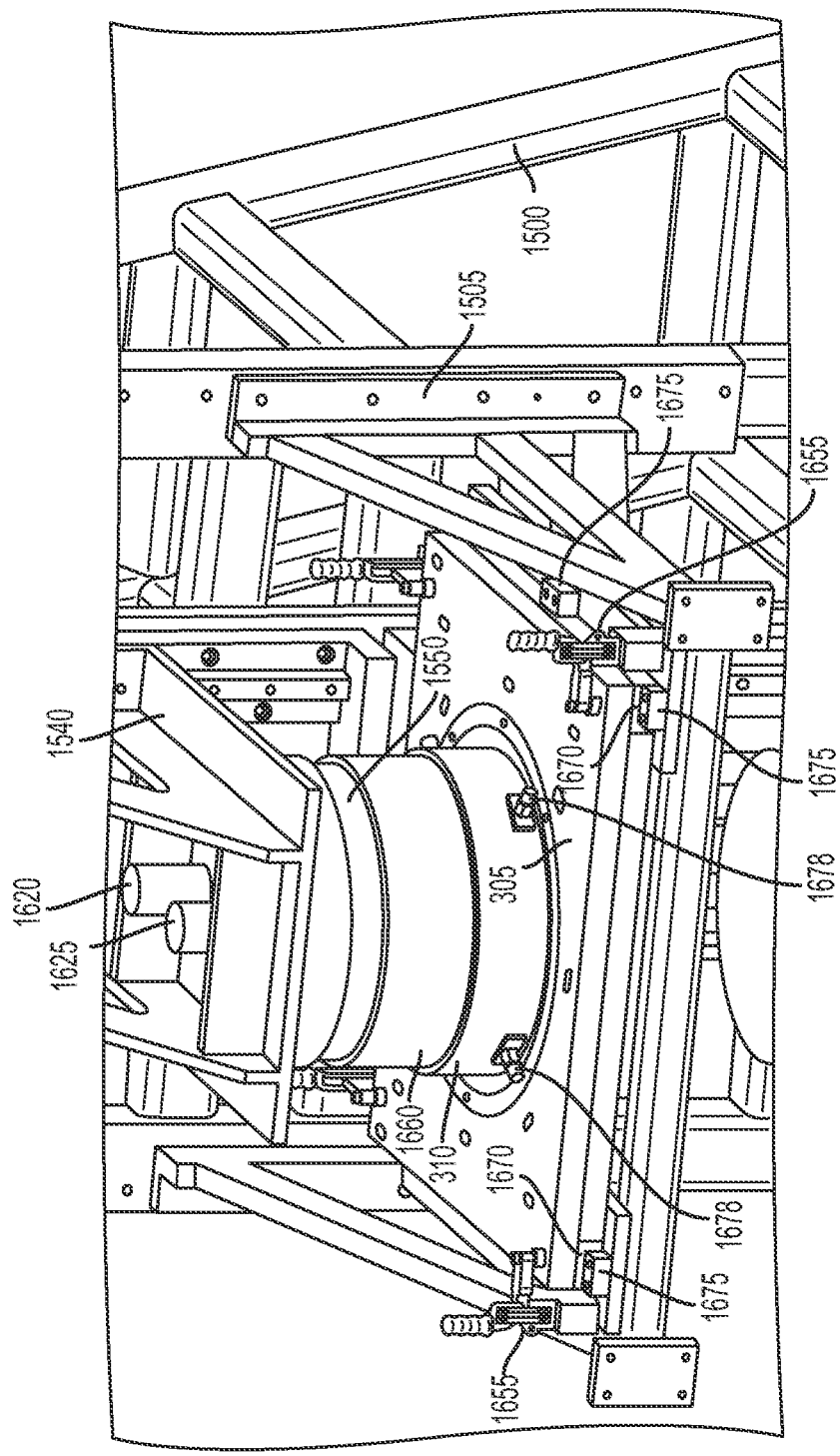
FIG. 33 is a perspective view of a portion of the exemplary skinning system.

FIG. 33 shows an isometric view of the exemplary manifold or manifold assembly 305. As shown in FIG. 33, the upper carriage 1540 may move close to the manifold 305. The vacuum chuck 1550 may hold the article 1660 and pull the article 1660 through the skinning pipe 310. The article 1660 may be at least partially skinned with the flowable mixture. The vacuum chuck 1550 may pull the article 1660 as the article 1660 moves axially along the inner space of the skinning pipe 310 to receive the flowable mixture.

In some embodiments, the manifold 305 may be placed on a precision machined pad (not shown), which may be a part of the mounting bracket 1505. The manifold 305 may include at least one locating pad 1670 (e.g., a plurality of locating pads 1670) configured to aid in positioning the manifold 305 on the mounting bracket 1505. In the embodiment shown in FIG. 33, six locating pads 1670 are included and distributed at suitable locations around the manifold 305. Other suitable numbers (e.g., one two, three, four, five, seven, eight, etc.) of locating pads 1670 may be used.

The manifold 305 may include at least one locating block 1675 (e.g., a plurality of locating blocks 1675) distributed at suitable locations around the manifold 305. The locating blocks 1675 may be screwed or otherwise secured to the mounting bracket 1675. The locating blocks 1675 may be configured to aid in positioning the manifold 305 on the mounting bracket 1505. In the embodiment shown in FIG. 33, six locating blocks 1675 are included and distributed at suitable locations. Other suitable numbers (e.g., one, two, three, four, five, seven, etc.) of locating blocks 1675 may also be used. The locating blocks 1675 may or may not be part of the manifold assembly 305.

Referring to FIG. 33, the locating pads 1670 and the locating blocks 1675 may enable fast mounting or assembling of the manifold 305 onto the manifold mounting bracket 1505 at the precise locations. For example, when articles of different sizes are used, the manifold 305 may need to be changed for a skinning pipe 310 of a different size. In some situations, the manifold 305 may need to be disassembled to be serviced or changed. The manifold 305 may be disassembled from the mounting bracket 1505, and a new or serviced manifold 305 may be mounted back onto the mounting bracket 1505. The locating pads 1670 and locating blocks 1675 may enable precise positioning and mounting of the new manifold 305 such that the skinning pipe 310 is back to its previous position within a small tolerance. The position of the skinning pipe may include positions in two horizontal directions and one vertical direction, one tip angle, and one tilt angle. The need for realigning the skinning pipe 310 and/or the manifold 305 after changing, servicing, or disassembling the manifold 305 or the skinning pipe 310 may be reduced or eliminated.

FIG. 33 also shows one or more pressure sensors 1678 mounted to the skinning pipe 310. The pressure sensors 1678 may be mounted to an upper portion of the skinning pipe 310 above the top surface of the manifold 305. The pressure sensors 1678 may be mounted on an outer surface of the skinning pipe 310 and may penetrate through the wall 1680 (shown in FIG. 34) of the skinning pipe 310. An end portion of the pressure sensors 1678 may be disposed adjacent the inner surface of the wall 1680. The pressure sensors 1678 may be configured to measure a pressure in an annular space (or gap) between the article 1660 and the skinning pipe 310. This pressure may or may not be the same as the skinning pipe pressure measured by the pressure sensors 330 (shown in FIG. 1), which may be mounted to a lower portion of the skinning pipe 310. In some embodiments, six pressure sensors 1678 may be used (two are shown in FIG. 33 for illustrative purposes). In some embodiments, other suitable numbers (e.g., one, two, three, four, five, seven, eight, etc.) of pressure sensors 1678 may be used.

Figure 34:
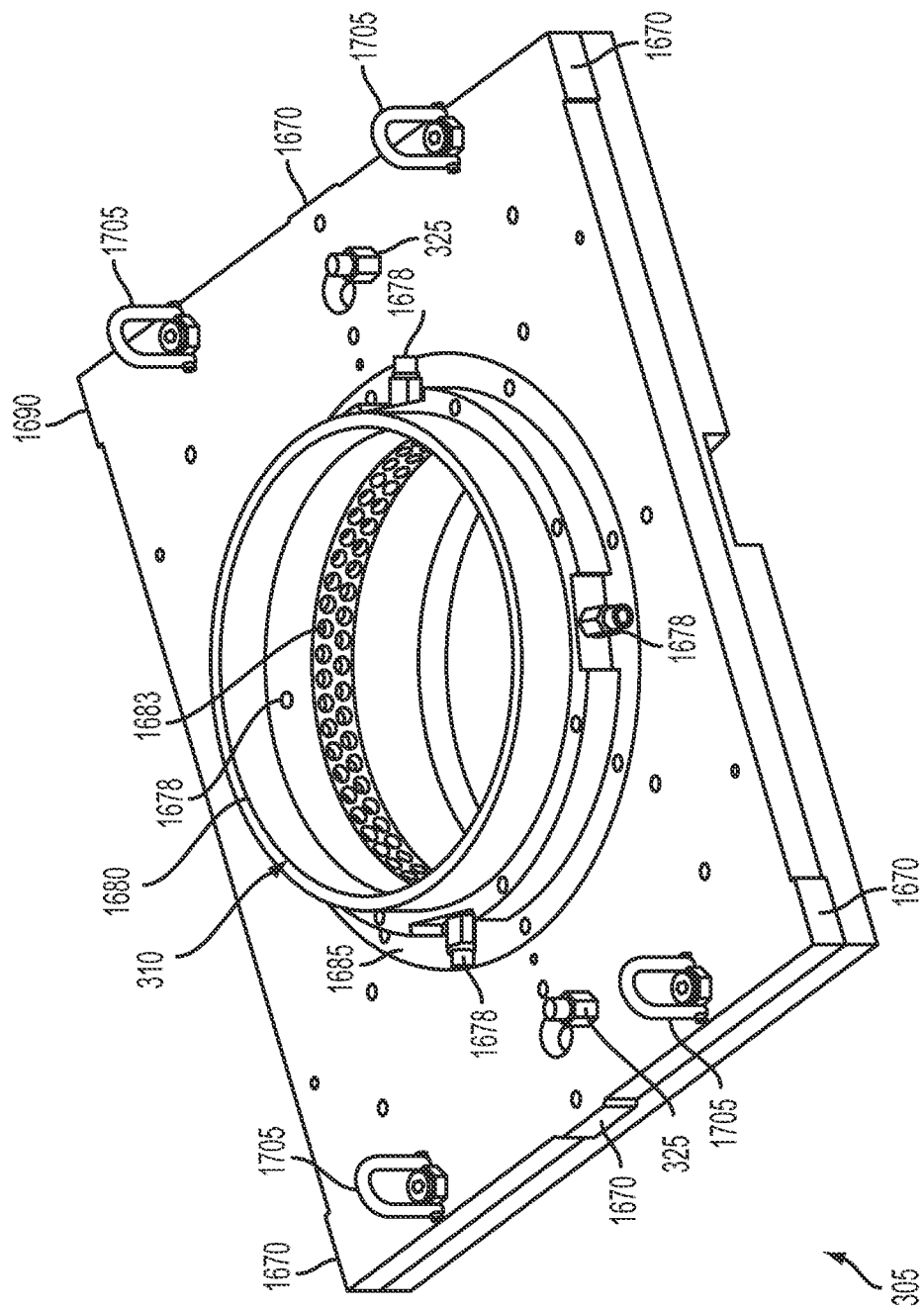
FIG. 34 is a perspective view of an exemplary manifold assembly.

FIG. 34 shows an isometric view of an exemplary manifold or manifold assembly 305. The skinning pipe 310 ma include a wall 1680 defining an inner space. The wall 1680 may include a plurality of holes 1683 (e.g., radial holes) configured to direct the flowable mixture flowing from the manifold 305 into the inner space (e.g., the annular gap between an article and the skinning pipe 310). The inner space of the skinning pipe 310 may be configured to be slighter larger than the volume of an unskinned article. Thus, when the article is disposed within the inner space, there is a small annular space (or gap) between the outer surface of the article and the inner surface of the wall 1680. Flowable mixture may flow into the annular space through the holes 1683 and may attach to the outer surface of the article. In some embodiments, the wall 1680 may be curved (e.g. when the skinning pipe 310 has a circular cross section shape). The skinning pipe 310 may have a different cross section shape, such as, for example, triangle, square, rectangle, polygon, ellipse, etc., and the wall 1680 may not be curved. The shape of the cross section of the skinning pipe 310 may match that of the articles to be skinned.

Referring to FIG. 34, the manifold 305 may include an upper ring 1685. The skinning pipe 310 may be mounted to the upper ring 1685 with tight radial clearance such that the skinning pipe 310 and the upper ring 1685 may be disassembled and reassembled with their centerline relations and tip/tilt errors remain within a small value (e.g., approximately within 0.0005 inches).

The manifold 305 may include an upper manifold piece 1690 and a lower manifold piece 1695 joined together. The upper ring 1685 may be mounted to the upper manifold piece 1690 with a tight radial clearance such that the centerline relations and the tip/tilt errors of these parts remain within a small value (e.g., approximately 0.0005 inches), even as they are disassembled or reassembled. The upper manifold piece 1690 and the lower manifold piece 1695 may be joined together to form the manifold 305, and may be taken apart for cleaning or servicing.

Referring to FIG. 34, the manifold 305 may include one or more pressure sensors 325. Each of the pressure sensors 325 may be mounted on the manifold 305 adjacent an inlet 1700 of the manifold 305 that receives the flowable mixture from the mixture delivery system 200. The pressure sensors 325 may be configured to measure a pressure at the manifold inlet 1700 (e.g., manifold pressure). FIG. 34 shows two inlets 1700 and two pressure sensors 325. The manifold 305 may include other number (such as one, three, four, etc.) of inlets 1700 and pressure sensors 325. In some embodiments, the manifold 305 may further include a plurality of lifting hooks 1705 configured to be used for lifting up the manifold 305 (e.g., the entire manifold 305 or the upper manifold piece 1690).

Figure 35:
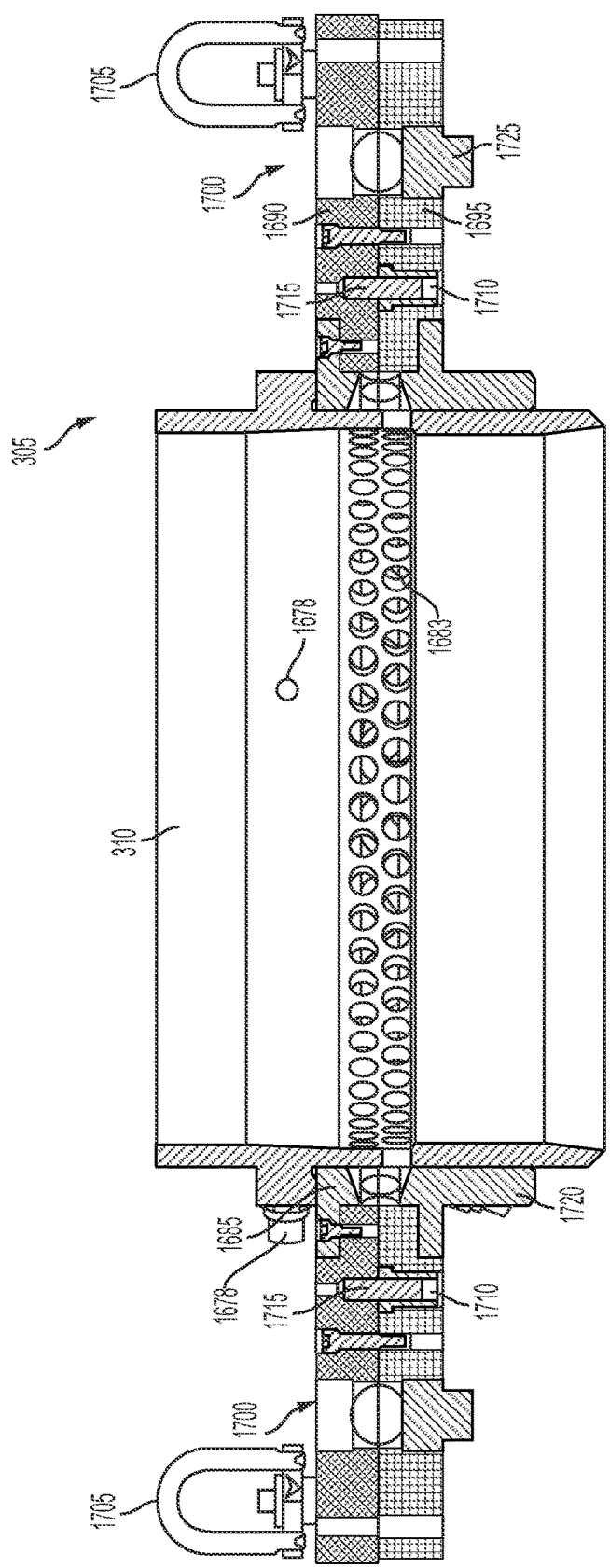
FIG. 35 is a cross-section of the exemplary manifold assembly.

FIG. 35 shows a cross sectional view of the exemplary manifold 305. The cross sectional view is taken from a line connecting the two inlets 1700 of the manifold 305 shown in FIG. 34. The manifold 305 may include one or more locating cylinders 1710 and one or more locating pins 1715. The one or more locating cylinders 1710 may be disposed within the lower manifold piece 1695, and the one or more locating pins 1715 may be disposed within the upper manifold piece 1690. In some embodiments, the locating cylinders 1710 may be disposed within the upper manifold piece 1690 and the locating pins 1715 may be disposed within the lower manifold piece 1695.

The locating cylinders 1710 and the locating pins 1715 may be configured to aid in precise locating and positioning of the upper manifold piece 1690 an the lower manifold piece 1695. For example, the locating cylinders 1710 and the locating pins 1715 may engage with one another for precisely locating and joining the upper manifold piece 1690 and the lower manifold piece 1695. In the embodiment shown in FIG. 34, two locating pins 1715 and two locating cylinders 1710 are included. Other suitable numbers (e.g., one, three, four, etc.) of locating pins 1715 and locating cylinders 1710 may be included in the manifold 305. The locating pins 1715 and the locating cylinders 1710 may be made of a hard material that may experience minimal wear as they are removed and replaced repeatedly. The clearance from the locating pins 1715 to the locating cylinders 1710 may be a small clearance (e.g., less than 0.001 inches), such that the lower manifold piece 1695 may be located in two horizontal directions within a reasonably small deviation even after repeated disassembly and reassembly.

As shown in FIG. 35, the manifold 305 may include a lower ring 1720. The lower ring 1720 may be disposed at a lower portion of the skinning pipe 310, e.g., under the lower manifold piece 1695. The lower ring 1720 may surround an outer surface of the skinning pipe 310. In some embodiments, the lower ring 1720 may be mounted to the lower manifold piece 1695 using suitable fastening devices, such as screws, bolts, nuts, etc. The lower ring 1720 may be configured to change or adjust the space adjacent the skinning pipe 310 available for the flowable mixture to flow to the holes 1683 of the skinning pipe 310. When the space adjacent the skinning pipe 310 is increased for the flowable mixture, the pressure within the flowable mixture adjacent the skinning pipe 310 (e.g., the skinning pipe pressure) may be reduced. When the space adjacent the skinning pipe 310 is reduced for the flowable mixture, the pressure within the flowable mixture adjacent the skinning pipe 310 (e.g., the skinning pipe pressure) may be increased. The lower ring 1720 may move, under actuation of an actuator, up and down along the outer surface of the skinning pipe 310, to change the space adjacent the skinning pipe available for the flowable mixture to flow. The lower ring 1720 may prevent the flowable mixture from leaking from a gap between the lower ring 1720 and the skinning pipe 310, which may be a tight fit that may be less than 0.003 inches on radius. The manifold 305 may include one or more plugs 1725. Each plug 1725 may be disposed adjacent the inlet 1700 and configured to prevent the flowable mixture from leaking from the inlet 1700.

Figure 36:
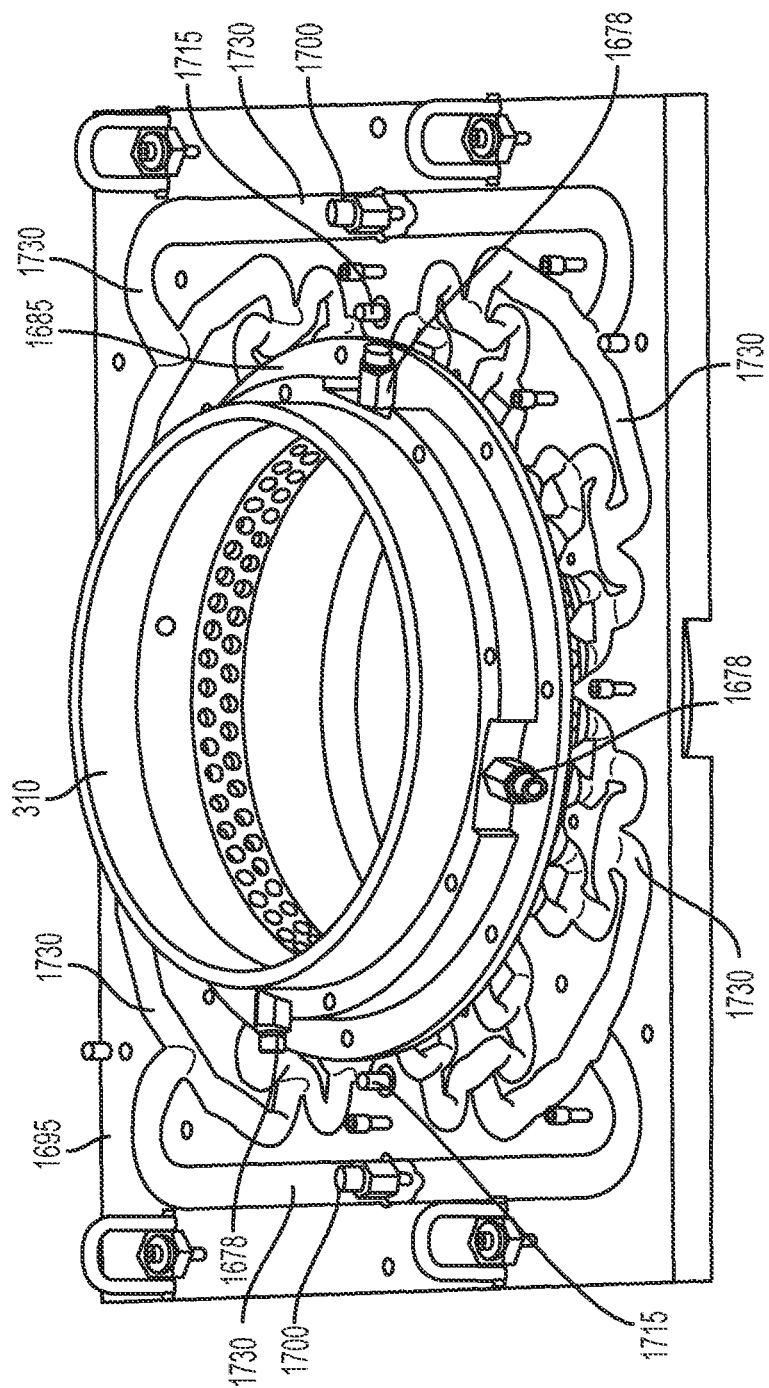
FIG. 36 is a perspective view of the exemplary manifold assembly with upper manifold piece removed.

FIG. 36 shows an isometric view of the exemplary manifold 305 with the upper manifold piece 1690 removed. FIG. 36 shows the manifold 305 with the upper manifold piece 1690 removed to expose the lower manifold piece 1695. The lower manifold piece 1695 may include a plurality of grooves or channels 1730 formed thereon. The upper manifold piece 1690 may likewise include grooves or channels that match the grooves 1730 of the lower manifold piece 1695. When the lower manifold piece 1695 and the upper manifold piece 1690 are joined together, the grooves on the respective manifold piece may form complete channels for the flowable mixture to flow. The grooves 1730 may include a plurality of bifurcated sub-grooves, forming a plurality of distribution channels for distributing the flowable mixture to the skinning pipe 310. The flowable mixture may enter the manifold from the inlets 1700, and flow through the grooves 1730, and then through the holes 1683 of the wall 1680 into the annular gap between the article and the inner surface of the wall 1680.

Pressure Relief System

Figure 37:
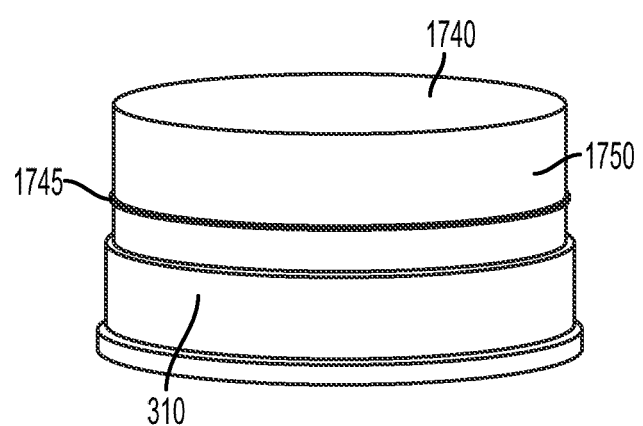
FIG. 37 is a perspective view of an exemplary skinned article with a "ring" type defect.

FIG. 37 shows an at least partially skinned article 1740 with a ring defect 1745 on a skin 1750. The ring defect 1745 on the skin is a ring of extra flowable mixture. The ring defect 1745 may be caused by a sudden pressure change in the skinning pipe 310. For example, such a defect may occur when the skinning system 300 is halted and the pump 235 is stopped and/or the delivery valve 245 has been closed. Such a defect may also occur when there is no pressure relief (or release) mechanism actuated or activated to reduce the pressure within the manifold 305 and/or the skinning pipe 310. In such situations, the residual pressure remaining within the internal passages (e.g., grooves 1730) of the manifold 305 may continue to push the flowable mixture out of the top of the skinning pipe 310, creating the ring defect 1745. To address this problem, the disclosed manifold 305 may include a pressure relief system configured to effectively prevent sudden pressure changes that lead to the formation of ring defects 1745.

Figure 38:
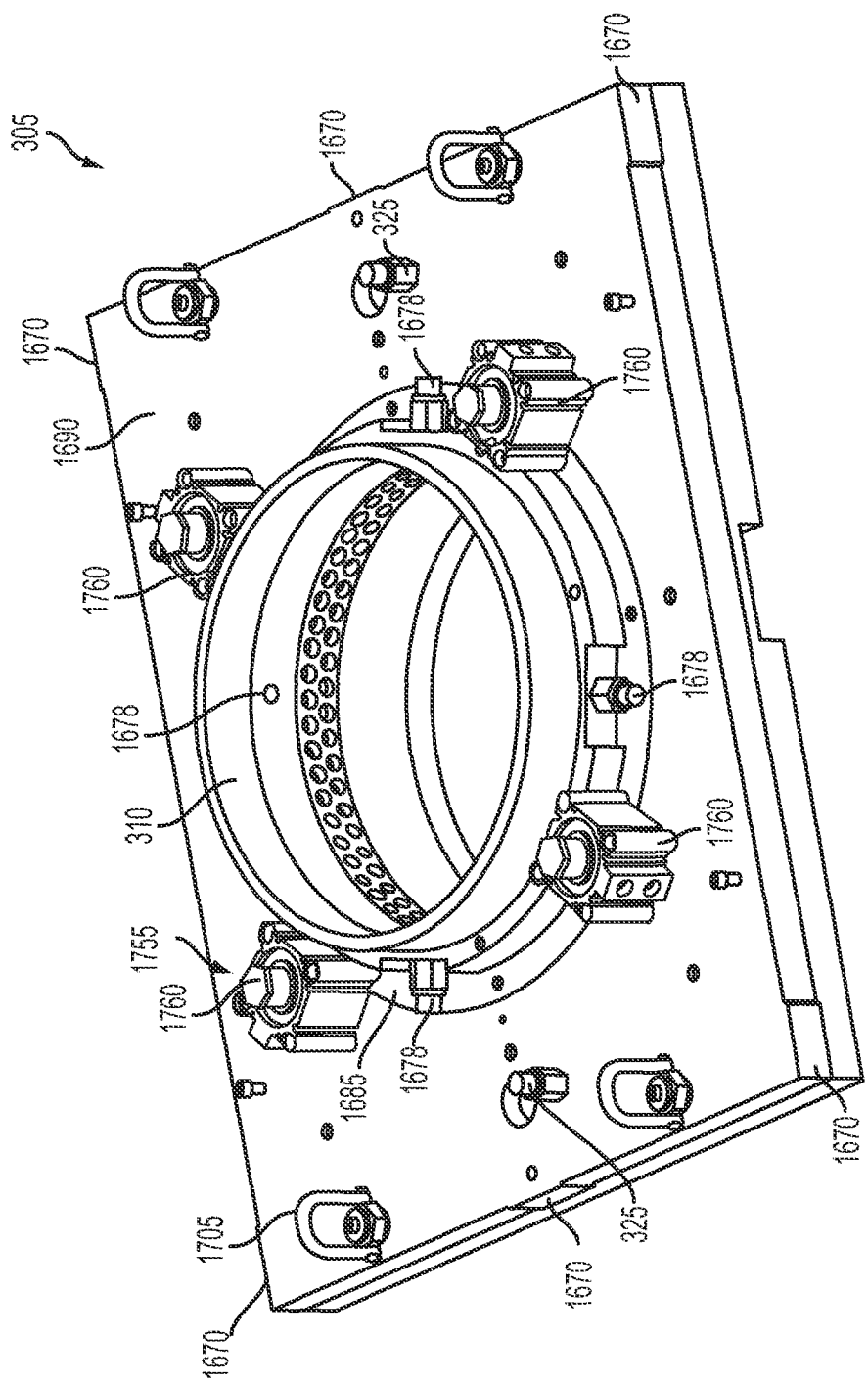
FIG. 38 is a perspective view of the exemplary manifold assembly.

FIG. 38 shows an isometric view of the exemplary manifold 305 having a pressure relief system 1755 (or pressure adjustment system 1755). The pressure relief system 1755 may include one or more actuators 1760 (also referred to as pressure release actuators 1760). In the embodiment shown in FIG. 38, the pressure relief system 1755 includes four pressure release actuators 1760. Other suitable numbers (e.g., one, two, three, five, six, etc.) of pressure release actuators 1760 may be used.

Figure 39:
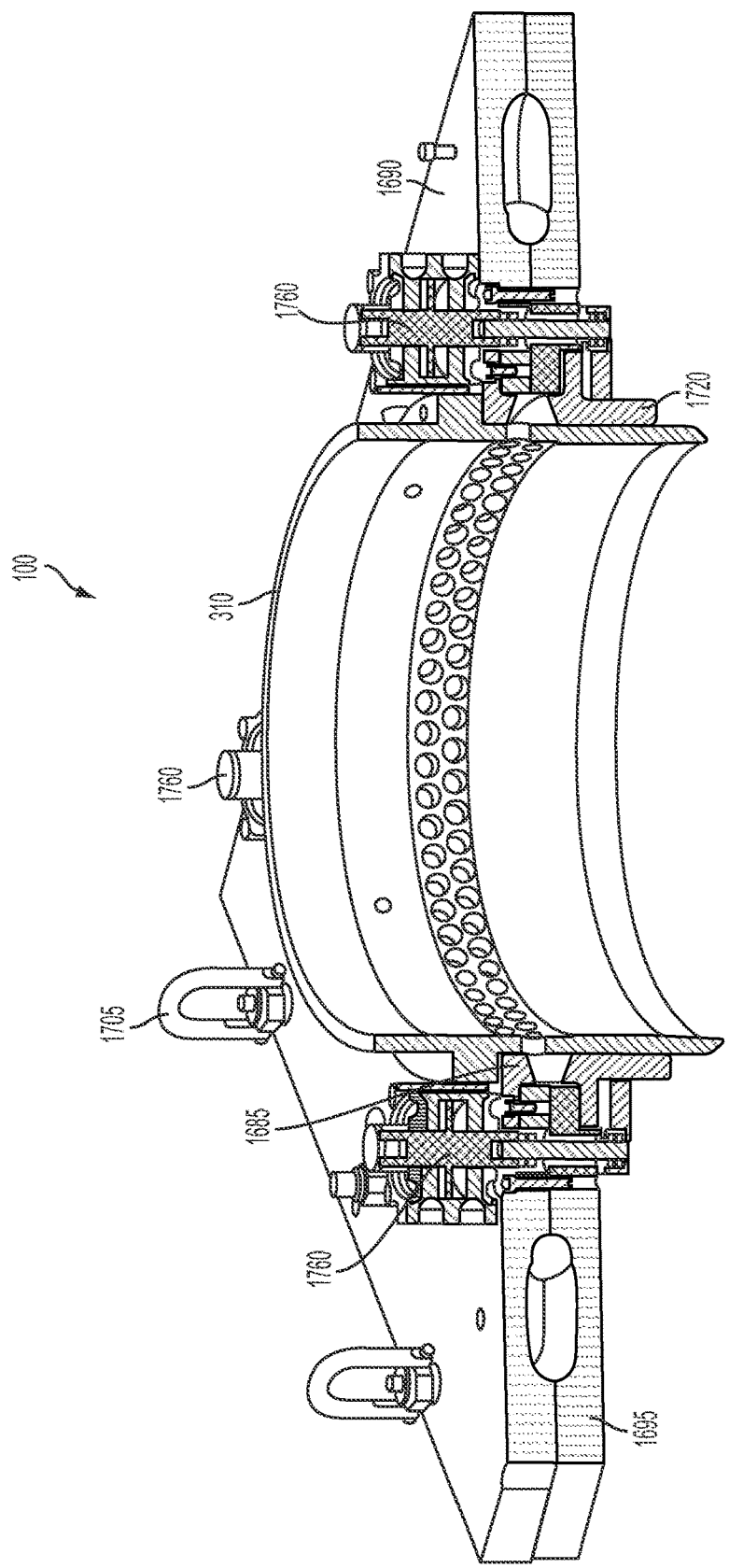
FIG. 39 is a perspective cross-section view of the exemplary manifold assembly.

FIG. 39 shows an isometric cut-away view of the exemplary manifold 305 with the pressure release actuators 1760. The cut-away view may be taken along any straight line connecting two pressure release actuators 1760 shown in FIG. 38. FIG. 39 shows the locations of the pressure release actuators 1760 and the lower ring 1720.

Figure 40:
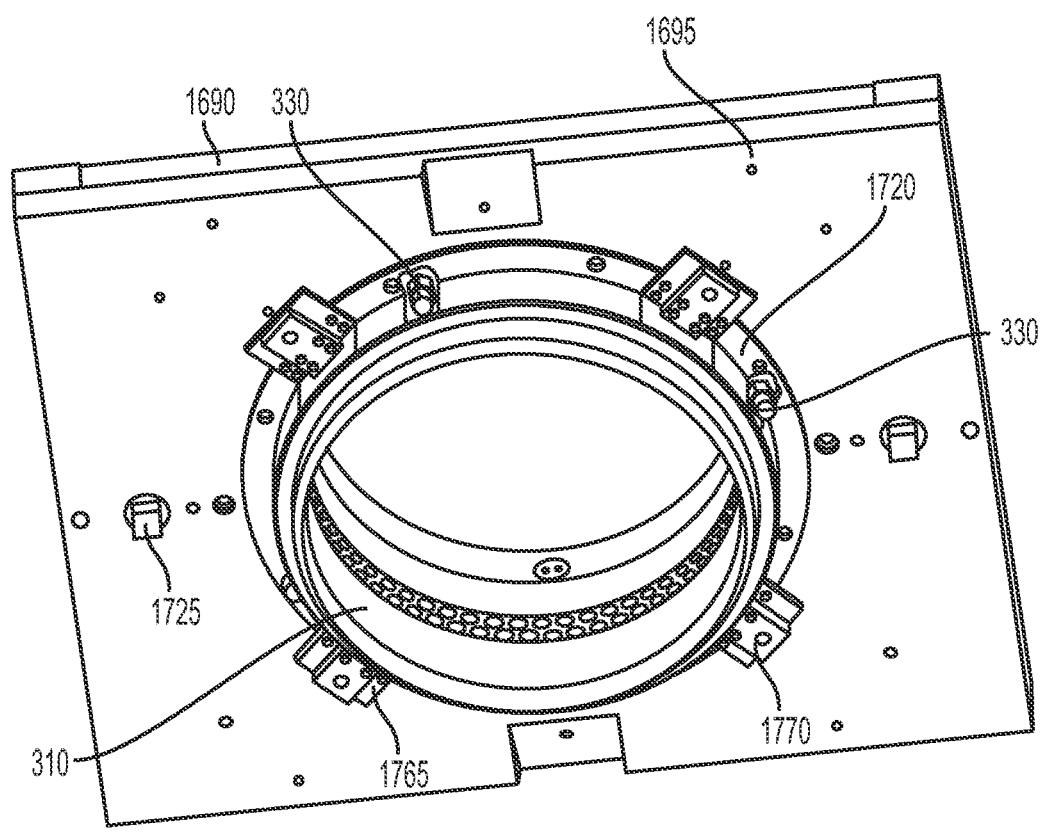
FIG. 40 is an underside perspective view of the exemplary manifold assembly.

FIG. 40 shows an isometric bottom view of the exemplary manifold 305. FIG. 40 shows the bottom configuration of an exemplary manifold 305. FIG. 40 shows the location of the plugs 1725. FIG. 40 also shows the locations of the pressure sensors 330 (also shown in FIG. 1). The pressure sensors 330 may be mounted to the lower ring 1720, which surrounds the lower portion of the skinning pipe 310. In some embodiments, the pressure sensors 330 may be mounted to the lower manifold piece 1695. In the embodiment shown in FIG. 40, there are six pressure sensors 330. Other numbers (e.g., one, two, three, four, five, seven, etc.) of pressure sensors 330 may be used.

The pressure sensors 330 may be configured to measure a pressure of the flowable mixture adjacent the skinning pipe 310. The pressure may be measured at a manifold exit or an inlet of the skinning pipe 310 that is in fluid communication with the manifold exit. The inlet of the skinning pipe 310 for the flowable mixture refers to a location at the interface of the manifold 305 and the skinning pipe 310, where the flowable mixture flows from the manifold 305 to the skinning pipe 310. The inlet of the skinning pipe may be adjacent the wall 1680 of the skinning pipe 310. The pressure measured by the pressure sensors 330 may be interchangeably referred to as the skinning pipe pressure, the pressure of the skinning pipe, the unipipe pressure, the pressure of the unipipe, the pressure of the pipe, or the pipe pressure. The skinning pipe pressure may reflect the pressure of the flowable mixture within the manifold 305 before the flowable mixture enters the inner space of the skinning pipe 310 through the holes 1683. The pressure relief system 1755 may be configured to adjust the pressure of the flowable mixture adjacent the skinning pipe 310 (e.g., adjust the skinning pipe pressure).

As shown in FIG. 40, the manifold 305 may include one or more upper receivers 1765. In the embodiment shown in FIG. 40, four upper receivers 1765 are included. Other suitable numbers (e.g., one, two, three, five, six, etc.) of upper receivers 1765 may be used. The manifold 305 may include one or more lower receivers 1770. In the embodiment shown in FIG. 40, four lower receivers 1770 are included. Other suitable numbers (e.g., one, two, three, five, six, etc.) of lower receivers 1770 may be used. The upper receivers 1765 and the lower receivers 1770 may be part of the pressure relief system 1755. The upper receivers 1765 may be located above the lower receivers 1770.

Figure 41:
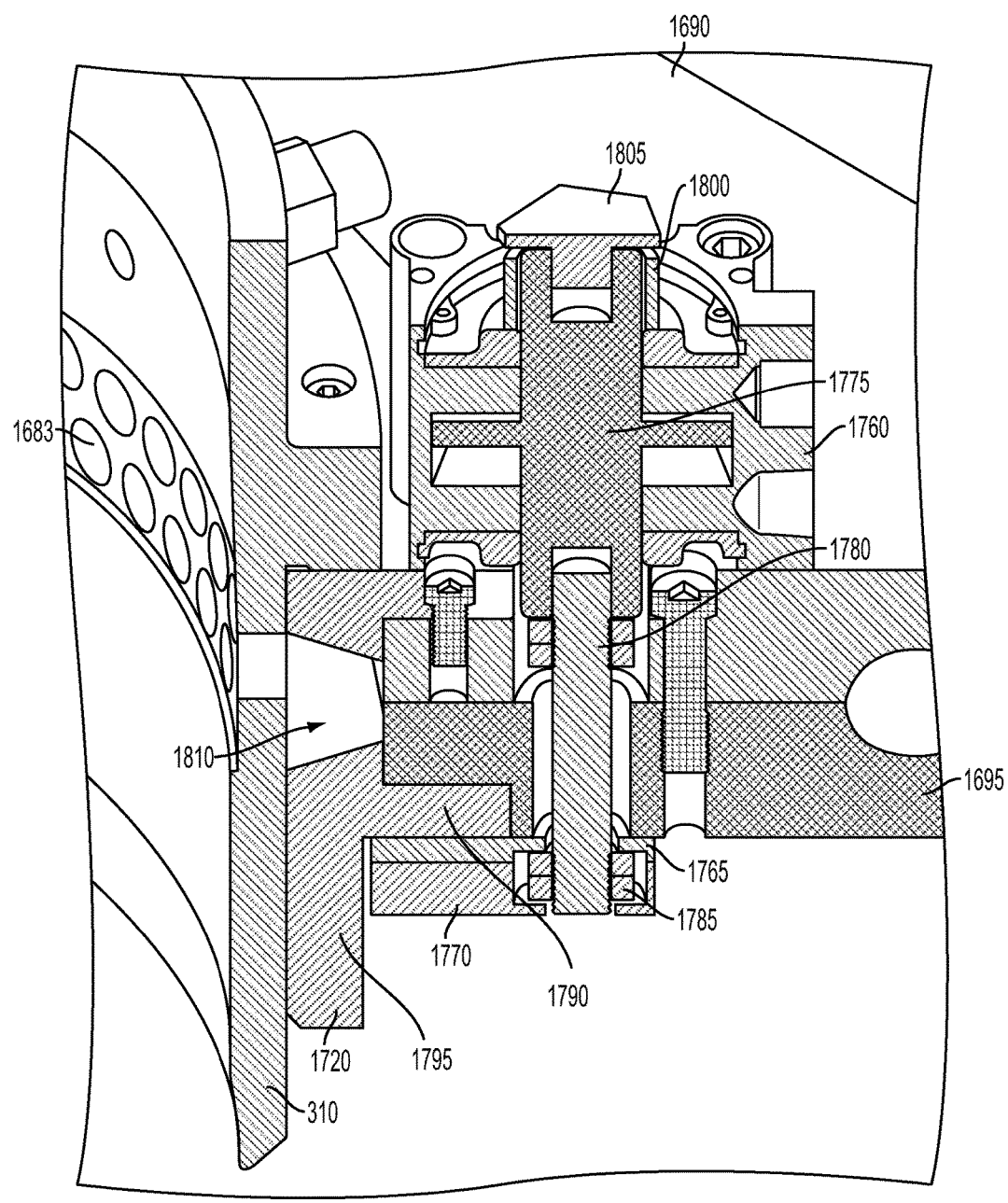
FIG. 41 is a perspective cut-away view of a portion of the exemplary manifold assembly.

FIG. 41 shows an isometric cut-away view of the exemplary manifold 305 with the skinning pipe 310 and the pressure release actuator 1760. The pressure release actuator 1760 may be any suitable actuator configured to actuate or move the lower ring 1720. In some embodiments, the pressure release actuator 1760 may be a pneumatic cylinder type actuator. For example, the pressure release actuator 1760 may include a pneumatic cylinder (e.g., an air cylinder) 1775.

The air cylinder 1775 may be mechanically connected with an upper end of a threaded rod 1780. The lower end of the threaded rod 1780 may extend into a cavity formed by the upper receiver 1765 and the lower receiver 1770. One or more locking nuts 1785 may be mounted to the lower end of the threaded rod 1780 within the cavity formed by the upper receiver 1765 and the lower receiver 1770. Both the upper receiver 1765 and the lower receiver 1770 may be mounted to the lower ring 1720. For example, the upper receiver 1765 may be mounted to a horizontally extended portion 1790 of the lower ring 1720, e.g., through screws or other fastening means. The lower receiver 1770 may be mounted to a vertically extended portion 1795 of the lower ring 1720, e.g., through screws or other connecting means.

The pressure release actuator 1760 may be other type of actuators for moving the lower ring 1720. For example, the pressure release actuator 1760 may not include an air cylinder, but instead, may include an electrical servo motor driven actuator. In some embodiments, the lower ring 1720 may be moved up and down in an abrupt manner. In some embodiments, the lower ring 1720 may be moved up and down smoothly.

Referring to FIG. 41, the pressure release actuator 1760 may include a stroke adjustment spacer 1800 disposed surrounding a top end of the air cylinder 1775. The stroke adjustment spacer 1800 may be used to adjust the stroke of the air cylinder 1775. The distance the lower ring 1720 moves may be determined by the length of the stroke adjustment spacer 1800. The pressure release actuator 1760 may also include a stop nut 1805 located at a top end of the air cylinder 1775. The stop nut 1850 may hit upon the stroke adjustment spacer 1800, and be stopped by the stroke adjustment spacer 1800.

The lower ring 1720 may be coupled to a space 1810 formed adjacent the skinning pipe 310, through which the flowable mixture flows to the holes 1683 in the skinning pipe 310. The space 1810 is shown to have a trapezoidal shape in the cut-away view shown in FIG. 41. In some embodiments, the space 1810 may have any other suitable shape, such as, for example, triangle, rectangle, square, circle, ellipse, polygon, etc. In some embodiments, the space 1810 may be part of the manifold 305.

The space 1810 available for the flowable mixture to flow may be adjusted by the lower ring 1720 as the lower ring 1720 moves up and down along the outer surface of the skinning pipe 310. When the lower ring 1720 moves down, the volume of the space 1810 available for the flowable mixture to flow may be increased, thereby reducing the pressure of the flowable mixture (e.g., the skinning pipe pressure) before the flowable mixture flows through the holes 1683. When the lower ring 1720 moves up, the volume of the space 1810 available for the flowable mixture may be reduced, thereby increasing the pressure of the flowable mixture before the flowable mixture flows through the holes 1683. The space 1810 may be in fluid communication with other parts of the internal passages (e.g., grooves 1730) for flowing the flowable mixture. Thus, changing the volume of the space 1810 may also change the total volume of the internal passages available for the flowable mixture to flow, thereby affecting the pressure within the internal passages of the manifold 305.

Referring to FIG. 41, in some embodiments, the pressure relief system 1755 may be configured such that when it moves the lower ring 1720 up, the volume of the space 1810 (and hence the volume of the internal passages) may be increased, thereby reducing the skinning pipe pressure. When the pressure relief system 1755 moves the lower ring 1720 down, the volume of the space 1810 (and hence the volume of the internal passages) may be reduced, thereby increasing the skinning pipe pressure. In some embodiments, the pressure relief system 1755 may be configured such that when it moves the lower ring 1720 up, the volume of the space 1810 (and hence the volume of the internal passages) may be reduced, thereby increasing the skinning pipe pressure. When the pressure relief system 1755 moves the lower ring 1720 down, the volume of the space 1810 (and hence the volume of the internal passages) may be increased, thereby reducing the skinning pipe pressure.

Referring to FIG. 41, during operations, the air cylinder 1775 may move up and down under air pressure, causing the connected threaded rod 1780 to move up and down. When the threaded rod 1780 moves up, the locking nuts 1785 may strike the upper receiver 1765, causing the lower ring 1720 to move up due to the connection between the upper receiver 1765 and the horizontally extended portion 1790. When the threaded rod 1780 moves down, the locking nuts 1785 may strike the lower receiver 1770, causing the lower ring 1720 to move down due to the connection between the lower receiver 1770 and the vertically extended portion 1795.

In some embodiments, when the skinning process has been stopped (e.g., a sudden system shut down), the pressure relief system 1755 may be activated to increase the space 1810 adjacent the skinning pipe 310 (e.g., by moving the lower ring 1720 down), thereby reducing the pressure of the internal passages (e.g., grooves) through which the flowable mixture flows. This may prevent the flowable mixture from bleeding at the exit of the skinning pipe 310 and creating a ring defect 1745 on the article that is still disposed within the skinning pipe 310 when the skinning process is stopped. This may also eliminate the need for an operator to enter the skinning cell and wipe off the excess flowable mixture from the exit of the skinning pipe 310.

Figure 42:
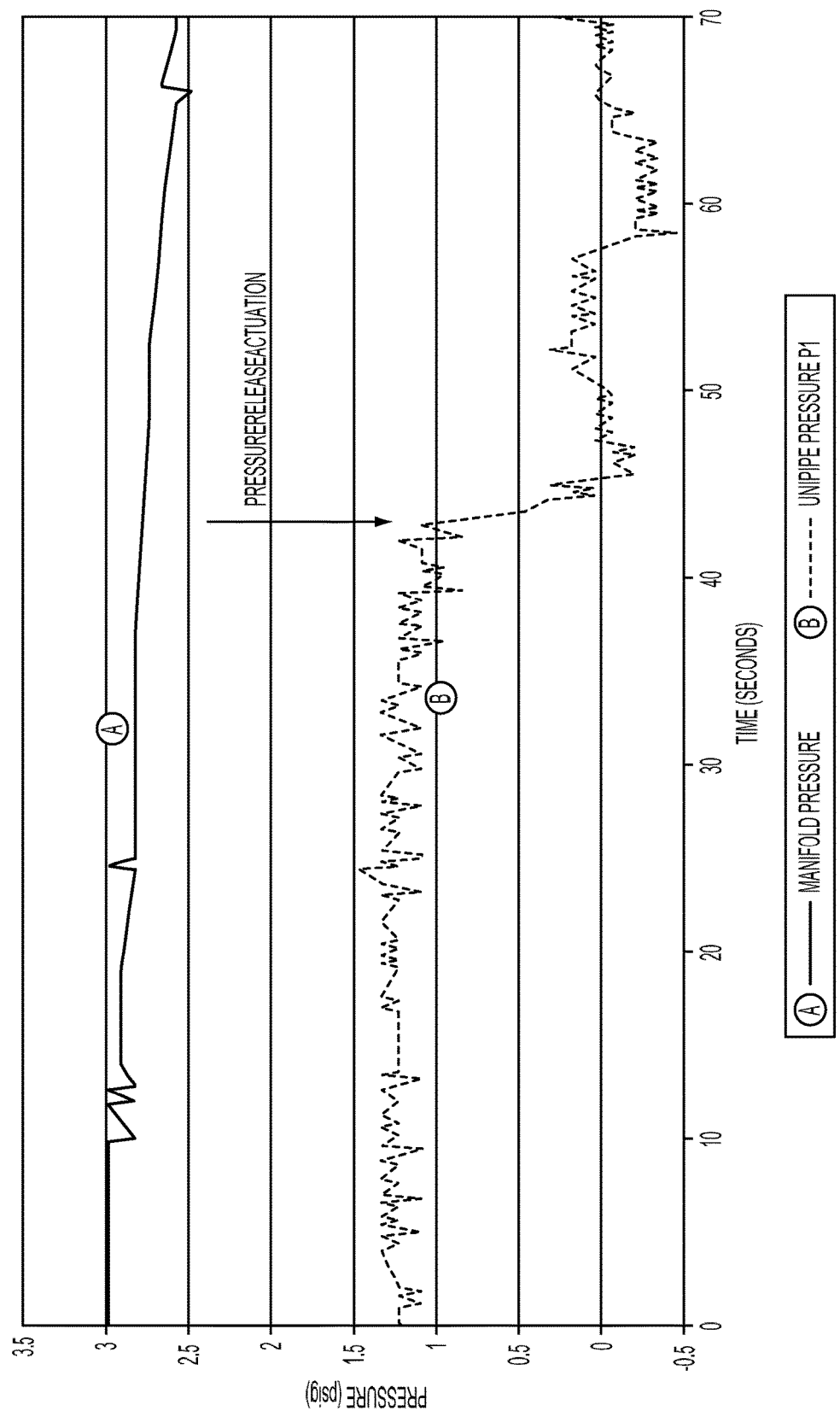
FIG. 42 is a graph of measured effect of an exemplary pressure relief system.

FIG. 42 shows the pressure relief effect of the exemplary pressure relief system 1755. FIG. 42 shows a plot of measured manifold pressure values and skinning pipe pressure values as a function of time. The curve labeled "A" corresponds to the manifold pressure. The manifold pressure may be measured by one or more of pressure sensors 325, which may be located the inlets 1700 or ahead of the cement distribution grooves 1730. The curve labeled "B" corresponds to the skinning pipe pressure (or unipipe pressure). The skinning pipe pressure may be measured by one or more of the pressure sensors 330 shown in FIG. 40. The pump 235 in the mixture delivery system 200 was shut off five minutes prior to time zero. The residual pressures remain in the two locations where the pressure sensors 325 are located, due to the nature of the flowable mixture (e.g., cement) to retain pressure locally within an enclosed volume even if the source of the pressurization is stopped.

As shown in FIG. 42, the skinning pipe pressure in the region closest to the article remains at approximately 1.2 psig until the pressure relief system 1755 was actuated at a time corresponding to 43 seconds on the plot. The skinning pipe pressure then dropped to approximately zero psig. Because the skinning pipe pressure dropped to zero as soon as the article motion was stopped, no excess cement oozed from the top of the skinning pipe 310. Accordingly, no ring defect 1745 as described in FIG. 37 was created and the article had sufficient skin quality to meet customer requirements. In addition, no excess flowable mixture was left on the top surface of the skinning pipe 310 that would cause "dragging" defects on subsequent articles that were skinned. Also, no operator intervention was needed to clean the excess flowable mixture (e.g., cement) from the top face of the skinning pipe 310 and production could resume without lost time, resulting in improved manufacturing efficiency.

Figure 43:
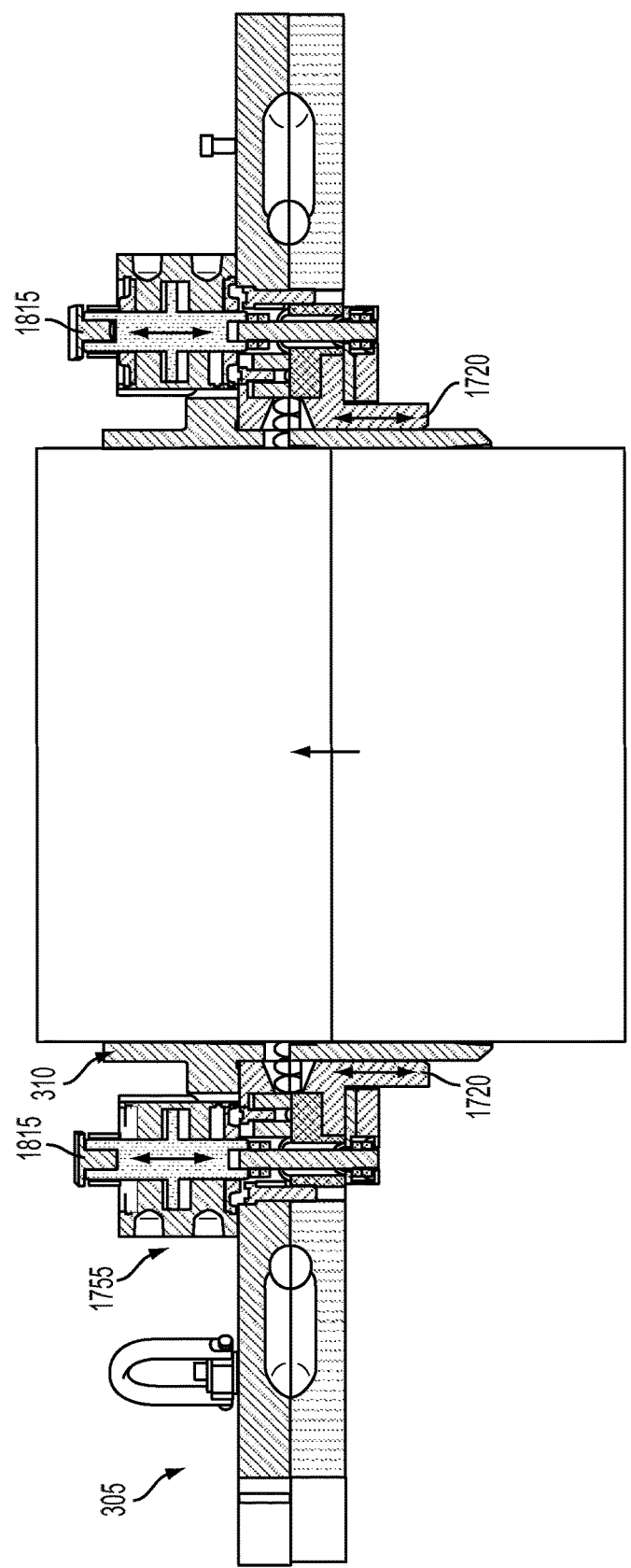
FIG. 43 is cross-sectional view of the exemplary manifold assembly.

FIG. 43 shows a cross sectional view of the exemplary manifold 305 having the pressure relief system 1755. In the embodiment shown in FIG. 43, the pressure relief system 1755 may include one or more electrical servo driven actuators 1815, which may be, for example, ball screw actuators 1815. The ball screw actuator 1815 enables smooth actuation (e.g., movement) of the lower ring 1720. Any other type of suitable actuators that may enable smooth or incremental control the movement of the lower ring 1720 may be used. The smooth actuation of the lower ring 1720 may enable more accurate control of the skinning pipe pressure, thereby improving the skin quality control. The ball screw actuator 1815 may be used in addition to or instead of the air cylinder type pressure release actuators 1760 depicted in FIGS. 38, 39, and 41. In some embodiments, these two types of actuators may be used together. Like the air cylinder type pressure release actuators 1760, the ball screw actuators 1815 may also be used for abrupt type actuation of the lower ring 1720.

Figure 44:
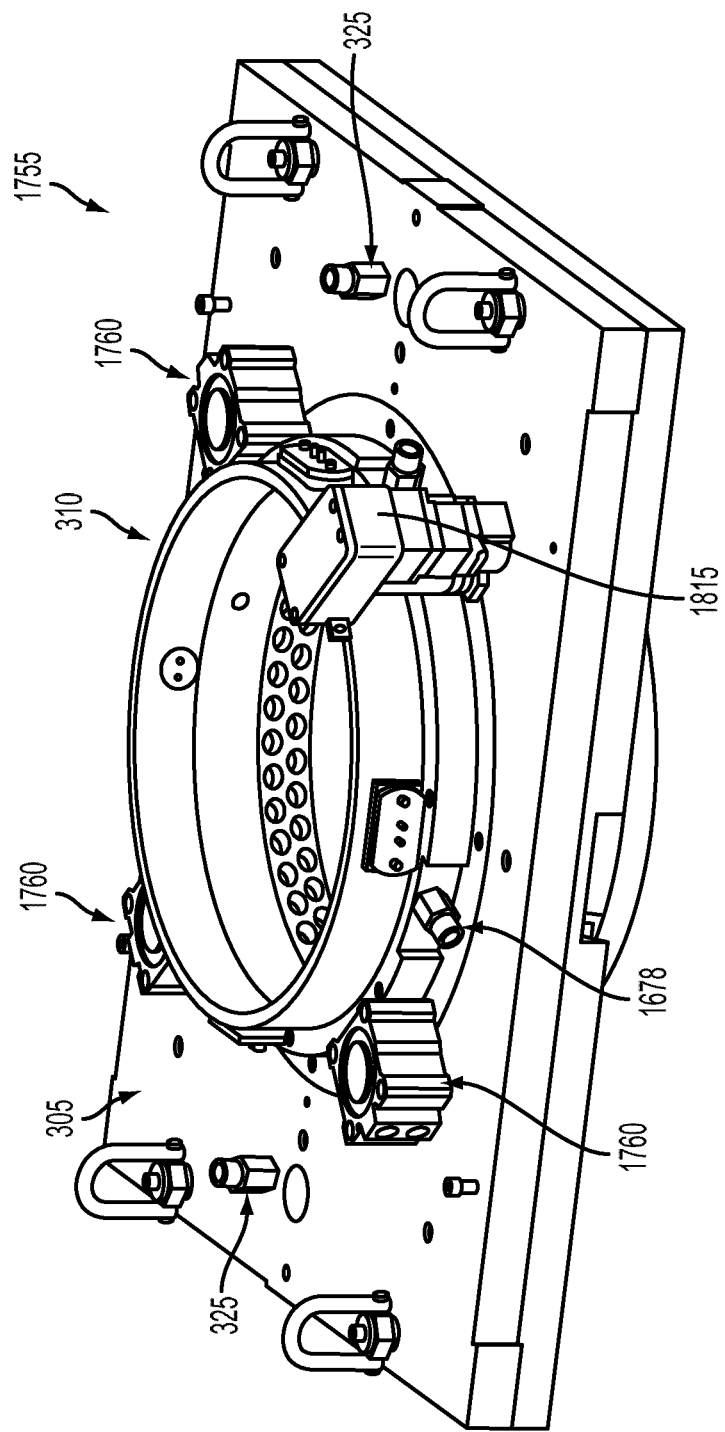
FIG. 44 is a perspective view of the exemplary manifold assembly.

FIG. 44 shows an isometric view of the exemplary manifold 305 with the exemplary pressure relief system 1755. The pressure relief system 1755 may include at least one ball screw type actuator 1815, replacing one air cylinder type pressure release actuator 1760 shown in FIG. 38. More than one ball screw type actuator 1815 may be used to replace more than one air cylinder type pressure release actuator 1760. In some embodiments, the pressure relief system 1755 may use only one ball screw type actuator 1815. In some embodiments, the pressure relief system 1755 may use a combination of one or more ball screw type actuators 1815 and one or more air cylinder type pressure release actuators 1760. In some embodiments, the pressure relief system 1755 may include only one or more ball screw type actuators 1815 (e.g., four ball screw type actuators).

Skin Thickness Sensor

In axial skinning, eccentricity between the article and the skinning pipe 310 may create skin thickness nonuniformity. A system and method is developed to measure the skin thickness at a point around the circumference of the skinning pipe 310 as the article is being skinned. The skin thickness may be used for control of cracks that may occur in the skin during a drying process. A higher skin thickness may result in a greater incidence of cracks. A valving method is also introduced by which the skin thickness measurements may be used as feedback for a control method. Skin thickness may be continuously monitored and measured. The measured skin thickness may also be used as feedback to machines upstream that grind unskinned articles to a specific dimension (e.g., diameter) to produce unskinned articles that will have skin thicknesses that will not experience cracking during the drying process. In addition, by measuring and monitoring the skin thickness as the articles are being skinned in the skinning pipe 310, blockages in the flow of the skinning material through the distribution grooves 1730 in the manifold 305 may be detected, and the skinning process may be stopped to prevent a large number of scrap articles to be produced. The blockages within the manifold 305 may be removed in time.

Figure 45:
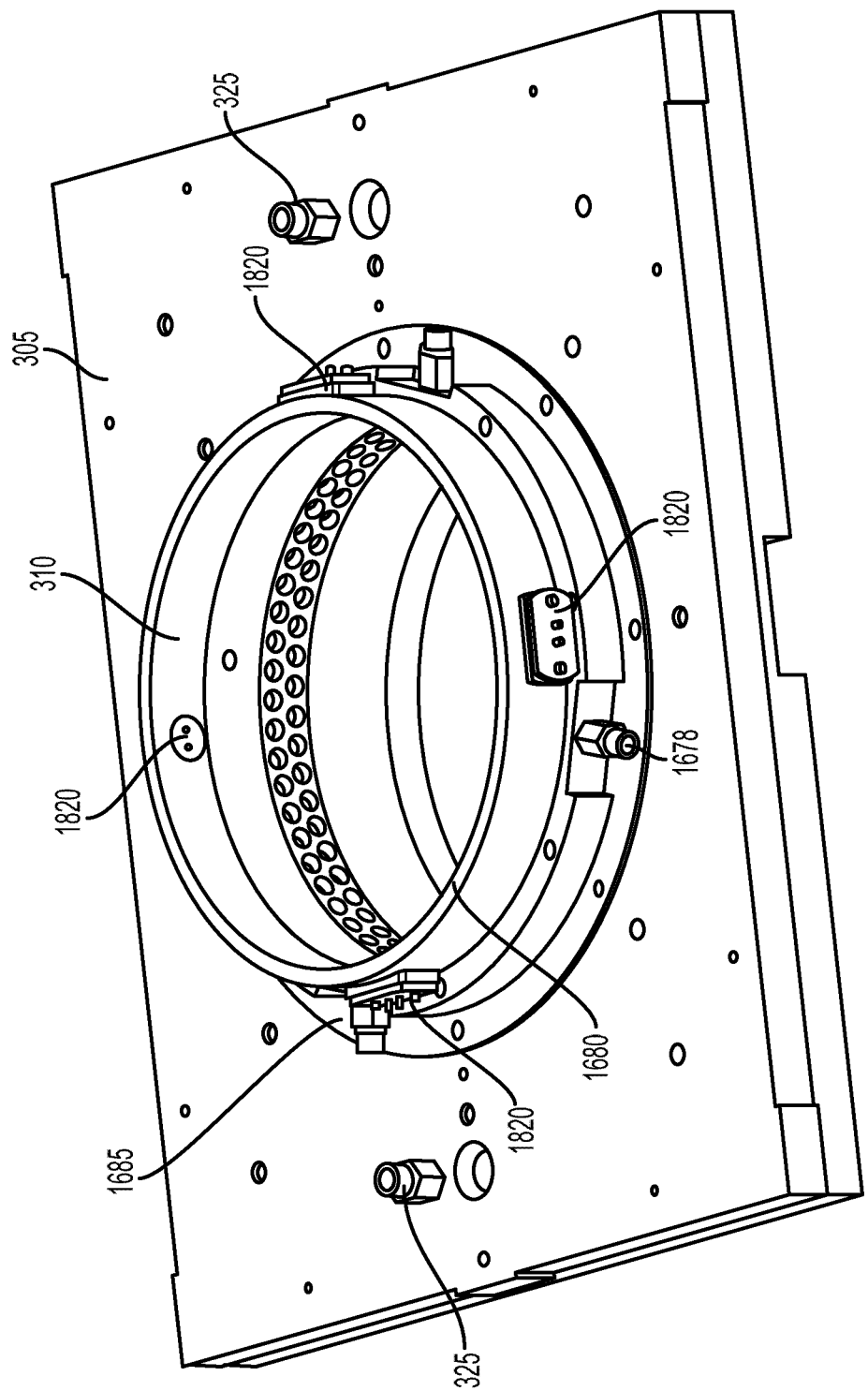
FIG. 45 is a perspective view of the exemplary manifold assembly.

FIG. 45 shows an isometric view of the exemplary manifold 305 having one or more skin thickness sensors 1820. In the embodiment shown in FIG. 45, there are four skin thickness sensors 1820. Other suitable numbers (e.g., one, two, three, five, six, etc.) of skin thickness sensors may also be used. Each skin thickness sensor 1820 may be integrated with the wall 1680 of the skinning pipe 310. For example, the skin thickness sensor 1820 may be mounted to the outer surface of the wall 1680 of the skinning pipe 310, and may penetrate through the wall 1680. One end of the skin thickness sensor 1820 may be located adjacent the inner surface of the wall 1680, as shown in FIG. 45.

Figure 46:
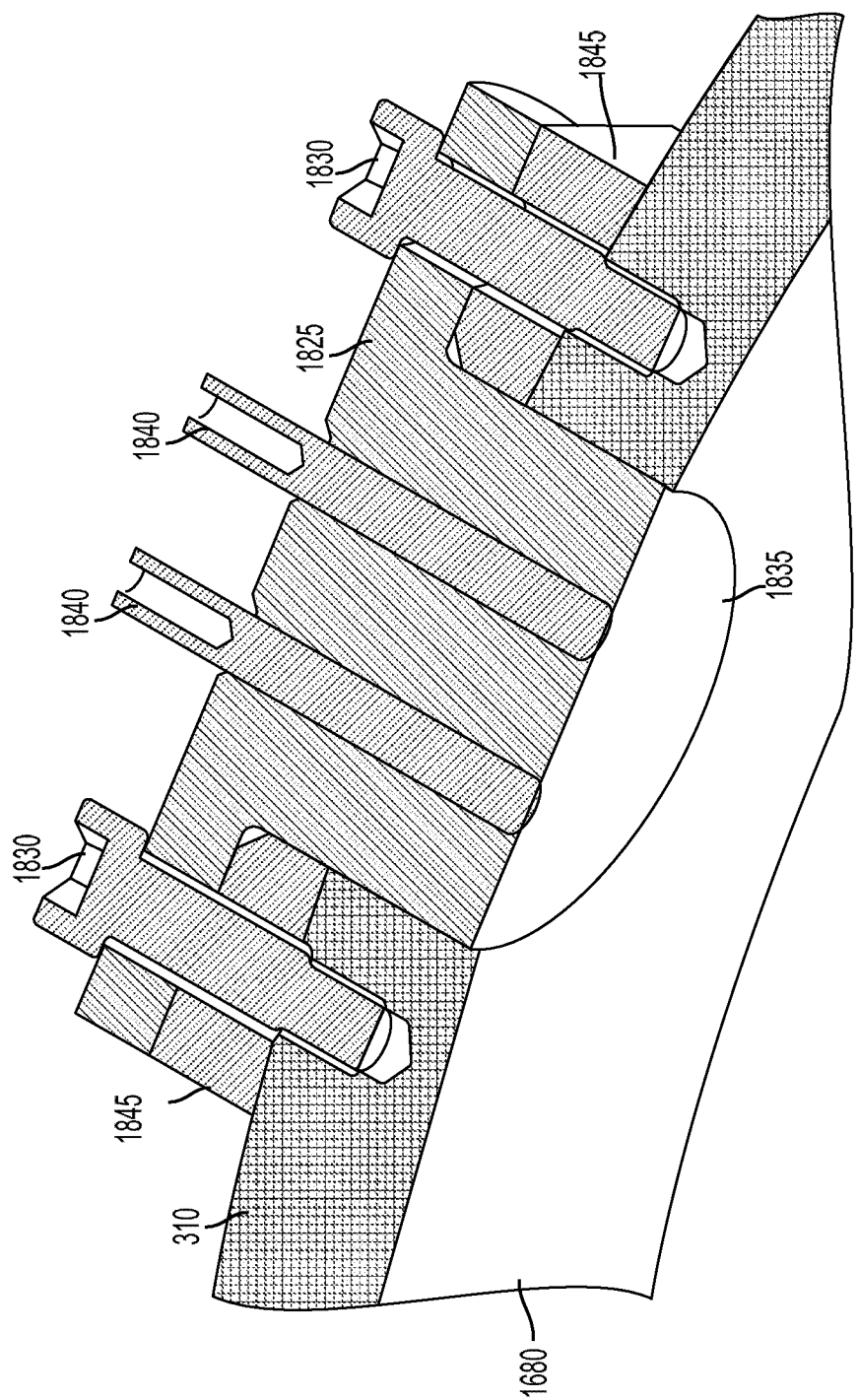
FIG. 46 is a perspective view of an exemplary skinning pipe with mounted skin thickness sensor.

FIG. 46 shows a cross sectional isometric view of the exemplary skinning pipe 310 mounted with the exemplary skin thickness sensor 1820. The skin thickness sensor 1820 may include a probe body 1825 mounted to the outer surface of the wall 1680 of the skinning pipe 310 by one or more suitable fasteners, such as for example, one or more screws 1830. The probe body 1825 may penetrate through the wall 1680 of the skinning pipe 310. One end 1835 of the probe body 1825 may be located adjacent the inner surface of the wall 1680, as shown in FIG. 46.

Figure 48:
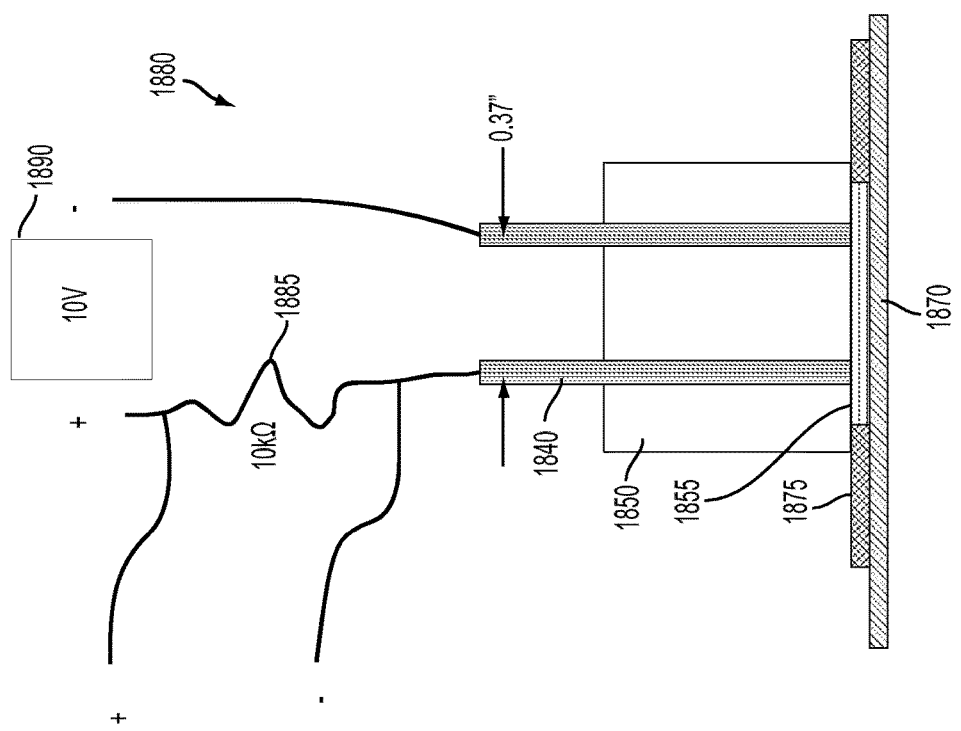
FIG. 48 is a schematic diagram of an exemplary skin thickness sensor bench test circuit.

The skin thickness sensor 1820 may include one or more conductors 1840 (e.g., at least one conductor 1840) connected to a power source and a circuit for supplying a voltage and/or electric current to the skin thickness sensor 1820. Exemplary power source and circuit are shown in FIG. 48. The conductors 1840 may be disposed or housed at least partially within the probe body 1825. The probe body 1825 may include at least one insulating material configured to electrically insulate the conductors 1840 from one another and from the skinning pipe 310. In the embodiment shown in FIG. 46, two conductors 1840 are shown. In some embodiments, one or more than two conductors 1840 may be used.

Referring to FIG. 46, end portions of the conductors 1840 may be located adjacent the inner surface of the wall 1680. As a skinned article moves along the inner space of the skinning pipe 310 and passes the end portions of the conductors 1840, the end portions of the conductors 1840 may be in contact or nearly in contact with the skin (e.g., the coated flowable mixture), yet does not introduce any defect or marks on the skin. Through the conductors 1840 and the power source in the circuit, a current maybe applied to the skin (e.g., flowable mixture) on the skinned article. The current may flow through one of the conductors 1840, the skin, and to another one of the conductors 1840. As a result, some characteristics of the circuit may be changed due to the current flowing through the skin. The changing characteristics of the circuit may be used to calculate the thickness of the skin based on a known relationship between the characteristics and the thicknesses of the skin.

The skin thickness sensor 1820 may include one or more spacers 1845 located between the probe body 1825 where the screws 1830 are located, and the outer surface of the wall 1680. The spacers 1845 may include a curved surface configured to match the curvature of the curved wall 1680, thereby making the skin thickness sensor 1820 better secured to the curved wall 1680.

FIGS. 47A and 47B schematically show the exemplary skinning pipe 310 mounted with the exemplary skin thickness sensor 1820. FIG. 47A shows a top view (viewed from the side of the skinning pipe 310 in a direction perpendicular to the surface of the skin thickness sensor 1820 shown in FIG. 44), and FIG. 47B shows a cross sectional view (viewed from the top of the skinning pipe 310).

The skin thickness sensor 1820 may include an insulator 1850, which may be any suitable insulator, such as for example, a ceramic insulator, a plastic insulator, etc. The insulator 1850 may surround the conductors 1840 and may form the probe body 1825 shown in FIG. 46. As shown in FIG. 47B, as an article 1860 with a skin 1855 (i.e., skinning material or flowable mixture 1855) moves upward out of the skinning pipe 310, the skin thickness sensor 1820 may be activated (e.g., by the skinning control system 410) to apply a voltage and/or current to the skin 1855 through the conductors 1840. The conductors 1840 may be connected to a circuit having at least one power source for applying the current. The current may flow through the skin 1855 and the circuit. One or more characteristics of the circuit may change as current is applied to the skin having different thicknesses. Based on a predefined, established, or calibrated relationship between the circuit characteristics and the skin thicknesses, the actual skin thickness may be calculated using the skin thickness sensor 1820 and the measured circuit characteristics.

FIG. 48 shows an exemplary bench test prototype 1865 that may be used to establish, calibrate, or predefine a relationship between a circuit characteristic and the skin thicknesses. The test prototype 1865 may include a plastic insulator 1870. A plastic shim 1875 may be stacked on the plastic insulator 1870. The plastic shim 1875 may include a portion filled with the skinning material (e.g., flowable mixture) 1855. The insulator 1850, which may be a plastic insulator, may be placed on to the plastic shim 1875. The insulator 1850 may include two conductors 1840 disposed therein. The conductors 1840 may be surrounded by the insulator 1850. The conductors 1840 may be copper tubes, or may include any other conductive materials.

The conductors 1840 may be connected to a circuit 1880 having a circuit portion 1885, which may include a resistor. The circuit 1880 may also include a power source 1890 (e.g., a voltage and/or current source 1890), which may be a battery or a power supply unit. The resistor may have any suitable value, such as, for example, 10 k Ohms, 100 k Ohms, 1 k Ohms, etc. The resistor may be connected in series with the conductors 1840. The power source 1890 may apply a voltage and/or current to the circuit 1880 formed by the resistor, the conductor 1840, and the skin material 1855. The voltage across the resistor may be measured, for example, by a voltmeter (not shown). Although a resistor is used as an example of the circuit portion across which a voltage may be measured for determining the thickness of the skin (e.g., flowable mixture applied to the article), the circuit portion 1885 may include additional and/or alternative electric components, such as capacitors. Although the measured voltage may be used for determining the thickness of the skin, a measured charge of a capacitor may also be used for determining the thickness of the skin.

Figure 49:
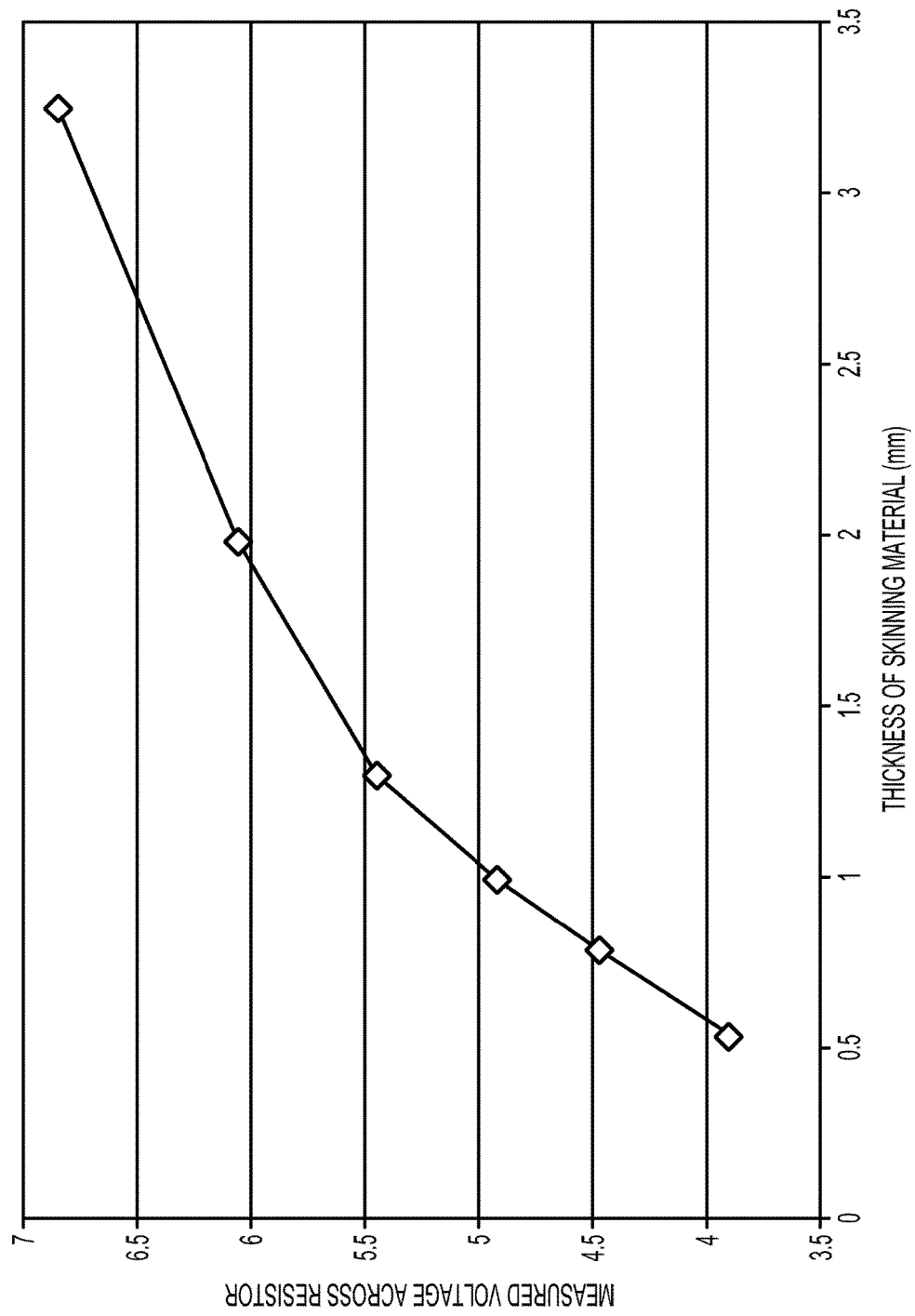
FIG. 49 is a graph of measured voltages versus skin thicknesses.

The measured voltages are plotted against different skin thicknesses, and the relationship is shown in FIG. 49. FIG. 49 shows a relatively linear relationship between the measured voltages across the resistor 1885 and the thickness of the skin material when the thickness of the skin material is less than 1.5 mm. The relationship shown in FIG. 49 may be used, e.g., by the control system or a dedicated controller, for measuring or calculating actual thicknesses of the skin during the skinning process based on voltages measured across resistors in circuits similar to the circuit 1880. Circuits similar to the circuit 1880 shown in FIG. 48 (e.g., including a power source and a resistor) may be connected to the conductors 1840 of the sensor 1820 to measure the skin thickness based on a pre-established or pre-defined relationship between the skin thicknesses and the voltage across the resistor (e.g., such as the relationship shown in FIG. 49). The circuit for applying the current to the skin and for measuring the voltage across the circuit portion (e.g., the resistor) may be included as part of the sensor 1820 or may be separate from the sensor 1820.

Figure 50:
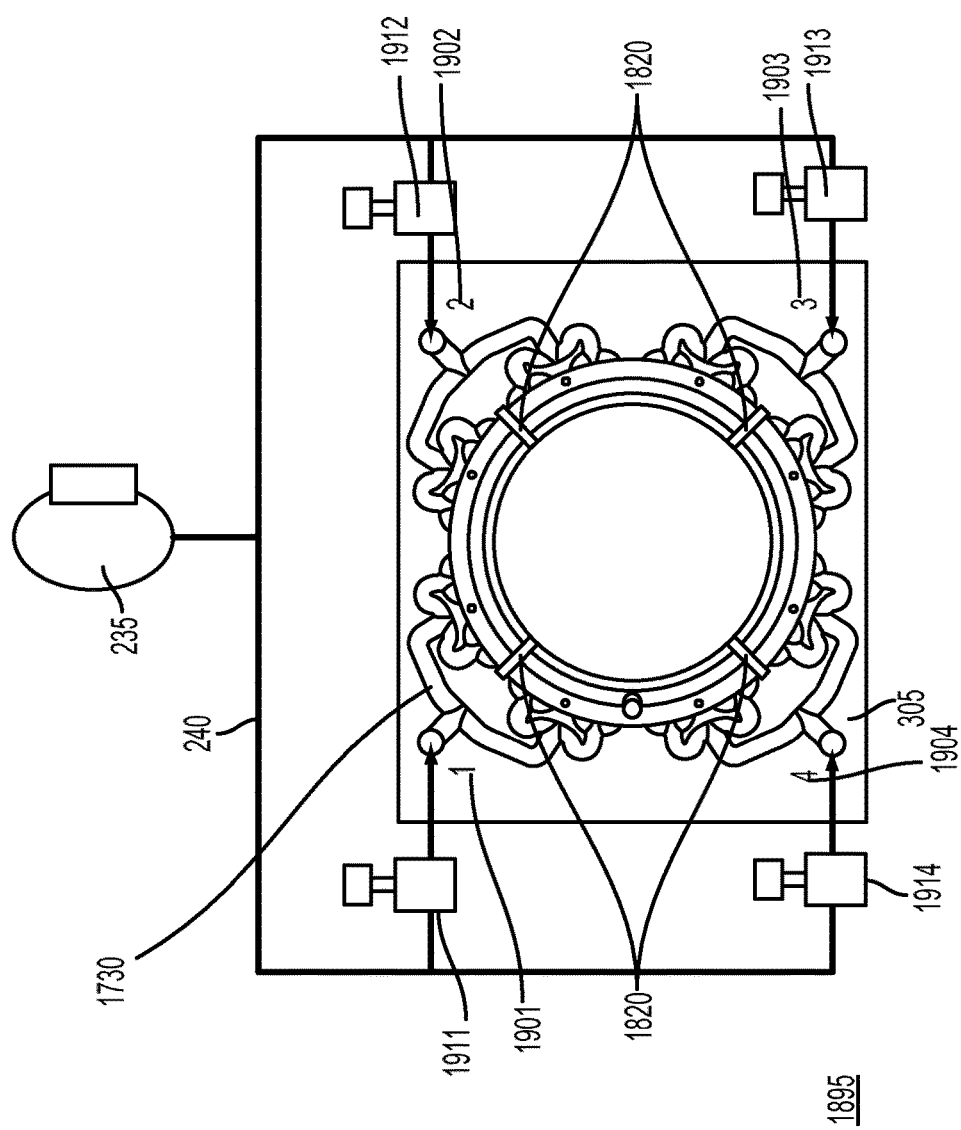
FIG. 50 is a schematic diagram of an exemplary manifold assembly and control system.

FIG. 50 shows a schematic diagram of a system 1895 configured to control flow of flowable mixture based on skin thickness measurements. FIG. 50 schematically shows the manifold 305 with the skinning pipe 310 and distribution grooves 1730 for delivering the flowable mixture to the skinning pipe 310. The manifold 305 may include one or more inlets. For illustrative purposes, FIG. 50 shows four inlets 1901, 1902, 1903, and 1904. The inlets 1901, 1902, 1903, and 1904 are fluidly connected with the delivery line 240 and configured to receive the flowable mixture from the mixture delivery system 200 through the delivery line 240. The pump 235 may pump the flowable mixture to the inlets 1901, 1902, 1903, and 1904 through the delivery line 240. Any number of inlets may be included in the manifold 305, such as, for example, one, two, three, five, six, etc.

As shown in FIG. 50, the system 1895 may include one or more valves disposed upstream of the inlets 1901, 1902, 1903, and 1904 for controlling the flow of the flowable mixture into the inlets. In the embodiment shown in FIG. 50, four valves 1911, 1912, 1913, and 1914 are shown. The number of valves may or may not match the number of inlets. For example, even if there are four inlets, the system 1895 may use only two valves, one for each pair of inlets. When the manifold 305 shown in FIG. 36 is used, which includes two inlets 1700 at two sides, similar configuration may be used for controlling the flow of the flowable mixture into the inlets 1700 based on the measured skin thickness. Four skin thickness sensors 1820 are shown in FIG. 50. Other number (e.g., one, two, three, five, etc.) of skin thickness sensors 1820 may also be used. The system 1895 may enable a feedback control in which the measured skin thickness may be used as real-time feedback to control the article such that it is centrally located within the skinning pipe 310 as it moves through the skinning pipe 310 to receive the flowable mixture, thereby improving the uniformity of the skin thickness.

Figure 51:
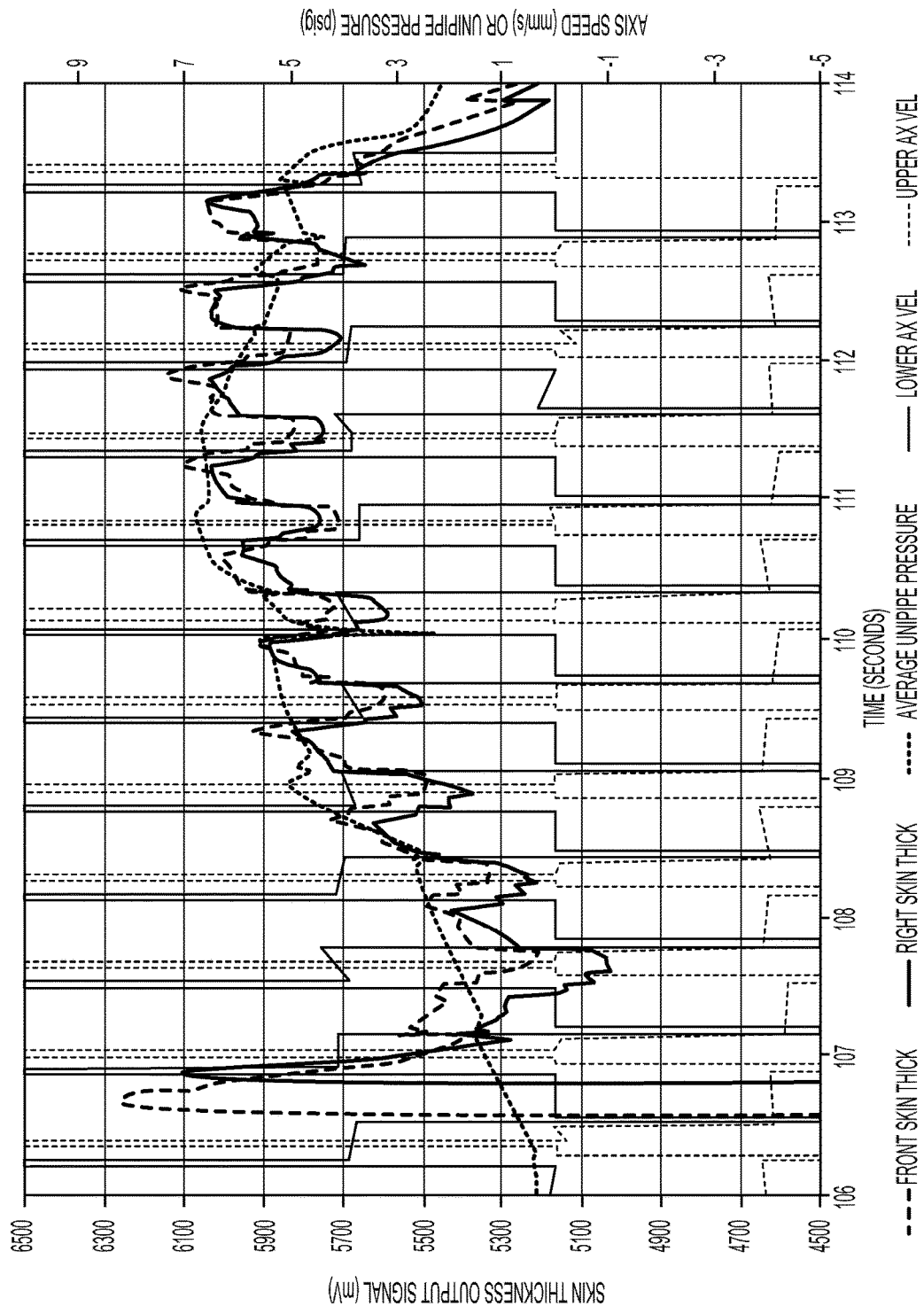
FIG. 51 is a graph of measured skin thickness output signals versus time from two skin thickness sensors.

The measured skin thickness may be used to extract information that may be useful for controlling the mixture delivery system 200 (e.g., the properties of the flowable mixture) and the skinning system 300 (e.g., the skinning process). FIG. 51 shows measured skin thickness output signals versus time from two skin thickness sensors 1820 (e.g., front skin thickness sensor and right skin thickness sensor). The two skin thickness sensors 1820 may be located at different positions (e.g., front and right) of the skinning pipe 310. The skinning pipe pressure (e.g., unipipe pressure) and the position of the lower and upper carriages 1525 and 1540 (which are referred to as the lower and upper axes in FIG. 51) are also plotted for reference.

FIG. 51 shows a strong correlation between skin thickness output signals and average skinning pipe pressure (e.g., unipipe pressure), indicating that the skin thickness sensors 1820 are also able to detect the water content of the flowable mixture (e.g., cement), which may be driven into the article (e.g., a cellular ceramic filter substrate) at a higher rate when the skinning pipe pressure (e.g., unipipe pressure) is higher. FIG. 51 also shows a discernible oscillation in the output signals of the skin thickness sensors 1820, indicating that the alternating nature of vacuum pressure applied to the internal volume of the article also has an impact on the output signals of the skin thickness sensors 1820. This also seems to indicate that the impact of water content in the skin material (e.g., flowable mixture) is a function of the vacuum that is drawing the skin material into the article. Information about the water content in the wet flowable mixture (e.g., cement) as it is being skinned may be used in a process control to be correlated with skin flaws in the skinned articles.

Figure 52:
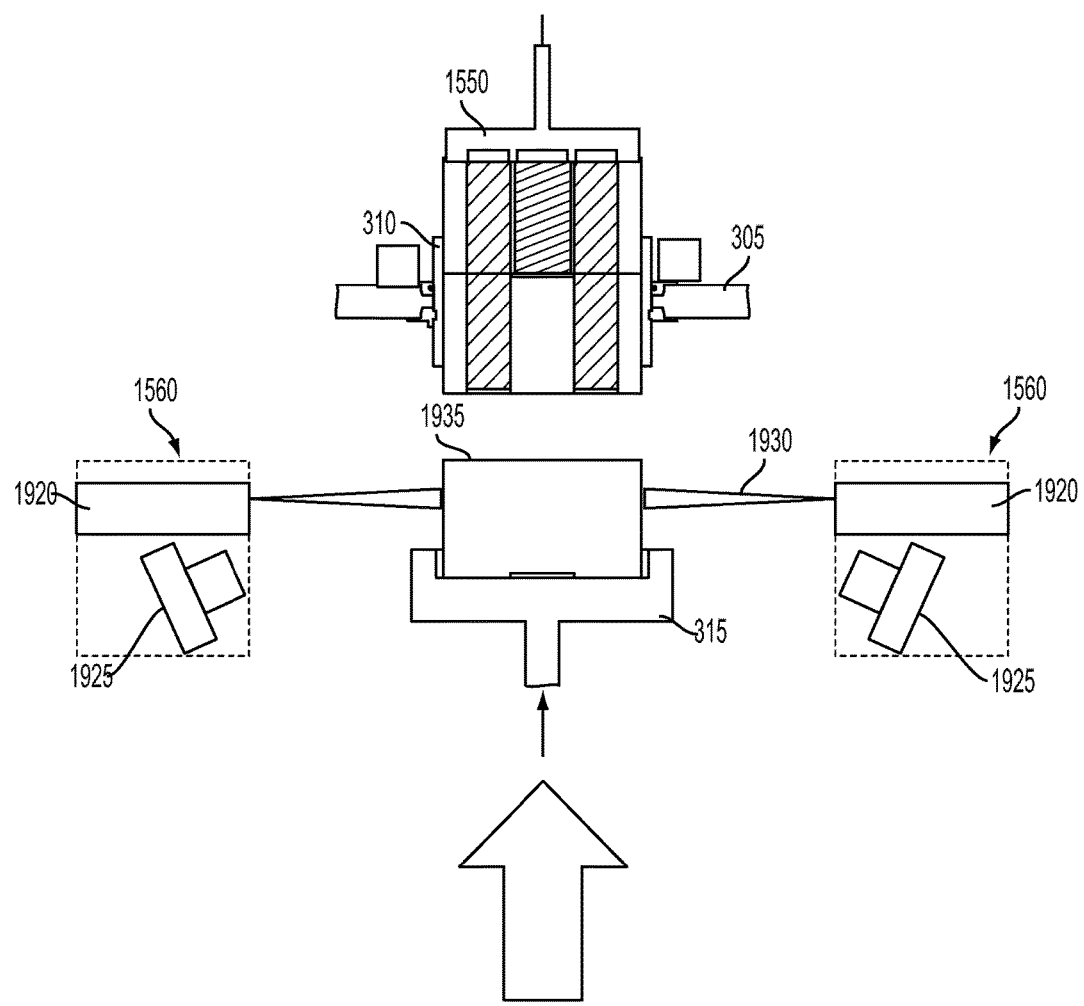
FIG. 52 is a schematic diagram of an exemplary unskinned article dimension measuring device.

FIG. 52 schematically shows the exemplary laser device 1560 for measuring the dimension (e.g., diameter, radius, circumference, axial length, and/or outer peripheral length) of an unskinned article. In one embodiment, the laser device 1560 may be used to measure the diameter of the unskinned article. As shown in FIGS. 26 and 32, the skinning system 300 may include one or more laser devices 1560 configured to measure the dimension of an unskinned article. The laser devices 1560 may be referred to as the dimension measuring laser devices 1560. The laser devices 1560 may be mounted adjacent an inlet of the skinning pipe 310, e.g., under the manifold 305. The schematic diagram of FIG. 52 shows how the laser devices 1560 measure the dimension (e.g., diameter), and does not reflect the actual positions of the laser devices 1560. Two laser devices 1560 are shown for illustrative purposes. Other number (e.g., one, three, four, five, six, seven, eight, etc.) of laser devices 1560 may be used. As shown in FIG. 52, each laser device 1560 may include a laser unit 1920 and an image capturing device 1925. The laser unit 1920 may emit a laser. In some embodiments, the laser unit 1920 may be a line laser scanner, which may emit a line laser 1930 onto an unskinned article 1935. The image capturing device 1925 may be a camera, such as a charge-coupled device (CCD) camera. As the laser unit 1920 emits a line laser onto the surface of the unskinned article 1935, the reflected light may be captured by the image capturing device 1925, which may be processed by a computer software to extract the dimension (e.g., diameter, radius, circumference, axial length, and/or outer peripheral length) information.

Because of the jagged nature of the bare article due to the underlying square or honeycomb matrix, it may be difficult to measure the dimension (e.g., diameter, radius, circumference, axial length, and/or outer peripheral length) at one point. In the present disclosure, a line laser projected on the bare article in combination with a CCD camera 1925 form a profilometer that is able to discern the overall curvature of the article in addition to the peaks and valleys associated with the outer exposed matrix. In some embodiments, the laser unit 1920 and the CCD camera 1925 may be positioned at four locations at 90 degree separations around the bare article. The laser units 1920 may be calibrated using a ground cylinder of precise dimension (e.g., diameter) which is placed in the measurement volume (e.g., on the platen 1515 where the unskinned article 1935 is placed in FIG. 52).

Various algorithms may be developed to extract the article dimension (e.g., diameter, radius, circumference, axial length, and/or outer peripheral length) from the rough contour measurement, one of which involves averaging the height of the peaks and valleys on the rough contour over a series of 5 peaks centered on each laser. After the distance between this average value is subtracted from the 180-degree opposite lasers and the calibration factor is applied, the dimension (e.g., diameter) of the article along that axis will be known. This measurement is simultaneously performed by the pair of laser units 1920 and the CCD cameras 1925 on the orthogonal axis to provide two measurements of dimension (e.g., diameter) simultaneously. This setup may be copied for as many as the number of simultaneous dimension (e.g., diameter) measurements as desired. In some embodiments, the average dimension (e.g., diameter) of the dimensions (e.g., diameters)s measured at the multiple axes may be used as the dimension (e.g., diameter) of the unskinned article.

Because the lasers act at high speed (1 kHz), it is possible to measure the dimension (e.g., diameter, radius, circumference, axial length, and/or outer peripheral length) of the incoming articles at a high rate that would allow feed forward control to be possible. In addition, since the article will be passed through the fixed laser system, it is possible to measure article dimension (e.g., diameter) variation along the length of the article or between articles. This could be valuable in controlling manifold pressure and/or skinning speed within an article as well as between articles. Process variation information may be obtained from the real-time or near real-time dimension (e.g., diameter) data to understand the impact of non-uniformities of the article dimensions (e.g., diameters) on the process parameters, such as skin quality, pressure variation, etc.

In some embodiments, the dimension measuring laser devices 1560 may also be disposed adjacent the outlet of the skinning pipe 310 where the skinned articles move out of the skinning pipe 310. The dimensions (e.g., diameter, radius, circumference, axial length, and/or outer peripheral length) of the skinned articles may also be measured by the dimension measuring laser devices 1560. Alternatively or additionally, the defect monitoring and/or detecting laser devices 1555 may be configured to also measure the dimensions (e.g., diameters) of the skinned articles, in addition to or instead of monitoring and/or detecting the defect. Combining the incoming unskinned article dimension (e.g., diameter) measurement with the skinned articles may also provide real-time or near real-time measurement of skin thickness since the incoming unskinned and skinned article dimensions (e.g., diameters) are measured continuously.

Referring to FIG. 52, the skinning control system 410 may receive signals from the laser device 1560 and may calculate or determine the dimension (e.g., diameter, radius, circumference, axial length, and/or outer peripheral length) from the received signals. The received signals may include a signal indicating the distance between the laser head of the leaser unit 1920 and the lateral surface of the unskinned article 1935. Because the distance between the two laser devices 1560 is known, the dimension (e.g., diameter) of the unskinned article 1935 may be calculated or determined based on the distance between the laser head of the laser unit 1920 and the lateral surface of the unskinned article 1935.

Figure 53:
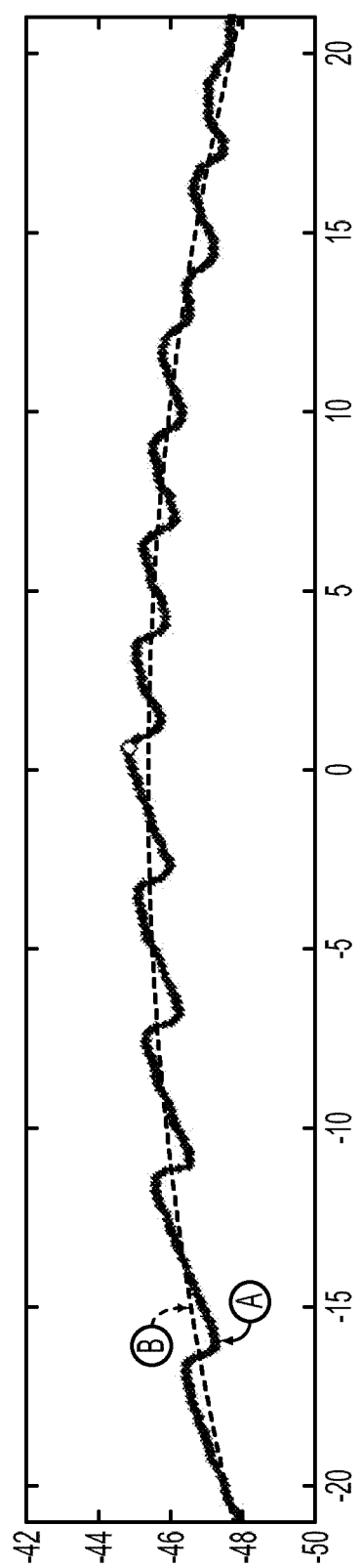
FIG. 53 is a graph of exemplary signals for measuring an unskinned article dimension.

FIG. 53 shows exemplary signals received from the laser devices 1560 for determining the dimension (e.g., diameter) of the unskinned articles. FIG. 53 shows line laser measurement of unskinned article contour before the unskinned article 1935 enters the skinning pipe 310. The x-axis (horizontal) is the distance in the width direction of the line laser (e.g., the circumferential direction of the unskinned article 1935). The y-axis (vertical) is the relative distance from the laser head of the laser unit 1920. The "0" position is at the laser head of the laser unit. Thus, the distance in the y-axis is negative. The jagged line marked with "A" is the measurement signal obtained by the laser device 1560. The line is jagged because the surface of the unskinned article 1935 is not smooth (as it has not been coated with the skin). The line marked with "B" is a curve used to fit the jagged line "A."

The dimension (e.g., diameter) of the unskinned article 1935 may be estimated or calculated either from the curve fitted line "B" and/or from the jagged line "A." For example, the average relative distance value (along the y-axis) of the curve fitted line "B" over a region along the x-axis, such as the entire region of [−20, 20] or a region of [−5, 5] in the x-axis, may be used to calculate the dimension (e.g., diameter) of the unskinned article 1935. Another method that may be used to calculate the dimension (e.g., diameter) is to take a region, e.g., [−5, 5] in the x-axis, and calculate the average relative distance value of the peaks and valleys within the selected region. The average relative distance may be used to further calculate the dimension (e.g., diameter) of the unskinned article 1930.

Figure 54:
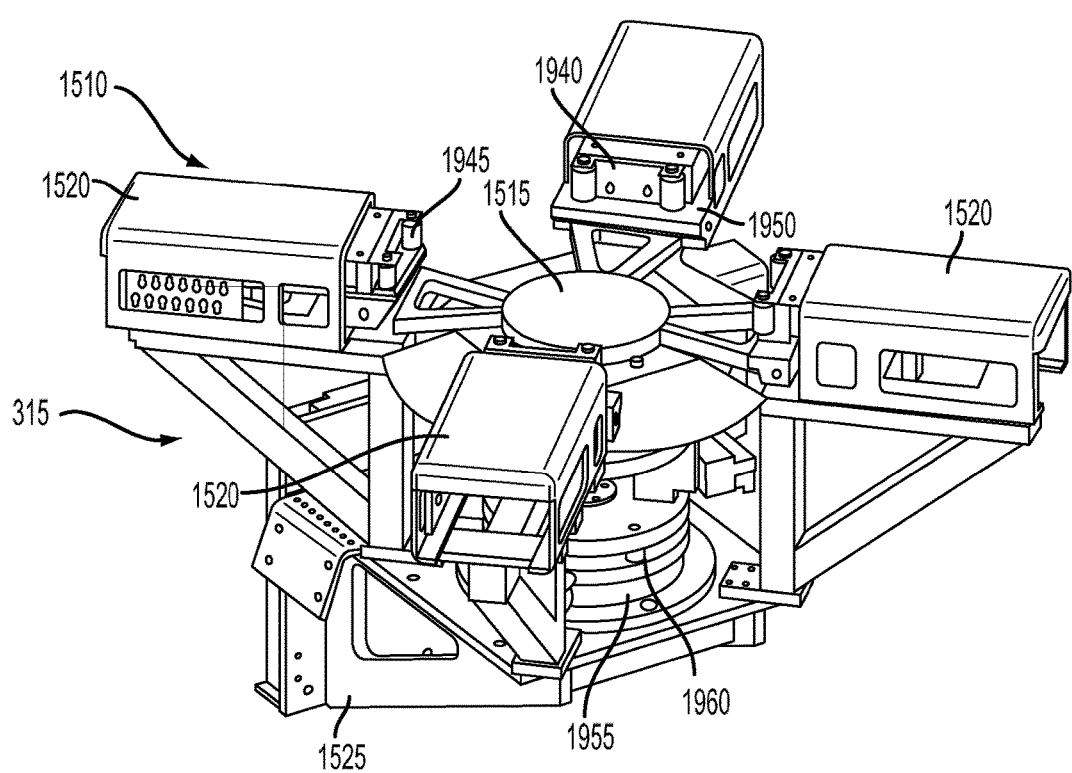
FIG. 54 is a perspective view of an exemplary article feeding mechanism.

FIG. 54 is an isometric view of the exemplary article feeding mechanism 315. The article feeding mechanism 315 may include a centering mechanism 1510. The centering mechanism 1510 may include a plurality of centering devices 1520. Although four centering devices 1520 are shown in FIG. 54, the centering mechanism 1510 may include any suitable number of centering devices 1520, such as, for example, one two, three, five, six, eight, etc.

Each centering device 1520 may include a centering actuator 1940, and one or more rollers 1945. Although FIG. 54 shows two rollers 1945 for each centering device 1520, the centering device 1520 may include any suitable number of rollers 1945, such as, for example, one, three, four, etc. The centering actuator 1940 may be stroke forward to center the article with respect to the central machine axis (e.g., the central axis of the skinning pipe 310).

The centering device 1520 may include at least one air knife 1950. The air knife 1950 may be configured to blow air toward the platen 1515 to blow off any debris from the platen 1515 before an unskinned article is loaded onto the platen 1515. The air knife 1950 may also blow air toward the unskinned article when the unskinned article is loaded onto the platen 1515 to blow off debris from the unskinned article.

The article feeding mechanism 315 may include an alignment base 1955 mounted on the lower carriage 1525. One or more force sensors 1960 (e.g., at least one second force sensor 1960) may be disposed at suitable locations in the article feeding mechanism 315 or on the lower carriage 1525. The force sensors 1960 may be configured to measure forces (e.g., a second force) experienced by the lower carriage 1525 during the skinning process. In some embodiments, three force sensors 1960 may be used. Other number of force sensors 1960 may also be used, such as, for example, one, two, four, etc.

Figure 55:
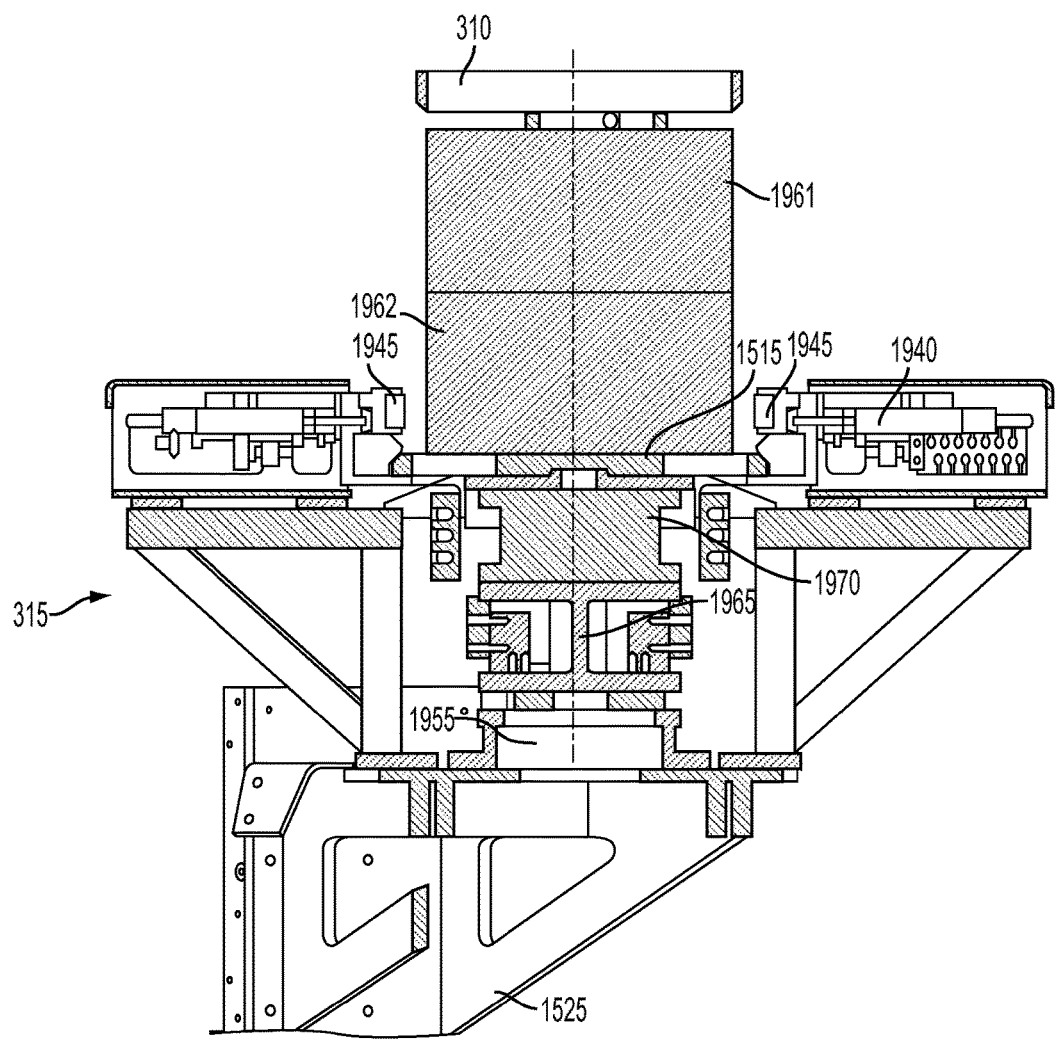
FIG. 55 is a cross-section view of the exemplary article feeding mechanism.

FIG. 55 is a schematic cross sectional view of the exemplary article feeding mechanism 315 shown in FIG. 54. The article feeding mechanism 315 may include a flexure shaft 1965 and a spacer 1970. The flexure shaft 1965 may be disposed above the alignment base 1955 and below the spacer 1970. The spacer 1970 may be disposed below the platen 1515.

Figure 56B:
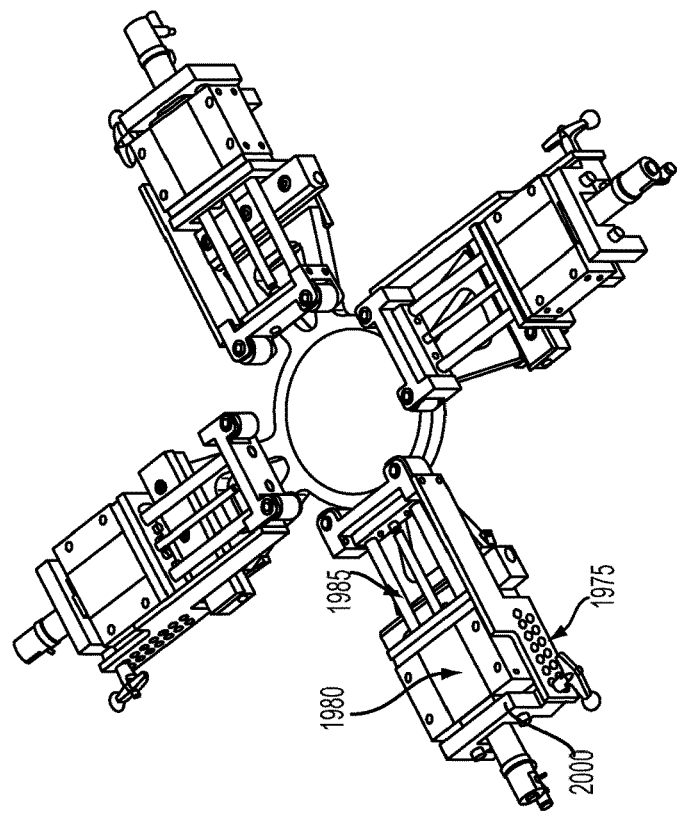
FIGS. 56A-56B are perspective views of an exemplary article centering mechanisms.
Figure 56A:
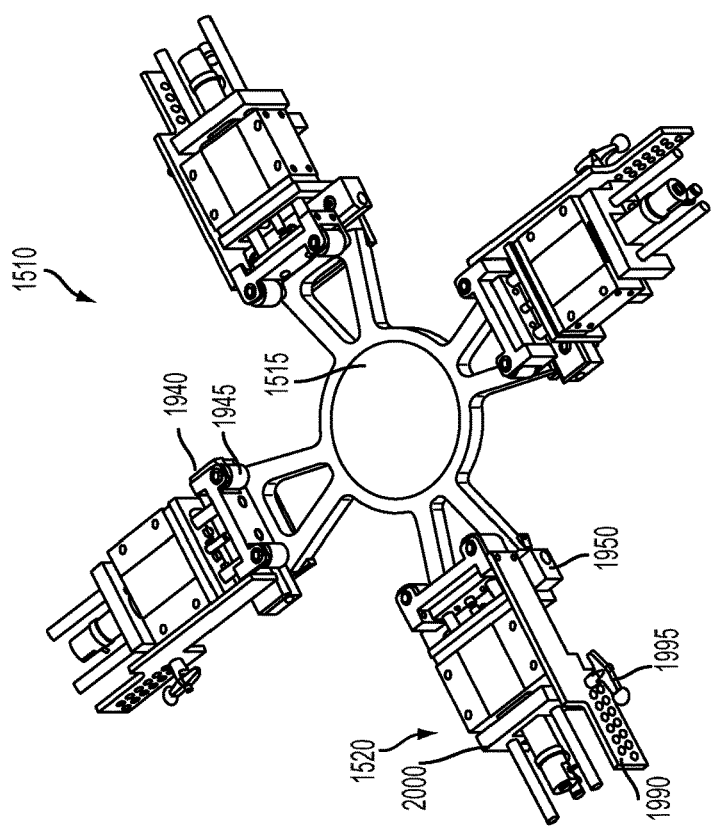

FIGS. 56A and 56B shows isometric views of the centering mechanism 1510. When an unskinned article is loaded on the platen 1515, the centering actuator 1940 may only have limited movement toward the center of the platen 1515 when centering the unskinned article. Thus, when the dimension (e.g., diameter) of the unskinned article is changed, e.g., from 13 inches in diameter to 7 inches in diameter, the positions of the centering actuator 1940 need to be adjusted accordingly. At least one adjusting mechanism 1975 may be included in each centering device 1520. The adjusting mechanism 1975 may automatically adjust the position of the centering actuator 1940 (e.g., moves the centering actuator 1940 closer to or away from the platen 1515 when the dimension of the unskinned article has changed). The adjusting mechanism 1975 may also be manually operated to adjust the position of the centering actuator 1940.

FIGS. 56A and 56B show a manual adjustment configuration of the adjusting mechanism 1975. FIG. 56A shows the position of the centering actuators 1940 for centering an article with a larger dimension (e.g., 13-inch diameter) and FIG. 56B shows the position of the centering actuators 1940 for centering an article with a smaller dimension (e.g., 7-inch diameter). The adjusting mechanism 1975 may include a support 1980 with at least one guide hole within its body. The centering actuator 1940 may be mounted on one or more rods 1985. The adjusting mechanism 1975 may include a locating plate 1990 having a plurality of holes, and a locating pin 1995 configured to engage with one of the plurality of holes on the locating plate 1990.

Referring to FIGS. 56A and 56B, the rods 1985, the centering actuator 1940, and the locating plate 1990 may move together. The rods 1985 may be inserted into the guide holes of the support 1980, and may slide along the guide holes such that the position of the centering actuator 1940 may be adjusted relative to the platen 1515. The locating plate 1990 may be connected with the centering actuator 1940 and the rod 1985. The locating plate 1990 may be moved to adjust the position of the centering actuator 1940 relative to the platen 1515. To secure the desired position of the centering actuator 1940, the locating pin 1995 may be inserted into one of the plurality of holes located on the locating plate 1990 and a hole provided on a bracket 2000 that is mounted to the support 1980. The number of holes on the locating plate 1990 may be designed based on the dimensions (e.g., diameters) of the articles to be skinned. Incremental holes may be included in the locating plate 1990 such that the position of the centering actuator 1940 relative to the platen 1515 may be incrementally adjusted (e.g., one inch at a time) to accommodate different dimensions (e.g., diameters) of the articles.

Figure 57B:
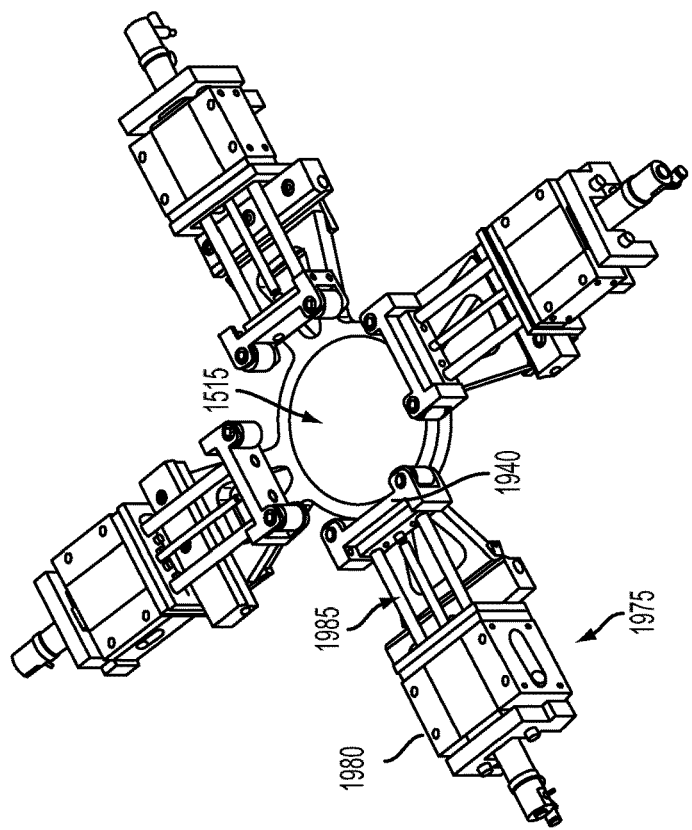
FIGS. 57A-57B are perspective views of the exemplary article centering mechanisms.
Figure 57A:
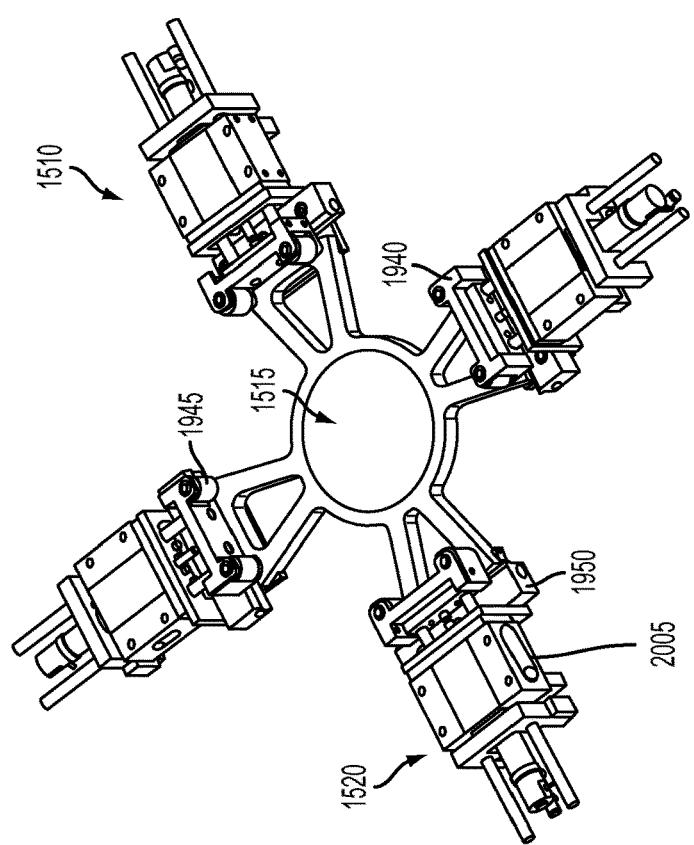

FIGS. 57A and 57B show isometric views of the centering mechanism 1510. In this embodiment, the position of the centering actuator 1940 may be adjusted automatically by the adjusting mechanism 1975. Instead of using locating plate 1990, locating pin 1995, and the bracket 2000 to adjust the position of the centering actuator 1940, the centering actuator 1940, along with the rod 1985, may be driven by a motor 2005, such that the rod 1985 moves along the guide holes of the support 1980. The motor 2005 may be coupled to the support 1980. In some embodiments, the motor 2005 may be disposed within the support 1980, or may be mounted to the support 1980.

The centering actuator 1940 may be mounted to the rod 1985. The motor 2005 may be controlled, e.g., by the skinning control system 410, to move the rod 1985 along the guide holes within the support, thereby adjusting the position of the centering actuator 1940 relative to the platen 1515. The automatic adjustment may save time and labor cost associated with manual adjustment. The motor 2005 may be controlled (e.g., by the skinning control system 410) to adjust the position of the centering actuator 1940 incrementally (e.g., by 0.1 inch, 0.5 inch, 1 inch, etc.) so that more precise adjustment may be achieved.

The centering mechanism 1510 of the present disclosure (e.g., shown in FIGS. 56A-57B) may enable precise article centering of crude articles, such as, for example, ceramic diesel substrates that may have relatively large shape variations when compared to an ideal cylinder. In some embodiments, when the articles to be skinned are in cylindrical shapes, the centering mechanism 1510 may include four quadrants, as shown in FIGS. 56A-57B, each quadrant including a centering actuator 1940 with two rollers 1945. This configuration may work well with quadrant shaped articles, although it may also work well with articles of other shapes.

Figure 58A:
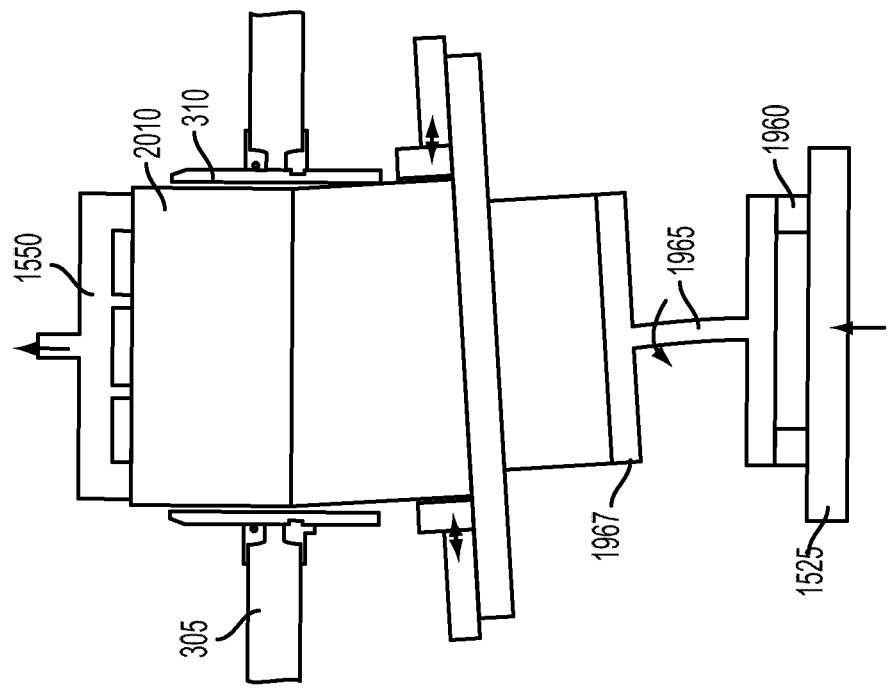
FIGS. 58A-58B are schematic diagrams showing the function of an exemplary flexure shaft.
Figure 58B:
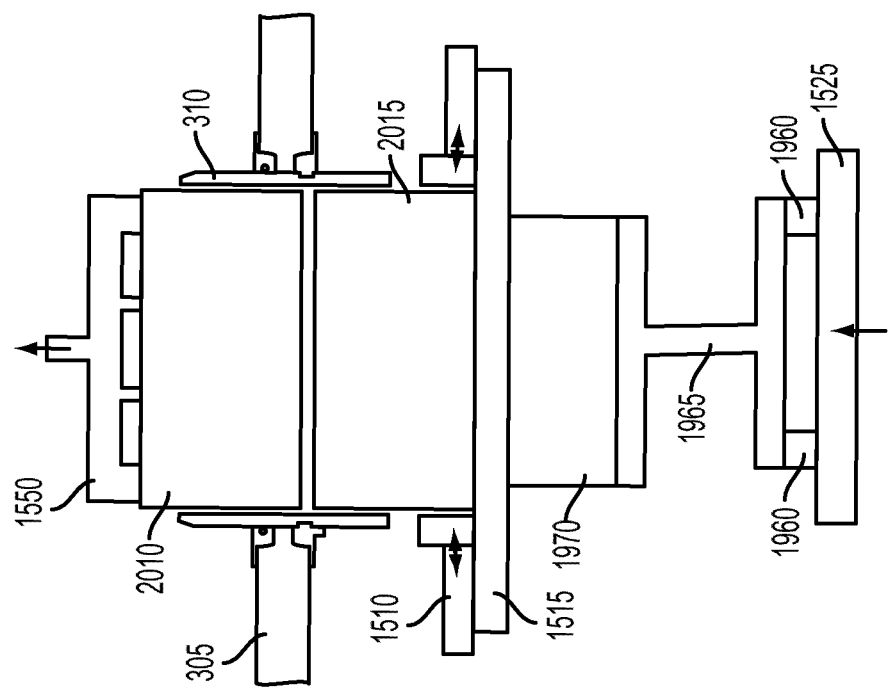

FIGS. 58A and 58B schematically show the article feeding mechanism 315 with the flexure shaft 1965. FIG. 58A shows how the article feeding mechanism 315 works when the articles 2010 and 2015 are made perfectly cylindrical and have perfectly parallel surfaces. In such a situation, the articles may be perfectly aligned with the skinning pipe 310, and the flexure shaft 1965 does not deflect or bend. FIG. 58B shows the situation when the articles 2010 and 2015 are not perfectly cylindrical, or have parallelism errors in their surfaces. In such a situation, the flexure shaft 1965 may be deflectable. For example, the flexure shaft 1965 may deflect or bend in a direction substantially perpendicular to the center axis of the inner space of the skinning pipe 310. The deflection or bend of the flexure shaft 1965 may be within a predetermined range so that the bending or deflection does not become permanent. The flexure shaft 1965 may bend or deflect to compensate for the misalignment between the articles and the skinning pipe 310, which may be caused by the parallelism errors or other reasons, thereby allowing the misaligned or out-of-tolerance articles to be pushed through the skinning pipe 310 without jamming.

The flexure shaft or flexure shaft assembly 1965 may include an upper plate 1967, a lower plate 1968, and a middle portion between the upper plate and the lower plate. In some embodiments, the upper plate 1967 and the lower plate 1968 may not be parts of the flexure shaft 1965, but may be connected to the flexure shaft 1965. In some embodiments, the upper plate 1967 and the lower plate 1968 are integrated with the middle portion to form the flexure shaft 1965. For discussion purposes, the upper plate 1967 and the lower plate 1968 are referred to as parts of the flexure shaft 1965.

Figure 59:
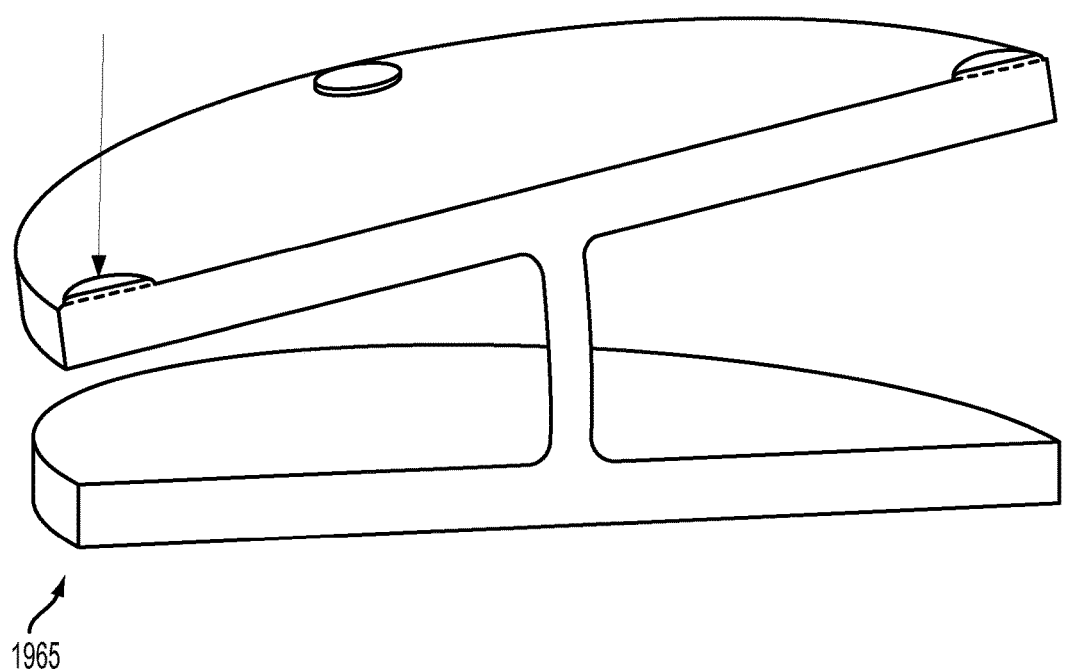
FIG. 59 is a cross-sectional perspective view of the output deflection plot of a Finite Element Analysis where a force is applied to the exemplary flexure shaft.

FIG. 59 shows cross-sectional isometric view of the output deflection plot of a Finite Element Analysis in which a force is applied to one side of the flexure shaft 1965. In some embodiments, the flexure shaft 1965 may be made of steel, having a diameter of about 0.5 inches, a length of about 2.5 inches, and corner radii of about 0.25 inches. The resulting deflection may be about 0.6 mm of tilt when a force of 13 pounds is applied at the location and direction shown in FIG. 59. The maximum von Mises stress for this condition is 6400 psi, which is well below the yield strength of common 1020 steel.

Figure 60:
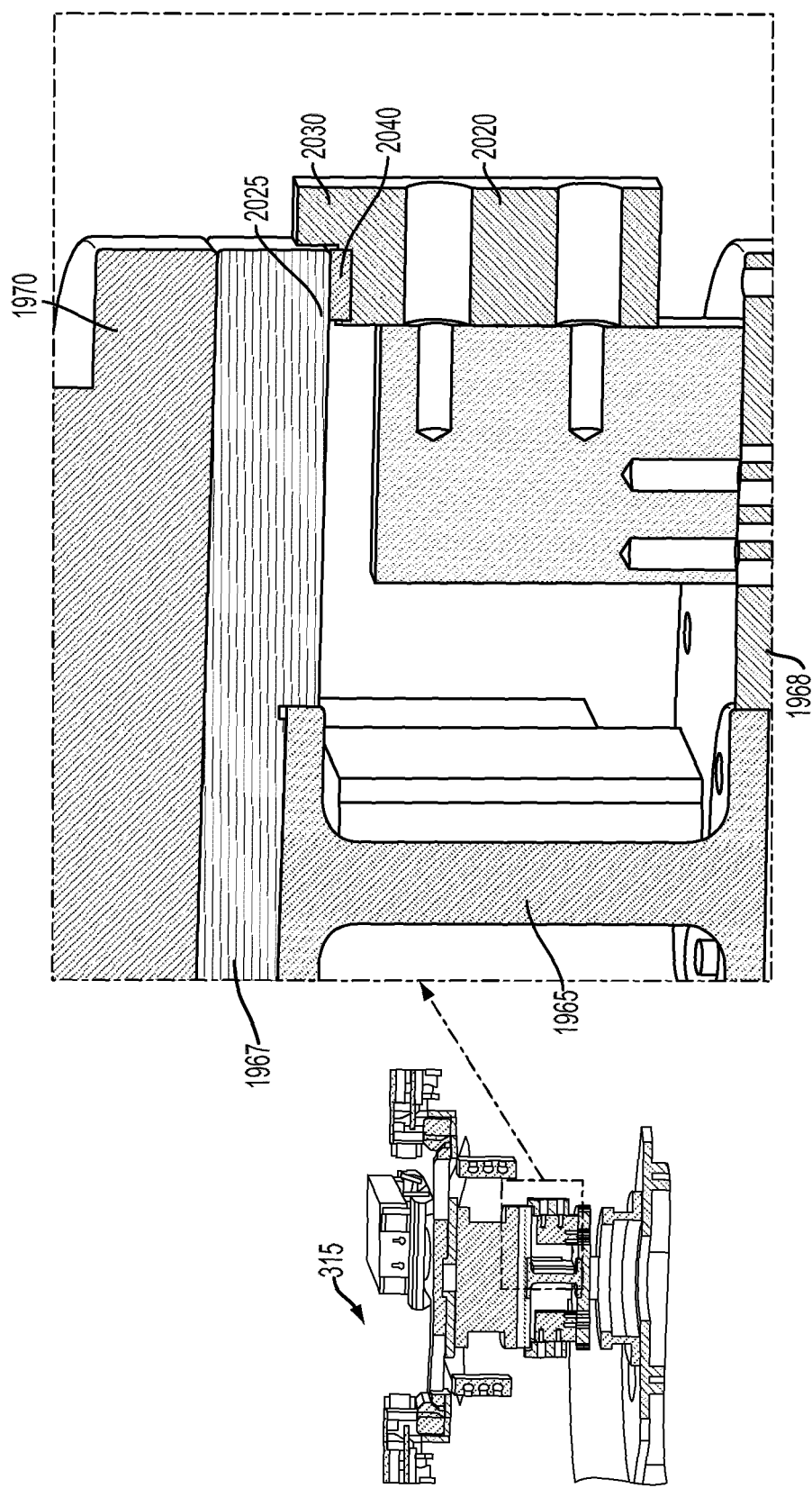
FIG. 60 is an enlarged view of the exemplary flexure shaft.

FIG. 60 schematically shows an enlarged view of the exemplary flexure shaft 1965 and associated elements. The article feeding mechanism 315 may include one or more tilt limiters 2020 located adjacent the flexure shaft 1965. For example, the tilt limiters 2020 may be located between the upper plate 1967 and the lower plate 1968 of the flexure shaft 1965. In some embodiments, the tilt limiters 2020 may be mounted on the lower plate 1968. The tilt limiters 2020 may be configured to limit an amount of deflection of the flexure shaft 1965, thereby preventing the flexure shaft 1965 from being over flexed and yielded (e.g., permanently deformed) during a machine crash, which may occur when, for example, the motion of the lower machine axis (e.g., including the lower carriage 1525 and the article feeding mechanism 315) is programmed wrong and an unexpected load occurs through the article feeding mechanism to the lower carriage 1525.

Radial and axial gaps may be created in the assembly to allow the flexure shaft 1965 assembly (e.g., including the upper plate 1967 and the lower plate 1968) to relatively freely move in the tip/tilt and radial directions. In some embodiments, the magnitude of these gaps may be less than 1 mm, such as, for example, 0.5 mm, 0.6 mm, 0.8 mm, etc. Each tilt limiter 2020 may include an axial stop 2025 that limits the axial deflection of the flexure shaft 1965. The tilt limiter 2020 may include a radial stop 2030 that limits the radial deflection of the flexure shaft 1965. The tilt limiter 2020 may include counterbores 2040, in which rubber pads may be disposed for dampening the natural vibration of the flexure shaft 1965 assembly.

Figure 61:
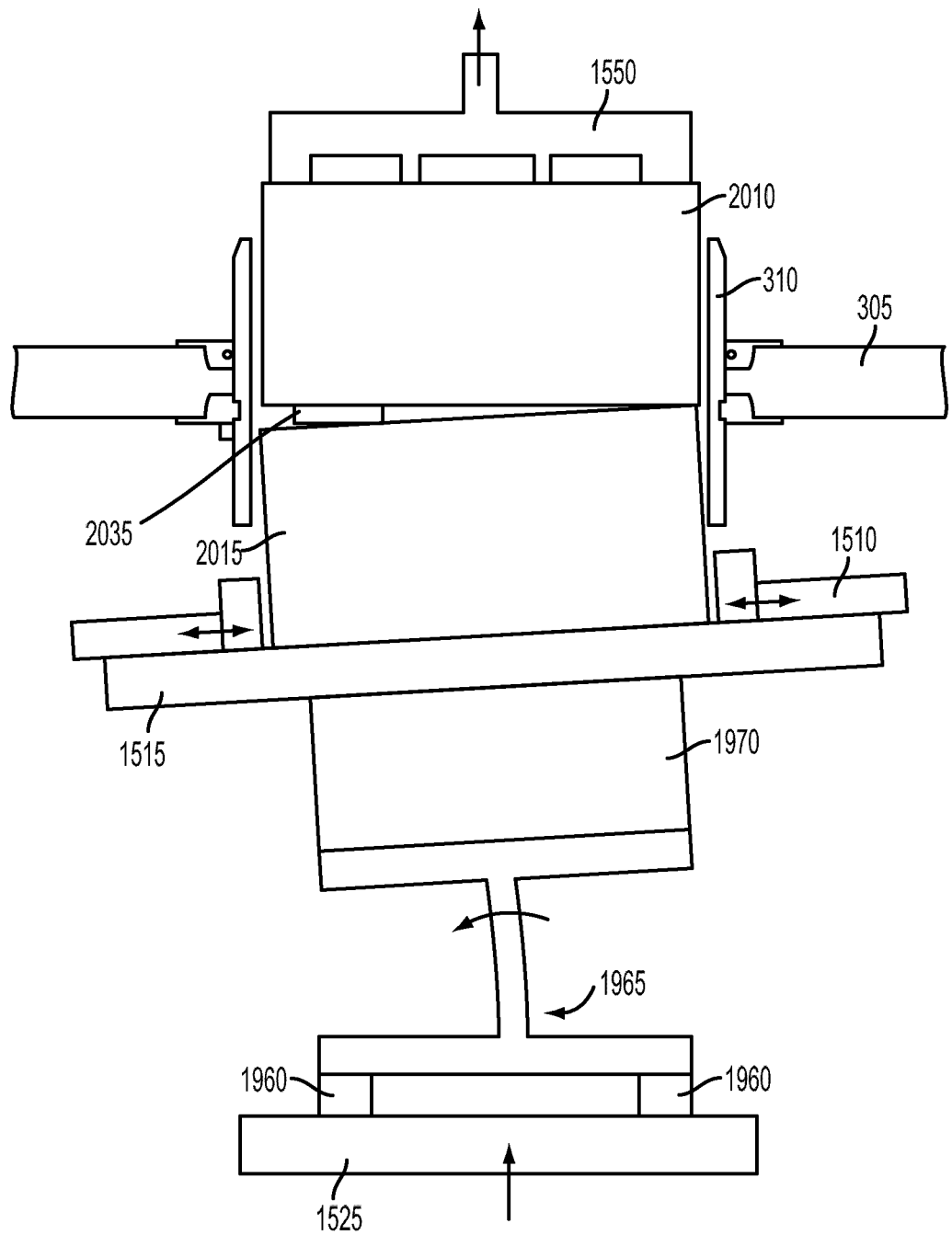
FIG. 61 is a schematic diagram showing a simulation for the exemplary article feeding mechanism.

FIG. 61 is a schematic diagram of the exemplary article feeding mechanism 315. A spacer 2035 is placed off-axis between two articles 2010 and 2015 to simulate the condition of an article being fed through the skinning pipe 310 with excessive parallelism errors in the surfaces.

Figure 62:
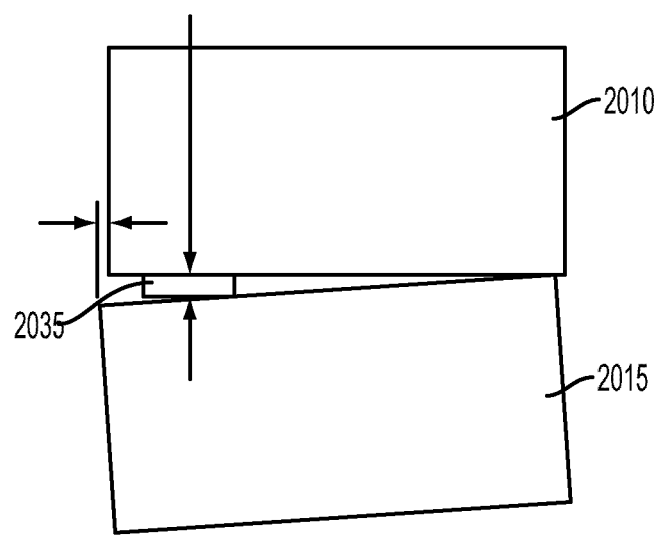
FIG. 62 is a schematic diagram of a spacer positioned between two articles for the simulation.

FIG. 62 shows the dimension of the spacer 2035. The spacer 2035 is 1.99 mm thick. The spacer 2035 creates a radial error of 1.1 mm. The articles 2010 and 2015 have a twelve-inch diameter and are six inches long.

Figure 63:
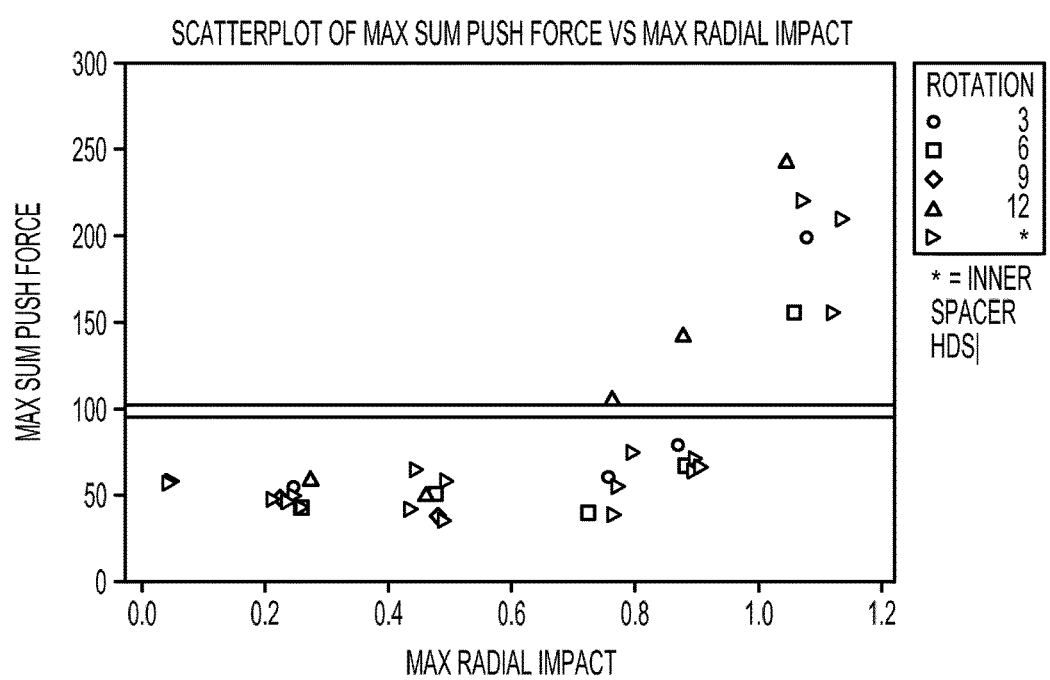
FIG. 63 is a graph of maximum axial push forces as measure by force sensors.

FIG. 63 shows a plot of maximum axial push force measured by the force sensors 1960 of the article feeding mechanism 315. The maximum force is plotted for each successive article. As shown, the largest force experienced was approximately 250 pounds. The machine components are capable of intermittently experiencing approximately double these forces (e.g., about 500 pounds) without undue wear or failure. If the flexure shaft 1965 was not used, a jamming would have occurred which would have forced the process to be shut down and unusual machine maintenance would have been required.

The compliant article feeding mechanism 315 that includes the flexure shaft 1965 enables out-of-balance articles to move through the skinning pipe 310 without jamming. The compliant article feeding mechanism 315 may help articles that have parallelism errors to engage properly and maintain the forces in an axial direction. The compliant article feeding mechanism 315 may also enable radial compliance after a lower article has been centrally and precisely engaged with an upper article located above the lower article within the skinning pipe 310. The compliant article feeding mechanism 315 may enable the article to be delivered to the centerline of the skinning pipe 310 with radial precision (submicron repeatability). Precise alignment improves the skin thickness uniformity, reduces wear of the skinning pipe 310 caused by rubbing. Rubbing of the misaligned articles against the skinning pipe 310 may cause debris to fall off, affecting the quality of skins. Misalignment between the articles and the skinning pipe 310 may reduce the feeding force. With precise alignment, the speed of skinning may be increased, meaning that articles may be delivered at a high speed into the skinning pipe 310. Precise alignment also minimizes dead cells caused by two consecutive articles being radially eccentric to each other.

Figure 64:
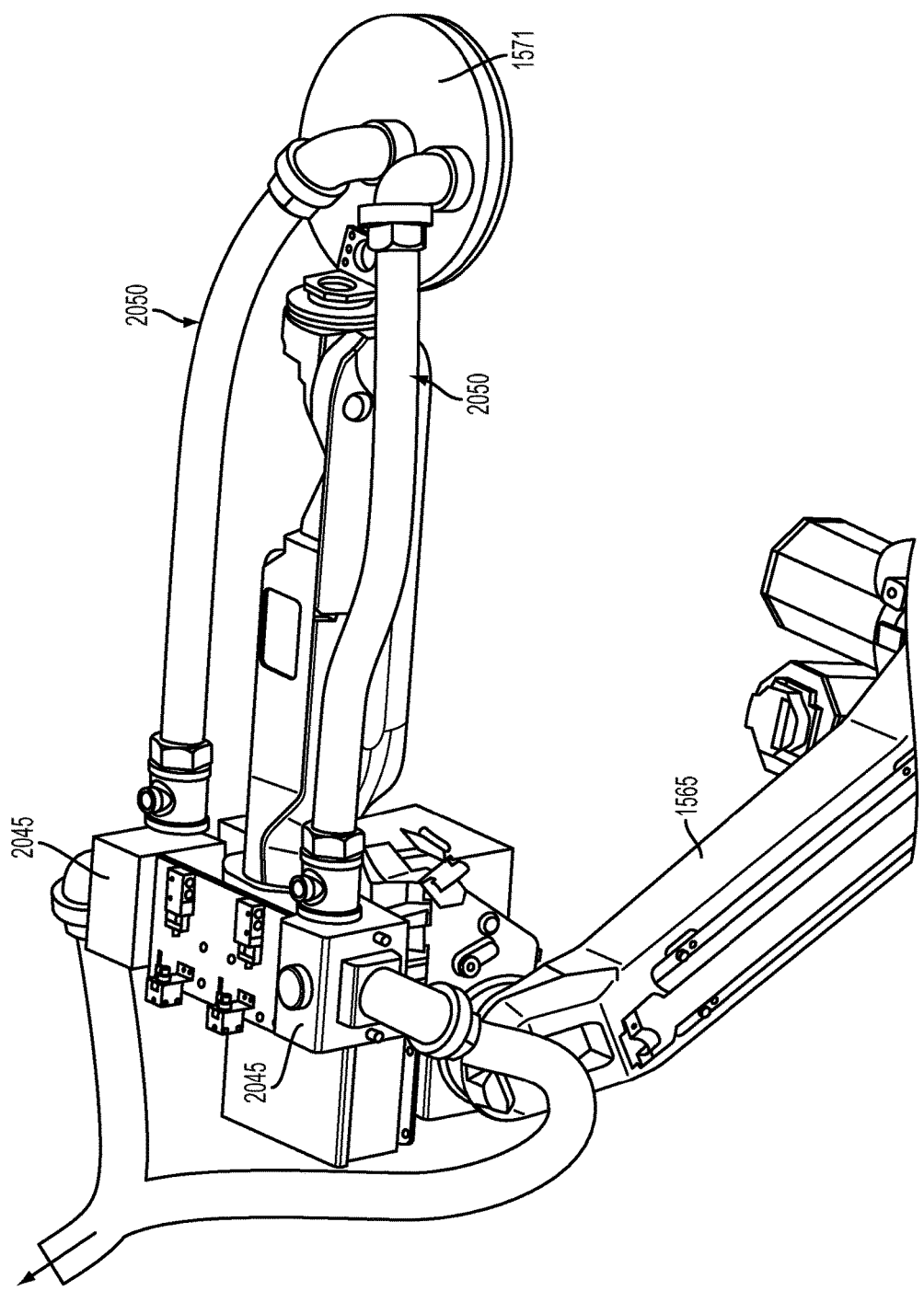
FIG. 64 is a perspective view of an exemplary article loading robot.

FIG. 64 is an isometric view of the exemplary loading robot 1565. The loading robot 1565 may include the vacuum chuck 1571, which is also shown in FIG. 26. The vacuum chuck 1571 may be configured to hold and lift an unskinned article using vacuum pressure or vacuum force, and transport the unskinned article onto the article feeding mechanism 315 (e.g., the platen 1515). The vacuum chuck 1571 may be similar to the vacuum chuck 1550 mounted to the upper carriage 1525, as shown in, e.g., FIG. 26. The loading vacuum chuck 1571 may be similar to the vacuum chuck 1550, and may be configured to generate independently controlled multiple vacuum zones (e.g., two zones).

The vacuum chuck 1571 may pick up (e.g., hold and lift) a single article with a single spacer located at the bottom surface of the article, whether it is a donut shaped spacer 1600 or a donut hole shaped spacer 1605. In some embodiments, when the vacuum chuck 1571 is a dual-zone vacuum chuck, two vacuum valves 2045 may be located on the loading robot 1565 to open and close vacuum pressure communication to the two zones of the vacuum chuck 1571. The valves 2045 may be connected with the vacuum chuck 1571 through connection hoses 2050. Similar to the vacuum chuck 1550, the vacuum chuck 1571 mounted on the loading robot 1565 may be changed for a larger or smaller vacuum chuck 1571 when the sizes (or dimensions) of the articles are changed (e.g., from seven-inch diameter articles to thirteen-inch diameter articles).

Figure 65:
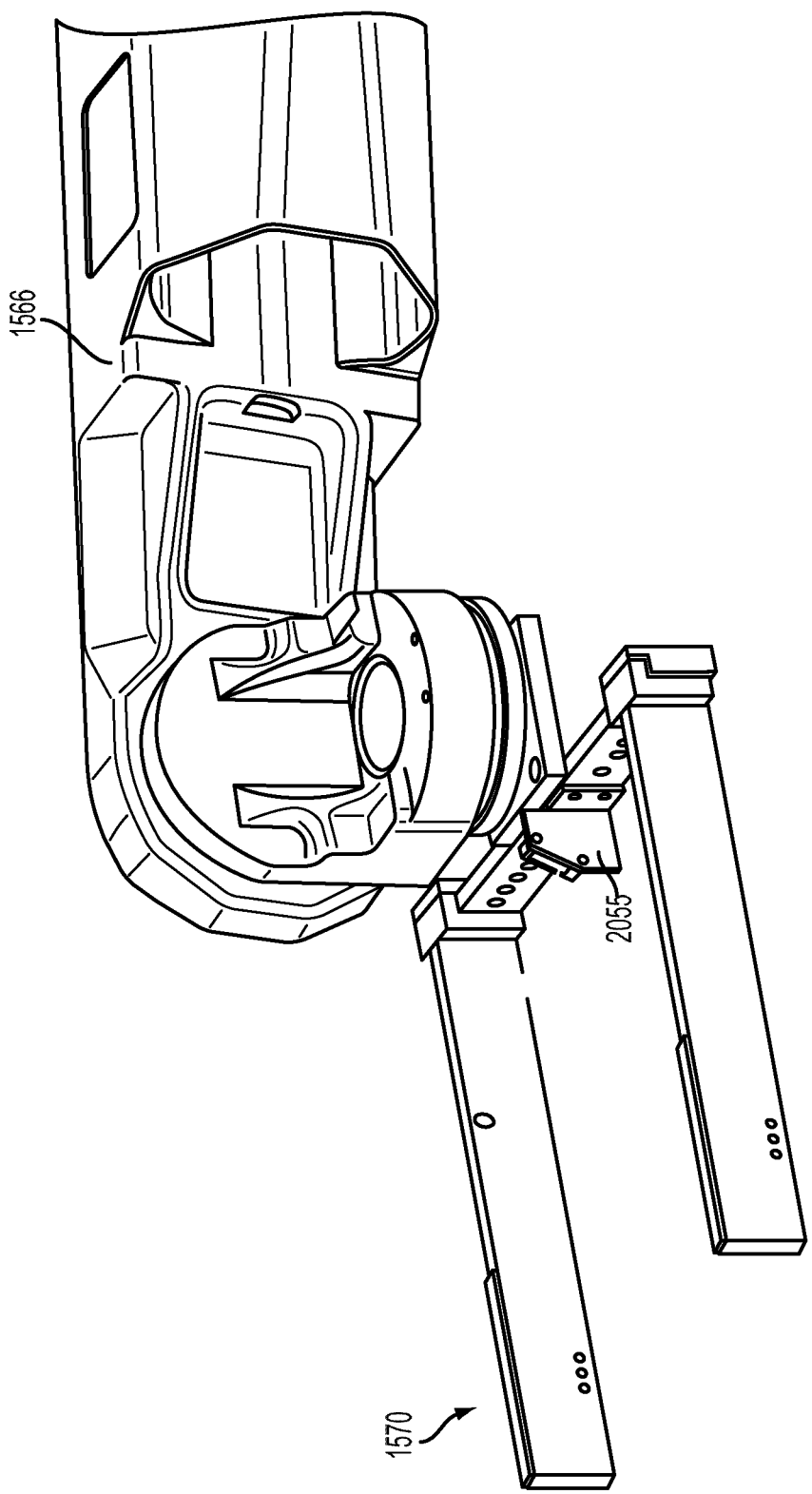
FIG. 65 is a perspective view of an exemplary article unloading robot.

FIG. 65 is an isometric view of the exemplary unloading robot 1566. The unloading robot 1566 may include at least one arm 1570 (e.g., two or more arms 1570), which are also shown in FIG. 26. The arms 1570 may be configured to receive a skinned article from the vacuum chuck 1550, transport it and place it onto a conveyance system for further processing. The arms 1570 may be adjustable arms 1570 configured to support articles with different dimensions (e.g., diameters) without touching the edge of the wet skin (flowable mixture) coated to the article. For example, the distance between the two arms 1570 may be adjusted to fit the skinned articles of different sizes. The arms 1570 may support the bottom surface of the skinned article. The unloading robot 1566 may also include a sensor 2055 configured to detect the presence of an article in the arms 1570. The sensor 2055 may be mounted on the arms 1570, or at any other suitable locations on the unloading robot 1566. The sensor 2055 may use any suitable technology for detecting the presence of the article, such as, for example, optical technology, electro-magnetic technology, thermo technology, etc.

Force Sensors and Motion Controls

As shown in FIGS. 27A-27E, in the skinning system 300, two axes work together to keep the articles moving through the skinning pipe 310 to receive the flowable mixture (e.g., to be skinned). The two axes include an upper axis and a lower axis. The upper axis may include the upper carriage 1540 and the vacuum system 320 (including the vacuum chuck 1550) mounted to the upper carriage 1540, which are shown in, e.g., FIG. 26. The lower axis may include the lower carriage 1525 and the article feeding mechanism 315, which are also shown in, e.g., FIG. 26.

Force sensors may be included in the skinning system 300 and configured to measure forces that may be used by the skinning control system 410 to control the motions of the two axes so that the articles are moved through the skinning pipe 310 at a substantially constant speed. Force sensors may measure the forces between the upper carriage 1540 and the lower carriage 1525 (or between the vacuum system 320 mounted to the upper carriage 1540 and the article feeding mechanism 315 mounted to the lower carriage 1525), and the measured forces may be used by the skinning control system 410 to determine when a lower article has engaged with an upper article. When the skinning control system 400 determines that two articles have engaged with one another, the controller may begin moving the two axes at the same speed. Once this mating of the upper and lower axes has completed, the upper axis may be free to disengage and move upward at a greater speed than the lower axis to a position where the article (e.g., skinned article) it carries may be unloaded.

Figure 66:
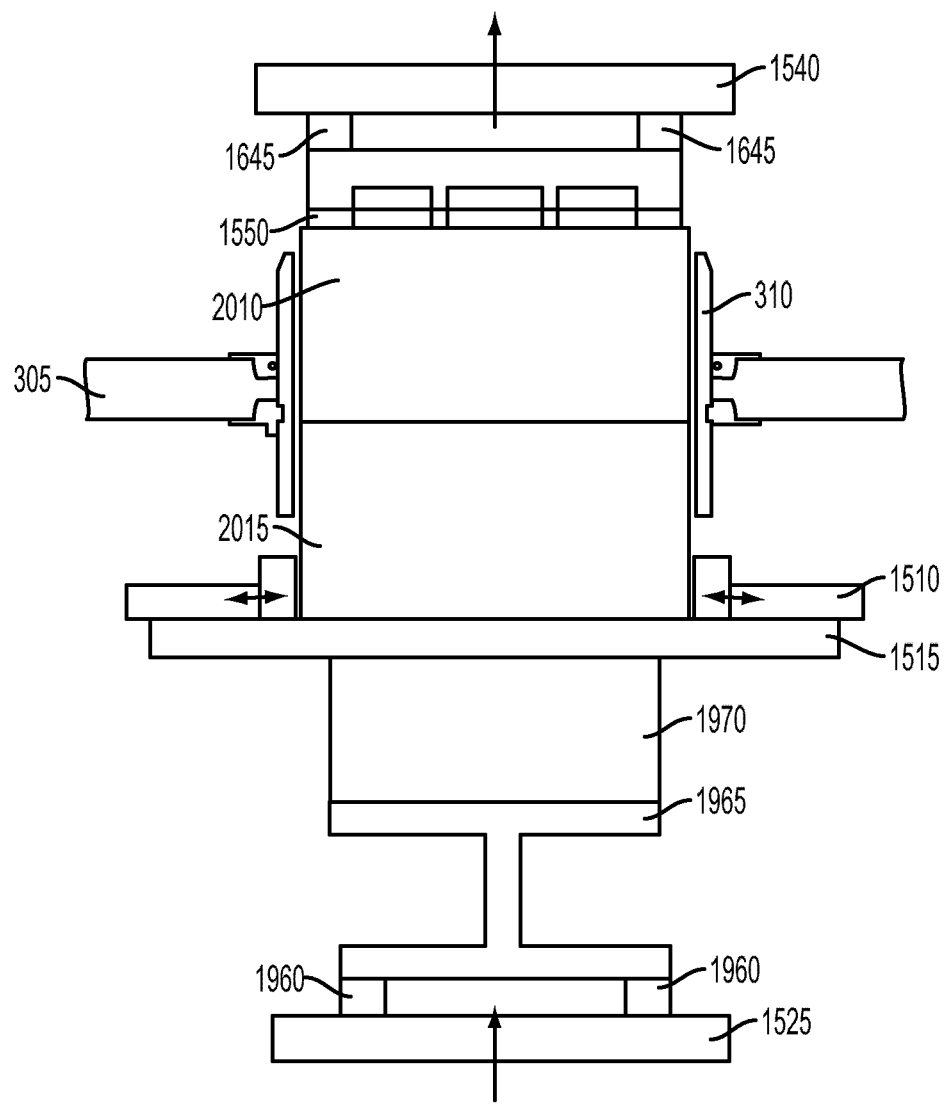
FIG. 66 is a schematic diagram of an exemplary skinning system with force sensors.

FIG. 66 is a schematic diagram showing the exemplary skinning system 300 with force sensors. As shown in FIG. 66, one or more force sensors 1645 may be disposed at suitable locations within the upper axis, for example, mounted to the upper carriage 1540, to the vacuum chuck 1550, or other elements of the vacuum system 320, as shown in FIGS. 29A-29B and 31A-31B. In some embodiments, as shown in FIGS. 31A and 31B, three force sensors 1645 may be used, although other suitable numbers of force sensors 1645 may also be used. Two force sensors 1645 are shown in the schematic diagram for illustrative purposes.

The force sensors 1645 may measure forces experienced by the upper axis, for example, when the articles 2010 and 2015 engage with one another by the push of the lower axis. The skinning system 300 may include one or more force sensors 1960 disposed at suitable locations within the lower axis, for example, mounted to the lower carriage 1525, to the flexure shaft 1965, or any other elements included in the lower axis. In some embodiments, three force sensors 1960 may be used, although any other suitable number of force sensors 1960 may also be used. Two force sensors 1960 are shown in the schematic diagram for illustrative purposes.

The force sensors 1960 may or may not be similar to the force sensors 1645. The force sensors 1960 may be configured to measure forces experienced by the lower axis, such as, for example, when the articles 2010 and 2015 engage with one another while the lower axis pushes the lower article 2015 into the skinning pipe 310. The forces measured by the force sensors 1645 and the force sensors 1960 may be used by the skinning control system 410 to determine when the lower and upper axes should move at the same speed, when the upper axis can disengage with the lower axis (e.g., when the upper carriage 1540 can move up at a higher speed to unload a skinned article 2010), and/or when the lower axis can disengage with the upper axis (e.g., when the lower carriage 1525 can stop pushing and move downward to receive a new unskinned article). That is, the timing of the hand-off between the two axes may be determined based on the forces measured by the force sensors 1645 and 1960.

FIGS. 67A-67E show the motion of the upper and lower axes of the skinning system 310, and FIG. 67F shows the status of various elements included in the skinning system 310. FIGS. 67A-67E are similar to FIGS. 27A-27E. Therefore, the descriptions of FIGS. 67A-67E are similar to those of FIGS. 27A-27E. FIG. 67F show the status of the elements in the skinning system 300 in which a dual-zone vacuum system is used, such as one shown in FIG. 28. The dual-zone vacuum system is only used for illustrative purposes, and the skinning system 300 may use a vacuum system with one zone or more than two zones.

As shown in FIG. 67F, at a first stage (stage "5A" in FIG. 67F, prior to loading an unskinned article, the status of the centering devices 1520 ("Centering Extend" in FIG. 67F) may be "off" (e.g., not activated or not turned on), the status of the side vacuum zone 1595 ("Vac Outer" in FIG. 67F) may be "on" (e.g., activated or turned on), and status of the center vacuum zone 1590 ("Vac Inner" in FIG. 67F) may be "on." The lower carriage 1525 ("Bottom Stage" in FIG. 67F) may move rapidly downward to a loading position to receive an unskinned article, and the upper carriage 1540 ("Upper Stage" in FIG. 67F) may move upward at a predetermined process speed. The air knife 1950 may be "on" or "off".

Referring to FIG. 67F, at a second stage (stage "1" in FIG. 67F), when an unskinned article is loaded onto the article feeding mechanism 315, the status of the centering devices 1520 may be "of" and the status of the center vacuum zone 1590 and the side vacuum zone 1595 may both be "on." The lower carriage 1525 may stop at the loading position to receive an unskinned article to be loaded by the loading robot 1565. The upper carriage 1540 may move upward at the process speed. The status of the air knife 1950 may be "off."

Referring to FIG. 67F, at a third stage (stage "1A" in FIG. 67F), after receiving the unskinned article, the lower carriage 1525 may move upward toward the skinning pipe 310 to insert (or push) the unskinned article (referred to as a lower article for the purpose of discussion of FIG. 67F) into the skinning pipe 310. There may already be at least one article (referred to as an upper article for the purpose of discussion of FIG. 67F) in the skinning pipe 310. During the process when the lower article is pushed into the skinning pipe 310 to be engaged with the upper article, the status of the centering devices 1520 may be "on." The status of the center vacuum zone 1590 and the side vacuum zone 1595 may be "on." The lower carriage 1525 may move rapidly upward, and the upper carriage 1540 may move upward at the process speed. The status of the air knife 1950 may be "off"

Referring to FIG. 67F, at a fourth stage (stage "2" in FIG. 67F), after the lower article engages with the upper article, the two may move together. The status of the centering devices 1520 may be "on" or "off" the status of the center vacuum zone 1590 and the side vacuum zone 1595 may be "on." The lower carriage 1525 may move upward at the process speed and the upper carriage 1540 may also move upward at the process speed. In this combined movement stage, the upper carriage 1540 and the lower carriage 1525 move upward at the same process speed. The status of the air knife 1950 may be "off."

Referring to FIG. 67F, at a fifth stage (stage "2A" in FIG. 67F), one of the vacuum zone may be turned off. At this stage, the status of the centering devices 1520 may be "off." The status of the side vacuum zone 1595 may be "on," and the status of the center vacuum zone 1590 may be "off" Depending on the sequence of the donut shaped and donut hole shaped spacers used, in some embodiments, instead of turning off the center vacuum zone 1590, the side vacuum zone 1595 may be turned off and the center vacuum zone 1590 may remain "on." That is, the status of the center vacuum zone 1590 and the side vacuum zone 1595 shown in FIG. 67F may be switched. At this stage, the lower carriage 1525 may move upward at the process speed. After turning off one vacuum zone, the upper carriage 1540 may disengage with the lower carriage 1525. The upper article held by the upper carriage 1540 may disengage with the lower article, which was held by the other vacuum zone that is now turned off. The status of the air knife 1950 may be "off."

Referring to FIG. 67F, at a sixth stage (stage "3" in FIG. 67F), the upper article may be moved rapidly upward by the upper carriage 1540 for unloading. The status of the centering devices 1520 may be "off" The status of the side vacuum zone 1595 may be "on," and the status of the center vacuum zone 1590 may be "off" The lower carriage 1525 may move upward at the process speed, and the upper carriage 1540 may move upward rapidly for unloading the skinned article. The status of the air knife 1950 may be "off"

Referring to FIG. 67F, at a seventh stage (stage "3A" in FIG. 67F), the upper article (e.g., skinned article) may be unloaded. At this stage, the status of the centering devices 1520 may be "off." The status of the center vacuum zone 1590 and the side vacuum zone 1595 may both be "off" The lower carriage 1525 may move upward at the process speed, and the upper carriage 1540 may be stationary such that the skinned upper article may be unloaded by the unloading 1566. The status of the air knife 1950 may be "off."

Referring to FIG. 67F, at an eighth stage (stage "4" in FIG. 67F), in which the upper carriage 1540 re-engages with the articles moving out of the skinning pipe 310 after the skinned article has been unloaded by the unloading robot 1566. The status of the centering devices 1520 is "off" The status of the side vacuum zone 1595 and the center vacuum zone 1590 may be "off" The lower carriage 1525 may move upward at the process speed, and the upper carriage 1540 may rapidly move downward toward the skinning pipe 310. The status of the air knife 1950 may be "off"

Referring to FIG. 67F, at a ninth stage (stage "4A" in FIG. 67F), the center vacuum zone 1590 and the side vacuum zone 1595 may be turned on. The status of the centering devices 1520 may be "off" The status of the center vacuum zone 1590 and the side vacuum zone 1595 may be "on." The lower carriage 1525 may move upward at the process speed. The upper carriage 1540, after engaging with the article moving out of the skinning pipe 310 (e.g., by holding the article with the vacuum force), may move upward at the process speed. The status of the air knife 1950 may be "off"

Referring to FIG. 67F, at a tenth stage (stage "5" in FIG. 67F), the lower carriage 1525 (or the lower axis) may be disengaged from the article in the skinning pipe 310. The status of the centering devices 1520 may be "off." The status of the center vacuum zone 1590 and the side vacuum zone 1595 may be "on." The lower carriage 1525 may move rapidly downward to the loading position to receive another unskinned article. The upper carriage 1540 may move upward at the process speed. The status of the air knife 1950 may be "on."

Controls of Skinning System

Various processes disclosed herein may be performed by the control system 400. Controls of the skinning system 300 may also involve controls of the mixture delivery system 200. Although for discussion convenience, it is described throughout the disclosure that some processes may be performed by the mixture control system 405, and some processes may be performed by the skinning control system 410, either mixture control system 405 and skinning control system 410 or a combination of these control systems may perform any process for controlling the skinning system 300 and/or the mixture delivery system 200.

Figure 68:
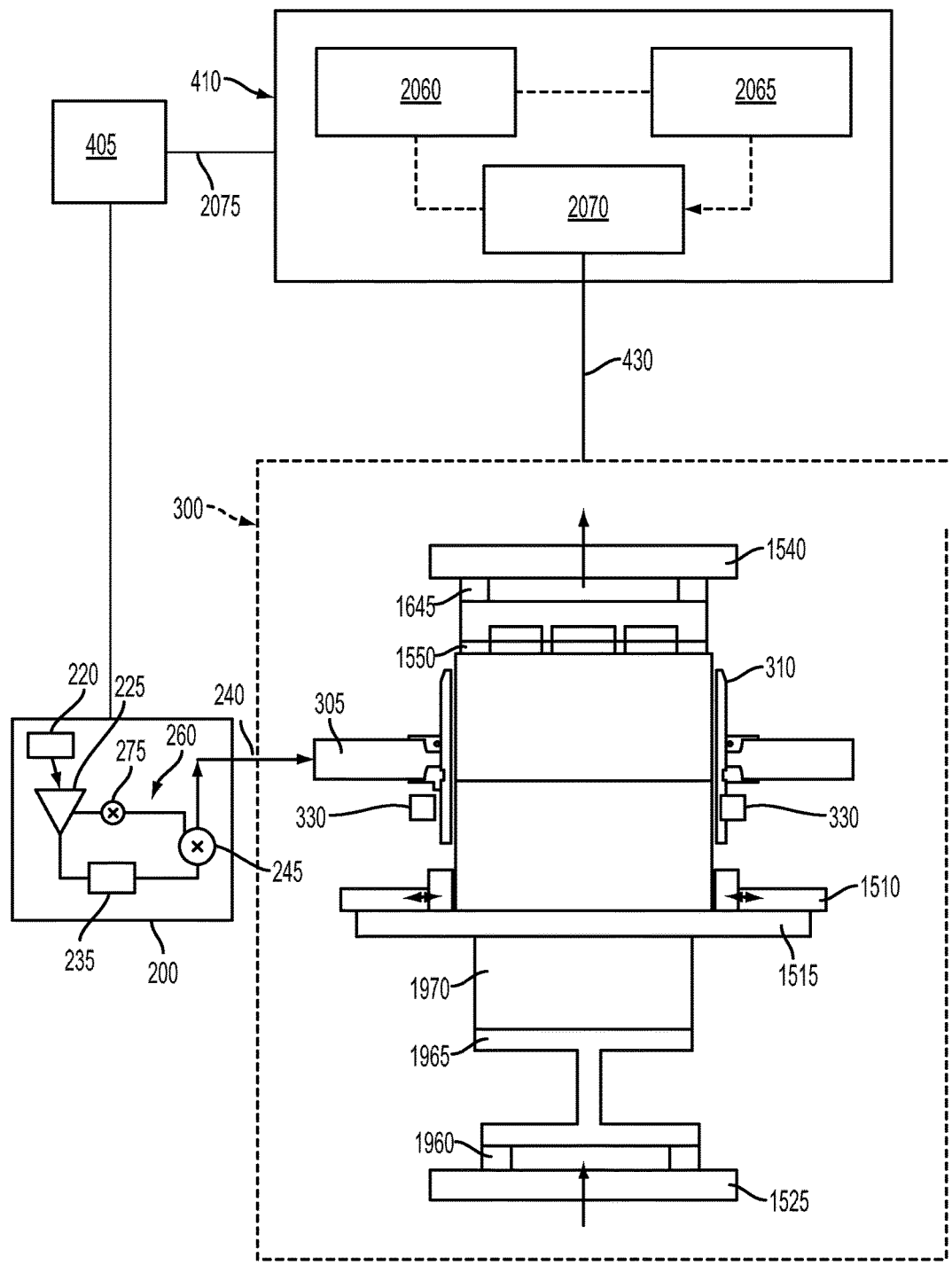
FIG. 68 is a schematic diagram of the exemplary skinning system with exemplary control systems.

FIG. 68 shows a schematic diagram showing the skinning control system 410. FIG. 68 schematically shows the mixture delivery system 200 and the skinning system 300. For illustrative purposes, only some elements of the mixture delivery system 200 and the skinning system 300 are shown. The mixture delivery system 200 and the skinning system 300 may include other elements or features disclosed in the present disclosure in addition to or instead of the elements shown in FIG. 68. The mixture delivery system 200 and the skinning system 300 may not include all of the elements shown in FIG. 68.

As shown in FIG. 68, the mixture delivery system 200 may include the mixer 220 configured to mix a fluid and a dry material to produce a flowable mixture, the storage device 225 configured to store the flowable mixture, the pump 235 configured to pump the flowable mixture to the delivery line 240 leading to the skinning system 300. The flow of the mixture to the skinning system 300 may be controlled by the delivery valve 245. The mixture delivery system 200 may include the recirculation line 260 configured to recirculate the flowable mixture when, for example, the delivery valve 245 is closed to shut down the flow of the mixture to the skinning system 300. The valve 275 may control the flow within the recirculation line 260. The recirculation line 260 may be connected with the storage device 225. The flowable mixture redirected from the main delivery line 240 may be returned to the storage device through the recirculation line 260. Additional and/or alternative components or devices that may be included in the mixture delivery system 200 have been discussed above in connection with other figures.

As shown in FIG. 68, the skinning system 300 may include the elements shown in previous figures that have already been discussed above. The skinning control system 410, which may be part of the control system 400 shown in FIG. 1, may be connected with the skinning system 300 and may be configured to control the operations of the skinning system 300. The skinning control system may include a processor 2060, a memory 2065, and a communication unit 2070. The communication unit 2070 may be a dedicated communication unit for the skinning control system 410, or may be the same as or similar to the communication unit 425 included in the control system 400, as shown in FIG. 1. In some embodiments, the communication unit 2070 may be part of the communication unit 425 shown in FIG. 1.

The processor 2060 and the memory 2065 may be dedicated processor and memory for the skinning control system 410, or may be the same as or similar to the processor 415 and memory 420 shown in FIG. 1. In some embodiments, the processor 2060 and memory 2065 may be part of the processor 415 and memory 420 shown in FIG. 1. In some embodiments, the skinning control system 410 may be implemented as software, programs, computer executable instructions or codes, which may be encoded in the memory 420 shown in FIG. 1 or a tangible, nontransitory computer-readable medium, such as a hard-disk, a compact disc, a flash memory, etc. The communication unit 450 may communicate with the skinning system 300 through the network 430. The communication unit 2070 may also communicate with the mixture control system 405 via a communication line or network 2075, which may include a wired or wireless network. For example, the skinning control system 410 may communicate with various components included in the mixture delivery system 300 directly or through the mixture control system 405. The skinning control system 410 may receive data or signals from various components included in the mixture delivery system 300 and may transmit control signals to the various components. The mixture control system 405 may be part of the control system 400 and may be configured to control the mixture delivery system 200.

The processor 2060 may be any suitable computer processor that includes computing capabilities, such as, for example, a central processing unit (CPU), a signal processor, etc. The memory 2065 may be any suitable memory configured to store programs, instructions, and/or codes, which may be executed by the processor 2060. The memory 2065 may be a non-transitory or tangible random access memory (RAM), a read only memory (ROM), a flash memory, etc. The processor 2060 may read the instructions and/or codes from the memory 2065 and execute the instructions and/or codes to run programs that perform various functions, such as the methods or processes disclosed herein.

Figure 69:
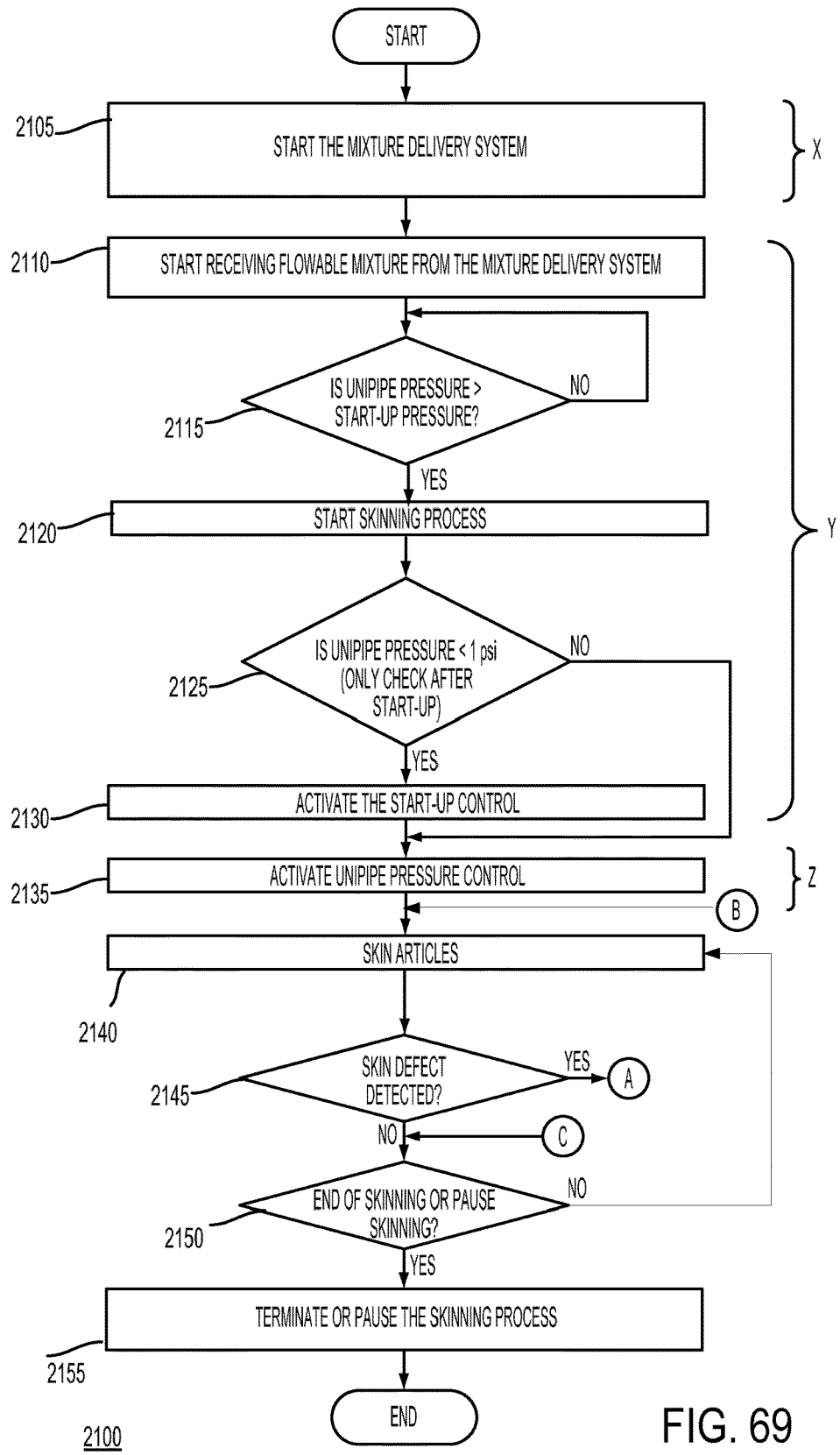
FIG. 69 is a process flow diagram of an exemplary method for controlling the skinning system.

FIG. 69 is a flowchart illustrating an exemplary method (or process, operation) 2100 of the skinning control system 300. The skinning system 300 may operate together with the mixture delivery system 200. Thus, certain processes involving the mixture delivery system 200 are also included in FIG. 69.

In the exemplary method 2100, for illustrative purposes, the mixture delivery system 200 is assumed to include a recirculation line 260 as shown in FIG. 68. In the method 2100, first, the mixture delivery system 200 may be started to run in a recirculation mode using the recirculation line 260 (block 2105, also referred to as stage "X" in FIG. 69). The pump 235 may advance the flowable mixture produced by the mixer 220 to the delivery line 240. The delivery valve 245, which may be a two-way valve, may close one path to prevent the flow to the skinning system 300, and open the other path to allow the mixture to flow into the recirculation line 260. The flowable mixture may be continuously recirculated using the recirculation line 260 without being delivered to the skinning system 300. A return pressure control may be activated. The return pressure may refer to the pressure within the recirculation line 260. The return pressure set point (e.g., target return pressure) may be determined, and the position (e.g., opening) of the return valve 275 may be determined.

Return Pressure Set Point

Determining the pressure in the recirculation line 260 just before the skinning process starts may facilitate speeding up the start-up of the skinning process and reduce or eliminate any pressure related defects on the final skinned part during start-up. The flowable mixture return pressure set point acts (or simply return pressure set point) as an initial condition to the skinning pipe pressure control scheme discussed below. The return pressure set point is the desired or target return pressure in the recirculation line 260. Based on the target skinning speed, the return pressure set point may be determined using the relation shown in FIG. 71, which shows a sample plot of return pressure versus skinning speed, showing the impact of the skinning speed on the return pressure. The relationship shown in FIG. 71 may be represented by the following equation (C-1):

$$\text{Return Pressure Set Point} = 4.1527 * (\text{Skinning speed in mm/sec}) + 28.353 \quad \text{(C-1)}$$

Equation (C-1) is an example equation reflecting the relationship between the return pressure set point and the skinning speed. The parameters 4.1527 and 28.353 are exemplary only. Other parameters may be used depending on the system configurations. The return pressure set point determined based on equation (C-1) is for a nominal viscosity of about 40000 centipoise (cP). The relationship or function described by equation (C-1) may depend on the composition of the flowable mixture and/or the nominal viscosity of the flowable mixture. After the return pressure set point is determined to match the desired or target skinning speed, the return pressure control may be activated. Details of the return pressure control are described below along with the skinning pressure control scheme. The position (e.g., opening) of the return valve 275 may be adjusted before activating the return pressure control, since if the return valve 275 is completely open, there may not be enough back pressure for the control to maintain the return pressure. The return pressure control may be useful for the skinning pipe pressure control, such as one shown in FIG. 72.

Figure 74:
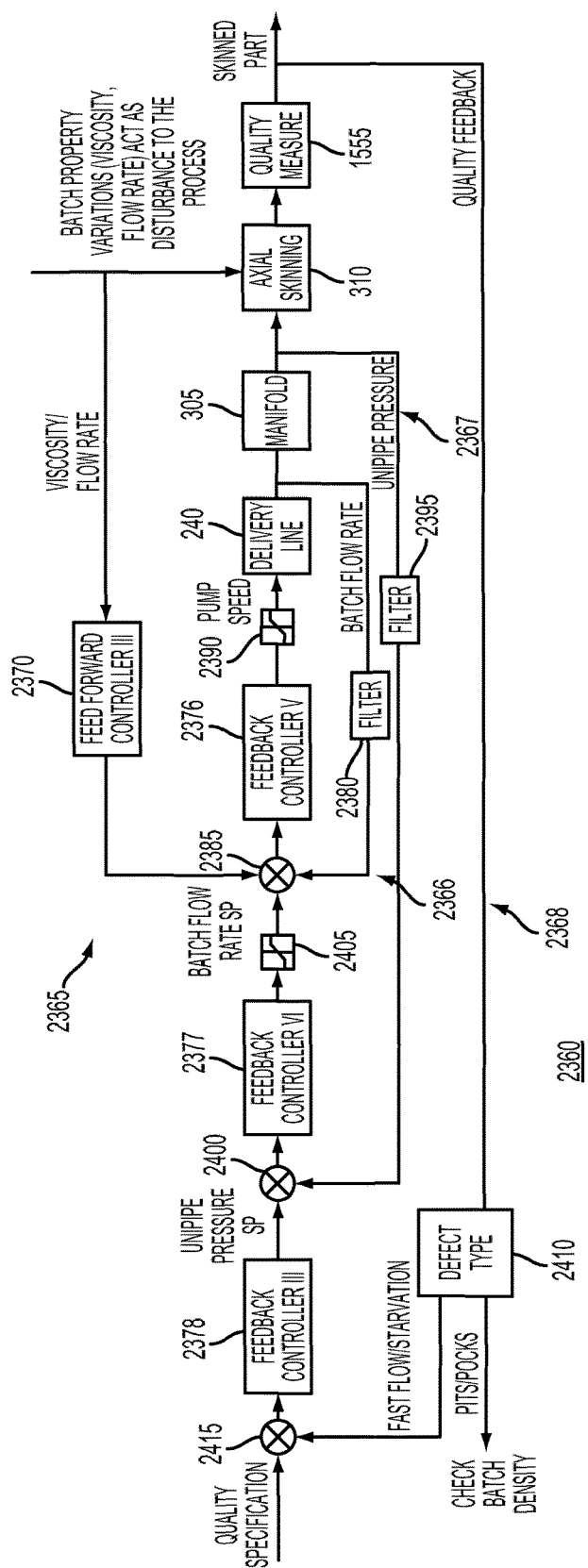
FIG. 74 is a control diagram for an exemplary method for controlling the skinning system.

For the skinning pipe pressure control scheme shown in FIG. 74, the return pressure control may be replaced with the flowable mixture flow rate control. Approaches similar to those discussed above in connection with equation (C-1) and FIG. 71 may be taken to determine the desired flow rate set point before the skinning process starts and requests flowable mixture from the mixture delivery system 200. The requirement on the return pressure set point may not be stringent. If the value obtained is close to the desired operating regime (e.g., if the return pressure is within an acceptable range of the desired return pressure set point), it still helps with the speeding up of the start-up of the skinning process. Also, once the skinning pipe pressure control scheme is activated, the control scheme may automatically adjust the return pressure to control the skinning pipe pressure. Some embodiments of the mixture delivery system 200 may not include the recirculation line 260. In such embodiments, the return pressure control may not be needed.

Skinning Process Start-Up Control

Referring to FIG. 69, details pertaining to sections referred to as "Y" in the flowchart are discussed below. The skinning process is initiated by starting receiving the flowable mixture from the mixture delivery system (block 2110). This may be done by the control system 400 (e.g., the mixture control system 405) sending a signal to the delivery valve 245 to adjust its position to direct the flowable mixture to the skinning system 300. The return valve 275 may be closed to shut off the recirculation line 260 and provide enough back pressure to the skinning system 300 (e.g., the manifold 305 and the skinning pipe 310), so as to attain the desired skinning pipe pressure needed to obtain quality skin. The return valve 275 need not be completely closed and may also be partially closed as long as enough back pressure is available to attain the desired skinning pipe pressure at the exit of the manifold 305 (e.g., at a point before the flowable mixture flows into the holes of the skinning pipe 310). The pressure of the flowable mixture at the exit of the manifold 305 or the inlet (which receives the flowable mixture) to the skinning pipe 310 (which may also be referred to as unipipe pressure, skinning pipe pressure, pressure of the skinning pipe, or pressure of the unipipe) may provide information regarding whether there is enough flowable mixture present in the manifold 305 to apply skin (e.g., flowable mixture) onto the article. Until the skinning pipe pressure reaches a threshold value (which may be referred to as a start-up pressure in FIG. 69), the skinning process may not start. This enables significant reduction of defects during the start-up of the skinning process, such as "fast flow" defects (e.g., excessive flow of mixture or skin on certain sections of the article) and "starvation" defects (e.g., lack of sufficient flowable mixture or skin on the article or partial application of the flowable mixture on the article). The start-up pressure may be a function of the weight of the part, as shown in equation (C-2):

$$\text{Start-up Pressure} = \Psi(\text{weight of the article}) \quad (C\text{-}2)$$

One example of the function, $\Psi(.)$ may be defined as:

$$\text{Start-up Pressure} = 4.2(\text{article length} > 4 \text{ inches}) \text{ or } 3(\text{article length} \leq 4 \text{ inches}) \quad (C\text{-}3)$$

Equation (C-3) uses the article length as a parameter. The length of the article could be used as a surrogate measurement for the weight if the dimension (e.g., diameter) of the article does not change. If the dimension (e.g., diameter) changes, using the article length as a parameter for determining the start-up pressure may not be accurate, because if a higher pressure is used for a lighter article, then there is a possibility of flowable mixture penetrating between articles causing the articles to skew. This article skew may result in a skin defect around the article. In situations where the dimension (e.g., diameter) may change, it may be desirable to use equation (C-2).

Referring to FIG. 69, the skinning control system 410 may determine whether the skinning pipe pressure has reached or exceeded the start-up pressure (block 2115). If the skinning control system 410 determines that the skinning pipe pressure has not reached or exceeded the start-up pressure (No, block 2115), the skinning control system 410 may continue measuring and monitoring the skinning pipe pressure until the skinning pipe pressure has reached or exceeded the start-up pressure. If the skinning control system 410 determines that the skinning pipe pressure reaches or exceeds the start-up pressure (Yes, block 2115), the skinning process starts (block 2120). At this time, skinning articles may not start.

The skinning control system 410 may determine whether the skinning pipe pressure is less than a predetermined threshold skinning pipe pressure (e.g., 1 psi) (block 2125). The predetermined threshold skinning pipe pressure may vary depending on the system configuration, and may be obtained via tests and experiments. Other suitable threshold pressure, e.g., 1.5 psi, 2 psi, 0.95 psi, etc., may also be used. This determination at block 2125 may only need to be performed once after the start-up.

If the skinning control system 410 determines that the skinning pipe pressure is less than the predetermined threshold skinning pipe pressure (e.g., if <1 psi) (Yes, block 2125), the skinning control system 410 may activate a start-up control (block 2130), which is discussed below in details. The skinning control system 410 may also activate a skinning pipe pressure control (block 2135). If the skinning control system 410 determines that the skinning pipe pressure is not less than the predetermined threshold skinning pipe pressure (e.g., if ≥1 psi) (No, block 2125), the skinning control system 410 may not activate the start-up control (e.g., skip block 2130), and may instead activate a skinning pipe pressure control (block 2135). The start-up control and the skinning pipe pressure control are discussed below.

Referring to FIG. 69, after the skinning pipe pressure control is activated (block 2135), the skinning control system 410 may start skinning articles (block 2140) by sending a signal to the skinning system 300 to start or activate various components, such that the lower carriage 1525, the upper carriage 1540, the loading robot 1565, and the unloading robot 1566, to transport the unskinned articles into the skinning pipe 310 and transport skinned articles out of the skinning pipe 310.

The skinning system 300 may use the laser devices 1555 to monitor and/or detect presence of defects on the skinned articles. The skinning control system 410 may determine whether a defect is present on the skin of the skinned article, and/or whether it has been detected (e.g., based on signals received from the laser devices 1555) (block 2145). If the skinning control system 410 determines that no defect is detected (No, block 2145), the skinning control system 410 may determine whether the skinning process should be terminated or paused (block 2150). If the skinning control system 410 determines that the skinning process should not be terminated or paused (No, block 2150), the skinning system 300 may continue to skin articles (e.g., continues block 2140). If the skinning control system 410 determines that a defect has been detected (Yes, block 2145), the process may continue to operation "A," the details of which are shown in FIG. 70.

If the skinning control system 410 determines that the skinning process should be terminated or paused (Yes, block 2150), the skinning control system 410 may terminate or pause the skinning process (block 2155). To terminate or pause the skinning process, the skinning control system 410 may send control signals to various components included in the skinning system 300 to deactivate them. In addition, the skinning control system 410 may communicate with the mixture control system 405, such that the mixture control system 405 may send control signals to various components included in the mixture delivery system 200 to deactivate them so that the flowable mixture is no longer delivered to the skinning system 300. For example, the mixture control system 405 may send a control signal to the delivery valve 245 to adjust the position of the delivery valve 245 to prevent flowable mixture from flowing to the skinning system 300. The mixture control system 405 may send a control signal to the return valve 275 to open the return valve 275, thereby allowing the flowable mixture to be recirculated within the recirculation line 260. The skinning control system 410 may deactivate the skinning pipe pressure control, which is discussed in detail below. The return pressure control may be activated to control the return pressure within the recirculation line 260.

Figure 70:
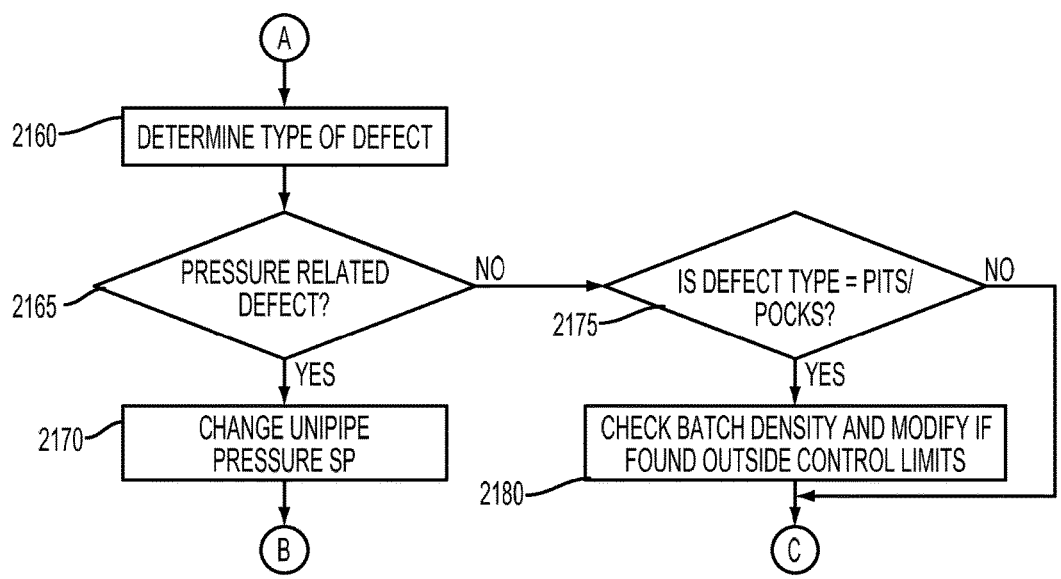
FIG. 70 is a process flow diagram of an exemplary method for controlling the skinning system.

FIG. 70 is a flowchart illustrating exemplary operations that may be included in the method 2100 shown in FIG. 69. Continuing from "A" in FIG. 69, after determining that a defect has been detected, the skinning control system 410 may determine the type of defect (block 2160). The defect may be a fast flow type defect, a starvation type defect, a pit defect, a pock defect, a ring defect, etc. The fast flow type defect and the starvation type defect may be related to the skinning pipe pressure. The skinning control system 410 may determine whether the defect is related to the skinning pipe pressure (block 2165). When the skinning control system 410 determines that the defect is a pressure related defect (Yes, block 2165), the skinning control system 410 may adjust the skinning pipe pressure set point (block 2170), and the process may proceed to "B" in FIG. 69.

When the skinning control system 410 determines that the defect is not a pressure related defect (No, block 2165), the skinning control system 410 may determine whether the defect is a pit and/or pock (block 2175). When the skinning control system 410 determines that the defect is a pit and/or pock (Yes, block 2175), the skinning control system 410 may check the density of the flowable mixture and adjust the density (e.g., by adjusting a mixer speed) if the density is outside the control limits (block 2180). The process may proceed to "C" in FIG. 69. When the skinning control system 410 determines that the defect is not a pit or a pock (No, block 2175), the process may proceed to "C" in FIG. 69.

Start-Up Control Strategy

After starting the skinning process, if the skinning speed ramps quickly (e.g., in about 3-4 seconds) to the target skinning speed, the sudden change in skinning speed from 0 mm/sec to the target speed may cause a change in the skinning pipe pressure, which may increase for slower target speeds (e.g., <5 mm/sec) and decrease for faster target speeds (e.g., >5 mm/sec). The 5 mm/second is a predetermined skinning speed threshold, and may vary depending on the system configurations. The predetermined skinning speed threshold may be determined based on tests or experiments. The skinning pipe pressure change in the related transients may last for about 3-4 articles during which time, there may be a potential of getting pressure related defects (e.g., fast flow or starvation) on the final skinned article. To significantly reduce these defects, the pressure related process transients need to be shortened so that the skinning process reaches steady state sooner. Two different control solutions, discussed below, have been developed to address this issue.

Start-Up Control Solution 1

This control solution depends on the target skinning speed. As mentioned above, if the target skinning speed is less than the predetermined threshold value (e.g., less than 5 mm/sec, where 5 mm/sec is the predetermine threshold value), the skinning pipe pressure may increase as soon as the skinning process starts. For target skinning speeds of greater than the predetermined threshold value (e.g., greater than 5 mm/sec), the skinning pipe pressure may decrease with the start of the skinning process.

For the first case (target skinning speed less than 5 mm/sec), before the start of the skinning process, the pressure relief system 1755 shown in FIGS. 38-41, 43, and 44 may be used to boost or increase the skinning pipe pressure (hence pressure relief system may also be referred to as a pressure boost system 1755 or pressure adjustment system 1755). As shown in FIGS. 38-41, 43, and 44, the pressure boost system 1755 may include a ring (e.g., a lower ring 1720) disposed adjacent or close to the skinning pipe 310. The lower ring 1720 may be moved up and down by the actuation of an actuator, such as, for example, the air cylinder type pressure release actuators 1760 and/or the electrical servo driven actuator 1815 (e.g., ball screw actuator 1815). When the lower ring 1720 moves up and down along the skinning pipe 310, it may change the volume of the space 1810 (and hence the total volume of the internal passages within the manifold 305) available for the flowable mixture to flow to the skinning pipe 310. Changing the volume of the flowable mixture may affect the pressure of the flowable mixture before the flowable mixture flows to the inner space of the skinning pipe 310 (e.g., the skinning pipe pressure).

In some embodiments, the pressure boost system 1755 may be configured such that when the lower ring 1720 moves up to an upper position, the volume of the space 1810 is reduced (thus the skinning pipe pressure is increased), and when the lower ring 1720 moves down to a lower position, the volume of the space 1810 is increased (thus the skinning pipe pressure is reduced). In some embodiments, the pressure boost system 1755 may be designed such that when the lower ring 1720 moves to the upper position, the volume of the space 1810 is increased and the skinning pipe pressure is reduced, and when the lower ring 1720 moves to the lower position, the volume of the space 1810 is reduced and the skinning pipe pressure is increased.

For illustrative purposes, the activation of the pressure boost system 1755 may be defined to be the case where the lower ring 1720 is in the upper position (hence the volume is reduced, and the skinning pipe pressure is boosted or increased). Thus, deactivating the pressure boost system 1755 refers to the status where the lower ring is at a lower position, which results in an increased volume of the space 1810 for the flowable mixture and reduced skinning pipe pressure. The definition of activation and deactivation of the pressure boost system 1755 may be defined in an opposite manner. In some embodiments, there may be three positions for the lower ring 1720, an upper position where the skinning pipe pressure is increased, a neutral position where the skinning pipe pressure is neither increased nor decreased, and a lower position where the skinning pipe pressure is decreased. When an electrical servo driven motor (e.g., the ball screw actuator 1815 shown in FIG. 44) is used, the lower ring 1720 may be finely adjusted to incrementally change the skinning pipe pressure.

As the skinning pipe pressure starts to increase, the pressure boost system 1755 may be deactivated. The lower ring 1720 may move down, increasing the volume of the space 1810 adjacent the skinning pipe 310 that is available for the flowable mixture to flow, which in turn decreases the skinning pipe pressure. Once the skinning process reaches steady-state, the skinning pipe pressure control may be activated. The skinning process could be run with the pressure boost system 1755 in this current state (deactivated state) until the end of the campaign. For the case when the target skinning speed is greater than 5 mm/sec, before the start of the skinning process, the pressure boost system must be deactivated (the lower ring 1720 is in the lower position). As the skinning pipe pressure starts to decrease, the pressure boost system 1755 is activated to cause the lower ring 1720 to move up. Since the same amount of skin material (flowable mixture) now has reduced volume or space than before, the skinning pipe pressure increases, thereby providing enough flowable mixture pressure to obtain good quality skin on the articles. Once the skinning process reaches steady-state, the skinning pipe pressure control (described below) may be activated. The skinning process may be run with the pressure boost system 1755 in the current state (activated state) until the end of the campaign.

Start-Up Control Solution 2

This control solution option may be valid only for the case when the target skinning speed is greater than 5 mm/sec. In this case, the skinning pipe pressure decreases as soon as the skinning process starts. In this control solution, as the skinning process starts, instead of ramping the skinning speed from 0 mm/sec to the target skinning speed (e.g., 8 mm/sec) in about 3-4 seconds, the skinning control system 410 may increase the skinning speed incrementally in a plurality of stages, e.g., at a first stage, skinning the first article at 3 mm/sec, at a second stage, skinning the second article at 5 mm/sec, and at the third stage, skinning the third article at the target skinning speed. This way, the mixture delivery process has sufficient time to catch up with the skinning speed and the skinning pipe pressure does not decrease during start-up. With this control method, the flowable mixture return pressure set point also needs to be changed for the first 3 articles as the return pressure set point is a function of the skinning speed, as described above. After the process reaches steady-state, the skinning pipe pressure control may be activated.

Figure 71:
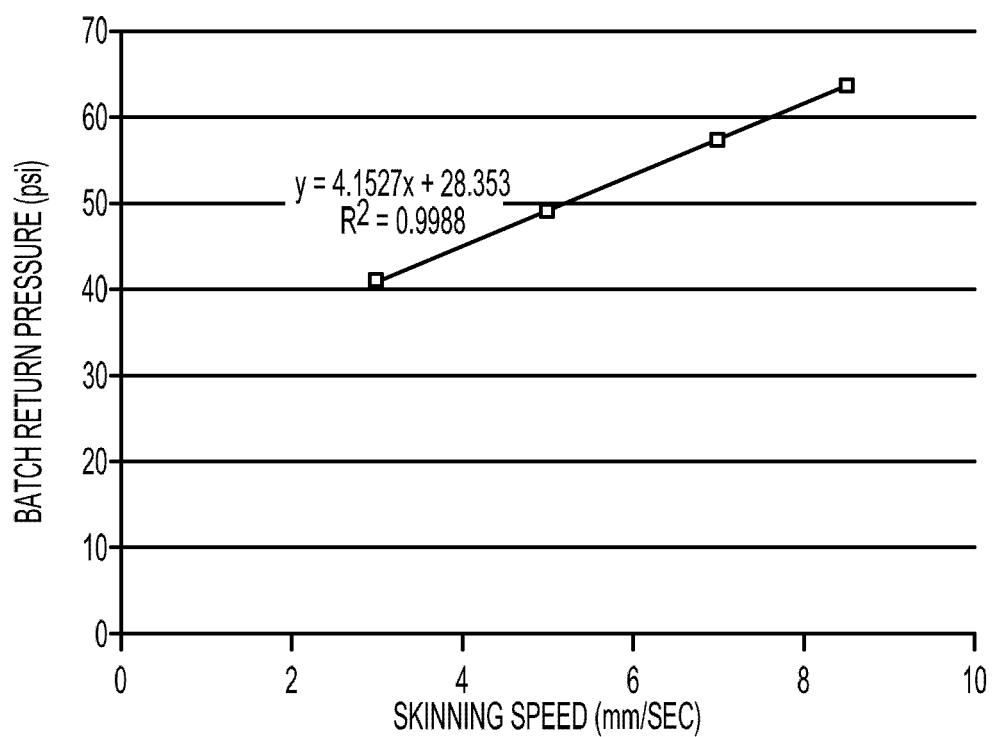
FIG. 71 is a graph of an exemplary relationship between return pressure and article skinning speed.

FIG. 71 shows a plot representing an exemplary relationship between the return pressure and the skinning speed. The plot shows an exemplary linear relationship between the return pressure and the skinning speed, which may be used for determining the return pressure set point based on the desired skinning speed, as shown in equation (B-1) discussed above.

Figure 72:
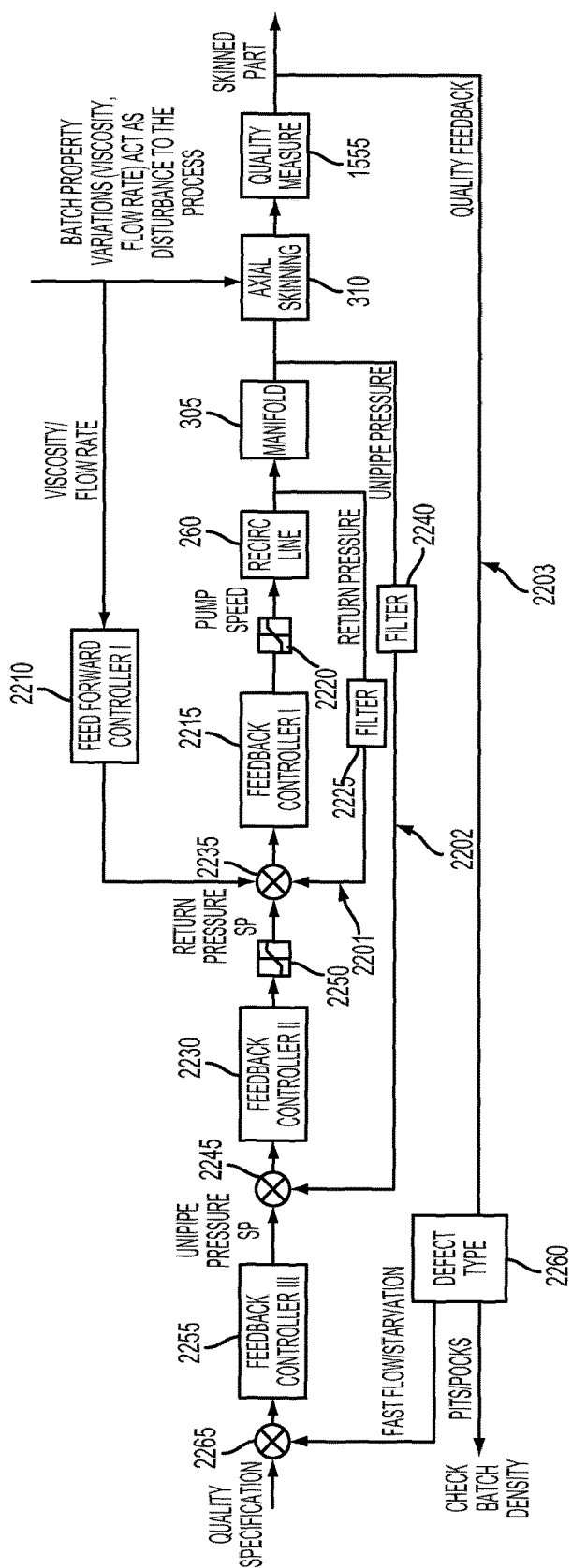
FIG. 72 is a control diagram for an exemplary method for controlling the skinning system.

FIG. 72 shows a control diagram representing controls that may be implemented by the skinning control system 410 to control the skinning process. The diagram shows a three-layer cascade control scheme 2190 for enabling delivery of defect-free or substantially defect-free skinned articles. The control scheme 2190 may include a first feed forward control 2195, a first feedback control 2201, a second feedback control 2202, and a third feedback control 2203.

The first feed forward control 2195 may include a first feed forward controller 2210. The first feed forward controller 2210 may determine a change or adjustment in the return pressure set point (e.g., the change in the target return pressure in the recirculation line 260) based on a variation in at least one of the viscosity or the flow rate of the flowable mixture. The variation in the viscosity and/or the flow rate may be input to the first feed forward controller 2210 as disturbance (or the viscosity and/or the flow rate may be input into the first feed forward controller 2210 as disturbance). In some embodiments, the skinning control system 410 may receive measured viscosity and/or the flow rate from a viscometer and/or flow meter disposed in the mixture delivery system 200, and the first feed forward controller 2210 may calculate the variation in the viscosity and/or the flow rate. In some embodiments, the skinning control system 410 may receive a signal directly indicating a variation in the measured viscosity and/or flow rate.

Referring to FIG. 72, the first feedback control 2201 may include a first feedback controller 2215. The first feedback controller 2215 may determine a pump speed (e.g., the speed of the pump 235) based on a measured return pressure (e.g., a return pressure measured in the recirculation line 260). In some embodiments, the return pressure may be measured by a pressure sensor disposed within the recirculation line 260. The first feedback control 2201 may include a saturation box 2225 to prevent pump speed from going up too high. The measured return pressure may be filtered by a filter 2225, which may be a digital filter, an analog filter, or a combination thereof. The filter 2225 may be configured to remove noise from the measurement signal of the return pressure.

The filter 2225 may be optional. The measured return pressure (filtered or not filtered) may be compared with a return pressure set point (e.g., the desired return pressure) determined by a second feedback controller 2230, and the difference or error may be combined with the change in the return pressure set point determined by the first feed forward controller 2210, as indicated by a combination symbol 2235. The result of the combination may be fed into the first feedback controller 2215 as an input.

Referring to FIG. 72, the second feedback control 2201 may include the second feedback controller 2230. The second feedback controller 2230 may determine a return pressure set point (e.g., the desired return pressure in the recirculation line 260) based on a measured skinning pipe pressure ("unipipe pressure" in FIG. 72). The measured skinning pipe pressure may be filtered by a filter 2240 to remove noise, which may be a digital filter, an analog filter, or a combination. The filter 2240 may be optional. The skinning pipe pressure (filtered or not filtered) may be compared with a skinning pipe pressure set point (e.g., a desired skinning pipe pressure) as indicated by the combination symbol 2245, and the difference (or error) may be fed into the second feedback controller 2230 to determine the return pressure set point. A saturation box 2250 may be included to limit the return pressure set point outputted from the second feedback controller 2230.

Referring to FIG. 72, the third feedback control 2203 may include a third feedback controller 2255, which may determine a skinning pipe pressure set point (e.g., a desired skinning pipe pressure set point) based on a result of monitoring presence of a defect in the skinned article. In some embodiments, the third feedback controller 2255 may determine the skinning pipe pressure set point based on a type of defect detected in the skinned articles. The at least one laser device 1555 may monitor the presence of the defects, and if any, detect the defects in the skinned articles. The skinning control system 410 or the laser device 1555 may determine (e.g., detect) the type of the defect, as indicated by box 2260. If the defect is a pit/pock type defect that is related to the density, the skinning control system 410 may check the density of the flowable mixture. If the defect is a fast flow or starvation type of defect, which is related to the skinning pipe pressure, this defect type information may be fed into the third feedback controller 2255 along with quality specification, as indicated by the combination symbol 2265. The quality specification may specify that no fast flow and/or starvation type of defect should occur, or an acceptable range of defects that may occur. The measurements (e.g., skinning pipe pressure, return pressure, defect type) shown in FIG. 72 may be real-time or near real-time measurements. Although the type of defect may be a direct input to the third feedback controller 2255, the first and second feedback controllers 2215 and 2230 may also use information derived from the type of defect, as shown in the layered feedback control scheme 2190. Thus, the determinations made by the first and second feedback controllers 2215 and 2230 may also be based on the type of defect.

The skinning pipe control scheme relating to controls shown in FIG. 72 is discussed below. As shown in FIG. 72, the skinning pipe pressure is controlled using a two-layer cascade control scheme. The inner loop (i.e., the first feedback control 2201) controls the return pressure in the recirculation line 260 using the pump speed (e.g., of pump 235) and the outer loop (i.e., the second feedback control 2202) controls the skinning pipe pressure by adjusting the return pressure set point. The measured return pressure and skinning pipe pressure signals are filtered to reduce noise so that the first and second feedback controllers 2215 and 2230 do not respond to noise induced variations. One form of the filters (e.g., filters 2225 and 2240) used to reduce noise in the pressure signals may be:

$$\text{Pressure }(k)=\alpha\times\text{Pressure }(k)+(1-\alpha)\times\text{Pressure }(k-1) \quad\text{(C-4)}$$

where 'k' is the sample time and '$\alpha$' is the filter parameter. This form of the filter as shown in equation (C-4) is a first order filter. The smaller the '$\alpha$' value, the more the signal will be filtered. This filter may induce a time delay in the filtered signal. The '$\alpha$' value may be designed to achieve a balance between the amount of filtering and time delay.

The filtered return pressure may be compared to the target return pressure (e.g., return pressure set point) as determined by the second feedback controller 2230 and the difference (or error) is sent to the first feedback controller 2215, which may automatically adjust the pump speed to reduce the error between the measured and target return pressures. The structure of the first feedback controller 2215 may be:

$$U_{FB}^{I}(s)=G_1^{-1}(s)F_1(s) \quad\text{(C-5)}$$

where, $U_{FB}^{I}(s)$ is the output of the first feedback controller 2215 in Laplace form, $F_1(s)$ is the Laplace transform representation of a low pass filter and $G_1^{-1}(s)$ is the inverse of the Laplace transform representation of the process model between the pump speed and return pressure. One form of the process model may be:

$$G_1(s)=K_1 e^{-\theta_1 s}/(1+\tau_1 s) \quad\text{(C-6)}$$

where, $K_1$, $\theta_1$, $\tau_1$ are the process gain, time delay, and the time constant respectively describing the relationship between the pump speed and the return pressure. The process model is a function of the composition of the flowable mixture and process design such as the length of tubing from the pump 235 to the location of the return pressure sensor, the type of tubing used, etc.

An example of the process model $G_1(s)$ may be:

$$G_1(s)=8e^{-7s}/(1+15s) \quad\text{(C-7)}$$

The filtered skinning pipe pressure is compared to the target skinning pipe pressure and the difference (or error) is sent to the second feedback controller 2230. This controller automatically determines the desired return pressure set point to reduce the error between the measured skinning pipe pressure and the target skinning pipe pressure. The structure of the second feedback controller 2230 may be:

$$U_{FB}^{II}(s)=C_1^{-1}(s)G_2^{-1}(s)F_2(s) \quad\text{(C-8)}$$

where, $U_{FB}^{II}(s)$ is the output of the second feedback controller 2230 in Laplace form, $F_2(s)$ is the Laplace transform representation of a low pass filter, $G_2^{-1}(s)$ is the inverse of the Laplace transform representation of the process model across the manifold 305 defining the pressure drop dynamics between the return pressure and the skinning pipe pressure and $C_1^{-1}(s)$ is the inverse of the Laplace transform of the closed loop representation of the inner control loop (i.e., the first feedback control 2201 loop).

One example of the structure of the process model $G_2(s)$ may be of the form similar to the one shown in equation (C-6):

$$G_2(s)=K_2 e^{-\theta_2 s}/(1+\tau_2 s) \quad\text{(C-9)}$$

where, $K_2$, $\theta_2$, $\tau_2$ are the process gain, time delay, and the time constant respectively describing the relationship between the return pressure and the skinning pipe pressure. This process model is also a function of the composition of the flowable mixture, mixture delivery process design from the location of the return pressure sensor to the manifold inlet (e.g., manifold inlet 1700) and the design of the manifold 305. The closed loop representation of the inner loop may be:

$$C_1(s)=U_{FB}^{I}(s)G_1(s)/[1+U_{FB}^{I}(s)G_1(s)] \quad\text{(C-10)}$$

An example of the process model defining the relationship between the return pressure set point and skinning pipe pressure, given by $C_1(s)\times G_2(s)$ may be:

$$C_1(s)\times G_2(s)=0.76e^{-7.6s}/(1+22s) \quad\text{(C-11)}$$

A simple form of both feedback controllers given by, $U_{FB}^{I}(s)$ and $U_{FB}^{II}(s)$ may be:

$$U_{FB}^{I}(s)=K_P^{I}+K_I^{I}/s \quad\text{(C-12)}$$

$$U_{FB}^{II}(s)=K_P^{II}+K_I^{II}/s \quad\text{(C-13)}$$

where, $K_P^{I}$ and $K_I^{I}$ are the proportional and integral gain for the first feedback controller 2215 and $K_P^{II}$ and $K_I^{II}$ are the proportional and integral gain of the second feedback controller 2230.

Based on equations (C-7) and (C-11) it can be observed that the outer loop process (i.e., the second feedback control 2202 loop) is not much slower than the inner loop process (i.e., the first feedback control 2201 loop). Hence, $K_P^{I}$ and $K_I^{I}$ are so designed such that the inner loop control (i.e., first feedback control 2201) is at least 5 times faster than the outer control loop (i.e., the second feedback control 2202), for example, 10 times faster. Example values of the controller parameters may be:

$$K_P^{I}=0.1; K_I^{I}=0.6; K_P^{II}=0.8; K_I^{II}=2.6 \quad\text{(C-14)}$$

Figure 73:
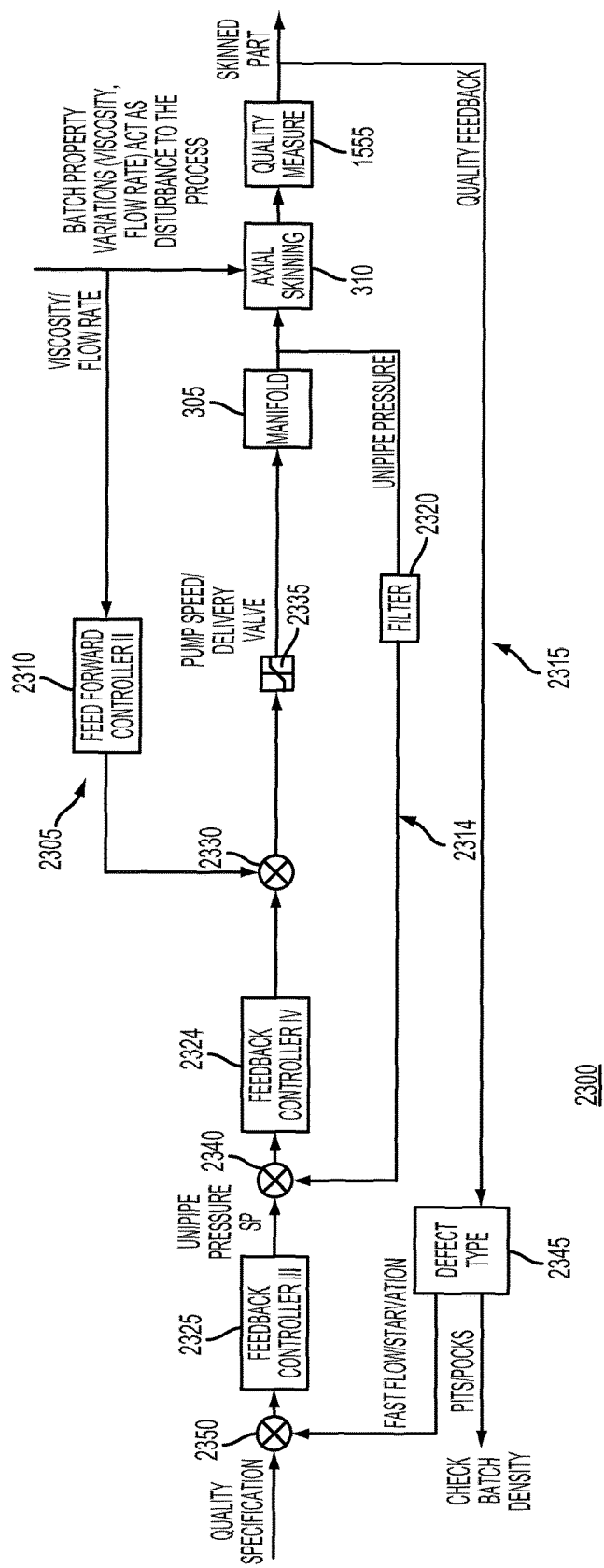
FIG. 73 is a control diagram for an exemplary method for controlling the skinning system.

FIG. 73 shows a control diagram representing controls that may be implemented by the skinning control system 410 to control the skinning process. The control scheme 2300 may include a second feed forward control 2305, which may include a second feed forward controller 2310. The second feed forward controller 2310 may determine a change or adjustment in the pump speed (e.g., the speed of the pump 235) and/or the delivery valve position (e.g., the opening of the delivery valve 245) based on a variation in at least one of the viscosity or flow rate of the flowable mixture, which may be input into the second feed forward controller 2310 as disturbance.

The control scheme 2300 may include a fourth feedback control 2314 and a fifth feedback control 2315. The fourth feedback control may include a filter 2320 configured to remove noise in the measured skinning pipe pressure, and a fourth feedback controller 2324 configured to determine the pump speed and/or the delivery valve position based on the measured skinning pipe pressure.

The fifth feedback control 2315 may include a fifth feedback controller 2325, which may determine a skinning pipe pressure set point based on a result of monitoring presence of a defect in the skinned articles. In some embodiments, monitoring the presence of the defect may include detecting a type of the defect, when the defect is present. The fifth feedback controller 2325 may determine the skinning pipe pressure set point based on the type of the defect in the skinned articles. The output of the fourth feedback controller 2324 may be the pump speed and/or the delivery valve position, which may be combined with the adjustment in the pump speed and/or the delivery valve position output from the second feed forward controller 2310, as indicated by a combination symbol 2330. The combination of the output from the second feed forward controller 2310 and the fourth feedback controller 2324 is the total pump speed and/or delivery valve position, which are then used by the mixture control system 405 to adjust the pump speed and/or the delivery valve position. The outputs combination may be limited by a saturation box 2335 included in the fourth feedback control 2314.

Referring to FIG. 73, the filtered skinning pipe pressure (or not filtered, since the filter 2320 may not be included) may be compared with a skinning pipe pressure set point output from the fifth feedback controller 2325, as indicated by the combination symbol 2340. The difference (or error) may be fed into the fourth feedback controller 2324 as an input to determine the pump speed and/or the delivery valve position. The fifth feedback control 2315 may receive the quality measurement, e.g., a result of monitoring that may include information regarding the presence of the defects, from the at least one laser device 1555. The laser device 1555 may continuously monitoring presence of a defect on the skin of a skinned article. When the defect is present on the skin, the laser device 1555 may detect the defect. The skinning control system 410 and/or the laser device 1555 may determine the type of the defect (e.g., a fast flow type, a starvation type, a pit type, a pock type, a ring type, etc.), as indicated by the box 2345. If the type of the defect is pits/pocks, the skinning control system 410 may communicate with the mixture control system 405 to check the density of the flowable mixture. If the type of the defect is fast flow and/or starvation, this defect type information may be fed into the fifth feedback controller 2325 along with the quality specification, as indicated by the combination symbol 2350.

The skinning pipe control scheme relating to controls shown in FIG. 73 is discussed below. In this embodiment, the skinning pipe pressure may be directly controlled using the pump speed and/or the delivery valve (e.g., delivery valve position). The filtered skinning pipe pressure may be compared to the target skinning pipe pressure (e.g., the skinning pipe pressure set point) and the difference (or error) is sent to the fourth feedback controller 2324. This controller automatically adjusts the pump speed and/or the delivery valve position to reduce the error between the measured skinning pipe pressure and the target skinning pipe pressure.

The structure of the fourth feedback controller 2324 may be:

$$U_{FB}^{IV}(s) = G_4^{-1}(s) F_4(s) \tag{C-15}$$

where, $U_{FB}^{IV}(s)$ is the output of the fourth feedback controller 2324 in Laplace form, $F_4(s)$ is the Laplace transform representation of a low pass filter and $G_4^{-1}(s)$ is the inverse of the Laplace transform representation of the process model between the pump speed or the delivery valve position and skinning pipe pressure, depending on which one of the pump speed or the delivery valve position is selected for the control.

A single feedback controller may be used for controlling the skinning pipe pressure, as described in this embodiment instead of the cascade control described in FIG. 72. The cascade control scheme shown in FIG. 72 may provide some ease of implementation benefits. If for some reason, the skinning process is stopped, then only the outer loop (i.e., the second feedback control 2202 loop) need to be turned off while the inner loop (i.e., the first feedback control 2201 loop) continues to execute to control the flowable mixture return pressure using the pump speed. In the case of the single feedback controller option, as shown in FIG. 73, whenever the skinning process is stopped, not only does the feedback signal may need to be switched (from skinning pipe pressure to return pressure), the controller parameters may also need to be changed. Another advantage of the cascade control architecture shown in FIG. 72 is the ability to tune the inner loop (i.e., the second feedback control 2202 loop) relatively fast so that the inner loop will be able to reject any disturbances caused in the flowable mixture delivery line as the return pressure will detect this sooner than the skinning pipe pressure.

FIG. 74 shows a control diagram representing controls that may be implemented by the skinning control system 410 to control the skinning process. The control scheme 2360 shown in FIG. 74 may be similar to the control scheme shown in FIG. 72, except for the feed forward control. The feed forward control in the control scheme 2360 may determine an adjustment or change in the flow rate set point (e.g., target flow rate), rather than the in the return pressure set point, as shown in the control scheme of FIG. 72.

Referring to FIG. 74, the control scheme 2360 may include a third feed forward control 2365, which may include a third feed forward controller 2370 configured to determine an adjustment or change in the flow rate set point. A variation in at least one of the viscosity or the flow rate may be input into the third feed forward controller 2370 as disturbance. The control scheme 2360 may include a sixth feedback control 2366, a seventh feedback control 2367, and an eighth feedback control 2368.

The sixth feedback control 2366 may include a sixth feedback controller 2376, the seventh feedback control 2367 may include a seventh feedback controller 2377, and the eighth feedback control 2368 may include an eighth feedback controller 2378. The sixth feedback controller 2376 may be configured to determine a pump speed based on a measured flow rate in the delivery line 240. The flow rate may be measured by a flow meter disposed downstream of the pump 235. The measured flow rate may be filtered by a filter 2380 to remove noise in the flow rate measurement. The filtered (or not filtered since the filter 2380 may not be included in some embodiments) may be compared with a flow rate set point output from the seventh feedback controller 2377, as indicated by the combination symbol 2385. The difference (or error) is fed into the sixth feedback controller 2376 along with the adjustment in the flow rate set point output from the third feed forward controller 2370. The sixth feedback controller 2376 may determine a pump speed. The output pump speed may be limited by a saturation box 2390, which is then be used by the mixture control system 405 to adjust the pump 235.

Referring to FIG. 74, the seventh feedback controller 2377 may determine the flow rate set point based on the measured skinning pipe pressure. The measured skinning pipe pressure may be filtered by a filter 2395 to remove noise. The filtered skinning pipe pressure (or not filtered since the filter 2395 may be optional) may be compared with a skinning pipe pressure set point output from the eighth feedback controller 2378, as indicated by a combination symbol 2400. The difference (or error) may be input into the seventh feedback controller 2377 to determine the flow rate set point. The flow rate set point output from the seventh feedback controller 2377 may be limited by a saturation box 2405.

The eighth feedback controller 2378 may determine the skinning pipe pressure set point based on a result of monitoring presence of a defect in the skinned article. For example, the eighth feedback controller 2378 may determine the skinning pipe pressure set point based on a type of the defect in the skinned articles. The skinning control system 410 may receive signals from the at least one laser device 1555, which may include information regarding the presence of the defects (e.g., whether defects are detected) in the skinned articles, and may determine, based on the received signals, the type of the defect in the skinned article, as indicated by the box 2410. Alternatively, the laser device 1555 may detect the type of the defect. If the type of the defect is pit/pock, the skinning control system 410 may communicate with the mixture control system 405 to check the density of the flowable mixture. If the type of the defect is fast flow and/or starvation, this type of defect information may be fed into the eighth feedback controller 2378 along with the qualify specification, as indicated by a combination symbol 2415.

Models for the controllers shown in FIG. 74 may be similarly designed, as those described above in equations (C-4) to (C-14), except that the specific design values shown in (C-7), (C-11), and (C-14) may be different.

Referring to the controls shown in FIGS. 72-74, the skinning pipe pressure control parameters (e.g., parameters used by at least one of the first feedback controller 2215, second feedback controller 2230, fourth feedback controller 2324, sixth feedback controller 2376, or seventh feedback controller 2377) need to be adjusted as a function of the skinning speed. For slower skinning speeds the pressure drop dynamics across the manifold 305 is much slower than for higher skinning speeds. So if the control parameters that were determined for higher skinning speeds are used for slower skinning speeds, the controller performance would be very aggressive which might not be a desirable from a process standpoint. Hence the control parameters need to be optimized as a function of the skinning speed.

The control schemes shown in FIGS. 72-74 enables the control system 400 to adjust the process set points (e.g., at least one of the return pressure set point, the delivery pressure set point, the skinning pipe pressure set point, or the flow rate set point) automatically based on the monitoring of the presence of the defect in the final skinned articles (e.g., based on the type of defect detected on the final skinned articles). By using the feed forward controls 2195, 2305, and 2365, the control system 400 may proactively compensate for variations in the properties of the flowable mixture, such as the flow rate and viscosity. The feedback, such as, the quality measurement (e.g., measured defect), the skinning pipe pressure measurement, the return pressure measurement, or the flow rate measurement, may be real-time or near real-time feedback. The inputs (e.g., disturbance) to the feed forward controllers, such as the viscosity and/or flow rate, or their variations, may also be real-time or near real-time inputs.

Figure 75:
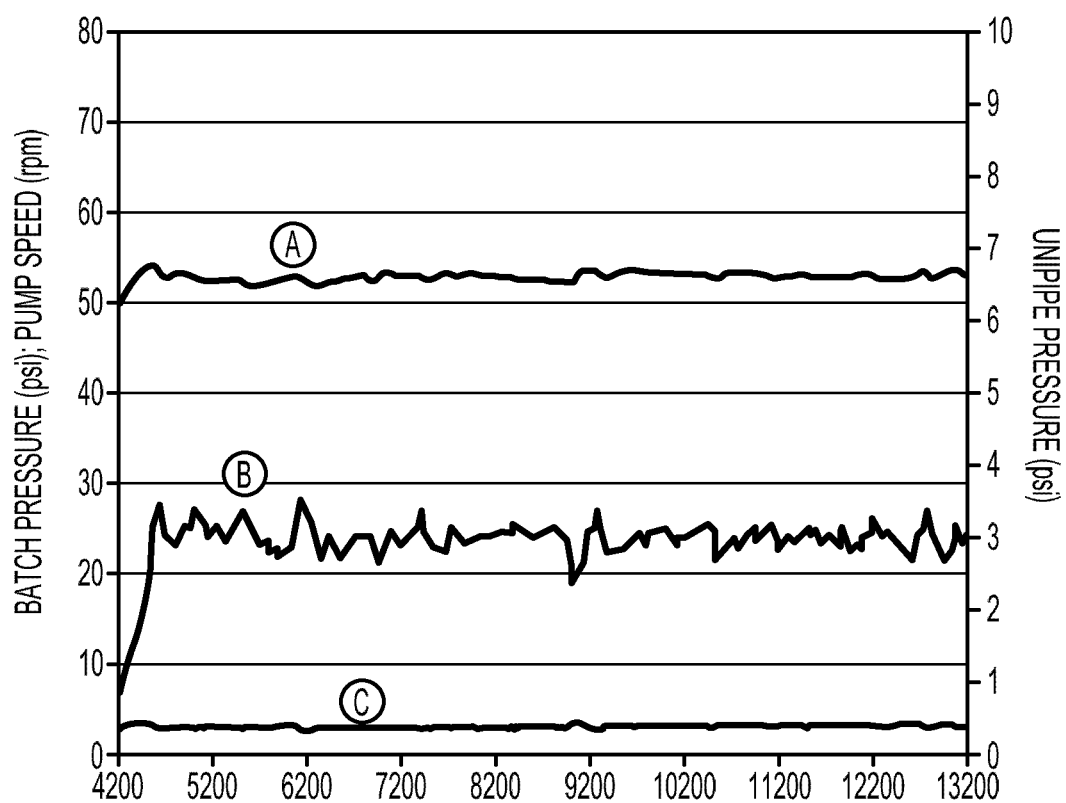
FIG. 75 is a graph of performance of exemplary skinning pipe pressure control schemes.

FIG. 75 shows a sample plot showing the performance of the skinning pipe pressure control scheme 2190 shown in FIG. 72. The plot shows the return pressure (A), the skinning pipe pressure (B), and the pump speed versus time. The control scheme 2190 may be configured to maintain the skinning pipe pressure within reasonable tolerance of the desired target value of 3 psi. The standard deviation of the skinning pipe pressure may be less than 0.2 psi for the whole run of about 85 articles. When smaller dimension (e.g., diameter) articles go through the process, the control scheme 2190 may automatically adjust the return pressure to compensate for the smaller dimension (e.g., diameter) articles and continue to maintain the skinning pipe pressure within tolerance of the target value.

Referring to the controls shown in FIGS. 72-74, the feed forward controllers 2210, 2310, and 2370 may be different, but their designs may share the same design philosophy. An example design of the first feed forward controller 2210 shown in FIG. 72 is discussed below for illustrative purposes. The second and third feed forward controllers 2310 and 2370 may be similarly designed. The structure of the first feed forward controller 2310 shown in FIG. 72 may be shown in below equation (C-16):

$$U_{FF}(s)=[G_P^{-1}(s)]Q_D(s) \quad (C-16)$$

where, $U_{FF}(s)$ is the Laplace transform of the output of the first feed-forward controller 2210, $Q_D(s)$ is the Laplace transform of the feed-forward model predicted impact of the viscosity on skinning pipe pressure and $G_P^{-1}(s)$ is the inverse of the Laplace transform of the process model between return pressure set point and the skinning pipe pressure.

The traditional approach of feed-forward control scheme is to obtain the model between the disturbance (e.g., the viscosity) and the process output (e.g., the skinning pipe pressure) so that the model can be used to predict the output drifts based on disturbance changes. The second step is to determine the change in the control action needed to offset the predicted process output drift using the process model between the control actuator (e.g., the return pressure set point) and the process output.

Figure 76:
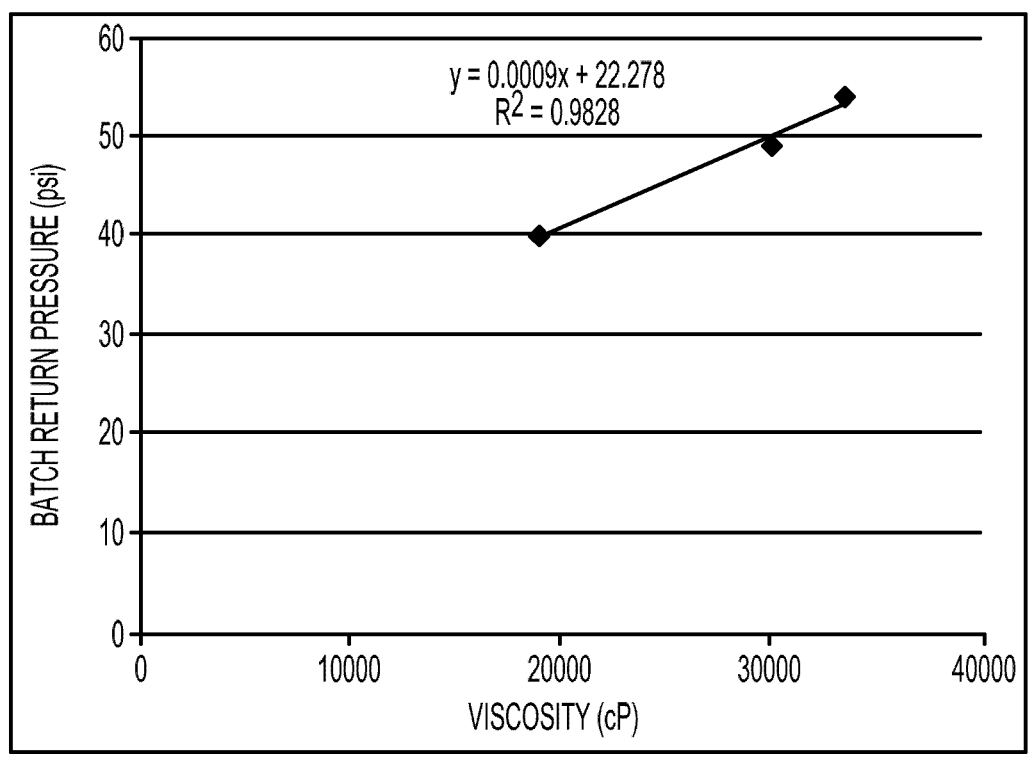
FIG. 76 is a graph of an exemplary relationship between viscosity and return pressure set point.

FIG. 76 shows an exemplary relation between viscosity and return pressure set point to maintain the same skinning pipe pressure. This relation is useful in designing the first feed forward controller 2210 shown in FIG. 72. This may be another way of implementing feed-forward control. In this case, a model between the disturbance (e.g., the viscosity) and the control actuator (e.g., the return pressure set point) may be obtained and the inverse of this model may be used as the first feed-forward controller 2210. An exemplary form of this controller may be a proportional only controller. Using the relation shown in FIG. 76, the feed forward controller 2210 gain may be obtained as shown in equation (C-17):

$$Kc=\Delta BRP/\Delta \text{viscosity}=0.0009 \quad (C-17)$$

where $\Delta BRP$ is the change in return pressure set point and $\Delta$viscosity is the change in the viscosity of the flowable mixture. The governing equation of the first feed forward controller 2210 may be shown in equation (C-18):

$$U_{FF}(k+\tau)=Kc(\Delta \text{Viscosity}(k)) \quad (C-18)$$

where, k is the sample time, $U_{FF}(.)$ is the output of the first feed-forward controller 2210, $\tau$ is the transport delay defined as the time the first feed-forward controller 2210 takes for the flowable mixture to travel from the location of the viscosity measurement to the location of the skinning pipe pressure measurement, and $\Delta$Viscosity(k) is the change in viscosity defined as shown in equation (C-19):

$$\Delta \text{Viscosity}(k)=\text{Viscosity}(k)-\text{Viscosity}(k-1) \quad (C-19)$$

The output of the first feed-forward controller 2210 is the change in the return pressure set point needed to compensate for any incoming viscosity variations. This output is combined with the output of the second feedback controller 2230 shown in FIG. 72 to obtain the final controller output defined as shown in equation (C-20):

$$U(s)=U_{FB}^{H}(s)-U_{FF}(s) \quad (C-20)$$

The second feed forward controller 2310 and third feed forward controller 2370 may be designed similarly using the principles described above for the design of the first feed forward controller 2210. Similar to the model shown in FIG. 76 for the first feed forward controller 2210, a model between viscosity and pump speed may be obtained for the second feed forward controller 2310 to maintain the same skinning pipe pressure and a model between the viscosity and flow rate may be obtained for the third feed forward controller 2370.

Referring to FIGS. 72-74, although return pressure and return pressure set point are used in the controls, they may be replaced by delivery pressure (e.g., the pressure in the delivery line 240) and delivery pressure set point.

Figure 77:
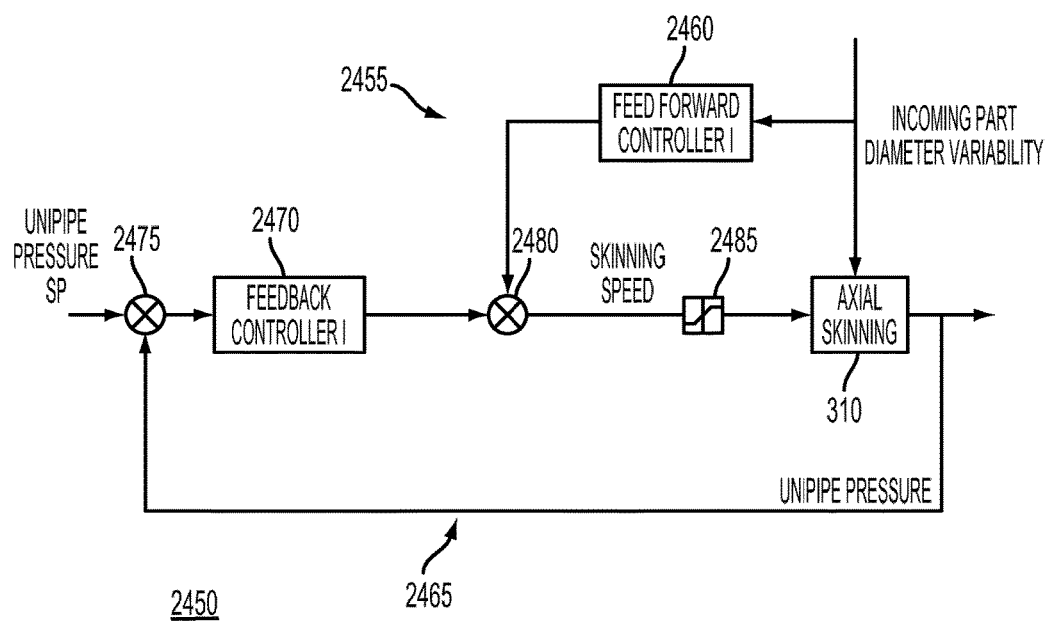
FIG. 77 is a control diagram of an exemplary method for controlling the skinning pipe pressure based on a variation in the article dimension.
Figure 79:
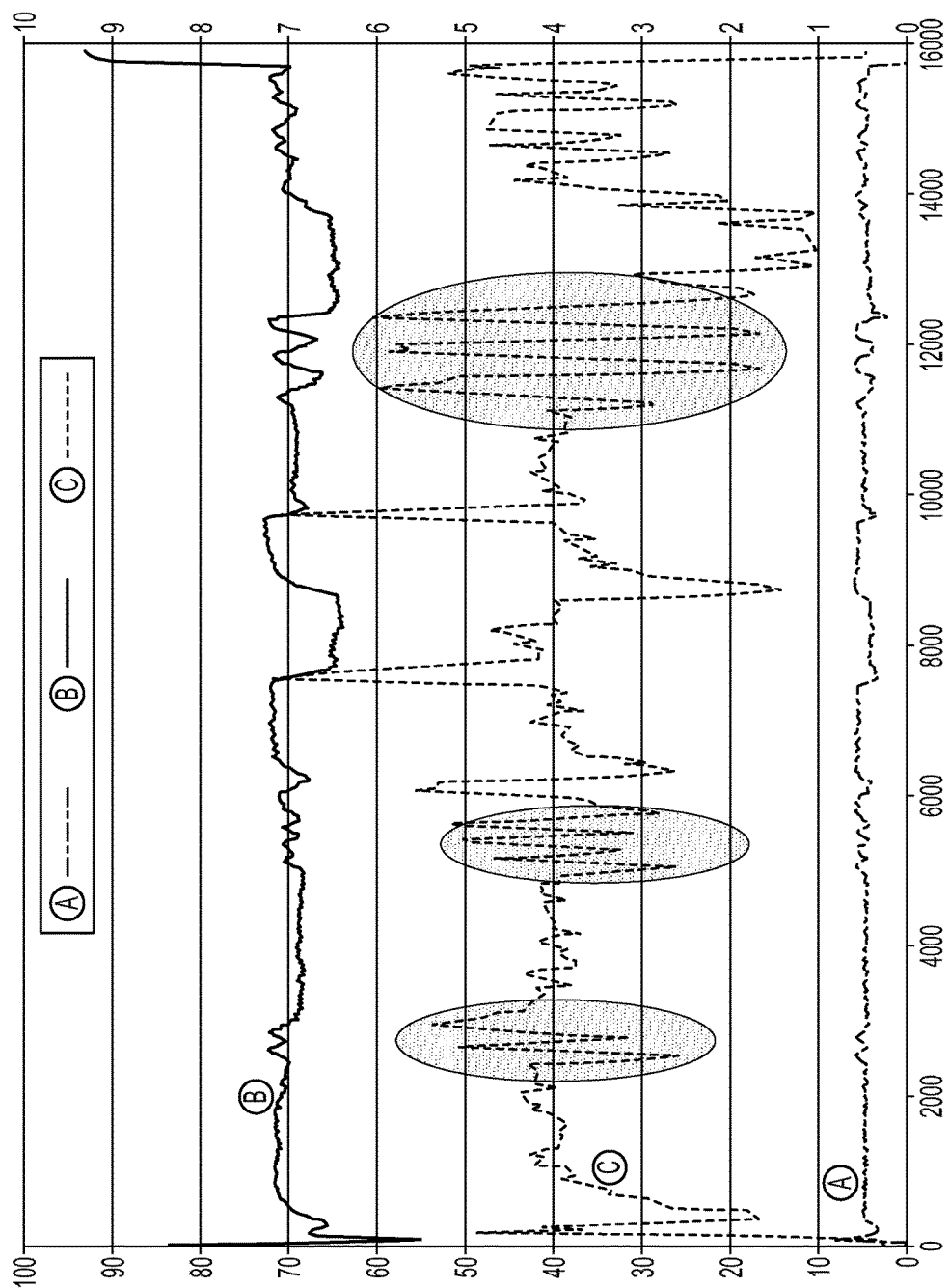
FIG. 79 is a graph showing the impact of incoming article dimension variations on the skinning pipe pressure.

FIG. 77 shows an exemplary control scheme 2450 for controlling the skinning pipe pressure. Variations in the unskinned article dimensions (e.g., diameter, radius, circumference, axial length, and/or outer peripheral length) may affect the skinning pipe pressure. For illustrative purposes, the variations in the unskinned article dimensions (e.g., diameters) refer to the dimension (e.g., diameter) variations in different articles, although the variation in the dimension (e.g., diameter) within a single article may also be used in the control of the skinning pipe pressure. FIG. 79 shows a sample plot showing the impact of incoming article dimension (e.g., diameter) variations on the skinning pipe pressure (or unipipe pressure). The plot shows that the greater the magnitude of variation, the greater the impact on the skinning pipe pressure in terms of sustained oscillations. The existence of the sustained oscillations results in the loss of the process window for the skinning process.

Referring back to FIG. 77, to compensate for the pressure change in the skinning pipe that may be caused by the variations in the unskinned article dimensions (e.g., diameter, radius, circumference, axial length, and/or outer peripheral length), the control scheme 2450 may include a feed forward control 2455 that includes a feed forward controller 2460 configured to estimate (or predict, calculate, determine) an adjustment or change to a skinning speed based on the variation in the measured incoming article dimensions (e.g., diameters). The variation in the incoming article dimensions (e.g., diameters) may be fed into the feed forward controller 2460 as disturbance.

The control scheme 2450 may include a feedback control 2465 that includes a feedback controller 2470. The feedback controller 2470 may determine the skinning speed based on the measured skinning pipe pressure. The measured skinning pipe pressure may be compared with a skinning pipe pressure set point, as indicated by a combination symbol 2475. The feedback control 2465 may include a filter to remove noise from the measured skinning pipe pressure, similar to the filter 2240 shown in FIG. 72. The skinning speed determined by the feedback controller 2470 may be combined with the adjustment to the skinning speed determined by the feed forward controller 2460, as indicated by the combination symbol 2480. The result of the combination is then fed into a saturation box 2485, which limits the skinning speed. The skinning control system 410 may use the skinning speed thus determined to control the skinning system 300. For example, the skinning control system 410 may send a signal to at least one of the lower servo motor 1535 or the upper servo motor 1545 shown in FIG. 26 to control the speed of the skinning. As shown in FIGS. 52 and 53, the incoming unskinned article dimension (e.g., diameter) may be measured by the laser devices 1560, which may transmit the dimension (e.g., diameter) signals or data to the skinning control system 410. The measurement of the incoming article dimensions (e.g., diameters) may be real-time or near real-time measurement. By controlling the skinning speed, the skinning pipe pressure may be controlled.

Figure 78:
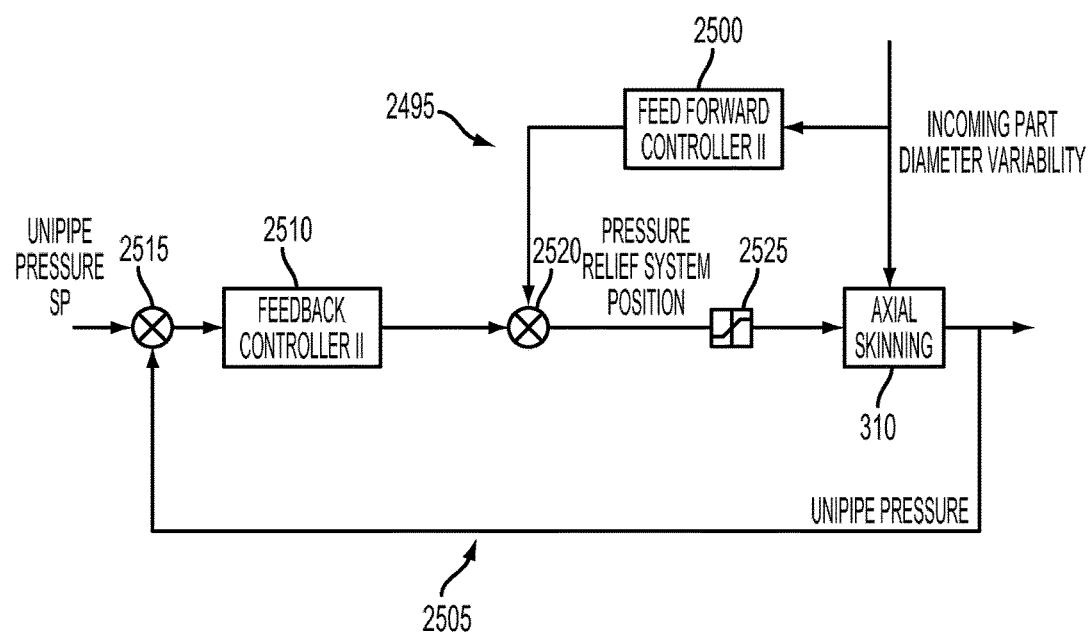
FIG. 78 is a control diagram of an exemplary method for controlling the skinning pipe pressure based on a variation in the article dimension.

The control scheme 2450 shown in FIG. 77 uses the skinning speed as the control parameter, which is adjusted by the skinning control system 410, such that a desired skinning pipe pressure set point is maintained at the skinning pipe 310. Alternatively or additionally, the pressure relief system position may be used as the control parameter, as shown in FIG. 78. That is, the pressure relief system 1755 shown in FIGS. 38-41, 43, and 44 may be adjusted based on the output from the feed forward controller, as shown in FIG. 78, to control the skinning pipe pressure such that it is within an acceptable range of the skinning pipe pressure set point.

The control scheme 2490 shown in FIG. 78 may include a feed forward control 2495, which may include a feed forward controller 2500. The feed forward controller 2500 may determine an adjustment or change to the pressure relief system position (e.g., how much the pressure relief system 1755 should move the lower ring 1720, which in turn affects the skinning pipe pressure) based on the variation in the measured incoming unskinned article dimension (e.g., diameter).

The control scheme 2490 may include a feedback control 2505, which may include a feedback controller 2510 that may determine a pressure relief system position based on the measured skinning pipe pressure. The measured skinning pipe pressure may be compared with the skinning pipe pressure set point, as indicated by the combination symbol 2515. The difference (or error) may be fed into the feedback controller 2510. The pressure relief system position output from the feedback controller 2510 may be combined with the adjustment to the pressure relief system position determined by the feed forward controller 2500, as indicated by the combination symbol 2520. The combined result may be limited by a saturation box 2525. The pressure relief system position output from the saturation box 2525 may be used by the skinning control system 410 to control the pressure relief system 1755. For example, the skinning control system 410 may send a signal to the pressure relief system 1755 to adjust the lower ring 1720, such that the skinning pipe pressure is adjusted. The measured skinning pipe pressure may be filtered by a filter (e.g., a digital or analog filter) to remove noise.

Referring to FIGS. 77 and 78, the feedback controller design will be discussed. The feedback controllers 2470 and 2510 may be different, but the design philosophy may be the same or similar in the sense that the skinning pipe pressure is monitored and compared to a target skinning pipe pressure (e.g., the skinning pipe pressure set point) and an control parameter (e.g., the skinning speed or the pressure relief system position) is adjusted to compensate for any pressure change due to incoming unskinned article dimension (e.g., diameter) variation. The control parameter for the control scheme of FIG. 77 is the skinning speed while the control parameter for the control scheme of FIG. 78 is the position of the pressure relief system 1755 (or the pressure relief system position). The process dynamics between the skinning speed and skinning pipe pressure may be different from the process dynamics between the pressure relief system position and skinning pipe pressure. The measured pressure signal may be filtered to reduce noise so that the designed controller does not respond to noise induced variations. The control schemes 2450 and 2490 shown in FIGS. 77 and 78 may be incorporated into the control schemes shown in FIGS. 72-74, in addition to or instead of the skinning pipe pressure control schemes disclosed in FIGS. 72-74.

One exemplary form of filter design is shown in equation (C-4) discussed above. The filtered (or not filtered) skinning pipe pressure is compared to the target skinning pipe pressure (e.g., skinning pipe pressure set point) and the difference (or error) may be sent to the feedback controller 2470 or 2510, which automatically adjusts the control parameter (either the skinning speed or the pressure relief system position) to compensate for the pressure change due to the variation in the incoming article dimension (e.g., diameter).

The controller may only react if the error is greater than a certain value (deadband). If not, the controller output may not change.

The structure of the feedback controller 2470, when the error between the measured skinning pipe pressure and the target skinning pipe pressure is greater than the deadband, may be:

$$U_{FB}^I(s) = G_1^{-1}(s) F_1(s) \quad (C-21)$$

where, $U_{FB}^I(s)$ is the output of the feedback controller 2470 in Laplace form, $F_1(s)$ is the Laplace transform representation of a low pass filter and $G_1^{-1}(s)$ is the inverse of the Laplace transform representation of the process model between the skinning pipe pressure and skinning speed. The process dynamics between the skinning speed and the skinning pipe pressure may be reverse acting as an increase in the skinning speed results in a decrease in the skinning pipe pressure. Hence, it may be desirable to design the controller to be direct acting. That means that if an increase in skinning pipe pressure is detected, the skinning speed should be increased to reduce the skinning pipe pressure.

One form of the process model may be:

$$G_1(s) = -K_1 e^{-\theta_1 s}/(1+\tau_1 s) \quad (C-22)$$

where, $K_1$, $\theta_1$, $\tau_1$ are the process gain, time delay, and the time constant respectively describing the relationship between the skinning speed and skinning pipe pressure. Note that the process gain $K_1$ is negative describing the reverse acting nature of the process.

The structure of the feedback controller 2510, when the error between the measured skinning pipe pressure and the target skinning pipe pressure is greater than the deadband, may be:

$$U_{FB}^{II}(s) = G_2^{-1}(s) F_2(s) \quad (C-23)$$

where, $U_{FB}^{II}(s)$ is the output of the feedback controller 2510 in Laplace form, $F_2(s)$ is the Laplace transform representation of a low pass filter and $G_2^{-1}(s)$ is the inverse of the Laplace transform representation of the process model between the skinning pipe pressure and pressure relief system position. The process dynamics between the pressure relief system position and the skinning pipe pressure is direct acting, as an increase in the position of the pressure relief system results in an increase in the skinning pipe pressure. Hence, it may be desirable to design the controller to be reverse acting. That means that if an increase in skinning pipe pressure is detected, the pressure relief system position should be decreased to reduce the skinning pipe pressure.

One form of the process model may be:

$$G_2(s) = K_2 e^{-\theta_2 s}/(1+\tau_2 s) \quad (C-24)$$

where, $K_2$, $\theta_2$, $\tau_2$ are the process gain, time delay, and the time constant respectively describing the relationship between the pressure relief system position and skinning pipe pressure.

One exemplary form of the feedback controller may be a proportional only controller:

$$U_{FB}^I(s) = -1/K_1 \quad (C-25)$$

$$U_{FB}^{II}(s) = 1/K_2 \quad (C-26)$$

The final form of the controller in time domain may be:
For the feedback controller 2470 shown in FIG. 77 that uses skinning speed as the control parameter:

$$U_{FB}^I(k) = U_{FB}^I(k-1); e(k) \leq \text{deadband} \quad (C-27)$$

$$U_{FB}^I(k) = U_{FB}^I(k-1) - [e(k) - e(k-1)]/K_1; e(k) > \text{deadband} \quad (C-28)$$

For the feedback controller 2510 shown in FIG. 78 that uses pressure relief system position as the control parameter:

$$U_{FB}^{II}(k) = U_{FB}^{II}(k-1); e(k) \leq \text{deadband} \quad (C-29)$$

$$U_{FB}^{II}(k) = U_{FB}^{II}(k-1) + [e(k) - e(k-1)]/K_2; e(k) > \text{deadband} \quad (C-30)$$

where $e(k)$ is defined as:

$$e(k) = \text{Skinning Pipe Pressure Set Point} - \text{Skinning Pipe Pressure } (k) \quad (C-31)$$

Example nominal values of the deadband may range from 0.2 psi to 0.8 psi.

The controller design for the feed forward controllers 2460 and 2500 shown in FIGS. 77 and 78 is discussed below. The feed-forward controller depends on the predicted impact of the incoming article dimension (e.g., diameter) variation on the skinning pipe pressure. If the predicted impact on the skinning pipe pressure is within a certain threshold, the feed-forward controller output may be held substantially constant and not changed. This can also be stated as follows: if the incoming article dimension (e.g., diameter) variation is within a certain range, then the feed-forward controller output may be held substantially constant and not changed. The feed-forward controller may become active only when the incoming article dimension (e.g., diameter) variation is outside the limits.

The structure of the feed forward controller 2460 shown in FIG. 77 may be:

$$U_{FF}^I(s) = [G_1^{-1}(s)] Q_D(s) \quad (C-32)$$

where, (s) is the Laplace transform of the output of the feed forward controller 2460, (s) is the Laplace transform of the feed-forward model predicted impact of the incoming article dimension (e.g., diameter) variation on the skinning pipe pressure and $G_1^{-1}(s)$ is the inverse of the Laplace transform of the process model between skinning speed and the skinning pipe pressure as shown in equation (C-22). Similarly, the structure of the feed forward controller 2500 as shown in FIG. 78 may be:

$$U_{FF}^{II}(s) = [G_2^{-1}(S)] Q_D(s) \quad (C-33)$$

Figure 80:
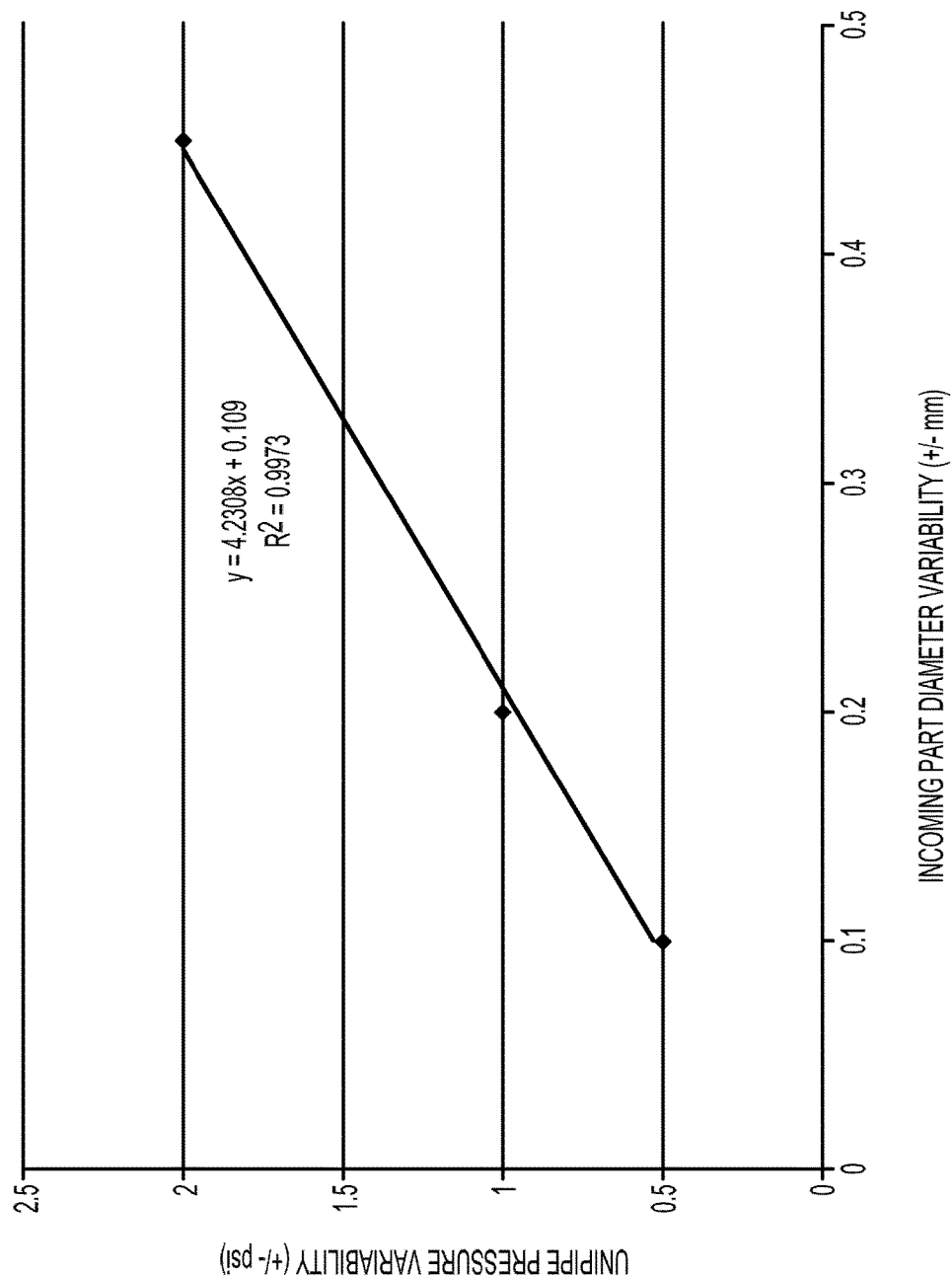
FIG. 80 is a graph showing the impact of incoming article dimension variations on the skinning pipe pressure.

One example of a feed forward control structure is described below. FIG. 80 shows a sample plot showing the impact of incoming article dimension (e.g., diameter) variations on the skinning pipe pressure in a regression form. The plot shows the skinning pipe pressure change or variation versus the incoming article dimension (e.g., diameter) change or variation. As shown in FIG. 80, there is a linear relationship between the change in the skinning pipe pressure and the variation in the incoming article dimensions (e.g., diameters). Based on FIG. 80, the impact of the incoming article dimension (e.g., diameter) variation on the unipipe pressure can be simplified as:

$$Q_D(s) = 4.2 \times e_D(k) \quad (C-34)$$

where, $e_D(k)$ is defined as:

$$e_D(k) = \text{nominal article diameter} - \text{incoming article diameter } (k) \quad (C-35)$$

Combining equations (C-25), (C-26), and (C-34), for the feed forward controller 2460 shown in FIG. 77, where skinning speed is a control parameter, the model is:

$$U_{FF}^I(k+\tau) = U_{FF}^I(k-1); e_D(k) \leq \text{diameter deadband} \quad (C-36)$$

$$U_{FF}^I(k+\tau) = -[4.2 \times e_D(k)]/K_1; e_D(k) > \text{diameter deadband} \quad (C-37)$$

For the feed forward controller 2500 shown in FIG. 78, where the pressure relief system position is used as a control parameter, the model is:

$$U_{FF}^{II}(k+\tau) = U_{FF}^{II}(k-1); e_D(k) \leq \text{diameter deadband} \quad (C\text{-}38)$$

$$U_{FF}^{II}(k+\tau) = [4.2 \times e_D(k)]/K_2; e_D(k) > \text{diameter deadband} \quad (C\text{-}39)$$

where, τ is defined as the time it takes for the incoming article to reach the location in the skinning process when the impact on the skinning pipe pressure will be seen. Example nominal values of the diameter deadband could range from +/−0.05 mm to +/−0.1 mm.

Figure 81:
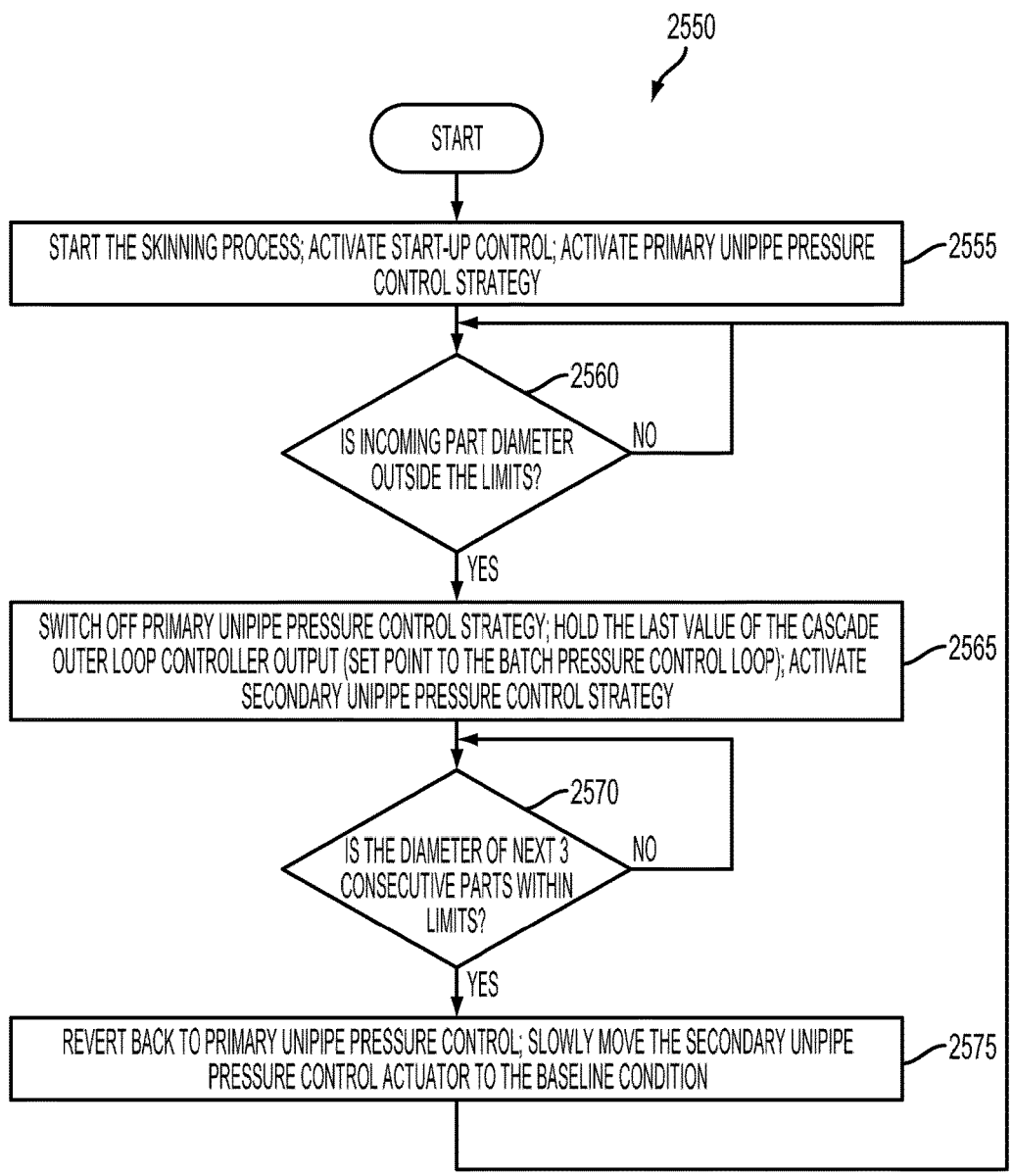
FIG. 81 is a process flow diagram of an exemplary method for controlling the skinning pipe pressure.

FIG. 81 is a flowchart illustrating an exemplary method 2550 for controlling the skinning pipe pressure. The method 2550 may be performed by the skinning control system 410. The method 2550 may include starting the skinning process, activating the start-up control, and activating a first (e.g., primary) skinning pipe pressure control (block 2555). The primary skinning pipe pressure control refers to the skinning pipe pressure controls shown in FIGS. 72-74. For illustrative purposes, below discussion uses the skinning pipe pressure control of FIG. 72 as the primary skinning pipe pressure control.

The method 2550 may include determining whether an incoming article dimension (e.g., diameter) is outside limits (block 2560). When the skinning control system 410 determines that the incoming article dimension (e.g., diameter) is not outside the limits (No, block 2560), the process may repeat the determining block 2560 when the next incoming article dimension (e.g., diameter) is measured. When the skinning control system 410 determines that the incoming article dimension (e.g., diameter) is outside the limits (Yes, block 2560), the skinning control system 410 may perform at least one of the operations listed in block 2565. For example, the skinning control system 410 may switch off the primary skinning pipe pressure control, and may hold the last value of the return pressure set point input to the first feedback control 2201.

The skinning control system 410 may activate a second (e.g., secondary) skinning pipe pressure control, which may be one of the two skinning pipe pressure controls disclosed in FIGS. 77 and 78. In block 2570, the skinning control system 410 may determine whether the dimensions (e.g., diameters)s of the next three consecutive articles are within the limits. When they are not within the limits (No, block 2570), the process may repeat the determining block 2570 based on the next three consecutive articles. When they are within the limits (Yes, block 2570), the skinning control system 410 may perform at least one of the operations listed in block 2575. For example, the skinning control system 410 may revert back to the primary skinning pipe pressure control, and may slowly move the secondary skinning pipe pressure control parameters (e.g., the skinning speed or the pressure relief system position) to their respective baseline conditions (e.g., the skinning speed is revert back to its normal speed, and the pressure relief system position is moved to a neutral position which neither increases nor reduces the skinning pipe pressure). In block 2570, the number three may be any other suitable number, e.g., one, two, four, five, etc. After block 2575, the process may repeat starting with block 2560.

Force Triggered Motion Control

The force sensors 1645 and 1960 shown in FIG. 66 may be used to control the motion of the upper carriage 1540 and the lower carriage 1525 during the skinning process. Control of the motion of the upper carriage 1540 and the lower carriage 1525 based on the force measured by the force sensors 1645 and 1960 may be referred to as force triggered motion control.

Figure 82:
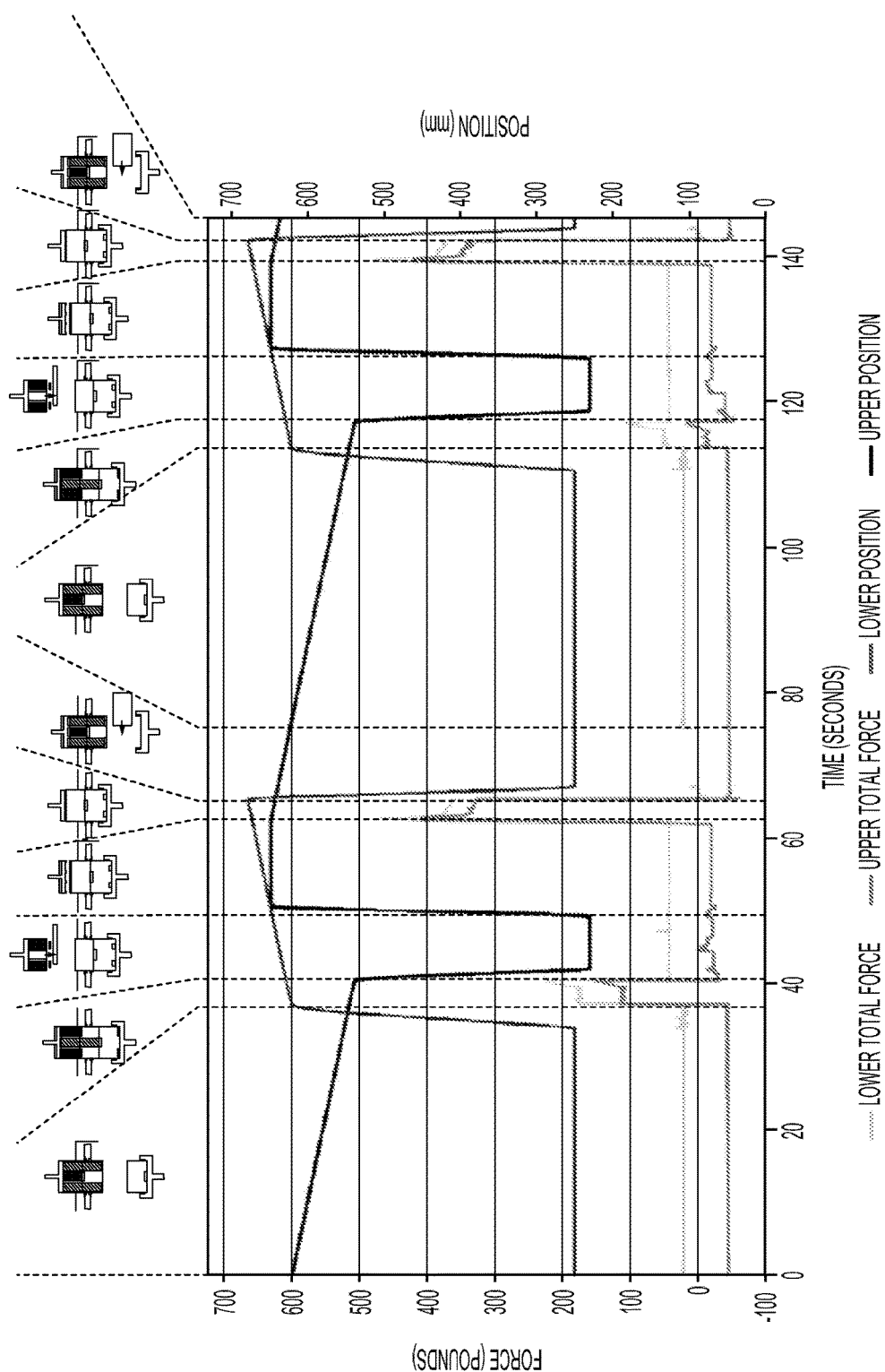
FIG. 82 is a graph of measured forces experienced by the upper and lower carriage of the skinning system while articles are being skinned.
Figure 84B:
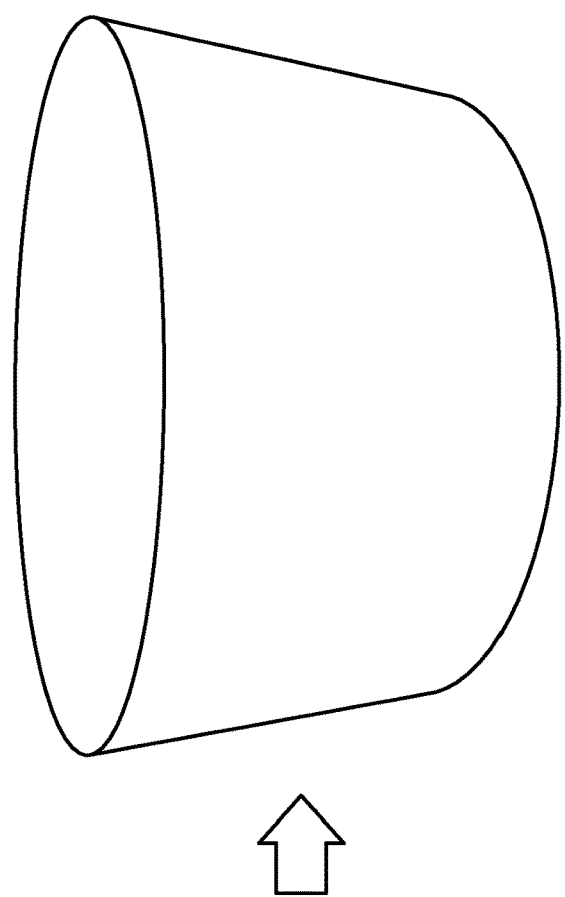
FIGS. 84A-84B are perspective views of skinned articles showing defects and without defects.
Figure 84A:
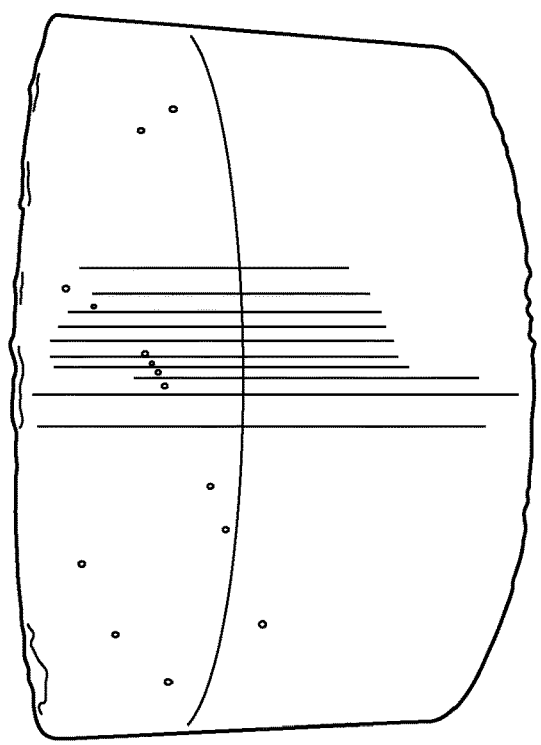

FIG. 82 shows measured forces experienced by the upper carriage 1540 and the lower carriage 1525 while the skinning system 300 skins articles with height variation of 1.03 mm in which force triggered motion control is not activated. The upper and lower axes positions are also plotted in FIG. 82. Diagrams are included which show the articles in various stages of the skinning process. As shown, the hand-off forces varied from as little as about 100 pounds for one article, to as much as 450 pounds for another article. A force of 450 pounds would cause excessive wear of the carriages and ball screw actuators for those carriages if this level of force would be allowed to exist at production rates for an extended period of time. Furthermore, each time a large force occurs at hand-off, a "ring" defect feature is created on the article being skinned, as shown in FIG. 84(A). This defect is the result of excessive squeeze displacement of the rubber member of the vacuum chuck and abrupt motion of the article being skinned with respect to the skinning pipe 310.

Referring to FIG. 82, an example of the force triggered motion control may be described as follows. The upper axis, which includes the upper carriage 1540 and the vacuum system 320, may holds (or grip) and pull one or more (e.g., two shown in FIG. 82) articles through the skinning pipe 310. In some embodiments, the vacuum system 320 may hold and pull two or more articles simultaneously. An unskinned article may be loaded onto the lower axis (which includes the lower carriage 1525 and the article feeding mechanism 315). The lower carriage 1525 may rapidly traverse such that the top of the unskinned article nearly touches the bottom of the lowest article held and pulled by the vacuum system 320. The lower axis may slow down and move at a speed that is slightly greater than that of the upper axis.

When a predetermined force value (e.g., 50 pounds) is detected, the control system 400 (e.g., the skinning control system 410) may adjust the speed of the lower axis to match the speed of the upper axis. The upper axis and the lower axis may move together at the same speed for a predetermined period of time (e.g., 1 second), which may depend on the skinning speed. The upper axis may then move upward at a rapid speed to a position where the skinned article can be unloaded. After the skinning article is unloaded, the upper axis may then rapidly move to a position such that the vacuum chuck is slightly higher than the top of the top article that is being pushed through the skinning pipe 310 by the lower axis.

The upper axis may stop and wait until a force measured by the force sensors 1645 reaches or exceeds the predetermined force value (e.g., 50 pounds). After the force reaches or exceeds the predetermined force value, the skinning control system 410 may then adjust the speed of the upper axis to be the same as the speed of the lower axis. The upper axis and lower axis may move at the same speed for the predetermined period of time (e.g., 1 second). The lower axis may then move downward a rapid speed to a position where a new unskinned article may be loaded onto the platen 1515. This cycle may repeat until the skinning process is terminated or paused.

Figure 83:
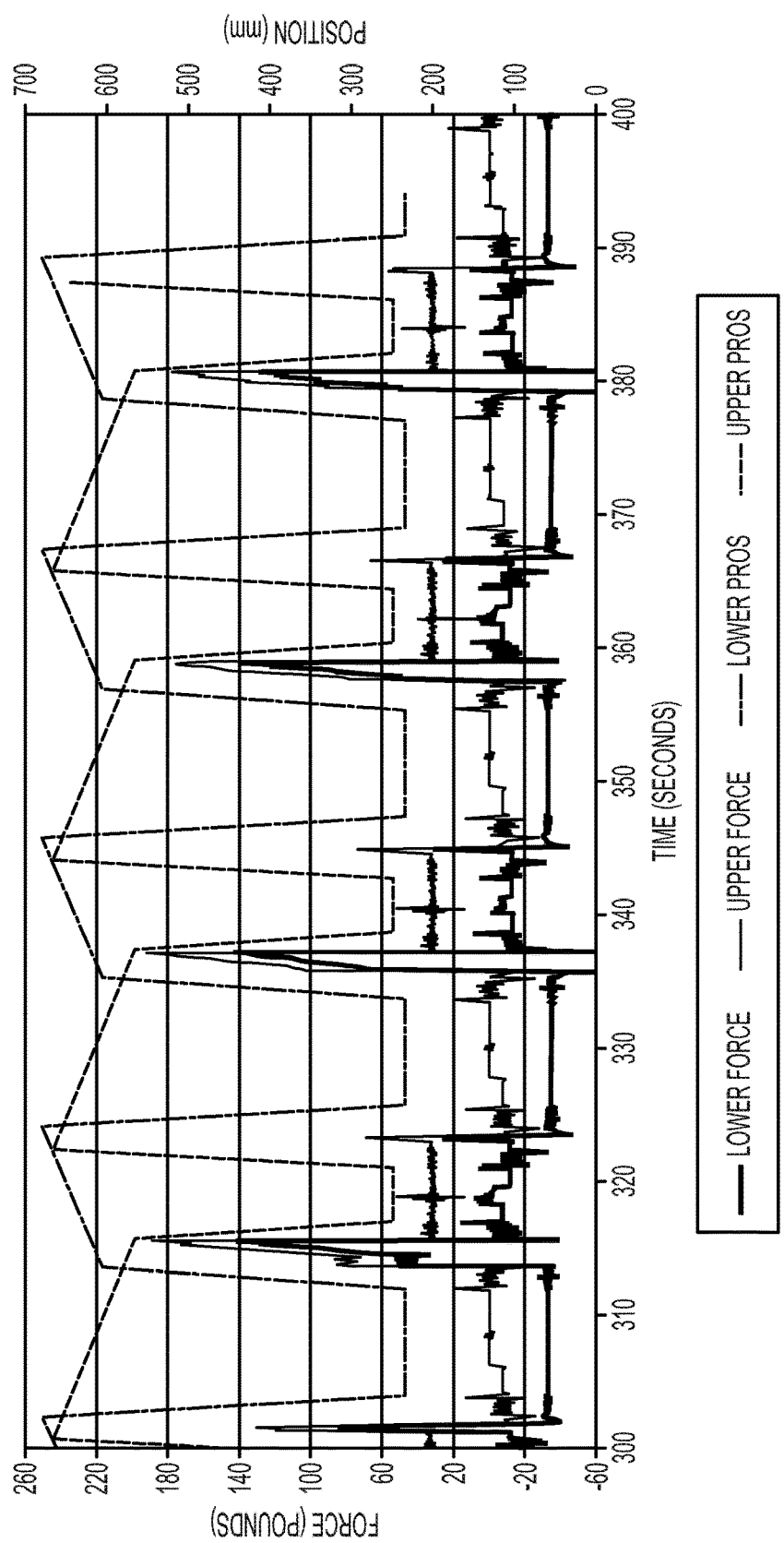
FIG. 83 is a graph of the measured forces while articles are being skinned.

FIG. 83 shows a plot of measured forces experienced while skinning articles with height variation of 1.03 mm in which force triggered motion control was used. The upper and lower axes positions are also plotted. A force value of 50 pounds was used as the trigger. As shown, even when articles with large height variations are put through the process, the peak forces remain less than approximately 190 pounds and they remain substantially consistent. No "ring" part defects were experienced during this run of parts, as shown in FIG. 84(B).

Figure 85:
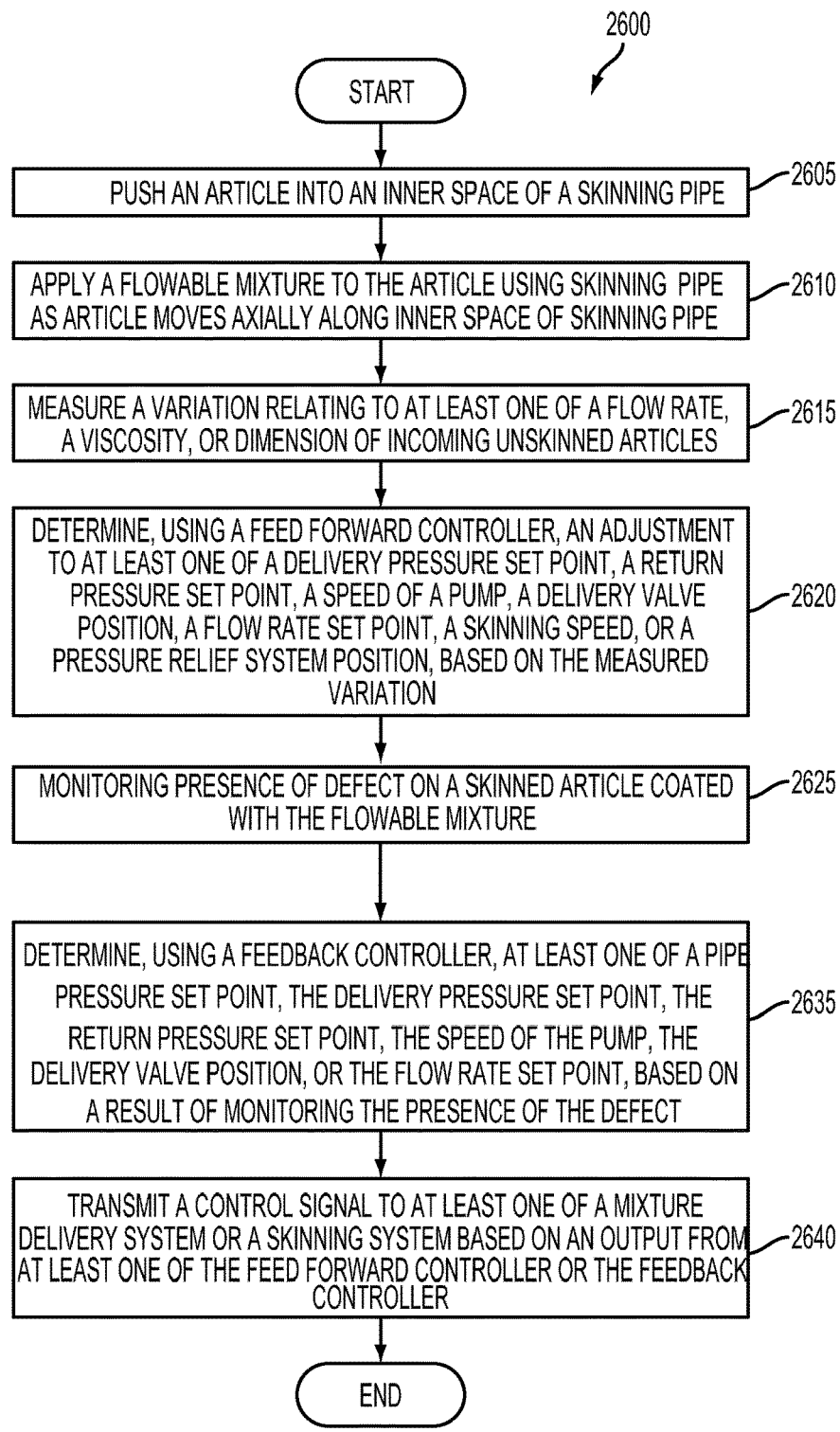
FIG. 85 is a process flow diagram of an exemplary method for controlling the skinning system.

FIG. 85 is a flowchart illustrating an exemplary method 2600 of controlling the system 100. The method 2600 may be performed by the control system 400. The method 2600 may include pushing, e.g., by the article feeding mechanism 315, an article into an inner space of a skinning pipe (block 2605). The method 2600 may include applying a flowable mixture to the article using the skinning pipe as the article moves axially along the inner space of the skinning pipe (block 2610). The method 2600 may include measuring a variation in at least one of a flow rate, a viscosity, or dimensions (e.g., diameters)s of incoming unskinned articles (block 2615). The method 2600 may include determining, using a feed forward controller, an adjustment to at least one of a delivery pressure set point, a return pressure set point, a speed of a pump, a delivery valve position, a flow rate set point, a skinning speed, or a pressure relief system position, based on the measured variation (block 2620).

The method 2600 may include monitoring presence of a defect in a skinned article coated with the flowable mixture (block 2625). Monitoring the presence may include detecting a defect and determining a type of the defect. The method 2600 may include determining, using a feedback controller, at least one of a pipe pressure set point, the delivery pressure set point, the return pressure set point, the speed of the pump, the delivery valve position, or the flow rate set point, based on a result of monitoring the presence of the defect (e.g., based on the detected type of defect) (block 2635). The method 2600 may include transmitting a control signal to at least one of a mixture delivery system or a skinning system based on an output from at least one of the feed forward controller or the feedback controller (block 2640).

Figure 86:
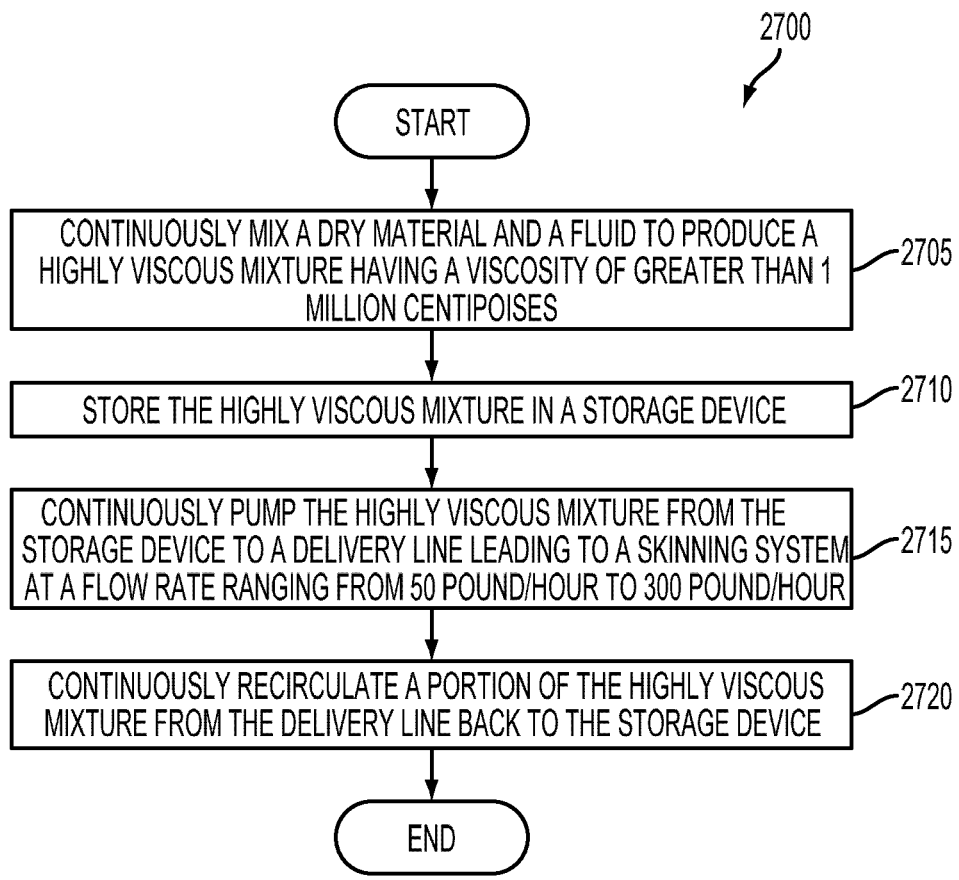
FIG. 86 is a process flow diagram of an exemplary method for controlling the mixture delivery system.

FIG. 86 is a flowchart illustrating an exemplary method 2700 of controlling the mixture delivery system 200. The method 2700 may be performed by the mixture control system 405. The method 2700 may include continuously mixing a dry material and a fluid to produce a highly viscous mixture having a viscosity of greater than one million centipoises (block 2705). The method 2700 may include storing the highly viscous mixture in a storage device (block 2710). The method 2700 may include continuously pumping the highly viscous mixture from the storage device to a delivery line leading to a skinning system at a flow rate ranging from 50 pound/hour to 300 pound/hour (block 2715). The method 2700 may include continuously recirculating a portion of the highly viscous mixture from the delivery line back to the storage device (block 2720).

Figure 87:
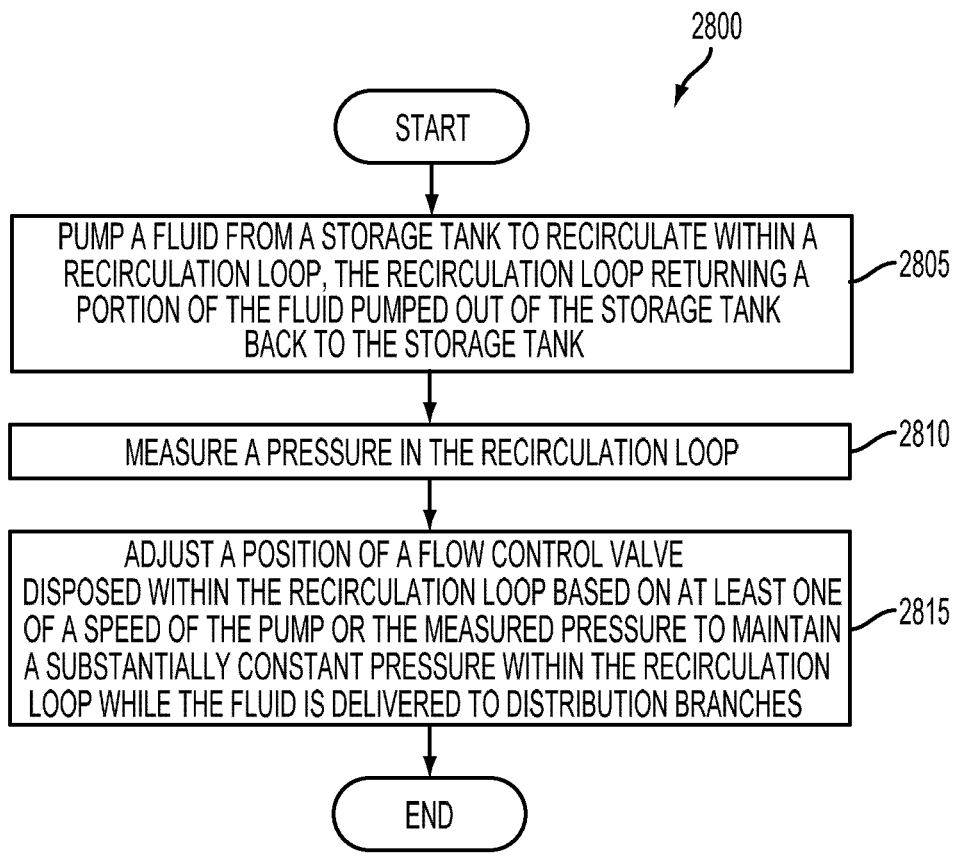
FIG. 87 is a process flow diagram of an exemplary method for controlling the fluid dispensing system.

FIG. 87 is a flowchart illustrating an exemplary method 2800 of controlling the fluid dispensing system 215. The method 2800 may be performed by the mixture control system 405. The method 2800 may include pumping a fluid from a storage tank to recirculate within a recirculation loop, the recirculation loop returning a portion of the fluid pumped out of the storage tank back to the storage tank (block 2805). The method 2800 may include measuring a pressure in the recirculation loop (block 2810). The method 2800 may include adjusting a position of a proportional flow control valve disposed within the recirculation loop based on at least one of a speed of the pump or the measured pressure to maintain a substantially constant pressure within the recirculation loop while the fluid is delivered to the plurality of distribution branches (block 2815).

Figure 88:
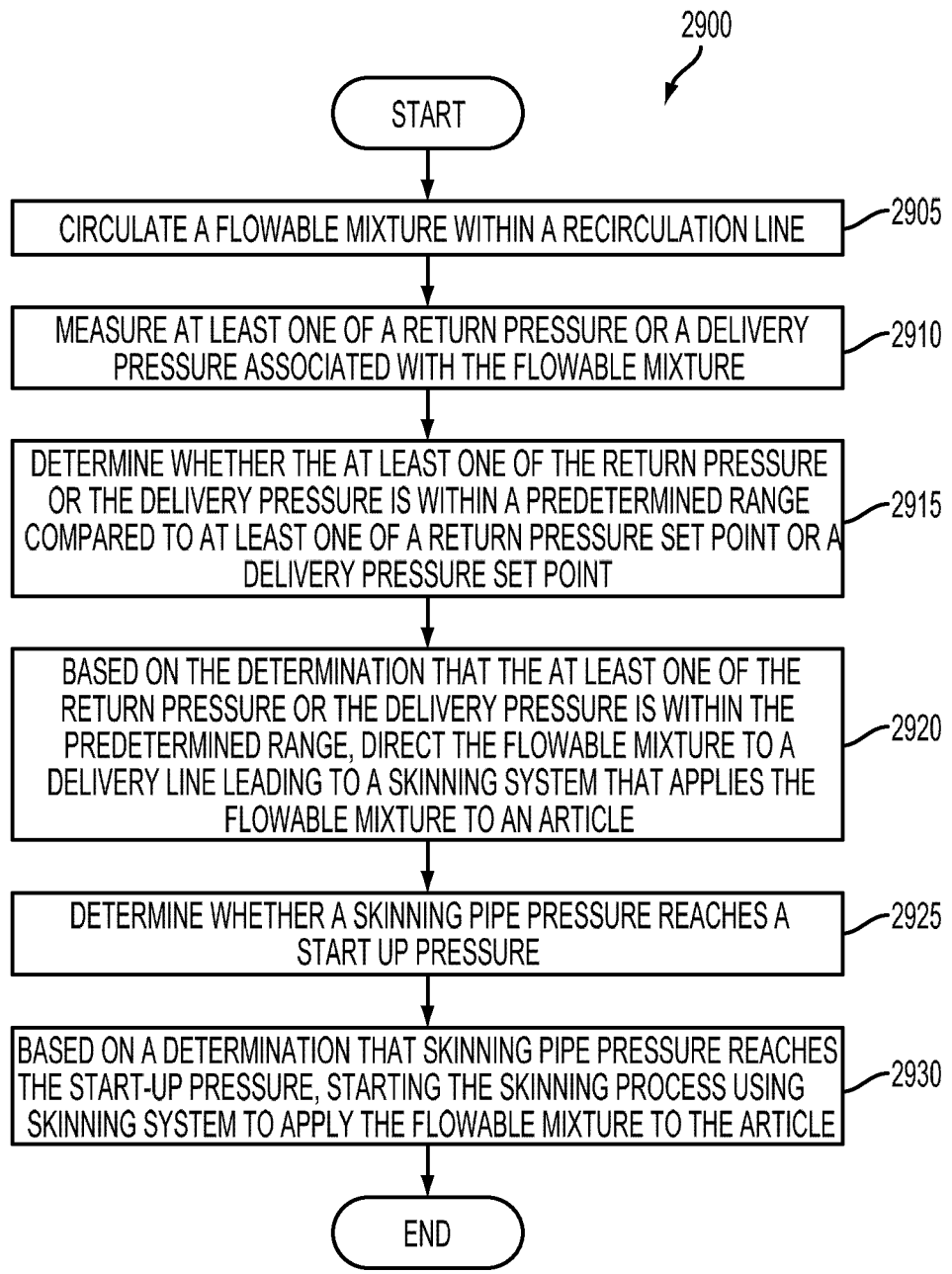
FIG. 88 is a process flow diagram of an exemplary method of operating or controlling the skinning system.

FIG. 88 is a flowchart illustrating an exemplary method 2900 of controlling the system 100. The method 2900 may be performed by the control system 400. The method 2900 may include circulating a flowable mixture within a recirculation line (block 2905). The method 2900 may include measuring at least one of a return pressure or a delivery pressure associated with the flowable mixture (block 2910). The method 2900 may include determining whether the at least one of the return pressure or the delivery pressure is within a predetermined range compared to at least one of a return pressure set point or a delivery pressure set point (block 2915). The method 2900 may include, based on the determination that the at least one of the return pressure or the delivery pressure is within the predetermined range, directing the flowable mixture to a delivery line leading to a skinning system that applies the flowable mixture to an article (block 2920). The method 2900 may include determining whether a skinning pipe pressure reaches a start-up pressure (block 2925). The method 2900 may include, based on a determination that the skinning pipe pressure reaches the start-up pressure, starting the skinning process using the skinning system to apply the flowable mixture to the article (block 2930).

Figure 89:
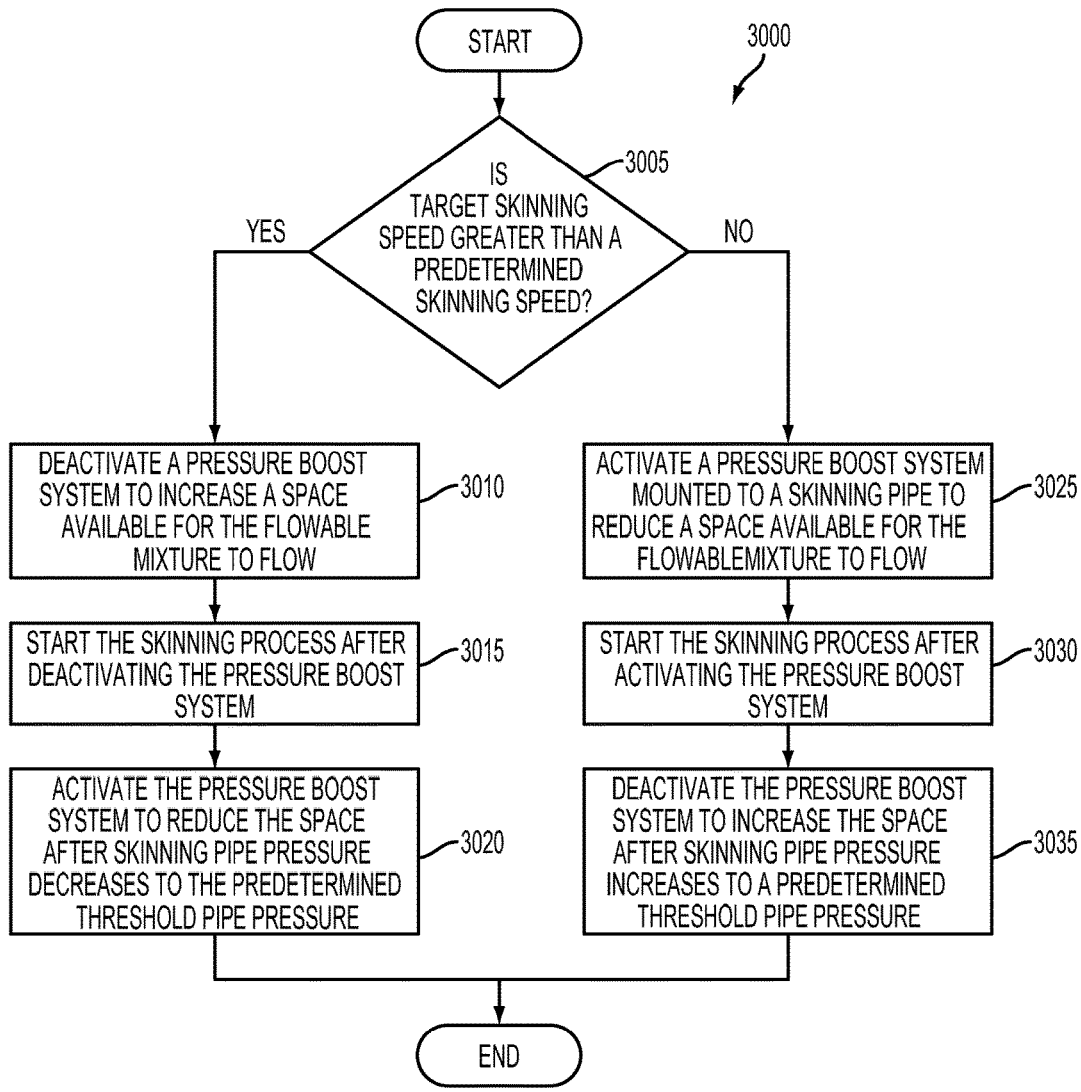
FIG. 89 is a process flow diagram of an exemplary method of operating or controlling the skinning system.

FIG. 89 is a flowchart illustrating an exemplary method 3000 of controlling the skinning system 300. The method 3000 may be performed by the skinning control system 410. The method 3000 may include determining whether a target skinning speed is greater than a predetermined skinning speed (block 3005). When the target skinning speed is greater than a predetermined skinning speed (Yes, block 3005), the method 3000 may include deactivating the pressure boost system to increase the space (e.g., space 1810) adjacent the skinning pipe available for the flowable mixture to flow (block 3010). The method 3000 may also include starting the skinning process after deactivating the pressure boost system (block 3015). The method 3000 may also include activating the pressure boost system to reduce the space adjacent the skinning pipe available for the flowable mixture to flow after the pipe pressure decreases to the predetermined threshold pipe pressure (block 3020).

Referring to FIG. 89, when the target skinning speed is not greater than a predetermined skinning speed (No, block 3005), the method 3000 may include activating a pressure boost system mounted to a skinning pipe to reduce a space (e.g., space 1810) adjacent the skinning pipe available for the flowable mixture to flow (block 3025). The method 3000 may include starting the skinning process after activating the pressure boost system (block 3030). The method 3000 may include deactivating the pressure boost system to increase the space adjacent the skinning pipe available for the flowable mixture to flow after a pipe pressure increases to a predetermined threshold pipe pressure (block 3035).

Figure 90:
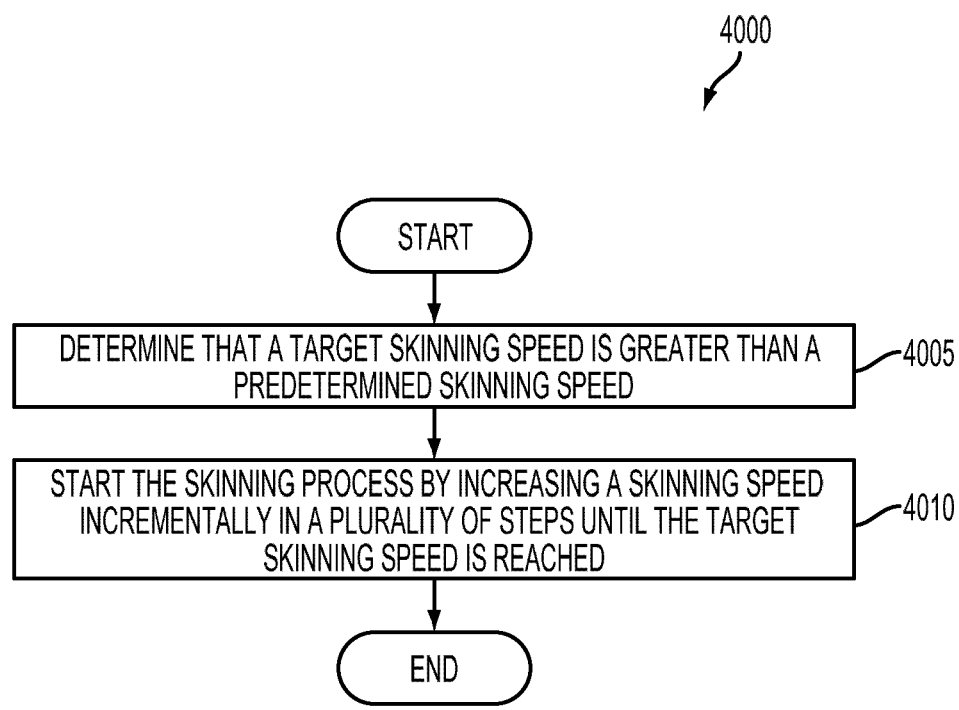
FIG. 90 is a process flow diagram of an exemplary method for operating or controlling the skinning system.

FIG. 90 is a flowchart illustrating an exemplary method 4000 of controlling the skinning system 300. The method 4000 may be performed by the skinning control system 410. The method 4000 may include determining that a target skinning speed (e.g., 6 mm/sec) is greater than a predetermined skinning speed (e.g., 5 mm/sec) (block 4005). The method 4000 may also include starting the skinning process by increasing a skinning speed incrementally in a plurality of steps or stages until the target skinning speed is reached (block 4010). For example, the method 4000 may include skinning a first article at a skinning speed of 2 mm/sec after starting the skinning process, and the skinning a second articles at a skinning speed of 4 mm/sec, and skinning a third article at a skinning speed of 6 mm/sec.

Figure 91:
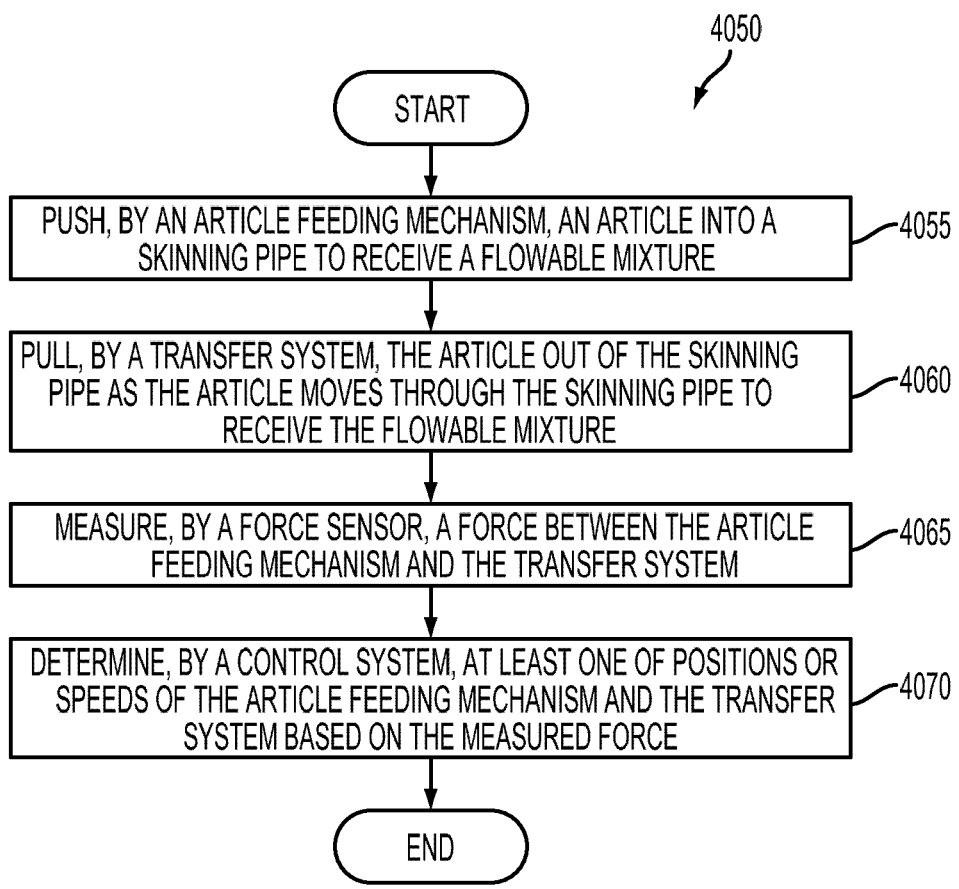
FIG. 91 is a process flow diagram of an exemplary method for operating or controlling the skinning system.

FIG. 91 is a flowchart illustrating an exemplary method 4050 of controlling the skinning system 300. The method 4050 may be performed by the skinning control system 410. The method 4050 may include pushing, by an article feeding mechanism, an article into a skinning pipe to receive a flowable mixture (block 4055). The method 4050 may include pulling, by a transfer system (e.g., a vacuum system using a vacuum pressure), the article out of the skinning pipe as the article moves through the pipe to receive the flowable mixture (block 4060). The method 4050 may include measuring, by a force sensor, a force between the article feeding mechanism and the transfer system (e.g., the vacuum system) (block 4065). The method 4050 may include determining, by a control system, at least one of positions or speeds of the article feeding mechanism and the transfer system (e.g., the vacuum system) based on the measured force (block 4070).

Figure 92:
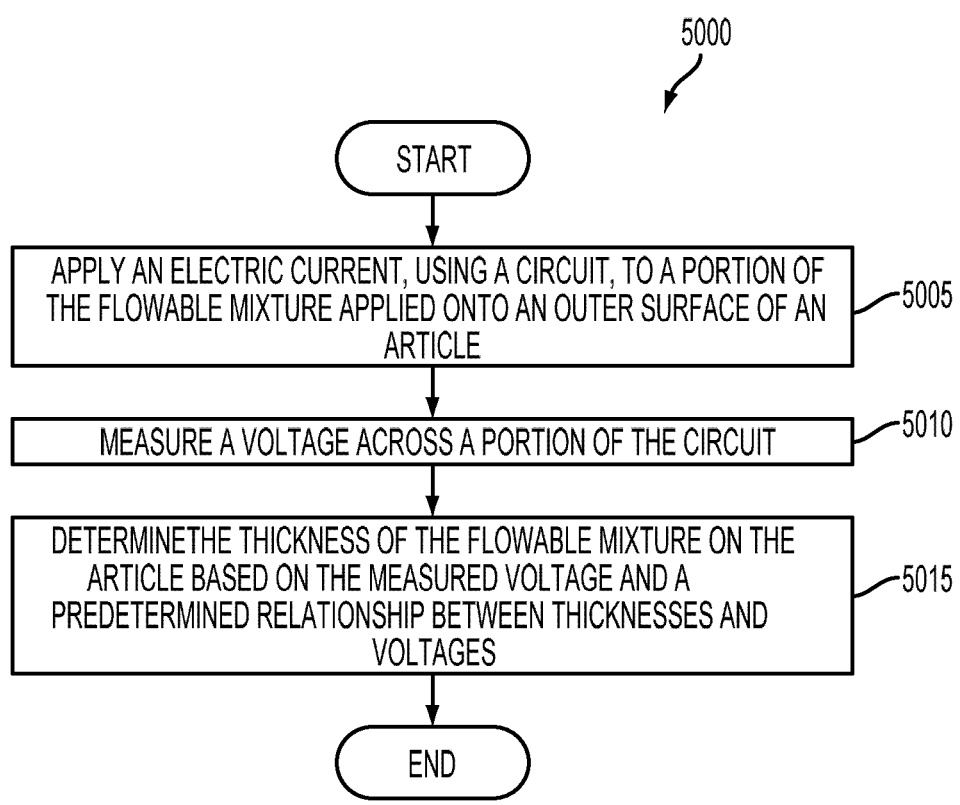
FIG. 92 is a process flow diagram of an exemplary method for detecting a skin thickness.

FIG. 92 is a flowchart illustrating an exemplary method 5000 of detecting a skin thickness of a skinned article in the skinning system 300. The method 5000 may include applying an electrical current, using a circuit, to a portion of the flowable mixture coated onto an outer surface of an article (block 5005). The method 5000 may include measuring a voltage across a portion of the circuit (block 5010). The method 5000 may include determining, using a processor, the thickness of the flowable mixture coated on the article based on the measured voltage and a predetermined relationship between thicknesses and voltages (block 5015).

Figure 93:
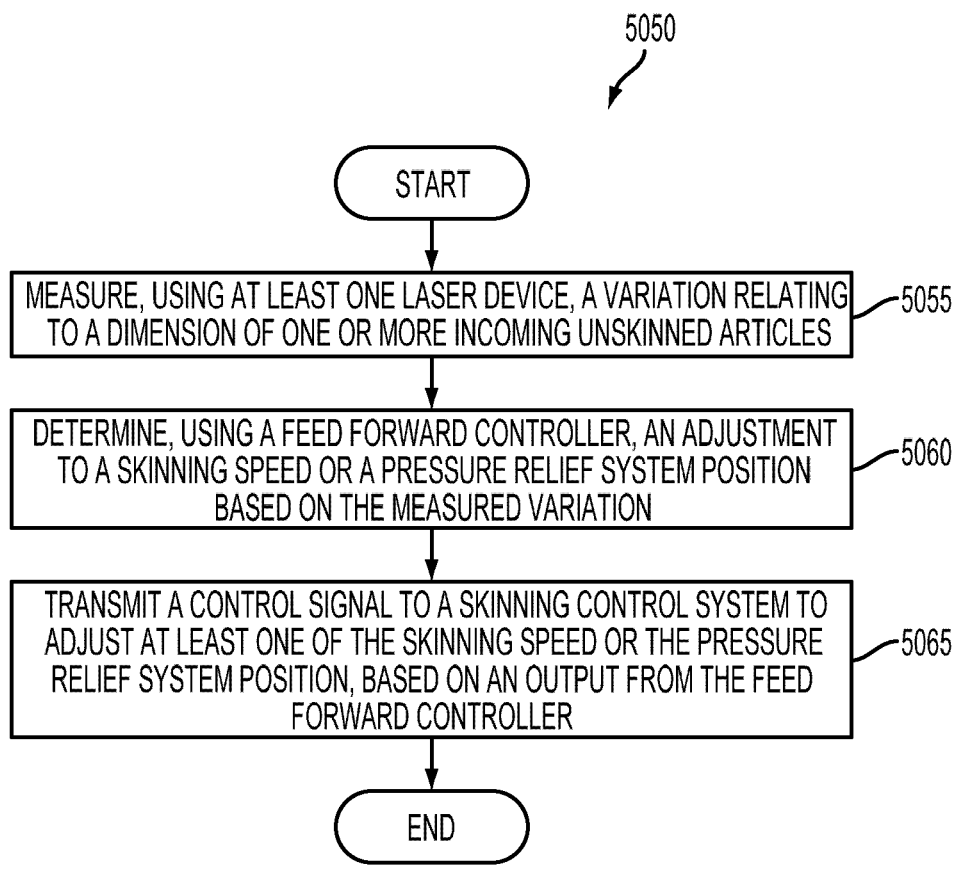
FIG. 93 is a process flow diagram of an exemplary method for operating or controlling the skinning system.

FIG. 93 is a flowchart illustrating an exemplary method 5050 of controlling the skinning system 300. The method 5050 may be performed by the skinning control system 410. The method 5050 may include measuring, using at least one laser device, a variation in a dimension (e.g., diameter) of one or more incoming unskinned articles (block 5055). Measuring the variation in the dimension may include measuring the dimension using at least one laser device, and determining the variation in the dimension using a controller or a control system, which receives signals or data from the at least one laser device. The method 5050 may include determining, using a feed forward controller, an adjustment to a skinning speed or a pressure relief system position based on the measured variation (block 5060). The method 5050 may include transmitting a control signal to a skinning control system to adjust at least one of the skinning speed or the pressure relief system position, based on an output from the feed forward controller (block 5065).

Figure 94:
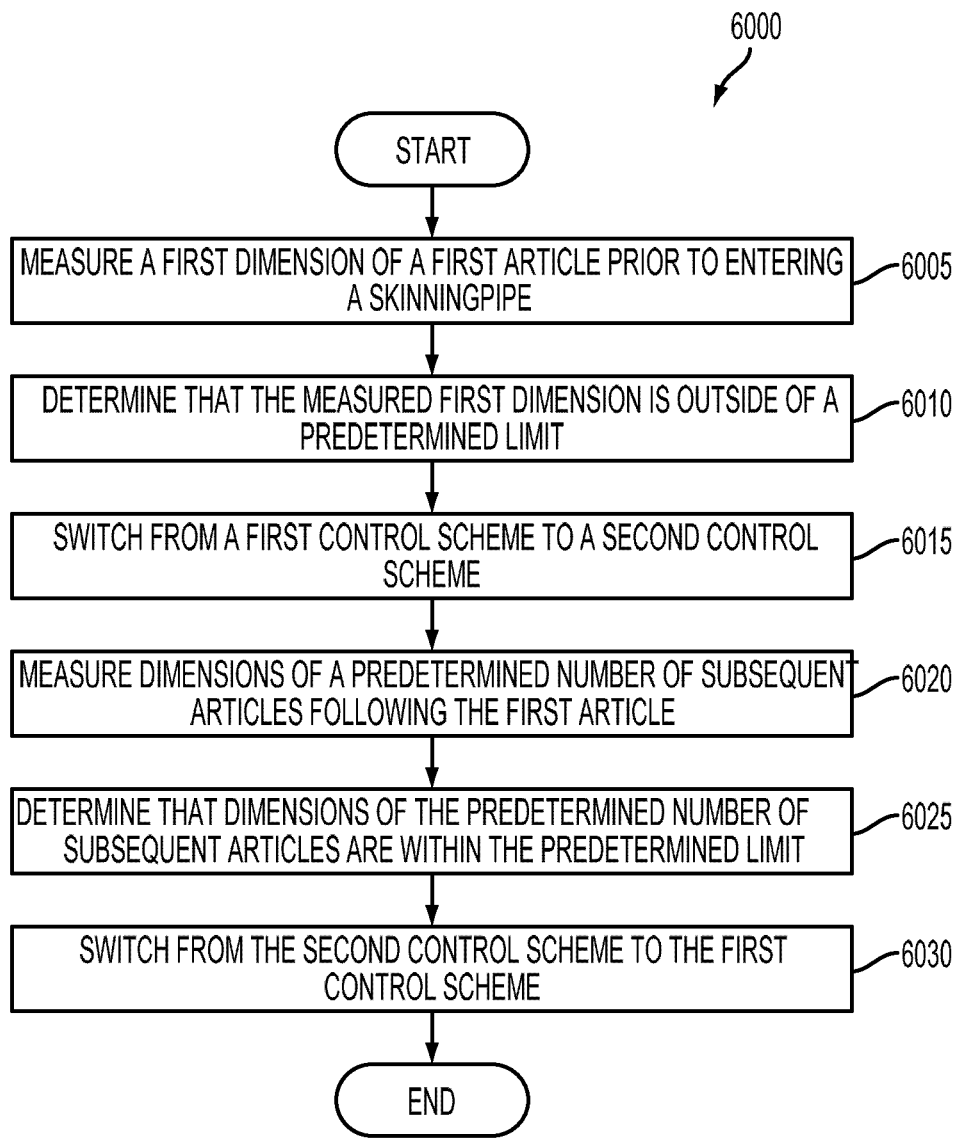
FIG. 94 is a process flow diagram of an exemplary method for operating or controlling the skinning system.

FIG. 94 is a flowchart illustrating an exemplary method 6000 of controlling the skinning system 300. The method 6000 may be performed by the skinning control system 410. The method 6000 may include measuring a first dimension (e.g., diameter) of a first article prior to entering a skinning pipe (block 6005). The method 6000 may include determining that the measured first dimension (e.g., diameter) is outside of a predetermined limit (block 6010). The method 6000 may include switching from a first control scheme to a second control scheme (block 6015). The method 6000 may include measuring dimensions (e.g., diameters) of a predetermined number of subsequent articles following the first article (block 6020). The method 6000 may include determining that the dimensions (e.g., diameters) of the predetermined number of subsequent articles are within the predetermined limit (block 6025). The method 6000 may include switching from the second control scheme to the first control scheme (block 6030).

In addition to the above descriptions, the following descriptions summarize various non-limiting embodiments disclosed herein.

According to a first embodiment, the present disclosure relates to a system for delivering and applying a flowable mixture to an article. The system may include a mixture delivery system. The mixture delivery system may include a mixer configured to mix a dry material and a fluid to produce the flowable mixture, and a pump disposed downstream of the mixer and configured to pump the flowable mixture to a delivery line. The system may include a skinning system fluidly coupled with the mixture delivery system through the delivery line, the skinning system configured to receive the flowable mixture from the mixture delivery system through the delivery line and to apply the flowable mixture to the article. The skinning system may include a skinning pipe configured to receive the article and apply the flowable mixture to the article as the article moves axially along an inner space of the skinning pipe. The skinning system may include a manifold including a plurality of grooves configured to deliver the flowable mixture to the skinning pipe, and an article feeding mechanism configured to align the article with the skinning pipe and push the article into the inner space of the skinning pipe. The skinning system may include a transfer system configured to hold the article and move the article out of the skinning pipe as the article moves axially along the inner space of the skinning pipe to receive the flowable mixture.

According to a second embodiment, the mixture delivery system of the first embodiment may further include a storage device coupled with the mixer and configured to store the flowable mixture produced by the mixer. The storage device may include a cone shaped structure configured to store the flowable mixture, and a vibration device mounted to an outer surface of the cone shaped structure and configured to cause vibration to the cone shaped structure when the flowable mixture is forced into the pump.

According to a third embodiment, the mixture delivery system of the first or second embodiment may further include a particle analyzer configured to measure a particle size distribution of the dry material.

According to a fourth embodiment, the mixture delivery system of the first or second embodiment may further include at least one sensor configured to measure at least one of a density, a flow rate, a pressure, and a viscosity of the flowable mixture.

According to a fifth embodiment, the vibration device of the second embodiment may be mounted to the outer surface at a rib of the cone shaped structure.

According to a sixth embodiment, the storage device of the second or fifth embodiment may include a vacuum system configured to withdraw air from the storage device.

According to a seventh embodiment, the storage device of the second or fifth embodiment may include a load cell configured to weigh at least one of the storage device and the flowable mixture stored therein.

According to an eighth embodiment, the storage device of the second or fifth embodiment may include an auger disposed within the cone shaped structure and configured to force the flowable mixture into the pump.

According to a ninth embodiment, the auger of the eighth embodiment may include a helical screw blade configured to be in close proximity to an inner wall of the cone shaped structure without contacting the inner wall during operation.

According to a tenth embodiment, the mixture delivery system of the first, second, or fifth embodiment may further include a recirculation line configured to recirculate at least a portion of the flowable mixture from the delivery line to the storage device.

According to a eleventh embodiment, the mixture delivery system of the first, second, or fifth embodiment may further include a delivery valve disposed within the delivery line and configured to control an amount of the flowable mixture directed to the skinning system.

According to a twelfth embodiment, the mixture delivery system of the eleventh embodiment may further include a purge line connected to a portion of the delivery line downstream of the pump and upstream of the delivery valve, the purge line configured to direct the flowable mixture out of the delivery line when the purge line is opened.

According to a thirteenth embodiment, the pump of the first, second, or fifth embodiment is a first pump, and the mixture delivery system of the first, second, or fifth embodiment may further include a fluid dispensing system configured to dispense the fluid to the mixer. The fluid dispensing system may include a storage tank configured to store the fluid, a second pump configured to pump the fluid from the storage tank, and a recirculation loop configured to recirculate the fluid pumped out of the storage tank by the pump back to the storage tank.

According to a fourteenth embodiment, the recirculation loop of the thirteenth embodiment may include a flow control valve configured to control an amount of fluid flowing in the recirculation loop, and a controller configured to control the flow control valve based on a speed of the second pump to maintain a substantially constant pressure within the recirculation loop.

According to a fifteenth embodiment, the fluid dispensing system of the fourteenth embodiment may include a plurality of distribution branches connected to the recirculation loop and configured to receive the fluid from the recirculation loop while the substantially constant pressure is maintained within the recirculation loop.

According to a sixteenth embodiment, the article feeding mechanism of the first, second, or fifth embodiment may include a platen configured to support the article placed thereon, and a centering mechanism configured to center the article placed on the platen.

According to a seventeenth embodiment, the centering mechanism of the sixteenth embodiment may include a plurality of centering devices each comprising a centering actuator configured to center the article.

According to an eighteenth embodiment, each centering device of the seventeenth embodiment may include an adjusting mechanism configured to adjust a position of the at least one centering actuator relative to the platen.

According to a nineteenth embodiment, the at least one adjusting mechanism of the eighteenth embodiment may include a locating plate having a plurality of holes, and a locating pin configured to engage with one of the plurality of holes.

According to a twentieth embodiment, the adjusting mechanism of the nineteenth embodiment may include a support having at least one guide hole, a rod configured to slide within the at least one guide hole, and a bracket mounted to the support and having a hole configured to engage with the locating pin to secure a position of the at least one centering actuator relative to the platen.

According to a twenty-first embodiment, the centering actuator of the twentieth embodiment may be mounted to at least one of the locating plate and the rod.

According to a twenty-second embodiment, the at least one adjusting mechanism of the eighteenth embodiment may include a motor configured to adjust the position of the at least one centering actuator.

According to a twenty-third embodiment, the centering mechanism of the sixteenth embodiment may include at least one air knife configured to blow air toward at least one of an unskinned article and the platen.

According to a twenty-fourth embodiment, the article feeding mechanism of the first, second, or fifth embodiment may be mounted to a lower carriage movable along a rail relative to the skinning pipe.

According to a twenty-fifth embodiment, the article feeding mechanism and the lower carriage of the twenty-fourth embodiment may be disposed below the skinning pipe in a vertical direction.

According to a twenty-sixth embodiment, the article feeding mechanism of the twenty-fifth embodiment may be configured to push the article into the skinning pipe from below the skinning pipe in the vertical direction.

According to a twenty-seventh embodiment, in the system of the first, second, or fifth embodiment, the article feeding mechanism may be mounted on a lower carriage, and the transfer system may be mounted on an upper carriage. The lower carriage and the upper carriage may be mounted on a vertical rail and may move along the vertical rail. The lower carriage may be disposed below the skinning pipe, and the upper carriage may be disposed above the skinning pipe.

According to a twenty-eighth embodiment, the article feeding mechanism of the sixteenth embodiment may include a flexure shaft configured to support the platen, the flexure shaft being deflectable while the article feeding mechanism pushes the article into the skinning pipe.

According to a twenty-ninth embodiment, the article feeding mechanism of the twenty-eighth embodiment may include a tilt limiter located adjacent the flexure shaft and configured to limit deflection of the flexure shaft.

According to a thirtieth embodiment, the transfer system of the first, second, or fifth embodiment may be mounted to an upper carriage movable along a rail relative to the skinning pipe.

According to a thirty-first embodiment, the upper carriage and the transfer system of the thirtieth embodiment may be disposed above the skinning pipe in a vertical direction.

According to a thirty-second embodiment, the transfer system of the thirty-first embodiment may be configured to pull the article upward in the vertical direction out of the skinning pipe.

According to a thirty-third embodiment, the transfer system of the first, second, or fifth embodiment may include a vacuum system configured to generate a vacuum pressure within the article. The vacuum system may include a vacuum chuck configured to hold the article using the vacuum pressure, and pull the article out of the skinning pipe while holding the article using the vacuum pressure.

According to a thirty-fourth embodiment, the vacuum chuck of the thirty-third embodiment may be a multi-zone vacuum chuck, each zone being independently controlled.

According to a thirty-fifth embodiment, the transfer system of the thirty-third embodiment may include a vacuum system configured to generate multiple vacuum zones within more than one article. The vacuum system may be configured to hold the more than one article by a vacuum pressure and move the more than one article out of the skinning pipe.

According to a thirty-sixth embodiment, the system of the thirty-fifth embodiment may include a first spacer disposed at a bottom surface of a first article to seal off a first vacuum zone, and a second spacer disposed at a bottom surface of a second article to seal off a second vacuum zone, a shape of the first spacer being different from a shape of the second spacer.

According to a thirty-seventh embodiment, the skinning system of the first, second, or fifth embodiment may include at least one force sensor configured to measure at least one force experienced by at least one of the transfer system and the article feeding mechanism.

According to a thirty-eighth embodiment, the skinning system of the thirty-seventh embodiment may include a control system configured to control motions of the transfer system and the article feeding mechanism based on the at least one force.

According to a thirty-ninth embodiment, the control system of the thirty-eighth embodiment may be configured to adjust at least one of a position and a speed of at least one of the article feeding mechanism and the transfer system based on the at least one force.

According to a fortieth embodiment, the at least one force sensor of the thirty-seventh embodiment may include at least one first force sensor configured to measure a first force experienced by the transfer system or an upper carriage to which the transfer system is mounted, and at least one second force sensor configured to measure a second force experienced by the article feeding mechanism or a lower carriage to which the article feeding mechanism is mounted.

According to a forty-first embodiment, in the system of the thirty-eighth embodiment, the transfer system may include a vacuum system configured to generate multiple vacuum zones, and the control system may be configured to activate or deactivate one or more of the multiple vacuum zones based on the at least one force.

According to a forty-second embodiment, the skinning system of the first, second, or fifth embodiment may further include at least one laser device disposed adjacent an inlet of the skinning pipe and configured to measure a dimension of an unskinned article, the dimension including at least one of a diameter, a radius, a circumference, and an outer peripheral length.

According to a forty-third embodiment, the at least one laser device of the forty-second embodiment may include a plurality of laser devices, each laser devices including a laser unit and a camera.

According to a forty-fourth embodiment, the skinning system of the first, second, or fifth embodiment may further include at least one laser device disposed adjacent an outlet of the skinning pipe and configured to monitor presence of a defect on a skinned article coated with the flowable mixture.

According to a forty-fifth embodiment, in the forty-fourth embodiment, the at least one laser device disposed adjacent the outlet of the skinning pipe may also be configured to detect the defect based on monitoring the presence of the defect.

According to a forty-sixth embodiment, the skinning system of the first, second, or fifth embodiment may further include at least one laser device disposed adjacent an outlet of the skinning pipe and configured to measure a dimension of a skinned article.

According to a forty-seventh embodiment, the dimension of the forty-sixth embodiment may include at least one of a diameter, a radius, a circumference, and an outer peripheral length.

According to a forty-eighth embodiment, the skinning system of the first, second, or fifth embodiment may further include at least one first laser device disposed adjacent an inlet of the skinning pipe and configured to measure a dimension of an unskinned article, and at least one second laser device disposed adjacent an outlet of the skinning pipe and configured to measure a dimension of a skinned article which is the unskinned article applied with the flowable mixture at an outer surface.

According to a forty-ninth embodiment, the skinning system of the forty-eighth embodiment may also include a controller configured to receive data regarding the dimension of the unskinned article and data regarding the dimension of the skinned article, the dimension including at least one of a diameter, a radius, a circumference, and an outer peripheral length. The controller may also be configured to calculate a thickness of the flowable mixture applied to the outer surface of the unskinned article based on the dimensions of the unskinned article and the skinned article.

According to a fiftieth embodiment, the dimension of the forty-eighth embodiment may include at least one of a diameter, a radius, a circumference, and an outer peripheral length.

According to a fifty-first embodiment, the skinning system of the first, second, or fifth embodiment may further include a frame structure including a rail disposed in a vertical direction. The manifold may be mounted to a middle portion of the frame structure, the article feeding mechanism may be mounted to a lower carriage, the lower carriage being mounted to the rail below the manifold, and the transfer system may be mounted to an upper carriage, the upper carriage being mounted to the rail above the manifold.

According to a fifty-second embodiment, the manifold of the first, second, or fifth embodiment may include a pressure adjustment system configured to adjust a pressure of the flowable mixture adjacent the skinning pipe.

According to a fifty-third embodiment, the manifold of the fifty-second embodiment may further include a ring mounted to a lower manifold piece of the manifold and configured to move along the skinning pipe under actuation of the pressure adjustment system.

According to a fifty-fourth embodiment, the manifold of the first, second, or fifth embodiment may include a skin thickness sensor mounted to a wall of the skinning pipe and configured to measure a thickness of the flowable mixture on a skinned article.

According to a fifty-fifth embodiment, the skin thickness sensor of the fifty-fourth embodiment may include at least one conductor configured to apply a current to the flowable mixture on the skinned article, and a probe body housing the at least one conductor.

According to a fifty-sixth embodiment, the manifold of the first, second, or fifth embodiment may include an upper manifold piece, and a lower manifold piece joined together with the upper manifold piece.

According to a fifty-seventh embodiment, the manifold of the fifty-sixth embodiment may include a locating pin located in at least one of the upper manifold piece and the lower manifold piece, and a locating cylinder located in at least one of the lower manifold piece and the upper manifold piece, the locating cylinder and the locating pin engaging with one another to join the upper manifold piece and the lower manifold piece.

According to a fifty-eighth embodiment, the manifold of the first, second, or fifth embodiment may be mounted to a mounting bracket. The manifold may include at least one locating pad for locating the manifold on the mounting bracket.

According to a fifty-ninth embodiment, the manifold of the first, second, or fifth embodiment may be mounted to a mounting bracket. The manifold may include at least one locating blocks for locating the manifold on the mounting bracket.

According to a sixtieth embodiment, the skinning pipe of the first, second, or fifth embodiment may include a wall having a plurality of holes, and the grooves may be configured to deliver the flowable mixture from the manifold to the inner space of the skinning pipe through the holes.

According to a sixty-first embodiment, in the sixtieth embodiment, the flowable mixture of within the grooves may be pressurized.

According to a sixty-second embodiment, the plurality of grooves of the sixty-first embodiment may be configured to deliver the flowable mixture to a circumference of the wall of the skinning pipe.

According to a sixty-third embodiment, the skinning system of the first, second, or fifth embodiment may include at least one robot configured to load or unload the article.

According to a sixty-fourth embodiment, the at least one robot of the sixty-third embodiment may include a loading robot and an unloading robot. The loading robot may include a vacuum chuck configured to hold and lift an unskinned article using a vacuum pressure, and the unloading robot may include at least one adjustable arm configured to receive a skinned article.

According to a sixty-fifth embodiment, the unloading robot of the sixty-fourth embodiment may include a sensor configured to detect a presence of the skinned article on the at least one adjustable arm.

According to a sixty-sixth embodiment, the present disclosure relates to a system for delivering and applying a flowable mixture to an article. The system may include a mixture delivery system configured to produce the flowable mixture and deliver the flowable mixture. The mixture delivery system may include a mixer configured to mix a dry material and a fluid to produce the flowable mixture, and a pump disposed downstream of the mixer and configured to pump the flowable mixture to a delivery line. The system may include a skinning system connected to the mixture delivery system through the delivery line, and configured to receive the flowable mixture from the mixture delivery system, and apply the flowable mixture to the article. The skinning system may include a skinning pipe configured to receive the article and apply the flowable mixture to the article as the article moves axially through the skinning pipe. The system may include a control system including a mixture control system for controlling the mixture delivery system and a skinning control system for controlling the skinning system. The mixture control system may include a first feed forward controller configured to determine an adjustment to an amount of the fluid to be added to the mixer based on a variation relating to a particle size distribution of the dry material. The mixture control system may include at least one first feedback controller configured to determine at least one of a screwfill ratio of the mixer and the amount of the fluid to be added to the mixer, based on at least one of a measured density and a measured viscosity of the flowable mixture. The skinning control system may include a second feed forward controller configured to determine an adjustment to at least one of a delivery pressure set point, a return pressure set point, a speed of the pump, a delivery valve position, a flow rate set point, a skinning speed, and a pressure relief system position, based on a variation relating to at least one of a measured flow rate, the measured viscosity, or dimensions of incoming unskinned articles, the dimensions including at least one of a diameter, a radius, a circumference, and an outer peripheral length. The skinning control system may include at least one second feedback controller configured to determine at least one of a skinning pipe pressure set point, the delivery pressure set point, the return pressure set point, the speed of the pump, the delivery valve position, and the flow rate set point, based on a result of monitoring presence of a defect on a skinned article coated with the flowable mixture. The control system may include a communication unit configured to transmit a control signal to at least one of the mixture delivery system and the skinning system based on an output from at least one of the first feed forward controller, the second feed forward controller, the at least one first feedback controller, and the at least one second feedback controller.

According to a sixty-seventh embodiment, the present disclosure relates to a system for delivering and applying a flowable mixture to an article. The system may include a mixture delivery system configured to produce the flowable mixture and deliver the flowable mixture, and a skinning system connected to the mixture delivery system, and configured to receive the flowable mixture from the mixture delivery system, and apply the flowable mixture to the article. The system may include a control system configured to control the mixture delivery system and the skinning system. The control system may include a feed forward controller configured to determine an adjustment to an amount of a fluid to be added to a mixer included in the mixture delivery system based on a variation relating to a particle size distribution of a dry material. The control system may include at least one feedback controller configured to determine at least one of a skinning pipe pressure set point associated with the skinning system, a delivery pressure set point associated with the mixture delivery system, a return pressure set point associated with the mixture delivery system, a pump speed associated with the mixture delivery system, a delivery valve position associated with the mixture delivery system, and a flow rate set point associated with the mixture delivery system, based on a result of monitoring presence of a defect on a skinned article coated with the flowable mixture at the skinning system.

According to a sixty-eighth embodiment, the sixty-seventh embodiment may include a communication unit configured to transmit a control signal to at least one of the mixture delivery system and the skinning system based on an output from at least one of the feed forward controller and the at least one feedback controller to adjust at least one parameter of at least one of the mixture delivery system and the skinning system.

According to a sixty-ninth embodiment, in the sixty-seventh embodiment, the at least one feedback controller may be at least one first feedback controller. The system may include at least one second feedback controller configured to determine at least one of a screwfill ratio of the mixer included in the mixture delivery system and the amount of the fluid to be added to the mixer, based on at least one of a measured density and a measured viscosity of the flowable mixture.

According to a seventieth embodiment, in the system of the sixty-seventh embodiment, the feed forward controller may be a first feed forward controller. The system may include a second feed forward controller configured to determine an adjustment to at least one of the delivery pressure set point, the return pressure set point, the pump speed, the delivery valve position, the flow rate set point, a skinning speed, and a pressure relief system position, based on a variation relating to at least one of a measured flow rate, the measured viscosity, or dimensions of incoming unskinned articles, the dimensions including at least one of a diameter, a radius, a circumference, and an outer peripheral length.

According to a seventy-first embodiment, the feed forward controller of the sixty-seventh embodiment may be an adaptive feed forward controller.

According to a seventy-second embodiment, the control system of the sixty-seventh embodiment may include an adjustment mechanism configured to adjust a model used by the feed forward controller based on a measured viscosity.

According to a seventy-third embodiment, the adjustment mechanism of the seventy-second embodiment may be configured to adjust the model used by the feed forward controller based on the measured viscosity and the variation in the particle size distribution.

According to a seventy-fourth embodiment, 66-73, the control system of any of the sixty-sixth to the seventy-third embodiment may include a reference model configured to determine a reference viscosity based on the variation in the particle size distribution.

According to a seventy-fifth embodiment, the adjustment mechanism of the seventy-fourth embodiment may be configured to adjust the model used by the feed forward controller based on the reference viscosity.

According to a seventy-sixth embodiment, the adjustment mechanism of the seventy-second or seventy-third embodiment may be configured to adjust the model used by the feed forward controller based on the reference viscosity, the measured viscosity, and the adjustment to the amount of the fluid to be added to the mixer.

According to a seventy-seventh embodiment, the at least one second feedback controller of the sixty-ninth embodiment may include a third feedback controller configured to determine the screwfill ratio of the mixer based on the measured density of the flowable mixture.

According to a seventy-eighth embodiment, the at least one second feedback controller of the sixty-ninth embodiment may include a third feedback controller configured to determine the amount of the fluid to be added to the mixer based on the measured viscosity.

According to a seventy-ninth embodiment, the at least one feedback controller of the sixty-seventh embodiment may include a first feedback controller configured to determine the pump speed based on a measured return pressure.

According to an eightieth embodiment, the at least one feedback controller of the seventy-ninth embodiment may include a second feedback controller configured to determine at least one of the return pressure set point and the delivery pressure set point based on the measured skinning pipe pressure. The first feedback controller may be configured to determine the pump speed also based on at least one of the return pressure set point and the delivery pressure set point.

According to an eighty-first embodiment, in the system of the eighty-first embodiment, monitoring the presence of the defect may include detecting a type of the defect, and the at least one feedback controller may include a third feedback controller configured to determine the skinning pipe pressure set point based on the type of defect. The second feedback controller may be configured to determine at least one of the return pressure set point and the delivery pressure set point also based on the skinning pipe pressure set point.

According to an eighty-second embodiment, the at least one feedback controller of the sixty-seventh embodiment may include a first feedback controller configured to determine at least one of the pump speed and the delivery valve position based on the measured skinning pipe pressure.

According to an eighty-third embodiment, in the system of the eighty-second embodiment, monitoring the presence of the defect may include detecting a type of the defect, and the at least one feedback controller may include a second feedback controller configured to determine the skinning pipe pressure set point based on the type of defect. The first feedback controller may be configured to determine at least one of the pump speed and the delivery valve position also based on the skinning pipe pressure set point.

According to an eighty-fourth embodiment, the at least one feedback controller of the sixty-seventh embodiment may include a first feedback controller configured to determine the pump speed based on a measured flow rate of the flowable mixture in the mixture delivery system.

According to an eighty-fifth embodiment, the at least one feedback controller of the eighty-fourth embodiment may include a second feedback controller configured to determine the flow rate set point based on a skinning pipe pressure measured in the skinning system. The first feedback controller may be configured to determine the pump speed also based on the flow rate set point.

According to an eighty-sixth embodiment, in the system of the eighty-fifth embodiment, monitoring the presence of the defect may include detecting a type of the defect, and the at least one feedback controller may include a third feedback controller configured to determine the skinning pipe pressure set point based on the type of defect. The second feedback controller may be configured to determine the flow rate set point also based on the skinning pipe pressure set point.

According to an eighty-seventh embodiment, the at least one second feedback controller of the sixty-ninth embodiment may be configured determine a mixer speed based on at least one of a measured density and a measured viscosity of the flowable mixture.

According to an eighty-eighth embodiment, the second feed forward controller of the seventieth embodiment may include a third feed forward controller configured to determine an adjustment to at least one of the return pressure set point or the delivery pressure set point based on the variation relating to at least one of the measured viscosity and measured flow rate.

According to an eighty-ninth embodiment, the second feed forward controller of the seventieth embodiment may include a third feed forward controller configured to determine an adjustment to at least one of the pump speed and the delivery valve position based on the variation relating to at least one of the measured viscosity and the measured flow rate.

According to a ninetieth embodiment, the second feed forward controller of the seventieth embodiment may include a third feed forward controller configured to determine an adjustment to the flow rate set point based on the variation relating to at least one of the measured viscosity and the measured flow rate.

According to a ninety-first embodiment, the second feed forward controller of the seventies embodiment may include a third feed forward controller configured to determine an adjustment to the skinning speed based on the variation relating to the dimensions of incoming unskinned articles measured in the skinning system.

According to a ninety-second embodiment, the second feed forward controller of the seventieth embodiment may include a third feed forward controller configured to determine an adjustment to the pressure relief system position based on the variation relating to the dimensions of incoming unskinned articles measured in the skinning system.

According to a ninety-third embodiment, the feedback controller of the ninety-first or ninety-second embodiment may include a first feedback controller configured to determine the skinning speed based on a measured skinning pipe pressure.

According to a ninety-fourth embodiment, the feedback controller of the ninety-second embodiment may include a first feedback controller configured to determine the pressure relief system position based on a measured skinning pipe pressure.

According to a ninety-fifth embodiment, the control system of the seventieth embodiment may be configured to switch between a first skinning pipe pressure control scheme and a second skinning pipe control scheme based on the dimensions of incoming unskinned articles measured in the skinning system.

According to a ninety-sixth embodiment, in the sixty-ninth embodiment, at least one of the measured density and the measured viscosity may be measured in real time or near real time.

According to a ninety-seventh embodiment, the control system of the seventieth embodiment may be configured to receive real-time or near real-time measurements of at least one of a skinning pipe pressure, a delivery pressure, a return pressure, the pump speed, the delivery valve position, the flow rate, the viscosity, the dimensions of the incoming unskinned articles, the skinning speed, or the pressure relief system position.

According to a ninety-eighth embodiment, the dimensions of the seventieth embodiment may include at least one of a diameter, a radius, a circumference, and an outer peripheral length.

According to a ninety-ninth embodiment, the present disclosure relates to a method of delivering and applying a flowable mixture to an article. The method may include mixing a dry material with a fluid in a mixer to produce a flowable mixture, and pumping the flowable mixture to a skinning system through a delivery line, the skinning system including a skinning pipe and an article feeding mechanism. The method may include aligning the article with the skinning pipe using the article feeding mechanism, pushing the article into an inner space of the skinning pipe using the article feeding mechanism, delivering the flowable mixture to the skinning pipe, and applying, using the skinning pipe, the flowable mixture to the article as the article moves axially along the inner space of the skinning pipe. The method may include holding and moving the article out of the skinning pipe as the article moves along the inner space of the skinning pipe to receive the flowable mixture.

According to a one hundredth embodiment, the method of the ninety-ninth embodiment may include placing the article on a platen. Aligning the article may include centering the article to align the article with the skinning pipe using a plurality of centering devices disposed around the platen.

According to a one hundred and first embodiment, the method of the one hundredth embodiment may include adjusting positions of the centering devices based on a dimension of the article placed on the platen, the dimension including at least one of a diameter, a radius, a circumference, and an outer peripheral length.

According to a one hundred and second embodiment, the method of the one hundredth or one hundred and first embodiment may include blowing air toward at least one of the platen and the article placed on the platen to blow off debris.

According to a one hundred and third embodiment, in the method of any of the ninety-ninth embodiment to the one hundred and first embodiment, pushing the article into the inner space of the skinning pipe may include pushing the article upward in a vertical direction from below an inlet of the skinning pipe.

According to a one hundred and fourth embodiment, the method of any of the ninety-ninth embodiment to the one hundred and first embodiment may include generating a vacuum pressure within the article using a vacuum system.

According to a one hundred and fifth embodiment, the method of the one hundred and fourth embodiment may include generating more than one vacuum zone within more than one article.

According to a one hundred and sixth embodiment, in the method of the one hundred and fourth embodiment, holding and moving the article may include holding and moving the article out of the skinning pipe using the vacuum pressure generated by the vacuum system.

According to a one hundred and seventh embodiment, in the method of the one hundred and sixth embodiment, holding and moving the article may include holding and pulling the article upward out of the skinning pipe.

According to a one hundred and eighth embodiment, in the method of any of the ninety-ninth to one hundred and first embodiment, pushing the article may include pushing the article using an article feeding mechanism. Holding and moving the article out of the skinning pipe may include holding and moving the article using a transfer system. The method may include measuring at least one force experienced by at least one of the transfer system and the article feeding mechanism, and controlling motions of the at least one of the transfer system and the article feeding mechanism based on the at least one force.

According to a one hundred and ninth embodiment, the method of the one hundred and eighth embodiment may include controlling motions of the at least one of the transfer system and the article feeding mechanism comprises adjusting at least one of a position and a speed of the at least one of the transfer system and the article feeding mechanism based on the at least one force.

According to a one hundred and tenth embodiment, the method of the one hundred and eighth embodiment may include generating multiple vacuum zones. Controlling motions of the at least one of the transfer system and the article feeding mechanism may include activating or deactivating one or more of the multiple vacuum zones based on the at least one force.

According to a one hundred and eleventh embodiment, the method of any of the ninety-ninth to one hundred and first embodiment may include measuring a dimension of at least one of an unskinned article and a skinned article.

According to a one hundred and twelfth embodiment, in the method of the one hundred and eleventh embodiment, the dimension may include at least one of a diameter, a radius, a circumference, and an outer peripheral length.

According to a one hundred and thirteenth embodiment, the method of any of the ninety-ninth to one hundred and first embodiment may include measuring a dimension of an unskinned article, measuring a dimension of a skinned article which is the unskinned article coated with the flowable mixture, and determining a thickness of the flowable mixture on the skinned article based on the measured dimension of the unskinned article and the dimension of the skinned article.

According to a one hundred and fourteenth embodiment, in the method of the one hundred and thirteenth embodiment, the dimension may include at least one of a diameter, a radius, a circumference, and an outer peripheral length.

According to a one hundred and fifteenth embodiment, the method of any of the ninety-ninth to one hundred and first embodiment may include monitoring presence of a defect on a skinned article coated with the flowable mixture.

According to a one hundred and sixteenth embodiment, in the method of the one hundred and fifteenth embodiment, monitoring the presence of the defect may include detecting a type of the defect.

According to a one hundred and seventeenth embodiment, the method of any of the ninety-ninth to one hundred and first embodiment may include moving a transfer system configured to hold and move the article out of the skinning pipe along a rail in a vertical direction above the skinning pipe, and moving an article feeding mechanism configured to push the article into the skinning pipe along the rail in the vertical direction below the skinning pipe.

According to a one hundred and eighteenth embodiment, the method of any of the ninety-ninth to one hundred and first embodiment may include adjusting a pressure of the flowable mixture adjacent the skinning pipe using a pressure adjustment system.

According to a one hundred and nineteenth embodiment, in the method of the one hundred and eighteenth embodiment, adjusting the pressure of the flowable mixture adjacent the skinning pipe using the pressure adjustment system may include moving a ring along the skinning pipe to adjust a space adjacent the skinning pipe available for the flowable mixture to flow.

According to a one hundred and twentieth embodiment, the method of any of the ninety-ninth to one hundred and first embodiment may include measuring a thickness of the flowable mixture of a skinned article using a skin thickness sensor.

According to a one hundred and twenty-first embodiment, in the method of the one hundred and twentieth embodiment, measuring the thickness may include applying an electric current to the flowable mixture using a circuit, measuring a voltage across a portion of the circuit, and determining the thickness based on the measured voltage and a predetermined relationship between voltages and thicknesses.

According to a one hundred and twenty-second embodiment, the method of any of the ninety-ninth to one hundred and first embodiment may include loading an unskinned article onto a platen using a robot having a vacuum chuck configured to generate a vacuum pressure within the unskinned article.

According to a one hundred and twenty-third embodiment, the method of any of the ninety-ninth to one hundred and first embodiment may include unloading a skinned article using a robot having an adjustable arm.

According to a one hundred and twenty-fourth embodiment, the method of any of the ninety-ninth to one hundred and first embodiment may include generating multiple vacuum zones and holding and moving more than one article using the multiple vacuum zones.

According to a one hundred and twenty-fifth embodiment, the method of the one hundred and twenty-fourth embodiment may include using spacers disposed at bottom surfaces of the more than one article to seal off the multiple vacuum zones, the spacers being alternately disposed at the bottom surfaces of the more than one article, at least two of the spacers having different shapes.

According to a one hundred and twenty-sixth embodiment, the method of any of the ninety-ninth to one hundred and first embodiment may include measuring a particle size distribution of the dry material.

According to a one hundred and twenty-seventh embodiment, the method of any of the ninety-ninth to one hundred and first embodiment may include measuring at least one of the density and viscosity of the flowable mixture.

According to a one hundred and twenty-eighth embodiment, in the method of the one hundred and twenty-seventh embodiment, measuring the at least one of the density and viscosity of the flowable mixture may include measuring the at least one of the density and viscosity in real time or near real time.

According to a one hundred and twenty-ninth embodiment, the method of the one hundred and twenty-eighth embodiment may include determining at least one of an amount of fluid to be added to the mixer and a screwfill ratio of the mixer, based on at least one of the real-time or near real-time measurement of density and viscosity.

According to a one hundred and thirtieth embodiment, the present disclosure relates to a method of controlling a mixture delivery system to deliver a flowable mixture and a skinning system to apply the flowable mixture to an article. The method may include mixing a dry material with a fluid in a mixer to produce the flowable mixture, pumping the flowable mixture to the skinning system through a delivery line, measuring a particle size distribution of the dry material, and determining, using a first feed forward controller, an adjustment to an amount of the fluid to be added to the mixer based on a variation relating to the particle size distribution. The method may also include measuring at least one of a density and a viscosity of the flowable mixture in the delivery line, determining, using at least one first feedback controller, at least one of the amount of fluid to be added to the mixer and a screwfill ratio of the mixer, based on at least one of the measured density and the measured viscosity, and determining a variation relating to at least one of the measured viscosity, a flow rate, or dimensions of incoming unskinned articles, the dimensions including at least one of a diameter, a radius, a circumference, and an outer peripheral length. The method may also include determining, using a second feed forward controller, an adjustment to at least one of a delivery pressure set point, a return pressure set point, a speed of the pump, a delivery valve position, a flow rate set point, a skinning speed, and a pressure relief system position, based on the variation relating to at least one of the measured viscosity, the flow rate, or the dimensions of the incoming unskinned articles. The method may also include measuring a skinning pipe pressure at a skinning pipe that applies the flowable mixture to the article, monitoring presence of a defect on a skinned article coated with the flowable mixture, and determining, using at least one second feedback controller, at least one of a skinning pipe pressure set point, the delivery pressure set point, the return pressure set point, the speed of the pump, the delivery valve position, and the flow rate set point, based on a result of monitoring the presence of the defect on the skinned article. The method may further include transmitting a control signal to at least one of the mixture delivery system and the skinning system based on an output from at least one of the first feed forward controller, the second feed forward controller, the at least one first feedback controller, and the at least one second feedback controller.

According to a one hundred and thirty-first embodiment, the present disclosure relates to a method of controlling a mixture delivery system to deliver a flowable mixture and a skinning system to apply the flowable mixture to an article. The method may include mixing a dry material with a fluid in a mixer to produce the flowable mixture, pumping the flowable mixture to the skinning system through a delivery line, and determining, using a feed forward controller, an adjustment to an amount of the fluid to be added to the mixer based on a variation relating to a particle size distribution of the dry material. The method may also include determining, using at least one feedback controller, at least one of a skinning pipe pressure set point, a delivery pressure set point, a return pressure set point, a pump speed, a delivery valve position, and a flow rate set point, based on a result of monitoring presence of a defect on a skinned article. The method may further include transmitting a control signal to at least one of the mixture delivery system and the skinning system based on an output from at least one of the feed forward controller and the at least one feedback controller to adjust at least one parameter associated with at least one of the mixture delivery system and the skinning system.

According to a one hundred and thirty-second embodiment, the method of the one hundred and thirty-first embodiment may include measuring the particle size distribution of the dry material.

According to a one hundred and thirty-third embodiment, the method of the one hundred and thirty-first embodiment may include measuring at least one of the density and viscosity of the flowable mixture.

According to a one hundred and thirty-fourth embodiment, in the method of the one hundred and thirtieth or one hundred and thirty-first embodiment, measuring the at least one of the density and viscosity of the flowable mixture may include measuring the at least one of the density and viscosity in real time or near real time.

According to a one hundred and thirty-fifth embodiment, the method of the one hundred and thirtieth or one hundred and thirty-first embodiment may include determining at least one of the amount of fluid to be added to the mixer and a screwfill ratio of the mixer, based on at least one of the measured density and viscosity.

According to a one hundred and thirty-sixth embodiment, the method of any of the one hundred and thirtieth to one hundred and thirty-third embodiment may include determining an adjustment to at least one of the delivery pressure set point, the return pressure set point, the pump speed, the delivery valve position, the flow rate set point, a skinning speed, and a pressure relief system position, based on a variation relating to at least one of a measured flow rate, the measured viscosity, or dimensions of incoming unskinned articles, the dimensions including at least one of a diameter, a radius, a circumference, and an outer peripheral length.

According to a one hundred and thirty-seventh embodiment, the feed forward controller of any of the one hundred and thirtieth to one hundred and thirty-third embodiment may be an adaptive feed forward controller.

According to a one hundred and thirty-eighth embodiment, the method of any of the one hundred and thirtieth to one hundred and thirty-third embodiment may include adjusting a model used by the feed forward controller based on a measured viscosity.

According to a one hundred and thirty-ninth embodiment, the method of the one hundred and thirty-eighth embodiment may include adjusting the model used by the feed forward controller based on the measured viscosity and the variation relating to the particle size distribution.

According to a one hundred and fortieth embodiment, the method of the one hundred and thirty-eighth embodiment may include determining a reference viscosity based on the variation relating to the particle size distribution.

According to a one hundred and forty-first embodiment, the method of the one hundred and thirty-eighth embodiment may include adjusting the model used by the feed forward controller based on the reference viscosity.

According to a one hundred and forty-second embodiment, the method of the one hundred and thirty-eighth embodiment may include adjusting the model used by the feed forward controller based on the reference viscosity, the measured viscosity, and the adjustment to the amount of the fluid to be added to the mixer.

According to a one hundred and forty-third embodiment, in the method of any of the one hundred and thirtieth to one hundred and thirty-third embodiment, determining at least one of the screwfill ratio of the mixer and the amount of the fluid to be added to the mixer based on at least one of the measured density and the measured viscosity may include determining the screwfill ratio of the mixer based on the measured density of the flowable mixture.

According to a one hundred and forty-fourth embodiment, in the method of any of the one hundred and thirtieth to one hundred and thirty-third embodiment, determining at least one of the screwfill ratio of the mixer and the amount of the fluid to be added to the mixer based on at least one of the measured density and the measured viscosity may include determining the amount of the fluid to be added to the mixer based on the measured viscosity.

According to a one hundred and forty-fifth embodiment, the method of any of the one hundred and thirtieth to one hundred and thirty-third embodiment may include determining a pump speed based on a measured return pressure.

According to a one hundred and forty-sixth embodiment, the method of the one hundred and forty-fifth embodiment may include determining at least one of the return pressure set point and the delivery pressure set point based on a measured skinning pipe pressure, and determining the pump speed also based on at least one of the return pressure set point and the delivery pressure set point.

According to a one hundred and forty-seventh embodiment, in the method of the one hundred and forty-sixth embodiment, monitoring the presence of the defect may include detecting a type of the defect. The method may include determining the skinning pipe pressure set point based on the type of defect, and determining at least one of the return pressure set point and the delivery pressure set point also based on the skinning pipe pressure set point.

According to a one hundred and forty-eighth embodiment, the method of any of the one hundred and thirtieth to one hundred and thirty-third embodiment may include determining at least one of the pump speed and the delivery valve position based on the measured skinning pipe pressure.

According to a one hundred and forty-ninth embodiment, in the method of any of the one hundred and thirtieth to one hundred and thirty-third embodiment, monitoring the presence of the defect may include detecting a type of the defect. The method may include determining the skinning pipe pressure set point based on the type of defect, and determining at least one of the pump speed and the delivery valve position also based on the skinning pipe pressure set point.

According to a one hundred and fiftieth embodiment, the method of any of the one hundred and thirtieth to one hundred and thirty-third embodiment may include determining the pump speed based on a measured flow rate of the flowable mixture in the mixture delivery system.

According to a one hundred and fifty-first embodiment, the method of any of the one hundred and thirtieth to one hundred and thirty-third embodiment may include determining the flow rate set point based on a skinning pipe pressure measured in the skinning system, and determining the pump speed also based on the flow rate set point.

According to a one hundred and fifty-second embodiment, in the method of any of the one hundred and thirtieth to one hundred and thirty-third embodiment, monitoring the presence of the defect may include detecting a type of the defect. The method may include determining the skinning pipe pressure set point based on the type of defect, and determining the flow rate set point also based on the skinning pipe pressure set point.

According to a one hundred and fifty-third embodiment, the method of any of the one hundred and thirtieth to one hundred and thirty-third embodiment may include determining a mixer speed based on at least one of a measured density and a measured viscosity of the flowable mixture.

According to a one hundred and fifty-fourth embodiment, the method of any of the one hundred and thirtieth to one hundred and thirty-third embodiment may include determining an adjustment to at least one of the return pressure set point and the delivery pressure set point based on the variation relating to at least one of the measured viscosity and measured flow rate.

According to a one hundred and fifty-fifth embodiment, the method of any of the one hundred and thirtieth to one hundred and thirty-third embodiment may include determining an adjustment to at least one of the pump speed and the delivery valve position based on the variation relating to at least one of the measured viscosity and the measured flow rate.

According to a one hundred and fifty-sixth embodiment, the method of any of the one hundred and thirtieth to one hundred and thirty-third embodiment may include determining an adjustment to the flow rate set point based on the variation relating to at least one of the measured viscosity and the measured flow rate.

According to a one hundred and fifty-seventh embodiment, the method of the one hundred and thirty-sixth embodiment may include determining an adjustment to the skinning speed based on the variation relating to the dimensions of incoming unskinned articles measured in the skinning system.

According to a one hundred and fifty-eighth embodiment, the method of the one hundred and thirty-sixth embodiment may include determining an adjustment to the pressure relief system position based on the variation relating to the dimensions of incoming unskinned articles measured in the skinning system.

According to a one hundred and fifty-ninth embodiment, the method of any of the one hundred and thirtieth to one hundred and thirty-third embodiment may include determining the skinning speed based on a measured skinning pipe pressure.

According to a one hundred and sixtieth embodiment, the method of any of the one hundred and thirtieth to one hundred and thirty-third embodiment may include determining the pressure relief system position based on a measured skinning pipe pressure.

According to a one hundred and sixty-first embodiment, the method of the one hundred and thirty-sixth embodiment may include switching between a first skinning pipe pressure control scheme and a second skinning pipe control scheme based on the dimensions of incoming unskinned articles measured in the skinning system.

According to a one hundred and sixty-second embodiment, the method of any of the one hundred and thirtieth to one hundred and thirty-third embodiment may include measuring in real-time or near real-time at least one of a skinning pipe pressure, a delivery pressure, a return pressure, a speed of the pump, a delivery valve position, a flow rate, a viscosity, dimensions of the incoming unskinned articles, a skinning speed, or a pressure relief system position.

According to a one hundred and sixty-third embodiment, in the method of the one hundred and sixty-second embodiment, the dimensions may include at least one of a diameter, a radius, a circumference, and an outer peripheral length.

According to a one hundred and sixty-fourth embodiment, the present disclosure relates to a control system for controlling a mixture delivery system and a skinning system. The control system may include a memory configured to store instructions, and a processor configured to execute the instructions to perform a mixture control process using a mixture control system and a skinning control process using a skinning control system. The mixture control system may include a first feed forward controller configured to determine an adjustment to an amount of a fluid to be added to a mixer based on a variation relating to a particle size distribution of the dry material, and at least one first feedback controller configured to determine at least one of a screwfill ratio of the mixer and the amount of the fluid to be added to the mixer, based on at least one of a measured density and a measured viscosity of the flowable mixture. The skinning control system may include a second feed forward controller configured to determine an adjustment to at least one of a delivery pressure set point, a return pressure set point, a pump speed, a delivery valve position, a flow rate set point, a skinning speed, and a pressure relief system position, based on a variation relating to at least one of a measured flow rate, the measured viscosity, or dimensions of incoming unskinned articles, the dimensions including at least one of a diameter, a radius, a circumference, and an outer peripheral length. The skinning control system may include at least one second feedback controller configured to determine at least one of a skinning pipe pressure set point, the delivery pressure set point, the return pressure set point, the pump speed, the delivery valve position, and the flow rate set point, based on a result of monitoring a defect on a skinned article coated with the flowable mixture. The control system may include a communication unit configured to transmit a control signal to at least one of the mixture delivery system and the skinning system based on an output from at least one of the first feed forward controller, the second feed forward controller, the at least one first feedback controller, and the at least one second feedback controller, to adjust at least one parameter associated with the mixture delivery system or the skinning system.

According to a one hundred and sixty-fifth embodiment, the present disclosure relates to a control system for controlling a mixture delivery system and a skinning system. The control system may include a memory configured to store instructions, and a processor configured to execute the instructions to perform a control scheme configured to control operations of at least one of the mixture delivery system and the skinning system. The control scheme may include a feed forward controller configured to determine an adjustment to an amount of a fluid to be added to a mixer producing a flowable mixture based on a variation relating to a particle size distribution of the dry material. The control scheme may include at least one feedback controller configured to determine at least one of a skinning pipe pressure set point, a delivery pressure set point, a return pressure set point, a pump speed, a delivery valve position, and a flow rate set point, based on a result of monitoring a defect on a skinned article coated with the flowable mixture.

According to a one hundred and sixty-sixth embodiment, in the control system of the one hundred and sixty-fifth embodiment, the at least one feedback controller may be at least one first feedback controller. The control scheme may include at least one second feedback controller configured to determine at least one of a screwfill ratio of a mixer and the amount of the fluid to be added to the mixer, based on at least one of a measured density and a measured viscosity of the flowable mixture.

According to a one hundred and sixty-seventh embodiment, in the control system of the one hundred and sixty-fifth embodiment, the feed forward controller may be a first feed forward controller. The control scheme may include a second feed forward controller configured to determine an adjustment to at least one of the delivery pressure set point, the return pressure set point, the pump speed, the delivery valve position, the flow rate set point, a skinning speed, and a pressure relief system position, based on a variation relating to at least one of a measured flow rate, the measured viscosity, or dimensions of incoming unskinned articles, the dimensions including at least one of a diameter, a radius, a circumference, and an outer peripheral length.

According to a one hundred and sixty-eighth embodiment, the control system of the one hundred and sixty-fifth embodiment may include a communication unit configured to transmit a control signal to at least one of the mixture delivery system and the skinning system based on an output from at least one of the feed forward controller and the at least one feedback controller, to adjust at least one parameter of at least one of the mixture delivery system and the skinning system.

According to a one hundred and sixty-ninth embodiment, in the control system of the one hundred and sixty-fifth embodiment, the feed forward controller may be an adaptive feed forward controller.

According to a one hundred and seventieth embodiment, the control scheme of the one hundred and sixty-fifth embodiment may include an adjustment mechanism configured to adjust a model used by the feed forward controller based on a measured viscosity.

According to a one hundred and seventy-first embodiment, the adjustment mechanism of the one hundred and seventieth embodiment may be configured to adjust the model used by the feed forward controller based on the measured viscosity and the variation relating to the particle size distribution.

According to a one hundred and seventy-second embodiment, in the one hundred and sixty-fourth or one hundred and seventieth embodiment, the control scheme may include a reference model configured to determine a reference viscosity based on the variation relating to the particle size distribution.

According to a one hundred and seventy-third embodiment, the adjustment mechanism of the one hundred and seventy-second embodiment may be configured to adjust the model used by the feed forward controller based on the reference viscosity.

According to a one hundred and seventy-fourth embodiment, the adjustment mechanism of the one hundred and seventy-third embodiment may be configured to adjust the model used by the feed forward controller based on the reference viscosity, the measured viscosity, and the adjustment to the amount of the fluid to be added to the mixer.

According to a one hundred and seventy-fifth embodiment, the at least one second feedback controller of the one hundred and sixty-sixth embodiment may include a third feedback controller configured to determine the screwfill ratio of the mixer based on the measured density of the flowable mixture.

According to a one hundred and seventy-sixth embodiment, the at least one second feedback controller of the one hundred and sixty-sixth embodiment may include a third feedback controller configured to determine the amount of the fluid to be added to the mixer based on the measured viscosity.

According to a one hundred and seventy-seventh embodiment, the at least one feedback controller of the one hundred and sixty-fifth embodiment may include a first feedback controller configured to determine the pump speed based on a measured return pressure.

According to a one hundred and seventy-eighth embodiment, the at least one feedback controller of the one hundred and seventy-seventh embodiment may include a second feedback controller configured to determine at least one of the return pressure set point and the delivery pressure set point based on the measured skinning pipe pressure. The first feedback controller may be configured to determine the pump speed also based on at least one of the return pressure set point and the delivery pressure set point.

According to a one hundred and seventy-ninth embodiment, in the control system of the one hundred and seventy-eighth embodiment, monitoring the presence of the defect may include detecting a type of the defect, and the at least one feedback controller may include a third feedback controller configured to determine the skinning pipe pressure set point based on the type of defect. The second feedback controller may be configured to determine at least one of the return pressure set point and the delivery pressure set point also based on the skinning pipe pressure set point.

According to a one hundred and eightieth embodiment, the at least one feedback controller of the one hundred and sixty-fifth embodiment may include a first feedback controller configured to determine at least one of the pump speed and the delivery valve position based on the measured skinning pipe pressure.

According to a one hundred and eighty-first embodiment, in the control system of the one hundred and eightieth embodiment, monitoring the presence of the defect may include detecting a type of the defect, and the at least one feedback controller may include a second feedback controller configured to determine the skinning pipe pressure set point based on the type of defect. The first feedback controller may be configured to determine at least one of the pump speed and the delivery valve position also based on the skinning pipe pressure set point.

According to a one hundred and eighty-second embodiment, the at least one feedback controller of the one hundred and sixty-fifth embodiment may include a first feedback controller configured to determine the pump speed based on a measured flow rate of the flowable mixture in the mixture delivery system.

According to a one hundred and eighty-third embodiment, the at least one feedback controller of the one hundred and eighty-second embodiment may include a second feedback controller configured to determine the flow rate set point based on a skinning pipe pressure measured in the skinning system. The first feedback controller may be configured to determine the pump speed also based on the flow rate set point.

According to a one hundred and eighty-fourth embodiment, in the control system of the one hundred and eighty-third embodiment, monitoring the presence of the defect may include detecting a type of the defect, and the at least one feedback controller may include a third feedback controller configured to determine the skinning pipe pressure set point based on the type of defect. The second feedback controller may be configured to determine the flow rate set point also based on the skinning pipe pressure set point.

According to a one hundred and eighty-fifth embodiment, the at least one second feedback controller of the one hundred and sixty-sixth embodiment may be configured determine a mixer speed based on at least one of a measured density and a measured viscosity of the flowable mixture.

According to a one hundred and eighty-sixth embodiment, the second feed forward controller of the one hundred and sixty-seventh embodiment may include a third feed forward controller configured to determine an adjustment to at least one of the return pressure set point and the delivery pressure set point based on the variation relating to at least one of the measured viscosity and measured flow rate.

According to a one hundred and eighty-seventh embodiment, the second feed forward controller of the one hundred and sixty-seventh embodiment may include a third feed forward controller configured to determine an adjustment to at least one of the pump speed and the delivery valve position based on the variation relating to at least one of the measured viscosity and the measured flow rate.

According to a one hundred and eighty-eighth embodiment, the second feed forward controller of the one hundred and sixty-seventh embodiment may include a third feed forward controller configured to determine an adjustment to the flow rate set point based on the variation relating to at least one of the measured viscosity and the measured flow rate.

According to a one hundred and eighty-ninth embodiment, the second feed forward controller of the one hundred and sixty-seventh embodiment may include a third feed forward controller configured to determine an adjustment to the skinning speed based on the variation relating to the dimensions of incoming unskinned articles measured in the skinning system.

According to a one hundred and ninetieth embodiment, the second feed forward controller of the one hundred and sixty-seventh embodiment may include a third feed forward controller configured to determine an adjustment to the pressure relief system position based on the variation relating to the dimensions of incoming unskinned articles measured in the skinning system.

According to a one hundred and ninety-first embodiment, the feedback controller of the one hundred and ninetieth embodiment may include a first feedback controller configured to determine the skinning speed based on a measured skinning pipe pressure.

According to a one hundred and ninety-second embodiment, the feedback controller of the one hundred and ninetieth embodiment may include a first feedback controller configured to determine the pressure relief system position based on a measured skinning pipe pressure.

According to a one hundred and ninety-third embodiment, the control system of the one hundred and sixty-seventh embodiment may be configured to switch between a first skinning pipe pressure control scheme and a second skinning pipe control scheme based on the dimensions of incoming unskinned articles measured in the skinning system.

According to a one hundred and ninety-fourth embodiment, in the control system of the one hundred and sixty-sixth embodiment, at least one of the measured density and the measured viscosity is measured in real time or near real time.

According to a one hundred and ninety-fifth embodiment, in the control system of any of the one hundred and sixty-fourth or one hundred and sixty-fifth embodiment, the control system may receive real-time or near real-time measurements of at least one of a skinning pipe pressure, a delivery pressure, a return pressure, a speed of the pump, a delivery valve position, a flow rate, a viscosity, dimensions of the incoming unskinned articles, a skinning speed, or a pressure relief system position.

According to a one hundred and ninety-sixth embodiment, the dimensions of the one hundred and ninety-fifth embodiment may include at least one of a diameter, a radius, a circumference, and an outer peripheral length.

According to a one hundred and ninety-seventh embodiment, the present disclosure relates to a mixture delivery system for producing and delivering a flowable mixture to a delivery line. The mixture delivery system may include a mixer configured to mix a dry material and a fluid to produce the flowable mixture, a storage device coupled with the mixer and configured to store the flowable mixture produced by the mixer, and a pump coupled with the storage device and configured to pump the flowable mixture from the storage device to the delivery line. The storage device may include a cone shaped structure configured to store the flowable mixture, and a vibration device mounted to an outer surface of the cone shaped structure and configured to cause vibration to the cone shaped structure when the flowable mixture is forced into the pump.

According to a one hundred and ninety-eighth embodiment, mixture delivery system of the one hundred and ninety-seventh embodiment may include a particle analyzer configured to measure a particle size distribution of the dry material.

According to a one hundred and ninety-ninth embodiment, mixture delivery system of any of the one hundred and ninety-seventh or one hundred and ninety-eighth embodiment may include at least one sensor configured to measure at least one of a density, a flow rate, a pressure, and a viscosity of the flowable mixture.

According to a two hundredth embodiment, in the mixture delivery system of any of the one hundred and ninety-seventh or one hundred and ninety-eighth embodiment, the vibration device may be mounted to the outer surface at a rib of the cone shaped structure.

According to a two hundred and first embodiment, in the mixture delivery system of any of the one hundred and ninety-seventh or one hundred and ninety-eighth embodiment, the storage device may include a vacuum system configured to withdraw air from the storage device.

According to a two hundred and second embodiment, in the mixture delivery system of any of the one hundred and ninety-seventh or one hundred and ninety-eighth embodiment, the storage device may include a load cell configured to weigh at least one of the storage device and the flowable mixture stored therein.

According to a two hundred and third embodiment, in the mixture delivery system of any of the one hundred and ninety-seventh or one hundred and ninety-eighth embodiment, the storage device may include an auger disposed within the cone shaped structure and configured to force the flowable mixture into the pump.

According to a two hundred and fourth embodiment, the auger of the two hundred and third embodiment may include a helical screw blade configured to be in close proximity to an inner wall of the cone shaped structure without contacting the inner wall during operation.

According to a two hundred and fifth embodiment, the mixture delivery system of any of the one hundred and ninety-seventh or one hundred and ninety-eighth embodiment may include a recirculation line configured to recirculate at least a portion of the flowable mixture from the delivery line to the storage device.

According to a two hundred and sixth embodiment, the mixture delivery system of any of the one hundred and ninety-seventh or one hundred and ninety-eighth embodiment may include a delivery valve disposed within the delivery line and configured to control an amount of the flowable mixture directed to the skinning system.

According to a two hundred and seventh embodiment, the mixture delivery system of any of the one hundred and ninety-seventh or one hundred and ninety-eighth embodiment may include a purge line connected to a portion of the delivery line downstream of the pump and upstream of the delivery valve, the purge line configured to direct the flowable mixture out of the delivery line when the purge line is opened.

According to a two hundred and eighth embodiment, in the mixture delivery system of any of the one hundred and ninety-seventh or one hundred and ninety-eighth embodiment, the pump may be a first pump. The mixture delivery system may include a fluid dispensing system configured to dispense the fluid to the mixer. The fluid dispensing system may include a storage tank configured to store the fluid, a second pump configured to pump the fluid from the storage tank, and a recirculation loop configured to recirculate the fluid pumped out of the storage tank by the pump back to the storage tank.

According to a two hundred and ninth embodiment, the recirculation loop of the two hundred and eighth embodiment may include a flow control valve configured to control an amount of fluid flowing in the recirculation loop, and a controller configured to control the flow control valve based on a speed of the second pump to maintain a substantially constant pressure within the recirculation loop.

According to a two hundred and tenth embodiment, the fluid dispensing system of the two hundred and ninth embodiment may include a plurality of distribution branches connected to the recirculation loop and configured to receive the fluid from the recirculation loop while the substantially constant pressure is maintained within the recirculation loop.

According to a two hundred and eleventh embodiment, the present disclosure relates to a mixture delivery system for producing and delivering a flowable mixture to a delivery line. The mixture delivery system may include a mixer configured to mixing a dry material and a fluid to produce the flowable mixture, a storage device coupled with the mixer and configured to store the flowable mixture produced by the mixer, and a pump coupled with the storage device and configured to pump the flowable mixture from the storage device to the delivery line, the delivery line leading to a skinning system configured to apply the flowable mixture to an article. The mixture delivery system may also include a recirculation line configured to recirculate a portion of the flowable mixture from the delivery line back to the storage device. The storage device may include a port connected with the recirculation line for receiving the recirculated portion of the flowable mixture.

According to a two hundred and twelfth embodiment, the mixture delivery system of the two hundred and eleventh embodiment may include a particle analyzer configured to measure a particle size distribution of the dry material.

According to a two hundred and thirteenth embodiment, mixture delivery system of any of the two hundred and eleventh or two hundred and twelfth embodiment may include at least one sensor configured to measure at least one of a density, a flow rate, a pressure, and a viscosity of the flowable mixture.

According to a two hundred and fourteenth embodiment, the storage device of any of the two hundred and eleventh or two hundred and twelfth embodiment may include a cone shaped structure configured to store the flowable mixture, and a vibration device mounted to an outer surface of the cone shaped structure and configured to cause vibration to the cone shaped structure when the flowable mixture is forced into the pump.

According to a two hundred and fifteenth embodiment, the vibration device of the two hundred and fourteenth embodiment may be mounted to the outer surface at a rib of the cone shaped structure.

According to a two hundred and sixteenth embodiment, the storage device of any of the two hundred and eleventh or two hundred and twelfth embodiment may include a vacuum system configured to withdraw air from the storage device.

According to a two hundred and seventeenth embodiment, the storage device of any of the two hundred and eleventh or two hundred and twelfth embodiment may include a load cell configured to weigh at least one of the storage device and the flowable mixture stored therein.

According to a two hundred and eighteenth embodiment, the storage device of any of the two hundred and eleventh or two hundred and twelfth embodiment may include an auger disposed within the cone shaped structure and configured to force the flowable mixture into the pump.

According to a two hundred and nineteenth embodiment, the auger of the two hundred and eighteenth embodiment may include a helical screw blade configured to be in close proximity to an inner wall of the cone shaped structure without contacting the inner wall during operation.

According to a two hundred and twentieth embodiment, the mixture delivery system of any of the two hundred and eleventh or two hundred and twelfth embodiment may include a delivery valve disposed within the delivery line and configured to control an amount of the flowable mixture directed to the skinning system.

According to a two hundred and twenty-first embodiment, the mixture delivery system of the two hundred and twentieth embodiment may include a purge line connected to a portion of the delivery line downstream of the pump and upstream of the delivery valve, the purge line configured to direct the flowable mixture out of the delivery line when the purge line is opened.

According to a two hundred and twenty-second embodiment, in the mixture delivery system of any of the two hundred and eleventh or two hundred and twelfth embodiment, the pump may be a first pump, and the mixture delivery system may include a fluid dispensing system configured to dispense the fluid to the mixer. The fluid dispensing system may include a storage tank configured to store the fluid, a second pump configured to pump the fluid from the storage tank, and a recirculation loop configured to recirculate the fluid pumped out of the storage tank by the pump back to the storage tank.

According to a two hundred and twenty-third embodiment, the recirculation loop of the two hundred and twenty-second embodiment may include a flow control valve configured to control an amount of fluid flowing in the recirculation loop. The fluid dispensing system may include a controller configured to control the flow control valve based on a speed of the second pump to maintain a substantially constant pressure within the recirculation loop.

According to a two hundred and twenty-fourth embodiment, the fluid dispensing system of the two hundred and twenty-third embodiment may include a plurality of distribution branches connected to the recirculation loop and configured to receive the fluid from the recirculation loop while the substantially constant pressure is maintained within the recirculation loop.

According to a two hundred and twenty-fifth embodiment, the present disclosure relates to a mixture delivery system for producing and delivering a flowable mixture to a delivery line. The mixture delivery system may include a mixer configured to mixing a dry material and a fluid to produce the flowable mixture, a storage device coupled with the mixer and configured to store the flowable mixture produced by the mixer, and a pump coupled with the storage device and configured to pump the flowable mixture from the storage device to the delivery line leading to a skinning system configured to apply the flowable mixture to an article. The mixture delivery system may include a delivery valve disposed within the delivery line and configured to control an amount of flowable mixture flowing in the delivery line, and a purge line fluidly coupled to the delivery line upstream of the delivery valve, the purge line configured to purge the flowable mixture out of the mixture delivery system when at least one property of the flowable mixture does not meet a target requirement.

According to a two hundred and twenty-sixth embodiment, the mixture delivery system of the two hundred and twenty-fifth embodiment may include a particle analyzer configured to measure a particle size distribution of the dry material.

According to a two hundred and twenty-seventh embodiment, the mixture delivery system of any of the two hundred and twenty-fifth or two hundred and twenty-sixth embodiment may include at least one sensor configured to measure at least one of a density, a flow rate, a pressure, and a viscosity of the flowable mixture.

According to a two hundred and twenty-eighth embodiment, the mixture delivery system of any of the two hundred and twenty-fifth or two hundred and twenty-sixth embodiment may include a storage device configured to store the flowable mixture produced by the mixer. The storage device may include a cone shaped structure for storing the flowable mixture, and a vibration device mounted to an outer surface of the cone shaped structure and configured to cause vibration to the cone shaped structure when the flowable mixture is forced into the pump.

According to a two hundred and twenty-ninth embodiment, the vibration device of the two hundred and twenty-eighth embodiment may be mounted to the outer surface at a rib of the cone shaped structure.

According to a two hundred and thirtieth embodiment, the storage device of the two hundred and twenty-eighth embodiment may include a vacuum system configured to withdraw air from the storage device.

According to a two hundred and thirty-first embodiment, the storage device of the two hundred and twenty-eighth embodiment may include a load cell configured to weigh at least one of the storage device and the flowable mixture stored therein.

According to a two hundred and thirty-second embodiment, the storage device of the two hundred and twenty-eighth embodiment may include an auger disposed within the cone shaped structure and configured to force the flowable mixture into the pump.

According to a two hundred and thirty-third embodiment, the auger of the two hundred and thirty-second embodiment may include a helical screw blade configured to be in close proximity to an inner wall of the cone shaped structure without contacting the inner wall during operation.

According to a two hundred and thirty-fourth embodiment, in the mixture delivery system of any of the two hundred and twenty-fifth or two hundred and twenty-sixth embodiment, the pump may be a first pump, and the mixture delivery system may include a fluid dispensing system configured to dispense the fluid to the mixer. The fluid dispensing system may include a storage tank configured to store the fluid, a second pump configured to pump the fluid from the storage tank, and a recirculation loop configured to recirculate the fluid pumped out of the storage tank by the pump back to the storage tank.

According to a two hundred and thirty-fifth embodiment, the recirculation loop of the two hundred and thirty-fourth embodiment may include a flow control valve configured to control an amount of fluid flowing in the recirculation loop. The fluid dispensing system may include a controller configured to control the flow control valve based on a speed of the second pump to maintain a substantially constant pressure within the recirculation loop.

According to a two hundred and thirty-sixth embodiment, the fluid dispensing system of the two hundred and thirty-fifth embodiment may include a plurality of distribution branches connected to the recirculation loop and configured to receive the fluid from the recirculation loop while the substantially constant pressure is maintained within the recirculation loop.

According to a two hundred and thirty-seventh embodiment, the present disclosure relates to a storage device for storing a flowable mixture. The storage device may include a cone shaped structure configured to store the flowable mixture, an auger disposed within the cone shaped structure and configured to drive the flowable mixture to a pump connected to a lower portion of the cone shaped structure, and a vibration device attached to an outer surface of the cone shaped structure, the vibration device configured to vibrate the cone-shaped structure to aid in moving the flowable mixture to the auger.

According to a two hundred and thirty-eighth embodiment, the vibration device of the two hundred and thirty-seventh embodiment may be mounted to the outer surface at a rib of the cone shaped structure.

According to a two hundred and thirty-ninth embodiment, the storage device of any of the two hundred and thirty-seventh or two hundred and thirty-eighth embodiment may include a vacuum system configured to withdraw air from the storage device.

According to a two hundred and fortieth embodiment, the storage device of any of the two hundred and thirty-seventh or two hundred and thirty-eighth embodiment may include a load cell configured to weigh at least one of the storage device and the flowable mixture stored therein.

According to a two hundred and forty-first embodiment, the auger of the two hundred and fortieth embodiment may include a helical screw blade configured to be in close proximity to an inner wall of the cone shaped structure without contacting the inner wall during operation.

According to a two hundred and forty-second embodiment, the present disclosure relates to a fluid dispensing system for delivering a fluid to a plurality of distribution branches. The fluid dispensing system may include a storage tank configured to store the fluid, a pump configured to pump the fluid from the storage tank to recirculate within a recirculation loop, the recirculation loop directing a portion of the fluid pumped out of the storage tank back to the storage tank, and a plurality of distribution branches connected to the recirculation loop and configured to receive fluid from the recirculation loop. The fluid dispensing system may include a flow control valve disposed in the recirculation loop and configured to control an amount of fluid flow within the recirculation loop, and a controller configured to adjust a position of the flow control valve based on a speed of the pump to maintain a substantially constant pressure within the recirculation loop while the fluid is delivered to the plurality of distribution branches.

According to a two hundred and forty-third embodiment, the present disclosure relates to a mixture delivery system for producing and delivering a flowable mixture to a delivery line. The mixture delivery system may include a particle analyzer configured to measure a particle size distribution of a dry material, a mixer configured to mix the dry material and a fluid to produce the flowable mixture, and a pump disposed downstream of the mixer and configured to pump the flowable mixture produced by the mixer to the delivery line. The mixture delivery system may include at least one sensor configured to measure at least one of a density and a viscosity of the flowable mixture, and a mixture control system including a communication unit configured to receive data relating to the measured particle size distribution from the particle analyzer, and receive data relating to the measured density or the measured viscosity from the at least one sensor. The mixture control system may include a feed forward controller configured to determine an adjustment to an amount of the fluid to be added to the mixer based on a variation relating to the measured particle size distribution, and at least one feedback controller configured to determine at least one of a screwfill ratio of the mixer and the amount of the fluid to be added to the mixer, based on at least one of the measured density and the measured viscosity. The communication unit may be further configured to transmit a control signal to at least one of the mixer and the pump based on an output from at least one of the feed forward controller and the at least one feedback controller.

According to a two hundred and forty-fourth embodiment, the present disclosure relates to a mixture delivery system for producing and delivering a flowable mixture to a delivery line. The mixture delivery system may include a mixer configured to mix the dry material and a fluid to produce the flowable mixture, a pump disposed downstream of the mixer and configured to pump the flowable mixture produced by the mixer to the delivery line, and a mixture control system including a feed forward controller configured to determine an adjustment to an amount of the fluid to be added to the mixer based on a variation relating to a measured particle size distribution. The mixture control system may include at least one feedback controller configured to determine at least one of a screwfill ratio of the mixer and the amount of the fluid to be added to the mixer, based on at least one of a measured density and a measured viscosity, and a communication unit configured to transmit a control signal to at least one of the mixer and the pump based on an output from at least one of the feed forward controller and the at least one feedback controller to adjust at least one parameter of at least one of the mixer and the pump.

According to a two hundred and forty-fifth embodiment, the mixture delivery system of the two hundred and forty-fourth embodiment may include a particle analyzer configured to measure the particle size distribution of the dry material.

According to a two hundred and forty-sixth embodiment, the mixture delivery system of any of the two hundred and forty-fourth or two hundred and forty-fifth embodiment at may include least one sensor configured to measure at least one of the density and the viscosity of the flowable mixture.

According to a two hundred and forty-seventh embodiment, the at least one sensor of the two hundred and forty-sixth embodiment may be configured to measure the at least one of the density and the viscosity in real time or near real time.

According to a two hundred and forty-eighth embodiment, the communication unit of the two hundred and forty-sixth embodiment may be configured to receive data relating to the measured particle size distribution from the particle analyzer, and data relating to the measured density or the measured viscosity from the at least one sensor.

According to a two hundred and forty-ninth embodiment, the feed forward controller of any of the two hundred and forty-fourth or two hundred and forty-fifth embodiment may be an adaptive feed forward controller.

According to a two hundred and fiftieth embodiment, the mixture control system of any of the two hundred and forty-fourth or two hundred and forty-fifth embodiment may include an adjustment mechanism configured to adjust a model used by the feed forward controller based on a measured viscosity.

According to a two hundred and fifty-first embodiment, the adjustment mechanism of the two hundred and fiftieth embodiment may be configured to adjust the model used by the feed forward controller based on the measured viscosity and the variation relating to the particle size distribution.

According to a two hundred and fifty-second embodiment, the mixture control system of any of the two hundred and forty-fourth or two hundred and forty-fifth embodiment may include a reference model configured to determine a reference viscosity based on the variation relating to the particle size distribution.

According to a two hundred and fifty-third embodiment, the adjustment mechanism of the two hundred and fifty-second embodiment may be configured to adjust the model used by the feed forward controller based on the reference viscosity.

According to a two hundred and fifty-fourth embodiment, the adjustment mechanism of the two hundred and fifty-third embodiment may be configured to adjust the model used by the feed forward controller based on the reference viscosity, the measured viscosity, and the adjustment to the amount of the fluid to be added to the mixer.

According to a two hundred and fifty-fifth embodiment, the at least one feedback controller of any of the two hundred and forty-fourth or two hundred and forty-fifth embodiment may be configured to determine the screwfill ratio of the mixer based on the measured density of the flowable mixture.

According to a two hundred and fifty-sixth embodiment, the at least one feedback controller of any of the two hundred and forty-fourth or two hundred and forty-fifth embodiment may be configured to determine the amount of the fluid to be added to the mixer based on the measured viscosity.

According to a two hundred and fifty-seventh embodiment, the at least one feedback controller of any of the two hundred and forty-fourth or two hundred and forty-fifth embodiment may be configured to determine a pump speed based on a measured return pressure.

According to a two hundred and fifty-eighth embodiment, the at least one feedback controller of any of the two hundred and forty-fourth or two hundred and forty-fifth embodiment may be configured to determine a pump speed based on a measured flow rate of the flowable mixture in the mixture delivery system.

According to a two hundred and fifty-ninth embodiment, the at least one feedback controller of any of the two hundred and forty-fourth or two hundred and forty-fifth embodiment may be configured to determine a mixer speed based on at least one of a measured density and a measured viscosity of the flowable mixture.

According to a two hundred and sixtieth embodiment, the at least one feedback controller of any of the two hundred and forty-fourth or two hundred and forty-fifth embodiment may be configured to determine the screwfill ratio of the mixer based on the measured density.

According to a two hundred and sixty-first embodiment, the at least one feedback controller of any of the two hundred and forty-fourth or two hundred and forty-fifth embodiment may be configured to determine a speed the mixer based on the measured density.

According to a two hundred and sixty-second embodiment, the at least one feedback controller of any of the two hundred and forty-fourth or two hundred and forty-fifth embodiment may be configured to determine the amount of the fluid to be added to the mixer based on the measured viscosity.

According to a two hundred and sixty-third embodiment, the feed forward controller of any of the two hundred and forty-fourth or two hundred and forty-fifth embodiment may be configured to determine an adjustment to at least one of the return pressure set point and the delivery pressure set point based on the variation relating to at least one of the measured viscosity and measured flow rate.

According to a two hundred and sixty-fourth embodiment, the at least one feedback controller of any of the two hundred and forty-fourth or two hundred and forty-fifth embodiment may be configured to determine an adjustment to at least one of the pump speed and the delivery valve position based on the variation relating to at least one of the measured viscosity and the measured flow rate.

According to a two hundred and sixty-fifth embodiment, the at least one feedback controller of any of the two hundred and forty-fourth or two hundred and forty-fifth embodiment may be configured to determine an adjustment to the flow rate set point based on the variation relating to at least one of the measured viscosity and the measured flow rate.

According to a two hundred and sixty-sixth embodiment, the present disclosure relates to a method of controlling at least one property of a flowable mixture produced by a mixture delivery system. The method may include mixing a dry material and a fluid in a mixer to produce the flowable mixture, pumping the flowable mixture to a delivery line, and determining, using a feed forward controller, an adjustment to an amount of the fluid to be added to the mixer based on a variation relating to a measured particle size distribution. The method may also include determining, using at least one feedback controller, at least one of a screwfill ratio of the mixer and the amount of the fluid to be added to the mixer, based on at least one of a measured density and a measured viscosity, and transmitting a control signal to the mixer to adjust at least one of the amount of fluid to be added to the mixer and the screwfill ratio of the mixer, based on an output of at least one of the feed forward controller and the at least one feedback controller.

According to a two hundred and sixty-seventh embodiment, the method of the two hundred and sixty-sixth embodiment may include measuring a particle size distribution of the dry material.

According to a two hundred and sixty-eighth embodiment, the method of any of the two hundred and sixty-sixth or two hundred and sixty-seventh embodiment may include measuring at least one of the density and viscosity of the flowable mixture.

According to a two hundred and sixty-ninth embodiment, in the method of the two hundred and sixty-eighth embodiment, measuring the at least one of the density or viscosity of the flowable mixture may include measuring the at least one of the density and viscosity in real time or near real time.

According to a two hundred and seventieth embodiment, the method of the two hundred and sixty-ninth embodiment may include determining at least one of the amount of fluid to be added to the mixer and a screwfill ratio of the mixer, based on at least one of the real-time or near real-time measurement of density and viscosity.

According to a two hundred and seventy-first embodiment, the method of any of the two hundred and sixty-sixth or two hundred and sixty-seventh embodiment may include adjusting a model used by the feed forward controller based on a measured viscosity.

According to a two hundred and seventy-second embodiment, the method of the two hundred and seventy-first embodiment may include adjusting the model used by the feed forward controller based on the measured viscosity and the variation relating to the particle size distribution.

According to a two hundred and seventy-third embodiment, the method of the two hundred and seventy-second embodiment may include determining a reference viscosity based on the variation relating to the particle size distribution.

According to a two hundred and seventy-fourth embodiment, the method of the two hundred and seventy-third embodiment may include adjusting the model used by the feed forward controller based on the reference viscosity.

According to a two hundred and seventy-fifth embodiment, the method of the two hundred and seventy-third embodiment may include adjusting the model used by the feed forward controller based on the reference viscosity, the measured viscosity, and the adjustment to the amount of the fluid to be added to the mixer.

According to a two hundred and seventy-sixth embodiment, in the method of any of the two hundred and sixty-sixth or two hundred and sixty-seventh embodiment, determining at least one of the screwfill ratio of the mixer and the amount of the fluid to be added to the mixer based on at least one of the measured density and the measured viscosity may include determining the screwfill ratio of the mixer based on the measured density of the flowable mixture.

According to a two hundred and seventy-seventh embodiment, in the method of any of the two hundred and sixty-sixth or two hundred and sixty-seventh embodiment, determining at least one of the screwfill ratio of the mixer and the amount of the fluid to be added to the mixer based on at least one of the measured density and the measured viscosity may include determining the amount of the fluid to be added to the mixer based on the measured viscosity.

According to a two hundred and seventy-eighth embodiment, the method of any of the two hundred and sixty-sixth or two hundred and sixty-seventh embodiment may include determining a pump speed based on a measured return pressure.

According to a two hundred and seventy-ninth embodiment, the method of the two hundred and seventy-eighth embodiment may include determining the pump speed based on a measured flow rate of the flowable mixture in the mixture delivery system.

According to a two hundred and eightieth embodiment, the method of any of the two hundred and sixty-sixth or two hundred and sixty-seventh embodiment may include determining a mixer speed based on at least one of the measured density and the measured viscosity of the flowable mixture.

According to a two hundred and eighty-first embodiment, the method of any of the two hundred and sixty-sixth or two hundred and sixty-seventh embodiment may include determining an adjustment to at least one of the return pressure set point and the delivery pressure set point based on the variation relating to at least one of the measured viscosity and a measured flow rate.

According to a two hundred and eighty-second embodiment, the method of any of the two hundred and sixty-sixth or two hundred and sixty-seventh embodiment may include determining an adjustment to at least one of the pump speed and the delivery valve position based on the variation relating to at least one of the measured viscosity and a measured flow rate.

According to a two hundred and eighty-third embodiment, the method of any of the two hundred and sixty-sixth or two hundred and sixty-seventh embodiment may include determining an adjustment to the flow rate set point based on the variation relating to at least one of the measured viscosity and a measured flow rate.

According to a two hundred and eighty-fourth embodiment, the present disclosure relates to a method of delivering a fluid to a plurality of distribution branches. The method may include pumping, using a pump, the fluid from a storage tank to recirculate within a recirculation loop, the recirculation loop directing a portion of the fluid pumped out of the storage tank back to the storage tank. The method may include measuring a pressure in the recirculation loop, and adjusting a position of a flow control valve disposed within the recirculation loop based on at least one of a speed of the pump and the measured pressure to maintain a substantially constant pressure within the recirculation loop while the fluid is delivered to the plurality of distribution branches.

According to a two hundred and eighty-fifth embodiment, the present disclosure relates to a method of producing and delivering a highly viscous mixture to a skinning system. The method may include continuously mixing a dry material and a fluid to produce the highly viscous mixture, the highly viscous mixture having a viscosity of greater than 1 million centipoises, storing the highly viscous mixture within a storage device, and continuously pumping the highly viscous mixture from the storage device to a delivery line leading to the skinning system at a flow rate ranging from 50 pounds/hour to 300 pounds/hour. The method may include continuously recirculating a portion of the highly viscous mixture from the delivery line back to the storage device through a recirculation line.

According to a two hundred and eighty-sixth embodiment, the present disclosure relates to a skinning system for applying a flowable mixture to an article. The skinning system may include a skinning pipe configured to receive the article and apply the flowable mixture to the article as the article moves axially along an inner space of the skinning pipe, and a manifold including a plurality of grooves configured to deliver the flowable mixture to the skinning pipe. The skinning system may include an article feeding mechanism configured to align the article with the skinning pipe and push the article into the inner space of the skinning pipe, and a transfer system configured to hold the article and move the article out of the skinning pipe as the article moves axially along the inner space of the skinning pipe to receive the flowable mixture.

According to a two hundred and eighty-seventh embodiment, the article feeding mechanism of the two hundred and eighty-sixth embodiment may include a platen configured to support the article placed thereon, and a centering mechanism configured to center the article placed on the platen.

According to a two hundred and eighty-eighth embodiment, centering mechanism of the two hundred and eighty-seventh embodiment may include a plurality of centering devices each comprising a centering actuator configured to center the article.

According to a two hundred and eighty-ninth embodiment, each centering device of the two hundred and eighty-eighth embodiment may include an adjusting mechanism configured to adjust a position of the at least one centering actuator relative to the platen.

According to a two hundred and ninetieth embodiment, the at least one adjusting mechanism of the two hundred and eighty-ninth embodiment may include a locating plate having a plurality of holes, and a locating pin configured to engage with one of the plurality of holes.

According to a two hundred and ninety-first embodiment, the adjusting mechanism of the two hundred and ninetieth embodiment may include a support having at least one guide hole, a rod configured to slide within the at least one guide hole, and a bracket mounted to the support and having a hole configured to engage with the locating pin to secure a position of the at least one centering actuator relative to the platen.

According to a two hundred and ninety-second embodiment, the centering actuator of the two hundred and ninetieth embodiment may be mounted to at least one of the locating plate and the rod.

According to a two hundred and ninety-third embodiment, the at least one adjusting mechanism of the two hundred and ninety-second embodiment may include a motor configured to adjust the position of the at least one centering actuator.

According to a two hundred and ninety-fourth embodiment, the centering mechanism of any of the two hundred and eighty-seventh to two hundred and ninety-third embodiment may include at least one air knife configured to blow air toward at least one of the unskinned article and the platen.

According to a two hundred and ninety-fifth embodiment, the article feeding mechanism of any of the two hundred and eighty-seventh to two hundred and ninety-third embodiment may be mounted to a lower carriage movable along a rail relative to the skinning pipe.

According to a two hundred and ninety-sixth embodiment, the article feeding mechanism and the lower carriage of the two hundred and ninety-fifth embodiment may be disposed below the skinning pipe in a vertical direction.

According to a two hundred and ninety-seventh embodiment, the article feeding mechanism of the two hundred and ninety-sixth embodiment may be configured to push the article into the skinning pipe from below the skinning pipe in the vertical direction.

According to a two hundred and ninety-eighth embodiment, in the skinning system of any of the two hundred and eighty-sixth to two hundred and ninety-third embodiment, the article feeding mechanism may be mounted on a lower carriage, and the transfer system may be mounted on an upper carriage. The lower carriage and the upper carriage may be mounted on a vertical rail and move along the vertical rail, and the lower carriage may be disposed below the skinning pipe. The upper carriage may be disposed above the skinning pipe.

According to a two hundred and ninety-ninth embodiment, the article feeding mechanism of any of the two hundred and eighty-fifth to two hundred and ninety-third embodiment may include a flexure shaft configured to support the platen, the flexure shaft being deflectable while the article feeding mechanism pushes the article into the skinning pipe.

According to a three hundredth embodiment, the article feeding mechanism of the two hundred and ninety-ninth embodiment may include a tilt limiter located adjacent the flexure shaft and configured to limit deflection of the flexure shaft.

According to a three hundredth and first embodiment, the transfer system of any of the two hundred and eighty-sixth to two hundred and ninety-third embodiment may be mounted to an upper carriage movable along a rail relative to the skinning pipe.

According to a three hundredth and second embodiment, the upper carriage and the transfer system of the three hundred and first embodiment may be disposed above the skinning pipe in a vertical direction.

According to a three hundredth and third embodiment, the transfer system of the three hundred and second embodiment may be configured to pull the article upward in the vertical direction out of the skinning pipe.

According to a three hundredth and fourth embodiment, the transfer system of any of the two hundred and eighty-sixth to two hundred and ninety-third embodiment may include a vacuum system configured to generate a vacuum pressure within the article. The vacuum system may include a vacuum chuck configured to hold the article using the vacuum pressure, and pull the article out of the skinning pipe while holding the article using the vacuum pressure.

According to a three hundredth and fifth embodiment, the vacuum chuck of the three hundredth and fourth embodiment may be a multi-zone vacuum chuck, each zone being independently controlled.

According to a three hundredth and fifth embodiment, the transfer system of any of the two hundred and eighty-sixth to two hundred and ninety-third embodiment may include a vacuum system configured to generate multiple vacuum zones within more than one article. The vacuum system may be configured to hold the more than one article by a vacuum pressure and move the more than one article out of the skinning pipe.

According to a three hundred and seventh embodiment, the skinning system of the three hundred and sixth embodiment may include a first spacer disposed at a bottom surface of a first article to seal off a first vacuum zone, and a second spacer disposed at a bottom surface of a second article to seal off a second vacuum zone, a shape of the first spacer being different from a shape of the second spacer.

According to a three hundred and eighth embodiment, the skinning system of any of the two hundred and eighty-sixth to two hundred and ninety-third embodiment may include at least one force sensor configured to measure at least one force experienced by at least one of the transfer system and the article feeding mechanism.

According to a three hundred and ninth embodiment, the skinning system of the three hundred and eighth embodiment may include a control system configured to control motions of the transfer system and the article feeding mechanism based on the at least one force.

According to a three hundred and tenth embodiment, the control system of the three hundred and ninth embodiment may be configured to adjust at least one of a position and a speed of at least one of the article feeding mechanism and the transfer system based on the at least one force.

According to a three hundred and eleventh embodiment, the at least one force sensor of the three hundred and eighth embodiment may include at least one first force sensor configured to measure a first force experienced by the transfer system or an upper carriage to which the transfer system is mounted, and at least one second force sensor configured to measure a second force experienced by the article feeding mechanism or a lower carriage to which the article feeding mechanism is mounted.

According to a three hundred and twelfth embodiment, in the skinning system of the three hundred and ninth embodiment, the transfer system may include a vacuum system configured to generate multiple vacuum zones, and the control system may be configured to activate or deactivate one or more of the multiple vacuum zones based on the at least one force.

According to a three hundred and thirteenth embodiment, the skinning system of any of the two hundred and eighty-sixth to two hundred and ninety-third embodiment may include at least one laser device disposed adjacent an inlet of the skinning pipe and configured to measure a dimension of an unskinned article, the dimension including at least one of a diameter, a radius, a circumference, and an outer peripheral length.

According to a three hundred and fourteenth embodiment, the at least one laser device of the three hundred and thirteenth embodiment may include a plurality of laser devices, each laser devices including a laser unit and a camera.

According to a three hundred and fifteenth embodiment, the skinning system of any of the two hundred and eighty-sixth to two hundred and ninety-third embodiment may include at least one laser device disposed adjacent an outlet of the skinning pipe and configured to monitor presence of a defect on a skinned article coated with the flowable mixture.

According to a three hundred and sixteenth embodiment, in the skinning system of the three hundred and fifteenth embodiment, the at least one laser device disposed adjacent the outlet of the skinning pipe is also configured to detect the defect based on monitoring the presence of the defect.

According to a three hundred and seventeenth embodiment, the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments further comprises at least one laser device disposed adjacent an outlet of the skinning pipe and configured to measure a dimension of a skinned article.

According to a three hundred and eighteenth embodiment, in the skinning system of the three hundred and seventeenth embodiment, the dimension comprises at least one of a diameter, a radius, a circumference, and an outer peripheral length.

According to a three hundred and nineteenth embodiment, the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments further comprises at least one first laser device disposed adjacent an inlet of the skinning pipe and configured to measure a dimension of an unskinned article, the dimension including at least one of a diameter, a radius, a circumference, and an outer peripheral length, and at least one second laser device disposed adjacent an outlet of the skinning pipe and configured to measure a dimension of a skinned article which is the unskinned article applied with the flowable mixture at an outer surface, the dimension including at least one of a diameter, a radius, a circumference, and an outer peripheral length.

According to a three hundred and twentieth embodiment, the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments further comprises a controller configured to receive data regarding a dimension of the unskinned article and data regarding a dimension of the skinned article and calculate a thickness of the flowable mixture applied to the outer surface of the unskinned article based on the dimensions of the unskinned article and the skinned article.

According to a three hundred and twenty-first embodiment, in the skinning system of the three hundred and twentieth embodiment, the dimension comprises at least one of a diameter, a radius, a circumference, and an outer peripheral length.

According to a three hundred and twenty-second embodiment, the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments further comprises a frame structure including a rail disposed in a vertical direction, and the manifold is mounted to a middle portion of the frame structure, and the article feeding mechanism is mounted to a lower carriage, the lower carriage being mounted to the rail below the manifold, and the transfer system is mounted to an upper carriage, the upper carriage being mounted to the rail above the manifold.

According to a three hundred and twenty-third embodiment, in the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments, the manifold further comprises a pressure adjustment system configured to adjust a pressure of the flowable mixture adjacent the skinning pipe.

According to a three hundred and twenty-fourth embodiment, in the skinning system of the three hundred and twenty-third embodiment, the manifold further comprises a ring mounted to a lower manifold piece of the manifold and configured to move along the skinning pipe under the actuation of the pressure adjustment system.

According to a three hundred and twenty-fifth embodiment, in the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments, the manifold further comprises a skin thickness sensor mounted to a wall of the skinning pipe and configured to measure a thickness of the flowable mixture on a skinned article.

According to a three hundred and twenty-sixth embodiment, in the skinning system of the three hundred and twenty-fifth embodiment, the skin thickness sensor comprises at least one conductor configured to apply a current to the flowable mixture on the skinned article and a probe body housing the at least one conductor.

According to a three hundred and twenty-seventh embodiment, in the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments, the manifold comprises an upper manifold piece and a lower manifold piece joined together with the upper manifold piece.

According to a three hundred and twenty-eighth embodiment, in the skinning system of the three hundred and twenty-seventh embodiment, the manifold comprises a locating pin located in at least one of the upper manifold piece and the lower manifold piece and a locating cylinder located in at least one of the lower manifold piece and the upper manifold piece, the locating cylinder and the locating pin engaging with one another to join the upper manifold piece and the lower manifold piece.

According to a three hundred and twenty-ninth embodiment, in the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments the manifold is mounted to a mounting bracket, the manifold further comprising at least one locating pad for locating the manifold on the mounting bracket.

According to a three hundred and thirtieth embodiment, in the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments, the manifold is mounted to a mounting bracket, the manifold further comprising at least one locating blocks for locating the manifold on the mounting bracket.

According to a three hundred and thirty-first embodiment, in the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments, the skinning pipe includes a wall having a plurality of holes and the grooves are configured to deliver the flowable mixture from the manifold to the inner space of the skinning pipe through the holes.

According to a three hundred and thirty-second embodiment, in the skinning system of the three hundred and thirty-first embodiment, the flowable mixture within the grooves is pressurized.

According to a three hundred and thirty-third embodiment, in the skinning system of the three hundred and thirty-second embodiment, the plurality of grooves are configured to deliver the flowable mixture to a circumference of the wall of the skinning pipe.

According to a three hundred and thirty-fourth embodiment, the skinning system of any of the two hundred and eighty-sixth, two hundred and eighty-seventh, two hundred and eighty-eighth, two hundred and eighty-ninth, two hundred and ninetieth, two hundred and ninety-first, two hundred and ninety-second, or two hundred and ninety-third embodiments further comprises at least one robot configured to load or unload the article.

According to a three hundred and thirty-fifth embodiment, in the skinning system of the three hundred and thirty-fourth embodiment, the at least one robot comprises a loading robot and an unloading robot, the loading robot comprises a vacuum chuck configured to hold and lift an unskinned article using a vacuum pressure, and the unloading robot comprises at least one adjustable arm configured to receive a skinned article.

According to a three hundred and thirty-sixth embodiment, in the skinning system of the three hundred and thirty-fifth embodiment, the unloading robot further comprises a sensor configured to detect the presence of the skinned article on the at least one adjustable arm.

According to a three hundred and thirty-seventh embodiment, the present disclosure relates to a manifold assembly for a skinning system that applies a flowable mixture to an article. The manifold assembly may include a manifold including a plurality of grooves configured to deliver the flowable mixture, a skinning pipe configured to receive the flowable mixture from the grooves of the manifold and apply the flowable mixture to an outer surface of the article, and a skin thickness sensor mounted to the skinning pipe and configured to apply an electric current, using a circuit, to a portion of the flowable mixture applied to the outer surface of the article. The skin thickness sensor may also be configured to measure a voltage across a portion of the circuit, and determine a thickness of the flowable mixture applied to the outer surface of the article based on the measured voltage and a predetermined relationship between thicknesses and voltages.

According to a three hundred and thirty-eighth embodiment, the manifold assembly of the three hundred and thirty-seventh embodiment further comprises a pressure adjustment system configured to adjust a pressure of the flowable mixture adjacent the skinning pipe.

According to a three hundred and thirty-ninth embodiment, the manifold assembly of the three hundred and thirty-eighth embodiment further comprises a ring mounted to a lower manifold piece of the manifold and configured to move along the skinning pipe under actuation of the pressure adjustment system.

According to a three hundred and fortieth embodiment, in the manifold assembly of the three hundred and thirty-seventh, three hundred and thirty-eighth, or three hundred and thirty-ninth embodiments, the skin thickness sensor comprises at least one conductor configured to apply the electric current to the flowable mixture applied to the outer surface of the article and a probe body housing the at least one conductor.

According to a three hundred and forty-first embodiment, in the manifold assembly of the three hundred and thirty-seventh, three hundred and thirty-eighth, or three hundred and thirty-ninth embodiments, the manifold comprises an upper manifold piece and a lower manifold piece joined together with the upper manifold piece.

According to a three hundred and forty-second embodiment, in the manifold assembly of the three hundred and forty-first embodiment, the manifold comprises a locating pin located in at least one of the upper manifold piece and the lower manifold piece and a locating cylinder located in at least one of the lower manifold piece and the upper manifold piece, the locating cylinder and the locating pin engaging with one another to join the upper manifold piece and the lower manifold piece.

According to a three hundred and forty-third embodiment, in the manifold assembly of the three hundred and thirty-seventh, three hundred and thirty-eighth, or three hundred and thirty-ninth embodiments, the manifold is mounted to a mounting bracket, the manifold further comprising at least one locating pad for locating the manifold on the mounting bracket.

According to a three hundred and forty-fourth embodiment, in the manifold assembly of the three hundred and thirty-seventh, three hundred and thirty-eighth, or three hundred and thirty-ninth embodiments, the manifold is mounted to a mounting bracket, the manifold further comprising at least one locating block for locating the manifold on the mounting bracket.

According to a three hundred and forty-fifth embodiment, in the manifold assembly of the three hundred and thirty-seventh, three hundred and thirty-eighth, or three hundred and thirty-ninth embodiments, the skinning pipe includes a wall having a plurality of holes and the grooves are configured to deliver the flowable mixture from the manifold to an inner space of the skinning pipe through the holes.

According to a three hundred and forty-sixth embodiment, in the manifold assembly of the three hundred and forty-fifth embodiment the flowable mixture within the grooves is pressurized.

According to a three hundred and forty-seventh embodiment, in the manifold assembly of the three hundred and forty-fifth embodiment the plurality of grooves are configured to deliver the flowable mixture to a circumference of the wall of the skinning pipe.

According to a three hundred and forty-eighth embodiment, in the manifold assembly of the three hundred and thirty-seventh, three hundred and thirty-eighth, or three hundred and thirty-ninth embodiments, the skinning pipe is mounted to the manifold.

According to a three hundred and forty-ninth embodiment, the present disclosure relates to a manifold assembly for a skinning system that applies a flowable mixture to an article. The manifold assembly may include a manifold including a plurality of grooves configured to deliver the flowable mixture, a skinning pipe configured to receive the flowable mixture from the grooves of the manifold and apply the flowable mixture to an outer surface of the article, and a pressure adjustment system configured to adjust a pressure of the flowable mixture adjacent the skinning pipe.

According to a three hundred and fiftieth embodiment, the manifold assembly of the three hundred and forty-ninth embodiment further comprises a ring mounted to a lower manifold piece of the manifold and configured to move along the skinning pipe under actuation of the pressure adjustment system.

According to a three hundred and fifty-first embodiment, the manifold assembly of the three hundred and forty-ninth or three hundred and fiftieth embodiments further comprises a skin thickness sensor comprising at least one conductor configured to apply an electric current to the flowable mixture applied to the outer surface of the article and a probe body housing the at least one conductor.

According to a three hundred and fifty-second embodiment, in the manifold assembly of the three hundred and forty-ninth or three hundred and fiftieth embodiments, the skin thickness sensor further comprises (i) a circuit comprising a power source configured to supply the electric current and a circuit portion across which a voltage is measured, and (ii) a controller configured to determine a thickness of the flowable mixture applied to the outer surface of the article based on the measured voltage and a predetermined relationship between thicknesses and voltages.

According to a three hundred and fifty-third embodiment, in the manifold assembly of the three hundred and forty-ninth or three hundred and fiftieth embodiments, the manifold comprises an upper manifold piece and a lower manifold piece joined together with the upper manifold piece.

According to a three hundred and fifty-fourth embodiment, in the manifold assembly of the three hundred and fifty-third embodiment, the manifold comprises a locating pin located in at least one of the upper manifold piece and the lower manifold piece, and a locating cylinder located in at least one of the lower manifold piece and the upper manifold piece, the locating cylinder and the locating pin engaging with one another to join the upper manifold piece and the lower manifold piece.

According to a three hundred and fifty-fifth embodiment, in the manifold assembly of the three hundred and forty-ninth or three hundred and fiftieth embodiments, the manifold is mounted to a mounting bracket, and the manifold further comprises at least one locating pad for locating the manifold on the mounting bracket.

According to a three hundred and fifty-sixth embodiment, in the manifold assembly of the three hundred and forty-ninth or three hundred and fiftieth embodiments, the manifold is mounted to a mounting bracket, and the manifold further comprises at least one locating blocks for locating the manifold on the mounting bracket.

According to a three hundred and fifty-seventh embodiment, in the manifold assembly of the three hundred and forty-ninth or three hundred and fiftieth embodiments, the skinning pipe includes a wall having a plurality of holes and the grooves are configured to deliver the flowable mixture from the manifold to an inner space of the skinning pipe through the holes.

According to a three hundred and fifty-eighth embodiment, in the manifold assembly of the three hundred and forty-ninth or three hundred and fiftieth embodiments, the flowable mixture within the grooves is pressurized.

According to a three hundred and fifty-ninth embodiment, in the manifold assembly of the three hundred and fifty-seventh embodiment, the plurality of grooves are configured to deliver the flowable mixture to a circumference of the wall of the skinning pipe.

According to a three hundred and sixtieth embodiment, in the manifold assembly of the three hundred and forty-ninth or three hundred and fiftieth embodiments, the skinning pipe is mounted to the manifold.

According to a three hundred and sixty-first embodiment, the present disclosure relates to a flexure shaft assembly for a skinning system. The flexure shaft assembly may include a flexure shaft configured to support a platen configured to support an article, and at least one tilt limiter configured to limit an amount of deflection of the flexure shaft. As the article is pushed into an inner space of a skinning pipe to receive a flowable mixture, the flexure shaft may deflect in a direction substantially perpendicular to an axis of the skinning pipe to compensate for misalignment between the article and the skinning pipe. The at least one tilt limiter may be configured to limit the deflection of the flexure shaft.

According to a three hundred and sixty-second embodiment, in the flexure shaft assembly of the three hundred and sixty-first embodiment, the tilt limiter comprises a radial stop configured to limit a radial deflection of the flexure shaft and an axial stop configured to limit an axial deflection of the flexure shaft.

According to a three hundred and sixty-third embodiment, the present disclosure relates to an article feeding mechanism for a skinning system. The article feeding mechanism may include a platen configured to support an unskinned article, and a centering mechanism configured to align the unskinned article with a skinning pipe. The centering mechanism may include a plurality of centering devices disposed around the platen, each centering device including a centering actuator and an adjusting mechanism configured to adjust a position of the centering actuator based on a dimension of the unskinned article, the dimension including at least one of a diameter, a radius, a circumference, and an outer peripheral length.

According to a three hundred and sixty-fourth embodiment, in the article feeding mechanism of the three hundred and sixty-third embodiment, the adjusting mechanism comprises a locating plate having a plurality of holes and a locating pin configured to engage with one of the plurality of holes.

According to a three hundred and sixty-fifth embodiment, in the article feeding mechanism of the three hundred and sixty-fourth embodiment, the adjusting mechanism comprises a support having at least one guide hole, a rod configured to slide within the at least one guide hole, and a bracket mounted to the support and having a hole configured to engage with the locating pin to secure a position of the at least one centering actuator relative to the platen.

According to a three hundred and sixty-sixth embodiment, in the article feeding mechanism of the three hundred and sixty-fifth embodiment, the centering actuator is mounted to at least one of the locating plate and the rod.

According to a three hundred and sixty-seventh embodiment, in the article feeding mechanisms of any of the three hundred and sixty-third, three hundred and sixty-fourth, three hundred and sixty-fifth, or three hundred and sixty-sixth embodiments the adjusting mechanism comprises a motor configured to adjust the position of the centering device.

According to a three hundred and sixty-eighth embodiment, in the article feeding mechanisms of any of the three hundred and sixty-third, three hundred and sixty-fourth, three hundred and sixty-fifth, or three hundred and sixty-sixth embodiments the centering mechanism comprises at least one air knife configured to blow air toward at least one of the unskinned article and the platen.

According to a three hundred and sixty-ninth embodiment, the article feeding mechanisms of any of the three hundred and sixty-third, three hundred and sixty-fourth, three hundred and sixty-fifth, or three hundred and sixty-sixth embodiments may further comprise a flexure shaft configured to support the platen, the flexure shaft being deflectable to compensate for misalignment between the unskinned article and the skinning pipe as the unskinned article is pushed into an inner space of the skinning pipe.

According to a three hundred and seventieth embodiment, the article feeding mechanisms of any of the three hundred and sixty-fourth, three hundred and sixty-fifth, or three hundred and sixty-sixth embodiments may further comprise a tilt limiter located adjacent the flexure shaft and configured to limit deflection of the flexure shaft.

According to a three hundred and seventy-first embodiment, in the article feeding mechanism of the three hundred and seventieth embodiment, the tilt limiter comprises a radial stop configured to limit a radial deflection of the flexure shaft and an axial stop configured to limit an axial deflection of the flexure shaft.

According to a three hundred and seventy-second embodiment, the present disclosure relates to a multi-zone vacuum system. The multi-zone vacuum system may include two or more vacuum ports, a vacuum chuck including two or more vacuum channels fluidly connected to the two or more vacuum ports, and a chuck mount disposed between the two or more vacuum ports and the vacuum chuck, the vacuum chuck being mounted on one side of the chuck mount, and the two or more vacuum ports being mounted on another side of the chuck mount. Each of the two or more vacuum ports may be independently controlled to provide vacuum pressure to the two or more vacuum channels.

According to a three hundred and seventy-third embodiment, the multi-zone vacuum system of the three hundred and seventy-second embodiment is configured to hold the more than one article using the multiple vacuum zones, a first spacer being disposed at a bottom surface of a first article to seal off a first vacuum zone, and a second spacer being disposed at a bottom surface of a second article to seal off a second vacuum zone, a shape of the first spacer being different from a shape of the second spacer.

According to a three hundred and seventy-fourth embodiment, the present disclosure relates to a skinning system for applying a flowable mixture to an article. The skinning system may include a skinning pipe configured to receive the article and apply the flowable mixture to the article as the article moves axially through the skinning pipe, a manifold including a plurality of grooves configured to deliver the flowable mixture to the skinning pipe, and a skinning control system. The skinning control system may include a feed forward controller configured to determine an adjustment to at least one of a delivery pressure set point, a return pressure set point, a speed of a pump, a delivery valve position, a flow rate set point, a skinning speed, and a pressure relief system position, based on a variation relating to at least one of a flow rate of the flowable mixture, a viscosity of the flowable mixture, or dimensions of incoming unskinned articles, the dimensions including at least one of a diameter, a radius, a circumference, and an outer peripheral length. The skinning control system may include at least one feedback controller configured to determine at least one of a skinning pipe pressure set point, the delivery pressure set point, the return pressure set point, the speed of the pump, the delivery valve position, and the flow rate set point, based on a result of monitoring presence of a defect on a skinned article coated with the flowable mixture. The skinning control system may include a communication unit configured to transmit a control signal to at least one of a mixture delivery system and the skinning system based on an output from at least one of the feed forward controller and the feedback controller.

According to a three hundred and seventy-fifth embodiment, the present disclosure relates to a skinning system for applying a flowable mixture to an article. The skinning system may include a skinning pipe configured to receive the article and apply the flowable mixture to the article as the article moves axially through the skinning pipe, a manifold including a plurality of grooves configured to deliver the flowable mixture to the skinning pipe, and a skinning control system. The skinning control system may include a feed forward controller configured to determine an adjustment to at least one of a delivery pressure set point, a return pressure set point, a speed of a pump, a delivery valve position, a flow rate set point, a skinning speed, and a pressure relief system position, based on a variation relating to at least one of a flow rate of the flowable mixture, a viscosity of the flowable mixture, or dimensions of incoming unskinned articles.

According to a three hundred and seventy-sixth embodiment, in the skinning system of the three hundred and seventy-fifth embodiment, the dimensions comprise at least one of a diameter, a radius, a circumference, and an outer peripheral length.

According to a three hundred and seventy-seventh embodiment, the skinning system of the three hundred and seventy-sixth embodiment further comprises at least one feedback controller configured to determine at least one of a skinning pipe pressure set point, the delivery pressure set point, the return pressure set point, the speed of the pump, the delivery valve position, and the flow rate set point, based on a result of monitoring presence of a defect on a skinned article coated with the flowable mixture.

According to a three hundred and seventy-eighth embodiment, the skinning system of the three hundred and seventy-seventh embodiment further comprises a communication unit configured to transmit a control signal to at least one of a mixture delivery system and the skinning system based on an output from at least one of the feed forward controller and the feedback controller.

According to a three hundred and seventy-ninth embodiment, in the skinning system of the three hundred and seventy-eighth embodiment, the communication unit is configured to receive real-time or near real-time measurements of at least one of a skinning pipe pressure, a delivery pressure, a return pressure, the speed of the pump, the delivery valve position, the flow rate, the viscosity, the dimensions of the incoming unskinned articles, the skinning speed, or the pressure relief system position.

According to a three hundred and eightieth embodiment, in the skinning system of any of the three hundred and seventy-seventh, three hundred and seventy-eighth, or three hundred and seventy-ninth embodiments, the at least one feedback controller comprises a first feedback controller configured to determine the speed of the pump based on a measured return pressure or delivery pressure.

According to a three hundred and eighty-first embodiment, in the skinning system of the three hundred and eightieth embodiment, the at least one feedback controller comprises a second feedback controller configured to determine at least one of the return pressure set point and the delivery pressure set point based on a measured skinning pipe pressure, and the first feedback controller is configured to determine the speed of the pump also based on at least one of the return pressure set point and the delivery pressure set point.

According to a three hundred and eighty-second embodiment, in the skinning system of the three hundred and eighty-first embodiment, monitoring the presence of the defect comprises detecting a type of the defect, and the at least one feedback controller comprises a third feedback controller configured to determine the skinning pipe pressure set point based on the type of defect, and the second feedback controller is configured to determine at least one of the return pressure set point and the delivery pressure set point also based on skinning pipe pressure set point.

According to a three hundred and eighty-third embodiment, in the skinning system of any of the three hundred and seventy-seventh, three hundred and seventy-eighth, or three hundred and seventy-ninth embodiments, the at least one feedback controller comprises a first feedback controller configured to determine at least one of the speed of the pump and the delivery valve position based on a measured skinning pipe pressure.

According to a three hundred and eighty-fourth embodiment, in the skinning system of the three hundred and eighty-third embodiment, monitoring the presence of the defect comprises detecting a type of the defect, and the at least one feedback controller comprises a second feedback controller configured to determine the skinning pipe pressure set point based on the type of defect, and the first feedback controller configured to determine at least one of the speed of the pump and the delivery valve position also based on the skinning pipe pressure set point.

According to a three hundred and eighty-fifth embodiment, in the skinning system of any of the three hundred and seventy-seventh, three hundred and seventy-eighth, or three hundred and seventy-ninth embodiments, the at least one feedback controller comprises a first feedback controller configured to determine the speed of the pump based on a measured flow rate of the flowable mixture in the mixture delivery system.

According to a three hundred and eighty-sixth embodiment, in the skinning system of the three hundred and eighty-fifth embodiment, the at least one feedback controller comprises a second feedback controller configured to determine the flow rate set point based on a skinning pipe pressure measured in the skinning system, and the first feedback controller is configured to determine the speed of the pump also based on the flow rate set point.

According to a three hundred and eighty-seventh embodiment, in the skinning system of the three hundred and eighty-sixth embodiment, monitoring the presence of the defect comprises detecting a type of the defect, and the at least one feedback controller comprises a third feedback controller configured to determine the skinning pipe pressure set point based on the type of defect, and the second feedback controller is configured to determine the flow rate set point also based on the skinning pipe pressure set point.

According to a three hundred and eighty-eighth embodiment, in the skinning system of any of the three hundred and seventy-fifth, three hundred and seventy-sixth, three hundred and seventy-seventh, three hundred and seventy-eighth, or three hundred and seventy-ninth embodiments, the feed forward controller comprises a second feed forward controller configured to determine an adjustment to at least one of the return pressure set point and the delivery pressure set point based on the variation relating to at least one of the measured viscosity and measured flow rate.

According to a three hundred and eighty-ninth embodiment, in the skinning system of any of the three hundred and seventy-fifth, three hundred and seventy-sixth, three hundred and seventy-seventh, three hundred and seventy-eighth, or three hundred and seventy-ninth embodiments, the feed forward controller comprises a second feed forward controller configured to determine an adjustment to at least one of the speed of the pump and the delivery valve position based on the variation relating to at least one of the measured viscosity and the measured flow rate.

According to a three hundred and ninetieth embodiment, in the skinning system of any of the three hundred and seventy-fifth, three hundred and seventy-sixth, three hundred and seventy-seventh, three hundred and seventy-eighth, or three hundred and seventy-ninth embodiments, the feed forward controller comprises a second feed forward controller configured to determine an adjustment to the flow rate set point based on the variation relating to at least one of the measured viscosity and the measured flow rate.

According to a three hundred and ninety-first embodiment, in the skinning system of any of the three hundred and seventy-sixth, three hundred and seventy-seventh, three hundred and seventy-eighth, or three hundred and seventy-ninth embodiments, the feed forward controller comprises a second feed forward controller configured to determine an adjustment to the skinning speed based on the variation relating to the dimensions of incoming unskinned articles measured in the skinning system.

According to a three hundred and ninety-second embodiment, in the skinning system of any of the three hundred and seventy-sixth, three hundred and seventy-seventh, three hundred and seventy-eighth, or three hundred and seventy-ninth embodiments, the feed forward controller comprises a second feed forward controller configured to determine an adjustment to the pressure relief system position based on the variation relating to the dimensions of incoming unskinned articles measured in the skinning system.

According to a three hundred and ninety-third embodiment, in the skinning system of any of the three hundred and seventy-seventh, three hundred and seventy-eighth, or three hundred and seventy-ninth embodiments, the at least one feedback controller comprises a first feedback controller configured to determine the skinning speed based on a measured skinning pipe pressure.

According to a three hundred and ninety-fourth embodiment, in the skinning system of any of the three hundred and seventy-seventh, three hundred and seventy-eighth, or three hundred and seventy-ninth embodiments, the at least one feedback controller comprises a first feedback controller configured to determine the pressure relief system position based on a measured skinning pipe pressure.

According to a three hundred and ninety-fifth embodiment, the skinning system of any of the three hundred and seventy-sixth, three hundred and seventy-seventh, three hundred and seventy-eighth, or three hundred and seventy-ninth embodiments is configured to switch between a first skinning pipe pressure control scheme and a second skinning pipe control scheme based on the dimensions of incoming unskinned articles measured in the skinning system.

According to a three hundred and ninety-sixth embodiment, the present disclosure relates to a method of operating a skinning system for applying a flowable mixture to an article. The method may include aligning the article with a skinning pipe, pushing the article into an inner space of the skinning pipe, and delivering the flowable mixture to the skinning pipe. The method may include applying the flowable mixture to the article while the article moves along the inner space of the skinning pipe, and holding and moving the article out of the skinning pipe as the article moves along the inner space of the skinning pipe to receive the flowable mixture.

According to a three hundred and ninety-seventh embodiment, the method of the three hundred and ninety-sixth embodiment further comprises placing the article on a platen, and aligning the article comprises centering the article to align the article with the skinning pipe using a plurality of centering devices disposed around the platen.

According to a three hundred and ninety-eighth embodiment, the method of the three hundred and ninety-seventh embodiment further comprises adjusting positions of the centering devices based on a dimension of the article placed on the platen, the dimension including at least one of a diameter, a radius, a circumference, and an outer peripheral length.

According to a three hundred and ninety-ninth embodiment, the methods of any of the three hundred and ninety-seventh or three hundred and ninety-eighth embodiments further comprise blowing air toward at least one of the platen and the article placed on the platen to blow off debris.

According to a four hundredth embodiment, in the methods of any of the three hundred and ninety-sixth, three hundred and ninety-seventh, or three hundred and ninety-eighth embodiments, pushing the article into the inner space of the skinning pipe comprises pushing the article upward in a vertical direction from below an inlet of the skinning pipe.

According to a four hundred and first embodiment, the methods of any of the three hundred and ninety-sixth, three hundred and ninety-seventh, or three hundred and ninety-eighth embodiments further comprise generating a vacuum pressure within the article using a vacuum system.

According to a four hundred and second embodiment, the methods of any of the three hundred and ninety-sixth, three hundred and ninety-seventh, or three hundred and ninety-eighth embodiments further comprise generating more than one vacuum zone within more than one article.

According to a four hundred and third embodiment, in the method of the four hundred and first embodiment, holding and moving the article comprises holding and moving the article out of the skinning pipe using the vacuum pressure generated by the vacuum system.

According to a four hundred and fourth embodiment, in the method of the four hundred and third embodiment, holding and moving the article comprises holding and pulling the article upward out of the skinning pipe.

According to a four hundred and fifth embodiment, in the methods of any of the three hundred and ninety-sixth, three hundred and ninety-seventh, or three hundred and ninety-eighth embodiments, pushing the article comprises pushing the article using an article feeding mechanism and holding and moving the article out of the skinning pipe comprises holding and moving the article using a transfer system, and the method further comprises measuring at least one force experienced by at least one of the transfer system and the article feeding mechanism and controlling motions of the at least one of the transfer system and the article feeding mechanism based on the at least one force.

According to a four hundred and sixth embodiment, in the method of the four hundred and fifth embodiment, controlling motions of the at least one of the transfer system and the article feeding mechanism comprises adjusting at least one of a position and a speed of the at least one of the transfer system and the article feeding mechanism based on the at least one force.

According to a four hundred and seventh embodiment, the methods of either the four hundred and fifth or four hundred and sixth embodiments further comprise generating multiple vacuum zones, and wherein controlling motions of the at least one of the transfer system and the article feeding mechanism comprises activating or deactivating one or more of the multiple vacuum zones based on the at least one force.

According to a four hundred and eighth embodiment, the methods of any of the three hundred and ninety-sixth, three hundred and ninety-seventh, or three hundred and ninety-eighth embodiments further comprise measuring a dimension of at least one of an unskinned article and a skinned article.

According to a four hundred and ninth embodiment, in the method of the four hundred and eighth embodiment, the dimension comprises at least one of a diameter, a radius, a circumference, and an outer peripheral length.

According to a four hundred and tenth embodiment, the methods of any of the three hundred and ninety-sixth, three hundred and ninety-seventh, or three hundred and ninety-eighth embodiments further comprise measuring a dimension of an unskinned article, measuring a dimension of a skinned article which is the unskinned article coated with the flowable mixture, and determining a thickness of the flowable mixture on the skinned article based on the measured dimension of the unskinned article and the dimension of the skinned article.

According to a four hundred and eleventh embodiment, in the method of the four hundred and tenth embodiment, the dimension comprises at least one of a diameter, a radius, a circumference, and an outer peripheral length.

According to a four hundred and twelfth embodiment, the methods of any of the three hundred and ninety-sixth, three hundred and ninety-seventh, or three hundred and ninety-eighth embodiments further comprise monitoring presence of a defect on a skinned article coated with the flowable mixture.

According to a four hundred and thirteenth embodiment, in the method of the four hundred and twelfth embodiment, monitoring the presence of the defect comprises detecting a type of the defect.

According to a four hundred and fourteenth embodiment, the methods of any of the three hundred and ninety-sixth, three hundred and ninety-seventh, or three hundred and ninety-eighth embodiments further comprise moving a transfer system configured to hold and move the article out of the skinning pipe along a rail in a vertical direction above the skinned pipe and moving an article feeding mechanism configured to push the article into the skinner pipe along the rail in the vertical direction below the skinning pipe.

According to a four hundred and fifteenth embodiment, the methods of any of the three hundred and ninety-sixth, three hundred and ninety-seventh, or three hundred and ninety-eighth embodiments further comprise adjusting a pressure of the flowable mixture adjacent the skinning pipe using a pressure adjustment system.

According to a four hundred and sixteenth embodiment, in the method of the four hundred and fifteenth embodiment, adjusting the pressure of the flowable mixture adjacent the skinning pipe using the pressure adjustment system comprises moving a ring along the skinning pipe to adjust a space adjacent the skinning pipe available for the flowable mixture to flow.

According to a four hundred and seventeenth embodiment, the methods of any of the three hundred and ninety-sixth, three hundred and ninety-seventh, or three hundred and ninety-eighth embodiments further comprise measuring a thickness of the flowable mixture of a skinned article using a skin thickness sensor.

According to a four hundred and eighteenth embodiment, in the four hundred and seventeenth embodiment, measuring a thickness comprises applying an electric current to the flowable mixture using a circuit, measuring a voltage across a portion of the circuit, and determining the thickness based on the measured voltage and a predetermined relationship between voltages and thicknesses.

According to a four hundred and nineteenth embodiment, the methods of any of the three hundred and ninety-sixth, three hundred and ninety-seventh, or three hundred and ninety-eighth embodiments further comprise loading an unskinned article onto a platen using a robot having a vacuum chuck configured to generate a vacuum pressure within the unskinned article.

According to a four hundred and twentieth embodiment, the methods of any of the three hundred and ninety-sixth, three hundred and ninety-seventh, or three hundred and ninety-eighth embodiments further comprise unloading a skinned article using a robot having an adjustable arm.

According to a four hundred and twenty-first embodiment, the methods of any of the three hundred and ninety-sixth, three hundred and ninety-seventh, or three hundred and ninety-eighth embodiments further comprise generating multiple vacuum zones and holding and moving more than one article using the multiple vacuum zones.

According to a four hundred and twenty-second embodiment, the method of the four hundred and twenty-first embodiment further comprises using spacers disposed at bottom surfaces of the more than one article to seal off the multiple vacuum zones, the spacers being alternately disposed at the bottom surfaces of the more than one article, at least two of the spacers having different shapes.

According to a four hundred and twenty-third embodiment, the present disclosure relates to a method of controlling a skinning process that applies a flowable mixture to an article. The method may include measuring, using at least one laser device, a variation relating to a dimension of one or more incoming unskinned articles, determining, using a feed forward controller, an adjustment to a skinning speed or a pressure relief system position based on the measured variation, and transmitting a control signal to a skinning system to adjust at least one of the skinning speed and the pressure relief system position, based on an output from the feed forward controller.

According to a four hundred and twenty-fourth embodiment, in the method of the four hundred and twenty-third embodiment, the dimensions comprise at least one of a diameter, a radius, a circumference, and an outer peripheral length.

According to a four hundred and twenty-fifth embodiment, the present disclosure relates to a method of controlling a skinning pipe pressure associated with a skinning pipe that applies a flowable mixture to an article. The method may include measuring a first dimension of a first article prior to entering the skinning pipe, and determining that the measured first dimension is outside of a predetermined limit. The method may include based on the determination that the measured first dimension is outside of the predetermined limit, switching from a first control scheme to a second control scheme, the first control scheme configured for controlling the skinning pipe pressure based on a viscosity or a flow rate, and the second control scheme configured for controlling the skinning pipe pressure based on variations in dimensions of incoming unskinned articles. The method may include measuring dimensions of a predetermined number of subsequent articles following the first article, and determining that the dimensions of the predetermined number of subsequent articles are within the predetermined limit. The method may include based on the determination that the dimensions of the predetermined number of subsequent articles are within the predetermined limit, switching from the second control scheme to the first control scheme.

According to a four hundred and twenty-sixth embodiment, in the method of the four hundred and twenty-fifth embodiment, the dimensions comprise at least one of a diameter, a radius, a circumference, and an outer peripheral length.

According to a four hundred and twenty-seventh embodiment, the present disclosure relates to a method for measuring a thickness of a flowable mixture coated on an outer surface of an article. The method may include applying an electric current, using a circuit, to a portion of the flowable mixture coated onto the outer surface of the article, measuring a voltage across a portion of the circuit, and determining, using a controller, the thickness of the flowable mixture coated on the article based on the measured voltage and a predetermined relationship between thicknesses and voltages.

According to a four hundred and twenty-eighth embodiment, the present disclosure relates to a method of controlling a continuous axial skinning process. The method may include circulating a flowable mixture within a recirculation line, measuring at least one of a return pressure and a delivery pressure associated with the flowable mixture, and determining whether the at least one of the return pressure and the delivery pressure is within a predetermined range compared to at least one of a return pressure set point and a delivery pressure set point. The method may also include based on a determination that at least one of the return pressure and the delivery pressure is within the predetermined range, directing the flowable mixture to a delivery line leading to a skinning system that applies the flowable mixture to an article.

According to a four hundred and twenty-ninth embodiment, the method of the four hundred and twenty-eighth embodiment further comprises determining whether a skinning pipe pressure reaches a start-up pressure and, based on a determination that the skinning pipe pressure reaches the start-up pressure, starting the skinning process using the skinning system to apply the flowable mixture to the article.

According to a four hundred and thirtieth embodiment, the present disclosure relates to a method of controlling a start-up of a skinning process that applies a flowable mixture to an article. The method may include determining whether a target skinning speed is greater than a predetermined skinning speed, and based on a determination that the target skinning speed is less than the predetermined skinning speed, activating a pressure boost system mounted adjacent a skinning pipe to reduce a space adjacent the skinning pipe available for the flowable mixture to flow. The method may include based on a determination that the target skinning speed is greater than the predetermined skinning speed, deactivating the pressure boost system to increase the space adjacent the skinning pipe available for the flowable mixture to flow.

According to a four hundred and thirty-first embodiment, the method of the four hundred and thirtieth embodiment further comprises starting the skinning process after activating the pressure boost system and deactivating the pressure boost system to increase the space adjacent the skinning pipe available for the flowable mixture to flow after the skinning pipe pressure increases to the predetermined threshold skinning pipe pressure.

According to a four hundred and thirty-second embodiment, the methods of the four hundred and thirtieth or four hundred and thirty-first embodiments further comprise starting the skinning process after deactivating the pressure boost system and activating the pressure boost system to reduce the space adjacent the skinning pipe available for the flowable mixture to flow after the skinning pipe pressure decreases to the predetermined threshold skinning pipe pressure.

According to a four hundred and thirty-third embodiment, the present disclosure relates to a method of controlling a start-up of a skinning system that applies a flowable mixture to an article. The method may include determining that a target skinning speed is greater than a predetermined skinning speed, and starting the skinning process by increasing a skinning speed incrementally in a plurality of steps until the target skinning speed is reached.

According to a four hundred and thirty-fourth embodiment, the present disclosure relates to a method of controlling a skinning system that applies a flowable mixture to an article. The method may include pushing, using an article feeding mechanism, the article into an inner space of a skinning pipe, applying, using the skinning pipe, the flowable mixture received from a mixture delivery system to the article as the article moves axially along the inner space of the skinning pipe, and measuring at least one of a flow rate of the flowable mixture, a viscosity of the flowable mixture, or dimensions of incoming unskinned articles. The method may include determining, using a feed forward controller, an adjustment to at least one of a delivery pressure set point, a return pressure set point, a speed of a pump, a delivery valve position, a flow rate set point, a skinning speed, and a pressure relief system position, based on a variation in at least one of the measured flow rate, viscosity, or dimensions of the incoming unskinned articles. The method may also include monitoring presence of a defect on a skinned article coated with the flowable mixture, and determining, using a feedback controller, at least one of a skinning pipe pressure set point, the delivery pressure set point, the return pressure set point, the speed of the pump, the delivery valve position, and the flow rate set point, based on a result of monitoring the presence of the defect on the skinned article. The method may also include transmitting a control signal to at least one of the mixture delivery system and the skinning system based on an output from at least one of the feed forward controller and the feedback controller.

According to a four hundred and thirty-fifth embodiment, in the method of the four hundred and thirty-fourth embodiment, monitoring the presence of the defect comprises detecting a type of the defect, and wherein determining, using the feedback controller, at least one of the skinning pipe pressure set point, the delivery pressure set point, the return pressure set point, the speed of the pump, the delivery valve position, and the flow rate set point, based on the result of monitoring the presence of the defect comprises determining, using the feedback controller, at least one of the skinning pipe pressure set point, the delivery pressure set point, the return pressure set point, the speed of the pump, the delivery valve position, and the flow rate set point, based on the type of the defect.

According to a four hundred and thirty-sixth embodiment, in the methods of the four hundred and thirty-fourth or four hundred and thirty-fifth embodiments, the dimensions comprise at least one of a diameter, a radius, a circumference, and an outer peripheral length.

According to a four hundred and thirty-seventh embodiment, the method of the four hundred and thirty-sixth embodiment further comprises measuring in real-time or near real-time at least one of a skinning pipe pressure, a delivery pressure, a return pressure, the speed of the pump, the delivery valve position, the flow rate, the viscosity, the dimensions of the incoming unskinned articles, the skinning speed, or the pressure relief system position.

According to a four hundred and thirty-eighth embodiment, the present disclosure relates to a method of controlling a skinning system that applies a flowable mixture to an article. The method may include pushing, using an article feeding mechanism, the article into an inner space of a skinning pipe, applying, using the skinning pipe, the flowable mixture received from a mixture delivery system to the article as the article moves axially along the inner space of the skinning pipe, and measuring at least one of a flow rate of the flowable mixture, a viscosity of the flowable mixture, or dimensions of incoming unskinned articles. The method may also include determining, using a feed forward controller, an adjustment to at least one of a delivery pressure set point, a return pressure set point, a speed of a pump, a delivery valve position, a flow rate set point, a skinning speed, and a pressure relief system position, based on a variation in at least one of the measured flow rate, viscosity, or dimensions of the incoming unskinned articles.

According to a four hundred and thirty-ninth embodiment, the method of the four hundred and thirty-eighth embodiment further comprises monitoring presence of a defect on a skinned article coated with the flowable mixture.

According to a four hundred and fortieth embodiment, in the method of the four hundred and thirty-ninth embodiment, monitoring the presence of the defect comprises detecting a type of the defect.

According to a four hundred and forty-first embodiment, the methods of any of the four hundred and thirty-ninth or four hundred and fortieth embodiments further comprise determining, using a feedback controller, at least one of a skinning pipe pressure set point, the delivery pressure set point, the return pressure set point, the speed of the pump, the delivery valve position, and the flow rate set point, based on a result of monitoring the presence of the defect on the skinned article.

According to a four hundred and forty-second embodiment, the method of the four hundred and forty-first embodiment further comprises transmitting a control signal to at least one of the mixture delivery system and the skinning system based on an output from at least one of the feed forward controller and the feedback controller.

According to a four hundred and forty-third embodiment, in the methods of any of the four hundred and thirty-eighth, four hundred and thirty-ninth, or four hundred and fortieth embodiments, the dimensions comprise at least one of a diameter, a radius, a circumference, and an outer peripheral length.

According to a four hundred and forty-fourth embodiment, the method of the four hundred and forty-third embodiment further comprises measuring in real-time or near real-time at least one of a skinning pipe pressure, a delivery pressure, a return pressure, the speed of the pump, the delivery valve position, the flow rate, the viscosity, the dimensions of the incoming unskinned articles, the skinning speed, or the pressure relief system position.

According to a four hundred and forty-fifth embodiment, the methods of any of the four hundred and thirty-eighth, four hundred and thirty-ninth, or four hundred and fortieth embodiments further comprise determining the speed of the pump based on a measured return pressure or delivery pressure.

According to a four hundred and forty-sixth embodiment, the method of the four hundred and forty-fifth embodiment further comprises determining at least one of the return pressure set point and the delivery pressure set point based on a measured skinning pipe pressure and determining the speed of the pump also based on at least one of the return pressure set point and the delivery pressure set point.

According to a four hundred and forty-seventh embodiment, in the method of the four hundred and forty-sixth embodiment, monitoring the presence of the defect comprises detecting a type of the defect, and the method further comprises determining the skinning pipe pressure set point based on the type of defect and determining at least one of the return pressure set point and the delivery pressure set point also based on skinning pipe pressure set point.

According to a four hundred and forty-eighth embodiment, the method of the four hundred and forty-first embodiment further comprises determining at least one of the speed of the pump and the delivery valve position based on a measured skinning pipe pressure.

According to a four hundred and forty-ninth embodiment, in the method of the four hundred and forty-eighth embodiment, monitoring the presence of the defect comprises detecting a type of the defect, and the method further comprises determining the skinning pipe pressure set point based on the type of defect and determining at least one of the speed of the pump and the delivery valve position also based on the skinning pipe pressure set point.

According to a four hundred and fiftieth embodiment, the method of the four hundred and forty-first embodiment further comprises determining the speed of the pump based on a measured flow rate of the flowable mixture in the mixture delivery system.

According to a four hundred and fifty-first embodiment, the method of the four hundred and fiftieth embodiment further comprises the method of the four hundred and forty-third embodiment further comprises and determining the speed of the pump also based on the flow rate set point.

According to a four hundred and fifty-second embodiment, in the method of the four hundred and fifty-first embodiment, monitoring the presence of the defect comprises detecting a type of the defect, and the method further comprises determining the skinning pipe pressure set point based on the type of defect and determining the flow rate set point also based on the skinning pipe pressure set point.

According to a four hundred and fifty-third embodiment, the methods of any of the four hundred and thirty-eighth, four hundred and thirty-ninth, or four hundred and fortieth embodiments further comprise determining an adjustment to at least one of the return pressure set point and the delivery pressure set point based on the variation relating to at least one of the measured viscosity and measured flow rate.

According to a four hundred and fifty-fourth embodiment, the methods of any of the four hundred and thirty-eighth, four hundred and thirty-ninth, or four hundred and fortieth embodiments further comprise determining an adjustment to at least one of the speed of the pump and the delivery valve position based on the variation relating to at least one of the measured viscosity and the measured flow rate.

According to a four hundred and fifty-fifth embodiment, the methods of any of the four hundred and thirty-eighth, four hundred and thirty-ninth, or four hundred and fortieth embodiments further comprise determining an adjustment to the flow rate set point based on the variation relating to at least one of the measured viscosity and the measured flow rate.

According to a four hundred and fifty-sixth embodiment, the method of the four hundred and forty-third embodiment further comprises determining an adjustment to the skinning speed based on the variation relating to the dimensions of incoming unskinned articles measured in the skinning system.

According to a four hundred and fifty-seventh embodiment, the method of the four hundred and forty-third embodiment further comprises determining an adjustment to the pressure relief system position based on the variation relating to the dimensions of incoming unskinned articles measured in the skinning system.

According to a four hundred and fifty-eighth embodiment, the method of the four hundred and forty-first embodiment further comprises determining the skinning speed based on a measured skinning pipe pressure.

According to a four hundred and fifty-ninth embodiment, the method of the four hundred and forty-first embodiment further comprises determining the pressure relief system position based on a measured skinning pipe pressure.

According to a four hundred and sixtieth embodiment, the method of the four hundred and forty-third embodiment further comprises switching between a first skinning pipe pressure control scheme and a second skinning pipe control scheme, based on the dimensions of incoming unskinned articles measured in the skinning system.

According to a four hundred and sixty-first embodiment, the present disclosure relates to a method of adjusting a pressure of a flowable mixture adjacent a skinning pipe configured to apply the flowable mixture to an article. The method may include actuating a ring disposed around an outer surface of the skinning pipe to adjust a space adjacent the skinning pipe that is available for the flowable mixture to flow.

The construction and arrangements of the systems and methods for skinning articles, as shown in the various examples, are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. For illustrative purposes, some figures may not show all elements included in a system or method. Such system or method may nevertheless include any other elements shown in any other figures or otherwise disclosed in the present disclosure. The order or sequence of any process, logical algorithm, or method may be varied or re-sequenced according to alternative examples. Other substitutions, modifications, changes, combinations, and omissions may also be made in the design, operating conditions and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

What is claimed is:

1. A skinning system for applying a flowable mixture to an article, comprising:
    a skinning pipe configured to receive the article and apply the flowable mixture to the article as the article moves axially through the skinning pipe;
    a manifold including a plurality of grooves configured to deliver the flowable mixture to the skinning pipe;
    a delivery line and a recirculation line each connected to the manifold, the delivery line comprising a delivery valve;
    a pump configured to pump the flowable mixture to the delivery line;
    a pressure relief system configured to adjust pressure of the flowable mixture in the skinning pipe; and
    a skinning control system comprising:
        a feed forward controller configured to determine an adjustment to at least one of a delivery pressure set point of the delivery line, a return pressure set point of the recirculation line, a speed of the pump, a position of the delivery valve, a flow rate set point corresponding to a target flow rate, a skinning speed of the article moving through the skinning pipe, or a position of an actuator of the pressure relief system, based on a variation relating to at least one of a flow rate of the flowable mixture, a viscosity of the flowable mixture, or dimensions of incoming unskinned articles.

2. The skinning system of claim 1, wherein the dimensions comprise at least one of a diameter, a radius, a circumference, or an outer peripheral length.

3. The skinning system of claim 2, further comprising: at least one feedback controller configured to determine at least one of a skinning pipe pressure set point, the delivery pressure set point, the return pressure set point, the speed of the pump, the position of the delivery valve, or the flow rate set point, based on a result of monitoring presence of a defect on a skinned article coated with the flowable mixture.

4. The skinning system of claim 3, further comprising: a communication unit configured to transmit a control signal to at least one of a mixture delivery system or the skinning system based on an output from at least one of the feed forward controller or the feedback controller.

5. The skinning system of claim 4, wherein the communication unit is configured to receive real-time or near real-time measurements of at least one of a skinning pipe pressure, a delivery pressure, a return pressure, the speed of the pump, the delivery valve position, the flow rate, the viscosity, the dimensions of the incoming unskinned articles, the skinning speed, or the pressure relief system position.

6. The skinning system of claim 5, wherein the at least one feedback controller comprises: a first feedback controller configured to determine the speed of the pump based on a measured flow rate of the flowable mixture in the mixture delivery system.

7. The skinning system of claim 6, wherein the at least one feedback controller comprises: a second feedback controller configured to determine the flow rate set point based on a skinning pipe pressure measured in the skinning system, wherein the first feedback controller is configured to determine the speed of the pump also based on the flow rate set point.

8. The skinning system of claim 7, wherein monitoring the presence of the defect comprises detecting a type of the defect, and wherein the at least one feedback controller comprises: a third feedback controller configured to determine the skinning pipe pressure set point based on the type of defect, wherein the second feedback controller is configured to determine the flow rate set point also based on the skinning pipe pressure set point.

9. The skinning system of claim 5, wherein the feed forward controller comprises: a first feed forward controller and a second feed forward controller, wherein the second feed forward controller is configured to determine an adjustment to at least one of the return pressure set point or the delivery pressure set point based on the variation relating to at least one of the measured viscosity or measured flow rate.

10. The skinning system of claim 5, wherein the feed forward controller comprises: a first feed forward controller and a second feed forward controller, wherein the second feed forward controller is configured to determine an adjustment to at least one of the speed of the pump or the delivery valve position based on the variation relating to at least one of the measured viscosity or the measured flow rate.

11. The skinning system of claim 5, wherein the feed forward controller comprises: a first feed forward controller and a second feed forward controller, wherein the second feed forward controller is configured to determine an adjustment to the flow rate set point based on the variation relating to at least one of the measured viscosity or the measured flow rate.

12. The skinning system of claim 3, wherein the at least one feedback controller comprises: a first feedback controller configured to determine the speed of the pump based on a measured return pressure or delivery pressure.

13. The skinning system of claim 12, wherein the at least one feedback controller comprises: a second feedback controller configured to determine at least one of the return pressure set point or the delivery pressure set point based on a measured skinning pipe pressure, wherein the first feedback controller is configured to determine the speed of the pump also based on at least one of the return pressure set point or the delivery pressure set point.

14. The skinning system of claim 13, wherein monitoring the presence of the defect comprises detecting a type of the defect, and wherein the at least one feedback controller comprises: a third feedback controller configured to determine the skinning pipe pressure set point based on the type of defect, wherein the second feedback controller is configured to determine at least one of the return pressure set point or the delivery pressure set point also based on skinning pipe pressure set point.

15. The skinning system of claim 3, wherein the at least one feedback controller comprises: a first feedback controller configured to determine at least one of the speed of the pump or the delivery valve position based on a measured skinning pipe pressure.

16. The skinning system of claim 15, wherein monitoring the presence of the defect comprises detecting a type of the defect, and wherein the at least one feedback controller comprises: a second feedback controller configured to determine the skinning pipe pressure set point based on the type of defect, wherein the first feedback controller configured to determine at least one of the speed of the pump or the delivery valve position also based on the skinning pipe pressure set point.

17. The skinning system of claim 2, wherein the feed forward controller comprises: a first feed forward controller and a second feed forward controller, wherein the second feed forward controller is configured to determine an adjustment to the skinning speed based on the variation relating to the dimensions of incoming unskinned articles measured in the skinning system.

18. The skinning system of claim 2, wherein the feed forward controller comprises: a first feed forward controller and a second feed forward controller, wherein the second feed forward controller is configured to determine an adjustment to the pressure relief system position based on the variation relating to the dimensions of incoming unskinned articles measured in the skinning system.

* * * * *